(12) United States Patent
Luo et al.

(10) Patent No.: US 12,545,732 B2
(45) Date of Patent: Feb. 10, 2026

(54) PD-1 ANTIGEN-BINDING PROTEIN AND USE THEREOF

(71) Applicant: HARBOUR BIOMED (SHANGHAI) CO., LTD, Shanghai (CN)

(72) Inventors: Haishan Luo, Shanghai (CN); Qianqian Shan, Shanghai (CN); Yongqiang Wang, Shanghai (CN); Xuekun Zhang, Shanghai (CN); Lei Shi, Shanghai (CN); Yun Zhang, Shanghai (CN); Chuchu Zhao, Shanghai (CN); Wei Zhou, Shanghai (CN); Xin Gan, Shanghai (CN)

(73) Assignee: Harbour BioMed (Shanghai) Co., Ltd., Shanghai (CN)

( * ) Notice: Subject to any disclaimer, the term of this patent is extended or adjusted under 35 U.S.C. 154(b) by 595 days.

(21) Appl. No.: 18/005,055

(22) PCT Filed: Jul. 15, 2021

(86) PCT No.: PCT/CN2021/106569
§ 371 (c)(1),
(2) Date: Jan. 10, 2023

(87) PCT Pub. No.: WO2022/012639
PCT Pub. Date: Jan. 20, 2022

(65) Prior Publication Data
US 2024/0034792 A1 Feb. 1, 2024

(30) Foreign Application Priority Data

Jul. 16, 2020 (CN) ......................... 202010686191.7
Jul. 7, 2021 (CN) ......................... 202110770856.7

(51) Int. Cl.
*C07K 16/28* (2006.01)
*A61K 47/68* (2017.01)

(52) U.S. Cl.
CPC ...... *C07K 16/2818* (2013.01); *A61K 47/6849* (2017.08); *C07K 16/2896* (2013.01); *C07K 2317/21* (2013.01); *C07K 2317/24* (2013.01); *C07K 2317/31* (2013.01); *C07K 2317/569* (2013.01)

(58) Field of Classification Search
None
See application file for complete search history.

(56) References Cited

U.S. PATENT DOCUMENTS

2022/0213192 A1* 7/2022 Wu .................... C07K 16/2818

FOREIGN PATENT DOCUMENTS

| CN | 104250302 A | 12/2014 |
|---|---|---|
| CN | 106699889 A | 5/2017 |
| CN | 108025051 A | 5/2018 |
| CN | 108285485 A | 7/2018 |
| CN | 108368170 A | 8/2018 |
| CN | 109467603 A | 3/2019 |
| CN | 110423277 A | 11/2019 |
| WO | WO 2002/085945 A2 | 10/2002 |

OTHER PUBLICATIONS

[No Author Listed], U.S. National Library of Medicine Clinical Trial NCT02503774. MEDI9447 Alone and in Combination with MEDI4736 in Adult Subjects with Select Advanced Solid Tumors. MedImmune LLC. Jul. 21, 2015. 8 pages.

[No Author Listed], U.S. National Library of Medicine Clinical Trial NCT03454451. CPI-006 Alone and in Combination with Ciforadenant and with Pembrolizumab for Patients with Advanced Cancers. Corvus Pharmaceuticals. Mar. 6, 2018. 8 pages.

[No Author Listed], U.S. National Library of Medicine Clinical Trial NCT03835949. Study of TJ004309 in Combination with Atezolizumab (Tecentriq®) in Patients with Advanced or Metastatic Cancer. Tracon Pharmaceuticals Inc.. Feb. 11, 2019. 8 pages.

* cited by examiner

*Primary Examiner* — Daniel E Kolker
*Assistant Examiner* — James Ryland Melchior
(74) *Attorney, Agent, or Firm* — Mintz Levin Cohn Ferris Glovsky and Popeo, P.C.

(57) ABSTRACT

Provided are an antigen binding protein capable of binding to PD-1 and a fusion protein thereof, and corresponding preparation method therefor and the use thereof. The fusion protein is capable of targeting PD-1 and CD73.

24 Claims, 13 Drawing Sheets
Specification includes a Sequence Listing.

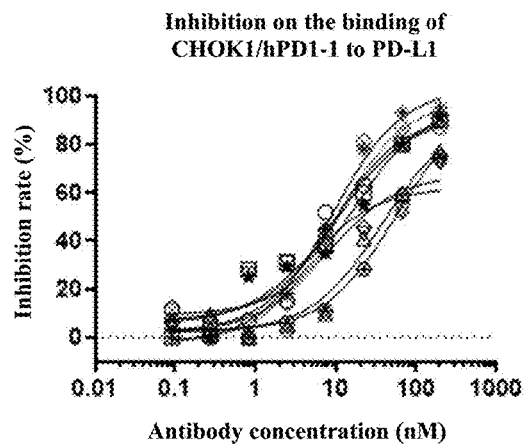
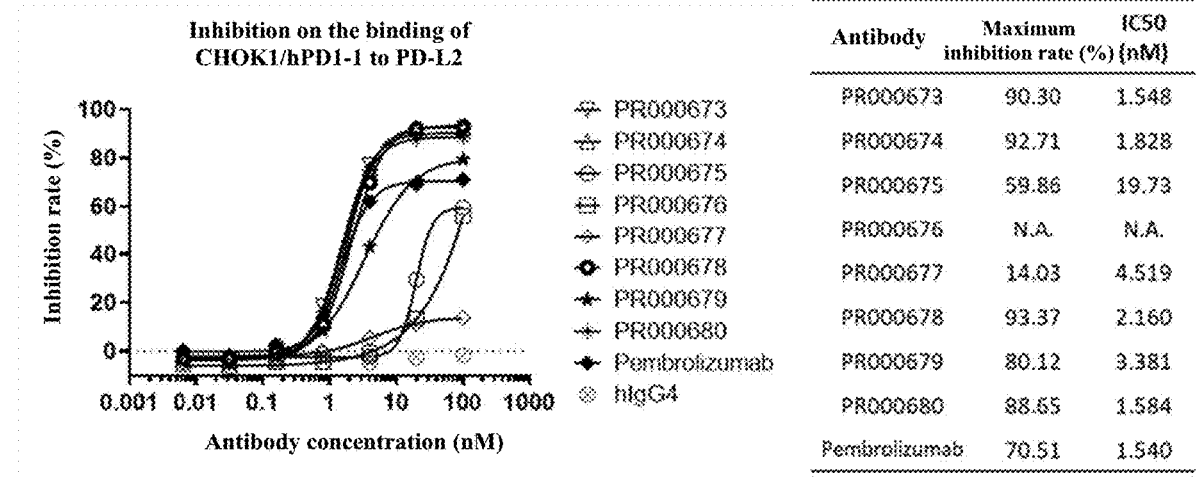
FIG. 5B
FIG. 5C
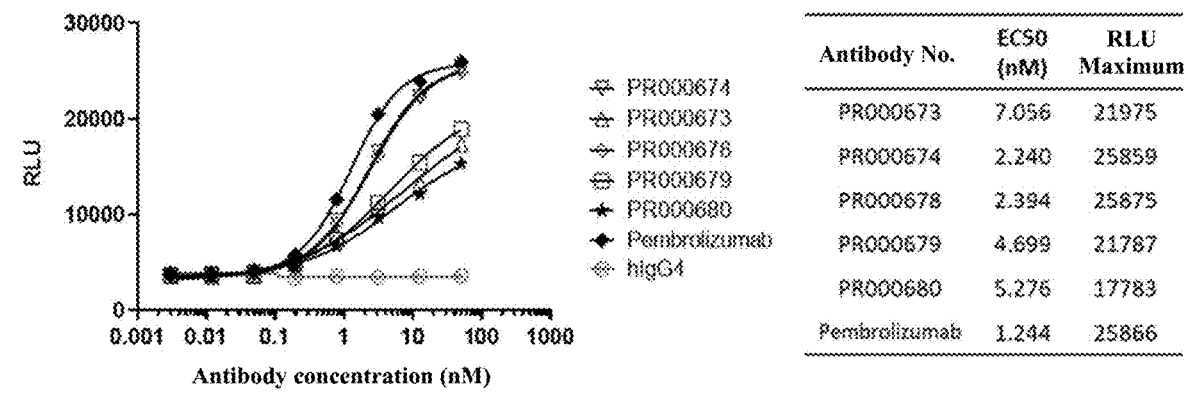
FIG. 6A

PD-1 ANTIGEN-BINDING PROTEIN AND USE THEREOF

CROSS REFERENCE TO RELATED APPLICATIONS

The present application is a United States National Phase under 35 U.S.C. § 371 of International Application No. PCT/CN2021/106569, filed Jul. 15, 2021, which claims priority to Chinese Patent Application No. 202010686191.7 filed on Jul. 16, 2020 and Chinese Patent Application No. 202110770856.7 filed on Jul. 7, 2021.

REFERENCE TO SEQUENCE LISTING

The application contains a Sequence Listing that has been filed electronically in the form of a text file, created Jan. 9, 2023, and named "C22W3253.01US-sequence listing in En.TXT" (388,053 bytes), the contents of which are incorporated by reference herein in their entirety.

TECHNICAL FIELD

The present application relates to the field of biomedicine, and in particular to an antigen-binding protein binding to PD-1 and use thereof.

BACKGROUND

Programmed death receptor 1 (PD-1) is a type I membrane protein with 288 amino acids, and it is mainly expressed on the surface of activated T cells. PD-1 has two ligands, namely programmed death ligand 1 (PD-L1) and programmed death ligand 2 (PD-L2). The interaction between PD-1 and PD-L1 and PD-L2 can down-regulate the activity of T cells, reduce the secretion of cytokines and play a role in immunosuppression. The PD-1/PD-L1 pathway inhibitor can block the binding of PD-1 to PD-L1, block negative regulation signals, restore the activity of T cells, and play a role in killing tumor cells, thereby inhibiting tumor growth. Therefore, the immunoregulation targeting PD-1/PD-L1 is of great significance for tumor inhibition.

CD73 (also called extracellular-5'-nucleotidase) is an enzyme that can decompose AMP (adenosine monophosphate) into adenosine, and adenosine produced by the decomposition of AMP inhibits the function of immune system cells typified by T cells. CD73 has been reported to be expressed on many different tumor cells, and CD73 expression is associated with tumor cell proliferation, migration, neovascularization, invasiveness, metastasis and shorter patient survival. Thus, CD73 plays an important role in the regulation of immune responses. CD73 can modulate cancer progression in both direct and indirect ways, which highlights its potential as a novel therapeutic target.

At present, the blocking antibody drugs of the PD-1/PD-L1 pathway still face a plurality of challenges in clinic, such as low effectiveness, drug resistance and side effects. The results of preclinical studies show that the combination of the PD-1/PD-L1 immune checkpoint inhibitor and the CD73 monoclonal antibody has a strong synergistic effect on killing tumor cells. Some clinical trials (NCT03454451, NCT03835949 and NCT02503774) are also using a PD-1 or PD-L1 antibody in combination with the CD73 monoclonal antibody to treat cancer to improve safety and effectiveness. However, the administration mode and clinical trials of the combination therapy are complex and expensive; besides, two single drugs need to be prepared or developed simultaneously, which requires considerably long period and is also relatively difficult. To solve the existing challenges, there is an urgent need to develop new products targeting PD-1/PD-L1 immune checkpoint and CD73 target point at the same time and having high anti-tumor effect and good safety.

SUMMARY

The present application provides an antigen-binding protein capable of binding to PD-1, which can block the binding of PD-1 to PD-L1 and PD-L2, stimulate the secretion of IFN-γ and/or IL2 in immune cells and inhibit tumor growth and/or tumor cell proliferation. The present application also provides a heavy-chain antibody containing only heavy chains, which has the activity of specifically binding to human PD-1 and cynomolgus monkey PD-1. The PD-1 heavy-chain antibody is only half the size of conventional IgG antibodies. Due to the absence of a light chain, the antibody can be used for bispecific antibodies, and the problems of light chain mismatching and heterodimerization are solved. The present application also provides a fusion protein comprising a PD-1 binding moiety and a CD73 binding moiety, which is capable of further synergistically inhibiting tumor growth and/or tumor cell proliferation by synergistically stimulating and increasing the secretion of IFN-γ and/or IL2 in immune cells; meanwhile, the fusion protein can recognize CD73 protein, inhibit the activity of CD73 enzymatic activity and induce the internalization of CD73 tumor cell, so that the activity of CD73 on the cell surface is further reduced.

In one aspect, the present application provides an isolated antigen-binding protein, which comprises an antibody heavy chain or a fragment thereof, wherein the antibody heavy chain or the fragment thereof comprises an HCDR1, an HCDR2 and an HCDR3, wherein the HCDR1 comprises an amino acid sequence set forth in SEQ ID NO: 359, the HCDR2 comprises an amino acid sequence set forth in SEQ ID NO: 360, and the HCDR3 comprises an amino acid sequence set forth in SEQ ID NO: 361.

In certain embodiments, the isolated antigen-binding protein comprises an antibody or an antigen-binding fragment thereof.

In certain embodiments, the antigen-binding fragment comprises Fab, Fab', Fv fragment, F(ab')$_2$, scFv, di-scFv, VHH, a heavy-chain antibody (HCAb) and/or dAb.

In certain embodiments, the antibody is selected from the group consisting of a monoclonal antibody, a chimeric antibody, a humanized antibody and a fully human antibody.

In certain embodiments, the HCDR1 comprises an amino acid sequence set forth in any one of SEQ ID NOs: 11-16, the HCDR2 comprises an amino acid sequence set forth in any one of SEQ ID NOs: 50-55, and the HCDR3 comprises an amino acid sequence set forth in any one of SEQ ID NOs: 92-97.

In certain embodiments, the HCDR1, HCDR2 and HCDR3 comprise amino acid sequences selected from any one of the following groups:

(1) HCDR1:, SEQ ID NO: 11

HCDR2:, SEQ ID NO: 50 and

HCDR3:; SEQ ID NO: 92

(2) HCDR1:, SEQ ID NO: 12

HCDR2:, SEQ ID NO: 50 and

HCDR3:; SEQ ID NO: 93

(3) HCDR1:, SEQ ID NO: 13

HCDR2:, SEQ ID NO: 51 and

HCDR3:; SEQ ID NO: 94

(4) HCDR1:, SEQ ID NO: 14

HCDR2:, SEQ ID NO: 52 and

HCDR3:; SEQ ID NO: 95

(5) HCDR1:, SEQ ID NO: 15

HCDR2:, SEQ ID NO: 53 and

HCDR3:; SEQ ID NO: 96

(6) HCDR1:, SEQ ID NO: 16

HCDR2:, SEQ ID NO: 54 and

HCDR3:; SEQ ID NO: 97

(7) HCDR1:, SEQ ID NO: 11

HCDR2:, SEQ ID NO: 55 and

HCDR3:. SEQ ID NO: 92

In certain embodiments, the isolated antigen-binding protein comprises an antibody heavy chain variable region VH, and the VH comprises an amino acid sequence set forth in SEQ ID NO: 368.

In certain embodiments, the VH comprises an amino acid sequence set forth in any one of SEQ ID NOs: 151-158.

In certain embodiments, the isolated antigen-binding protein further comprises an antibody heavy chain constant region.

In certain embodiments, the heavy chain constant region is derived from a human IgG constant region.

In certain embodiments, the heavy chain constant region is derived from a human IgG4 constant region and/or a human IgG1 constant region.

In certain embodiments, the heavy chain constant region comprises an amino acid sequence set forth in any one of SEQ ID NOs: 354-355.

In certain embodiments, the isolated antigen-binding protein comprises an antibody heavy chain, and the antibody heavy chain comprises an amino acid sequence set forth in any one of SEQ ID NOs: 238-245.

In certain embodiments, the isolated antigen-binding protein comprises an antibody light chain or a fragment thereof, wherein the antibody light chain or the fragment thereof comprises an LCDR1, an LCDR2 and an LCDR3, wherein the LCDR1 comprises an amino acid sequence set forth in SEQ ID NO: 365, the LCDR2 comprises an amino acid sequence set forth in SEQ ID NO: 366, and the LCDR3 comprises an amino acid sequence set forth in SEQ ID NO: 367.

In certain embodiments, the LCDR1 comprises an amino acid sequence set forth in any one of SEQ ID NOs: 121-125, the LCDR2 comprises an amino acid sequence set forth in any one of SEQ ID NOs: 130-135, and the LCDR3 comprises an amino acid sequence set forth in any one of SEQ ID NOs: 140-145.

In certain embodiments, the LCDR1, LCDR2 and LCDR3 comprise amino acid sequences selected from any one of the following groups:

(1) LCDR1:, SEQ ID NO: 121

LCDR2:, SEQ ID NO: 130 and

LCDR3:; SEQ ID NO: 140

(2) LCDR1:, SEQ ID NO: 122

LCDR2:, SEQ ID NO: 131 and

LCDR3:; SEQ ID NO: 141

(3) LCDR1:, SEQ ID NO: 123

LCDR2:, SEQ ID NO: 132 and

LCDR3:; SEQ ID NO: 142

(4) LCDR1:, SEQ ID NO: 122

LCDR2:, SEQ ID NO: 133 and

-continued

LCDR3:;　　　　　　　　　　SEQ ID NO: 143

(5) LCDR1:,　　　　　　　　SEQ ID NO: 124

LCDR2:,　　　　　　　　　　SEQ ID NO: 134
and

LCDR3:;　　　　　　　　　　SEQ ID NO: 144
and (6) LCDR1:,　　　　　　　　SEQ ID NO: 125

LCDR2:,　　　　　　　　　　SEQ ID NO: 135
and

LCDR3:.　　　　　　　　　　SEQ ID NO: 145

In certain embodiments, the isolated antigen-binding protein comprises an antibody light chain variable region VL, and the VL comprises an amino acid sequence set forth in SEQ ID NO: 369.

In certain embodiments, the VL comprises an amino acid sequence set forth in any one of SEQ ID NOs: 231-236.

In certain embodiments, the isolated antigen-binding protein further comprises an antibody light chain constant region.

In certain embodiments, the light chain constant region comprises an amino acid sequence set forth in SEQ ID NO: 353.

In certain embodiments, the isolated antigen-binding protein comprises an antibody light chain, and the antibody light chain comprises an amino acid sequence set forth in any one of SEQ ID NOs: 324-329.

In certain embodiments, the isolated antigen-binding protein comprises an antibody heavy chain or a fragment thereof and an antibody light chain or a fragment thereof, wherein the antibody heavy chain or the fragment thereof comprises an HCDR1, an HCDR2 and an HCDR3, and the antibody light chain or the fragment thereof comprises an LCDR1, an LCDR2 and an LCDR3, wherein the HCDR1, HCDR2, HCDR3, LCDR1, LCDR2 and LCDR3 comprise amino acid sequences selected from any one of the following groups:

(1) HCDR1:,　　　　　　　　SEQ ID NO: 11

HCDR2:,　　　　　　　　　　SEQ ID NO: 50
and

HCDR3:,　　　　　　　　　　SEQ ID NO: 92

LCDR1:,　　　　　　　　　　SEQ ID NO: 121

LCDR2:,　　　　　　　　　　SEQ ID NO: 130
and

LCDR3:;　　　　　　　　　　SEQ ID NO: 140

-continued (2) HCDR1:,　　　　　　　　SEQ ID NO: 12

HCDR2:,　　　　　　　　　　SEQ ID NO: 50
and

HCDR3:,　　　　　　　　　　SEQ ID NO: 93

LCDR1:,　　　　　　　　　　SEQ ID NO: 122

LCDR2:,　　　　　　　　　　SEQ ID NO: 131
and

LCDR3:;　　　　　　　　　　SEQ ID NO: 141

(3) HCDR1:,　　　　　　　　SEQ ID NO: 13

HCDR2:,　　　　　　　　　　SEQ ID NO: 51
and

HCDR3:,　　　　　　　　　　SEQ ID NO: 94

LCDR1:,　　　　　　　　　　SEQ ID NO: 123

LCDR2:,　　　　　　　　　　SEQ ID NO: 132
and

LCDR3:;　　　　　　　　　　SEQ ID NO: 142

(4) HCDR1:,　　　　　　　　SEQ ID NO: 14

HCDR2:,　　　　　　　　　　SEQ ID NO: 52
and

HCDR3:,　　　　　　　　　　SEQ ID NO: 95

LCDR1:,　　　　　　　　　　SEQ ID NO: 122

LCDR2:,　　　　　　　　　　SEQ ID NO: 133
and

LCDR3:;　　　　　　　　　　SEQ ID NO: 143

(5) HCDR1:,　　　　　　　　SEQ ID NO: 15

HCDR2:,　　　　　　　　　　SEQ ID NO: 53
and

HCDR3:,　　　　　　　　　　SEQ ID NO: 96

LCDR1:,　　　　　　　　　　SEQ ID NO: 124

LCDR2:,　　　　　　　　　　SEQ ID NO: 134
and

-continued (6) HCDR1:, SEQ ID NO: 16

HCDR2:, SEQ ID NO: 54 and

HCDR3:, SEQ ID NO: 97

LCDR1:, SEQ ID NO: 125

LCDR2:, SEQ ID NO: 135 and

LCDR3:; SEQ ID NO: 145 and (7) HCDR1:, SEQ ID NO: 11

HCDR2:, SEQ ID NO: 55 and

HCDR3:; SEQ ID NO: 92

LCDR1:, SEQ ID NO: 121

LCDR2:, SEQ ID NO: 130 and

LCDR3:. SEQ ID NO: 140

In certain embodiments, the isolated antigen-binding protein comprises an antibody heavy chain variable region VH and an antibody light chain variable region VL, and the VH and VL comprise amino acid sequences selected from any one of the following groups:

(1) VH: SEQ ID NO: 151
and
VL:; SEQ ID NO: 231

(2) VH: SEQ ID NO: 152
and
VL:; SEQ ID NO: 232

(3) VH: SEQ ID NO: 153
and
VL:; SEQ ID NO: 233

(4) VH: SEQ ID NO: 154
and
VL:; SEQ ID NO: 234

-continued (5) VH: SEQ ID NO: 155
and
VL:; SEQ ID NO: 235

(6) VH: SEQ ID NO: 156
and
VL:; SEQ ID NO: 232

(7) VH: SEQ ID NO: 157
and
VL:; SEQ ID NO: 236

(8) VH: SEQ ID NO: 158
and
VL:. SEQ ID NO: 231

In certain embodiments, the isolated antigen-binding protein has one or more of the following properties:
(1) being capable of binding to human PD-1 with a KD value of $1 \times 10^8$ M or less;
(2) being capable of blocking the binding of PD-1 to PD-L1;
(3) being capable of blocking the binding of PD-1 to PD-L2;
(4) being capable of stimulating the secretion of IL-2 and/or IFN-γ in immune cells; and
(5) being capable of inhibiting tumor growth and/or tumor cell proliferation.

In another aspect, the present application provides an isolated antigen-binding protein, which comprises an antibody heavy chain or a fragment thereof, wherein the antibody heavy chain or the fragment thereof comprises an HCDR1, an HCDR2 and an HCDR3, wherein the HCDR1 comprises an amino acid sequence set forth in SEQ ID NO: 362, the HCDR2 comprises an amino acid sequence set forth in SEQ ID NO: 363, and the HCDR3 comprises an amino acid sequence set forth in SEQ ID NO: 364.

In certain embodiments, the isolated antigen-binding protein comprises an antibody or an antigen-binding fragment thereof.

In certain embodiments, the antigen-binding fragment comprises Fab, Fab', Fv fragment, F(ab')$_2$, scFv, di-scFv, VHH, a heavy-chain antibody (HCAb) and/or dAb.

In certain embodiments, the antigen-binding fragment is a heavy-chain antibody (HCAb). In certain embodiments, the antigen-binding fragment is a VHH.

In certain embodiments, the antibody is selected from the group consisting of a monoclonal antibody, a chimeric antibody, a humanized antibody and a fully human antibody.

In certain embodiments, the HCDR1 comprises an amino acid sequence set forth in any one of SEQ ID NOs: 18-33, the HCDR2 comprises an amino acid sequence set forth in any one of SEQ ID NOs: 57-68, and the HCDR3 comprises an amino acid sequence set forth in any one of SEQ ID NOs: 99-101 and 103-111.

In certain embodiments, the HCDR1, HCDR2 and HCDR3 comprise amino acid sequences selected from any one of the following groups:

(1) HCDR1:, SEQ ID NO: 18
HCDR2:, SEQ ID NO: 57
and
HCDR3:; SEQ ID NO: 100

(2) HCDR1:, SEQ ID NO: 18
HCDR2:, SEQ ID NO: 57
and
HCDR3:; SEQ ID NO: 99

(3) HCDR1:, SEQ ID NO: 19
HCDR2:, SEQ ID NO: 57
and
HCDR3:; SEQ ID NO: 99

(4) HCDR1:, SEQ ID NO: 18
HCDR2:, SEQ ID NO: 57
and
HCDR3:; SEQ ID NO: 101

(5) HCDR1:, SEQ ID NO: 18
HCDR2:, SEQ ID NO: 58
and
HCDR3:; SEQ ID NO: 100

(6) HCDR1:, SEQ ID NO: 20
HCDR2:, SEQ ID NO: 59
and
HCDR3:; SEQ ID NO: 103

(7) HCDR1:, SEQ ID NO: 20
HCDR2:, SEQ ID NO: 60
and
HCDR3:; SEQ ID NO: 103

(8) HCDR1:, SEQ ID NO: 20
HCDR2:, SEQ ID NO: 61
and
HCDR3:; SEQ ID NO: 103

(9) HCDR1:, SEQ ID NO: 21
HCDR2:, SEQ ID NO: 60
and
HCDR3:; SEQ ID NO: 103

(10) HCDR1:, SEQ ID NO: 21
HCDR2:, SEQ ID NO: 59
and
HCDR3:; SEQ ID NO: 103

(11) HCDR1:, SEQ ID NO: 21
HCDR2:, SEQ ID NO: 61
and
HCDR3:; SEQ ID NO: 103

(12) HCDR1:, SEQ ID NO: 20
HCDR2:, SEQ ID NO: 58
and
HCDR3:; SEQ ID NO: 100

(13) HCDR1:, SEQ ID NO: 18
HCDR2:, SEQ ID NO: 58
and
HCDR3:; SEQ ID NO: 104

(14) HCDR1:, SEQ ID NO: 18
HCDR2:, SEQ ID NO: 58
and
HCDR3:; SEQ ID NO: 105

(15) HCDR1:, SEQ ID NO: 21
HCDR2:, SEQ ID NO: 58
and
HCDR3:; SEQ ID NO: 100

-continued

(16) HCDR1:, SEQ ID NO: 22
HCDR2:, SEQ ID NO: 58
and
HCDR3:; SEQ ID NO: 100

(17) HCDR1:, SEQ ID NO: 18
HCDR2:, SEQ ID NO: 58
and
HCDR3:; SEQ ID NO: 106

(18) HCDR1:, SEQ ID NO: 18
HCDR2:, SEQ ID NO: 58
and
HCDR3:; SEQ ID NO: 107

(19) HCDR1:, SEQ ID NO: 18
HCDR2:, SEQ ID NO: 58
and
HCDR3:; SEQ ID NO: 103

(20) HCDR1:, SEQ ID NO: 18
HCDR2:, SEQ ID NO: 62
and
HCDR3:; SEQ ID NO: 100

(21) HCDR1:, SEQ ID NO: 18
HCDR2:, SEQ ID NO: 61
and
HCDR3:; SEQ ID NO: 100

(22) HCDR1:, SEQ ID NO: 18
HCDR2:, SEQ ID NO: 59
and
HCDR3:; SEQ ID NO: 100

(23) HCDR1:, SEQ ID NO: 18
HCDR2:, SEQ ID NO: 60
and

-continued

HCDR3:; SEQ ID NO: 100

(24) HCDR1:, SEQ ID NO: 18
HCDR2:, SEQ ID NO: 63
and
HCDR3:; SEQ ID NO: 100

(25) HCDR1:, SEQ ID NO: 23
HCDR2:, SEQ ID NO: 64
and
HCDR3:; SEQ ID NO: 108

(26) HCDR1:, SEQ ID NO: 24
HCDR2:, SEQ ID NO: 65
and
HCDR3:; SEQ ID NO: 108

(27) HCDR1:, SEQ ID NO: 26
HCDR2:, SEQ ID NO: 64
and
HCDR3:; SEQ ID NO: 108

(28) HCDR1:, SEQ ID NO: 25
HCDR2:, SEQ ID NO: 66
and
HCDR3:; SEQ ID NO: 108

(29) HCDR1:, SEQ ID NO: 25
HCDR2:, SEQ ID NO: 65
and
HCDR3:; SEQ ID NO: 108

(30) HCDR1:, SEQ ID NO: 26
HCDR2:, SEQ ID NO: 67
and
HCDR3:; SEQ ID NO: 109

(31) HCDR1:, SEQ ID NO: 27
HCDR2:, SEQ ID NO: 64
and

-continued

HCDR3:; SEQ ID NO: 110

(32) HCDR1:, SEQ ID NO: 18
HCDR2:, SEQ ID NO: 64
and
HCDR3:; SEQ ID NO: 108

(33) HCDR1:, SEQ ID NO: 28
HCDR2:, SEQ ID NO: 64
and
HCDR3:; SEQ ID NO: 111

(34) HCDR1:, SEQ ID NO: 18
HCDR2:, SEQ ID NO: 66
and
HCDR3:; SEQ ID NO: 111

(35) HCDR1:, SEQ ID NO: 23
HCDR2:, SEQ ID NO: 68
and
HCDR3:; SEQ ID NO: 108

(36) HCDR1:, SEQ ID NO: 18
HCDR2:, SEQ ID NO: 64
and
HCDR3:; SEQ ID NO: 111

(37) HCDR1:, SEQ ID NO: 18
HCDR2:, SEQ ID NO: 66
and
HCDR3:; SEQ ID NO: 109

(38) HCDR1:, SEQ ID NO: 30
HCDR2:, SEQ ID NO: 64
and
HCDR3:; SEQ ID NO: 111

(39) HCDR1:, SEQ ID NO: 29
HCDR2:, SEQ ID NO: 66
and

-continued

HCDR3:; SEQ ID NO: 111

(40) HCDR1:, SEQ ID NO: 23
HCDR2:, SEQ ID NO: 68
and
HCDR3:; SEQ ID NO: 111

(41) HCDR1:, SEQ ID NO: 29
HCDR2:, SEQ ID NO: 65
and
HCDR3:; SEQ ID NO: 111

(42) HCDR1:, SEQ ID NO: 30
HCDR2:, SEQ ID NO: 64
and
HCDR3:; SEQ ID NO: 109

(43) HCDR1:, SEQ ID NO: 31
HCDR2:, SEQ ID NO: 64
and
HCDR3:; SEQ ID NO: 111

(44) HCDR1:, SEQ ID NO: 23
HCDR2:, SEQ ID NO: 66
and
HCDR3:; SEQ ID NO: 111

(45) HCDR1:, SEQ ID NO: 23
HCDR2:, SEQ ID NO: 64
and
HCDR3:; SEQ ID NO: 111

(46) HCDR1:, SEQ ID NO: 32
HCDR2:, SEQ ID NO: 64
and
HCDR3:; SEQ ID NO: 109

(47) HCDR1:, SEQ ID NO: 23
HCDR2:, SEQ ID NO: 66
and

-continued

HCDR3:;  SEQ ID NO: 109 and

(48) HCDR1:,  SEQ ID NO: 33

HCDR2:,  SEQ ID NO: 65 and

HCDR3:.  SEQ ID NO: 111

In certain embodiments, the isolated antigen-binding protein comprises an antibody heavy chain variable region VH, and the VH comprises an amino acid sequence set forth in SEQ ID NO: 254.

In certain embodiments, the VH comprises an amino acid sequence set forth in any one of SEQ ID NOs: 160-166 and 168-221.

In certain embodiments, the isolated antigen-binding protein further comprises an antibody heavy chain constant region.

In certain embodiments, the heavy chain constant region is derived from a human IgG constant region.

In certain embodiments, the heavy chain constant region is derived from a human IgG4 constant region and/or a human IgG1 constant region.

In certain embodiments, the heavy chain constant region comprises an amino acid sequence set forth in any one of SEQ ID NOs: 354-355.

In certain embodiments, the isolated antigen-binding protein comprises an antibody heavy chain, and the antibody heavy chain comprises an amino acid sequence set forth in any one of SEQ ID NOs: 247-253 and 255-309.

In certain embodiments, the isolated antigen-binding protein has one or more of the following properties:
a) being capable of binding to human PD-1 with a KD value of $1\times10^8$ M or less;
b) being capable of blocking the binding of PD-1 to PD-L1;
c) being capable of blocking the binding of PD-1 to PD-L2;
d) being capable of stimulating the secretion of IL-2 and/or IFN-γ in immune cells; and
e) being capable of inhibiting tumor growth and/or tumor cell proliferation.

In another aspect, the present application provides an isolated antigen-binding protein, which comprises an antibody heavy chain or a fragment thereof, wherein the antibody heavy chain or the fragment thereof comprises an HCDR1, an HCDR2 and an HCDR3, wherein the HCDR1 comprises an amino acid sequence set forth in SEQ ID NO: 10, the HCDR2 comprises an amino acid sequence set forth in SEQ ID NO: 81, and the HCDR3 comprises an amino acid sequence set forth in SEQ ID NO: 102.

In certain embodiments, the isolated antigen-binding protein comprises an antibody or an antigen-binding fragment thereof.

In certain embodiments, the antigen-binding fragment comprises Fab, Fab', Fv fragment, F(ab')$_2$, scFv, di-scFv, VHH, a heavy-chain antibody (HCAb) and/or dAb.

In certain embodiments, the antigen-binding fragment is a heavy-chain antibody (HCAb).

In certain embodiments, the antibody is selected from the group consisting of a monoclonal antibody, a chimeric antibody, a humanized antibody and a fully human antibody.

In certain embodiments, the HCDR1 comprises an amino acid sequence set forth in any one of SEQ ID NOs: 18, 25, 28 and 34-38, the HCDR2 comprises an amino acid sequence set forth in any one of SEQ ID NOs: 64-66, and the HCDR3 comprises an amino acid sequence set forth in any one of SEQ ID NOs: 108, 111 and 112.

In certain embodiments, the HDCR1, HCDR2 and HCDR3 comprise amino acid sequences selected from any one of the following groups:

(1) HCDR1:,  SEQ ID NO: 25

HCDR2:,  SEQ ID NO: 66 and

HCDR3:;  SEQ ID NO: 108

(2) HCDR1:,  SEQ ID NO: 25

HCDR2:,  SEQ ID NO: 65 and

HCDR3:;  SEQ ID NO: 108

(3) HCDR1:,  SEQ ID NO: 25

HCDR2:,  SEQ ID NO: 65 and

HCDR3:;  SEQ ID NO: 111

(4) HCDR1:,  SEQ ID NO: 34

HCDR2:,  SEQ ID NO: 65 and

HCDR3:;  SEQ ID NO: 111

(5) HCDR1:,  SEQ ID NO: 18

HCDR2:,  SEQ ID NO: 64 and

HCDR3:;  SEQ ID NO: 108

(6) HCDR1:,  SEQ ID NO: 18

HCDR2:,  SEQ ID NO: 64 and

HCDR3:;  SEQ ID NO: 111

(7) HCDR1:,  SEQ ID NO: 35

HCDR2:,  SEQ ID NO: 64 and

```
                 -continued
      HCDR3:;
                                  SEQ ID NO: 111

(8) HCDR1:,
                                  SEQ ID NO: 36

HCDR2:,
                                  SEQ ID NO: 64
      and

HCDR3:;
                                  SEQ ID NO: 111

(9) HCDR1:,
                                  SEQ ID NO: 36

HCDR2:,
                                  SEQ ID NO: 64
      and

HCDR3:;
                                  SEQ ID NO: 112

(10) HCDR1:,
                                  SEQ ID NO: 37

HCDR2:,
                                  SEQ ID NO: 64
      and

HCDR3:;
                                  SEQ ID NO: 111

(11) HCDR1:,
                                  SEQ ID NO: 28

HCDR2:,
                                  SEQ ID NO: 64
      and

HCDR3:;
                                  SEQ ID NO: 111
      and

(12) HCDR1:,
                                  SEQ ID NO: 38

HCDR2:,
                                  SEQ ID NO: 64
      and

HCDR3:.
                                  SEQ ID NO: 111
```

In certain embodiments, the isolated antigen-binding protein comprises an antibody heavy chain variable region VH, and the VH comprises an amino acid sequence set forth in SEQ ID NO: 167.

In certain embodiments, the VH comprises an amino acid sequence set forth in any one of SEQ ID NOs: 196, 197, 200, 201, 202 and 222-230.

In certain embodiments, the isolated antigen-binding protein further comprises an antibody heavy chain constant region.

In certain embodiments, the heavy chain constant region is derived from a human IgG constant region.

In certain embodiments, the heavy chain constant region is derived from a human IgG4 constant region and/or a human IgG1 constant region.

In certain embodiments, the heavy chain constant region comprises an amino acid sequence set forth in any one of SEQ ID NOs: 354-355.

In certain embodiments, the isolated antigen-binding protein comprises an antibody heavy chain, and the antibody heavy chain comprises an amino acid sequence set forth in any one of SEQ ID NOs: 310-323.

In certain embodiments, the isolated antigen-binding protein has one or more of the following properties:
a) being capable of binding to human PD-1 with a KD value of $1 \times 10^8$ M or less;
b) being capable of blocking the binding of PD-1 to PD-L1;
c) being capable of blocking the binding of PD-1 to PD-L2;
d) being capable of stimulating the secretion of IL-2 and/or IFN-γ in immune cells; and
e) being capable of inhibiting tumor growth and/or tumor cell proliferation.

In another aspect, the present application provides a fusion protein, which comprises a first targeting moiety and a second targeting moiety, wherein the first targeting moiety comprises a PD-1 binding moiety, and the PD-1 binding moiety comprises the isolated antigen-binding protein described herein.

In certain embodiments, the second targeting moiety comprises a CD73 binding moiety.

In certain embodiments, the CD73 binding moiety comprises an antibody or an antigen-binding fragment thereof that specifically binds to CD73.

In certain embodiments, the CD73 binding moiety comprises an antibody heavy chain or a fragment thereof, wherein the antibody heavy chain or the fragment thereof comprises an HCDR1, an HCDR2 and an HCDR3, and the HCDR1, HCDR2 and HCDR3 comprise amino acid sequences set forth in SEQ ID NO: 17, SEQ ID NO: 56 and SEQ ID NO: 98, respectively.

In certain embodiments, the CD73 binding moiety comprises an antibody heavy chain variable region VH, and the VH comprises an amino acid sequence set forth in SEQ ID NO: 159.

In certain embodiments, the CD73 binding moiety comprises an antibody light chain or a fragment thereof, wherein the antibody light chain or the fragment thereof comprises an LCDR1, an LCDR2 and an LCDR3, and the LCDR1, LCDR2 and LCDR3 comprise amino acid sequences set forth in SEQ ID NO: 123, SEQ ID NO: 130 and SEQ ID NO: 146, respectively.

In certain embodiments, the CD73 binding moiety comprises an antibody light chain variable region VL, and the VL comprises an amino acid sequence set forth in SEQ ID NO: 237.

In certain embodiments, the CD73 binding moiety comprises a Fab.

In certain embodiments, the CD73 binding moiety comprises an antibody heavy chain, and the antibody heavy chain comprises an amino acid sequence set forth in SEQ ID NO: 246.

In certain embodiments, the CD73 binding moiety comprises an antibody light chain, and the antibody light chain comprises an amino acid sequence set forth in SEQ ID NO: 330.

In certain embodiments, the PD-1 binding moiety is located at the N-terminus or C-terminus of the CD73 binding moiety.

In certain embodiments, the fusion protein comprises a first polypeptide chain and a second polypeptide chain, wherein the first polypeptide chain comprises a VH of the PD-1 binding moiety and the VH of the CD73 binding moiety, and the second polypeptide chain comprises the VL of the CD73 binding moiety.

In certain embodiments, in the first polypeptide chain, the VH of the PD-1 binding moiety is located at the N-terminus of the VH of the CD73 binding moiety.

In certain embodiments, in the first polypeptide chain, the VH of the PD-1 binding moiety is located at the C-terminus of the VH of the CD73 binding moiety.

In certain embodiments, the first polypeptide chain further comprises an antibody heavy chain constant region.

In certain embodiments, the first polypeptide chain comprises the VH of the PD-1 binding moiety, the VH of the CD73 binding moiety and the antibody heavy chain constant region sequentially from the N-terminus to the C-terminus.

In certain embodiments, the VH of the PD-1 binding moiety and the VH of the CD73 binding moiety are indirectly linked by a linker peptide.

In certain embodiments, the linker peptide comprises an amino acid sequence set forth in any one of SEQ ID NOs: 334-352.

In certain embodiments, the first polypeptide chain comprises an amino acid sequence set forth in SEQ ID NO: 333.

In certain embodiments, the second polypeptide chain further comprises an antibody light chain constant region.

In certain embodiments, the second polypeptide chain comprises an amino acid sequence set forth in SEQ ID NO: 330.

In certain embodiments, the fusion protein comprises two the first polypeptide chains and two the second polypeptide chains.

In another aspect, the present application provides an immunoconjugate, which comprises the isolated antigen-binding protein or the fusion protein.

In another aspect, the present application provides one or more isolated nucleic acid molecules, which encode the isolated antigen-binding protein and/or the fusion protein.

In another aspect, the present application provides a vector, which comprises the nucleic acid molecule.

In another aspect, the present application provides a cell, which comprises the nucleic acid molecule or the vector.

In another aspect, the present application provides a method for preparing the isolated antigen-binding protein and/or the fusion protein, which comprises culturing the cell under a condition that allows expression of the isolated antigen-binding protein and/or the fusion protein.

In another aspect, the present application provides a pharmaceutical composition, which comprises the isolated antigen-binding protein, the fusion protein, the conjugate, the nucleic acid molecule, the vector and/or the cell, and optionally a pharmaceutically acceptable carrier. In another aspect, the present application provides use of the isolated antigen-binding protein, the fusion protein, the conjugate, the nucleic acid molecule, the vector, the cell, and/or the pharmaceutical composition in preparing a medicament for treating a PD-1-mediated disease or disorder.

In certain embodiments, the PD-1-mediated disease or disorder comprises a tumor, an autoimmune disease or inflammation. In certain embodiments, the tumor comprises a solid tumor or a non-solid tumor.

In certain embodiments, the tumor comprises a solid tumor and/or a non-solid tumor.

In certain embodiments, the tumor comprises lung cancer, liver cancer, melanoma, urothelial cancer, head and neck squamous cell carcinomas, lymphoma, gastric cancer and/or esophageal cancer.

Provided is a method for increasing T cell activity in a subject, which comprises administering to a subject in need thereof an effective amount of the antigen-binding protein, the fusion protein, the conjugate, the nucleic acid molecule, the vector, the cell and/or the pharmaceutical composition.

In another aspect, the present application provides a method for preventing, ameliorating or treating a PD-1-mediated disease or disorder, which comprises administering to a subject in need thereof an effective amount of the antigen-binding protein, the fusion protein, the conjugate, the nucleic acid molecule, the vector, the cell and/or the pharmaceutical composition, optionally in combination with one or more other tumor treatment methods.

In certain embodiments, the PD-1-mediated disease or disorder comprises a tumor, an autoimmune disease or inflammation. In certain embodiments, the tumor comprises a solid tumor or a non-solid tumor. In certain embodiments, the tumor comprises lung cancer, liver cancer, melanoma, urothelial cancer, head and neck squamous cell carcinomas, lymphoma, gastric cancer and/or esophageal cancer.

In another aspect, the present application provides the antigen-binding protein, the fusion protein, the conjugate, the nucleic acid molecule, the vector, the cell and/or the pharmaceutical composition for use in preventing, ameliorating or treating a PD-1 mediated disease or disorder.

In certain embodiments, the PD-1-mediated disease or disorder comprises a tumor, an autoimmune disease or inflammation. In certain embodiments, the tumor comprises a solid tumor or a non-solid tumor. In certain embodiments, the tumor comprises lung cancer, liver cancer, melanoma, urothelial cancer, head and neck squamous cell carcinomas, lymphoma, gastric cancer and/or esophageal cancer.

In another aspect, the present application provides a kit or an administration device, which comprises the antigen-binding protein, the fusion protein, the conjugate, the nucleic acid molecule, the vector, the cell and/or the pharmaceutical composition.

In another aspect, the present application provides a method for inhibiting binding of a PD-L1 protein to a PD-1 protein, which comprises using the antigen-binding protein, the fusion protein, the conjugate, the nucleic acid molecule, the vector, the cell and/or the pharmaceutical composition.

In certain embodiments, the method is an in vitro method.

In certain embodiments, the method is a method for non-diagnostic and/or non-therapeutic purposes.

In another aspect, the present application provides a method for inhibiting binding of a PD-L2 protein to a PD-1 protein, which comprises using the antigen-binding protein, the fusion protein, the conjugate, the nucleic acid molecule, the vector, the cell and/or the pharmaceutical composition.

In certain embodiments, the method is an in vitro method.

In certain embodiments, the method is a method for non-diagnostic and/or non-therapeutic purposes.

In another aspect, the present application provides a method for detecting presence and/or content of a PD-1 protein, which comprises using the antigen-binding protein, the fusion protein, the conjugate, the nucleic acid molecule, the vector, the cell and/or the pharmaceutical composition.

In certain embodiments, the method is an in vitro method.

In certain embodiments, the method is a method for non-diagnostic and/or non-therapeutic purposes.

Provided is use of the antigen-binding protein, the fusion protein, the conjugate, the nucleic acid molecule, the vector, the cell and/or the pharmaceutical composition, in combination with one or more other tumor treatment methods, in preparing a medicament for treating a tumor.

In certain embodiments, the one or more other tumor treatment methods comprise chemotherapy and/or radiotherapy.

In certain embodiments, the tumor comprises a solid tumor and/or a non-solid tumor.

In certain embodiments, the tumor comprises lung cancer, liver cancer, melanoma, urothelial cancer, head and neck squamous cell carcinomas, lymphoma, gastric cancer and/or esophageal cancer.

Provided is use of the isolated antigen-binding protein, in combination with an anti-CD73 antibody, in preparing a medicament for treating a tumor.

In certain embodiments, the tumor comprises a solid tumor and/or a non-solid tumor.

In certain embodiments, the tumor comprises lung cancer, liver cancer, melanoma, urothelial cancer, head and neck squamous cell carcinomas, lymphoma, gastric cancer and/or esophageal cancer.

Other aspects and advantages of the present application will be readily apparent to those skilled in the art from the following detailed description. Only exemplary embodiments of the present application have been shown and described in the following detailed description. As those skilled in the art will recognize, the content of the present application enables those skilled in the art to make changes to the specific embodiments disclosed without departing from the spirit and scope of the invention to which the present application pertains. Accordingly, descriptions in the drawings and specification are only illustrative rather than restrictive.

BRIEF DESCRIPTION OF THE DRAWINGS

Specific features of the invention to which the present application pertains are set forth in appended claims. Features and advantages of the invention to which the present application pertains will be better understood by reference to the exemplary embodiments and drawings described in detail below. The drawings are briefly described as follows:

FIG. 5B shows the activity of the antigen-binding proteins PR002473, PR002474, PR002475, PR002476, PR002477, PR002478, PR002479 and PR002481 described herein in blocking the binding of human PD-1 protein expressed on CHO-K1 cells to PD-L1 protein.

FIG. 5C shows the activity of the antigen-binding proteins PR000673, PR000674, PR000675, PR000676, PR000677, PR000678, PR000679 and PR000680 described herein to block the binding of human PD-1 protein expressed on CHO-K1 cells to PD-L2 protein.

FIG. 6A shows the inhibition of the PD-1 signaling pathway by the antigen-binding proteins PR000673, PR000674, PR000678, PR000679 and PR000680 described herein (as detected by using reporter gene cell line).

DETAILED DESCRIPTION

Figure 1A:
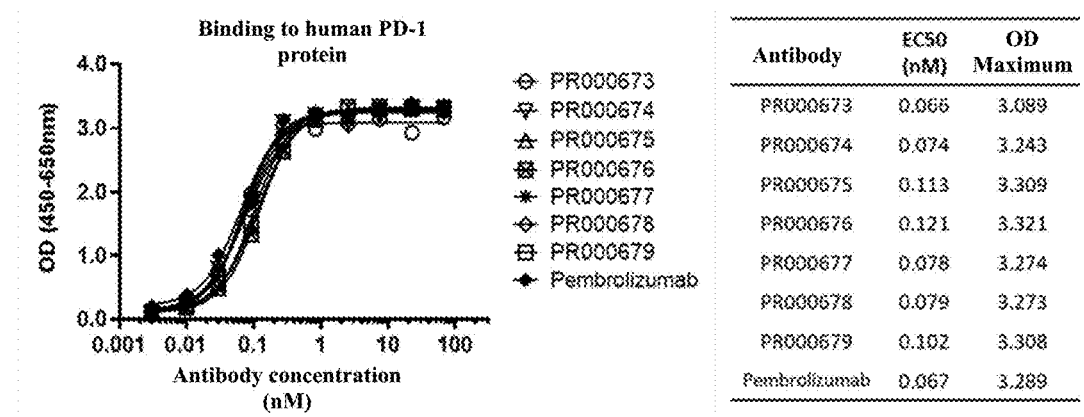
FIG. 1A shows the binding activity of the antigen-binding proteins PR000673, PR000674, PR000675, PR000676, PR000677, PR000678 and PR000679 described herein to human PD-1 protein.

The embodiments of the present invention are described below with reference to specific examples, and other advantages and effects of the present invention will be readily apparent to those skilled in the art from the disclosure of the present specification.

Definitions of Terms

In the present application, the term "PD-1" generally refers to programmed cell death 1, also referred to as "programmed death 1", "CD279", "cluster of differentiation 279", "PD1" or "PDCD1". PD-1 is typically expressed on T cells, B cells, natural killer T cells, activated monocytes and dendritic cells (DCs) and is involved in apoptosis. PD-1 typically comprises an extracellular IgV domain, a transmembrane region and an intracellular domain. PD-1 may bind to two ligands, namely PD-L1 and PD-L2. The term "PD-1" includes any native PD-1 from any vertebrate source, including mammals such as primates (e.g., humans and cynomolgus monkeys) and rodents (e.g., mice and rats). The term encompasses "full-length", unprocessed PD-1, and PD-1 of any form that results from processing in the cell. PD-1 may present as a transmembrane protein or as a soluble protein. "PD-1" includes intact PD-1 and fragments thereof, and also includes functional variants, isoforms, species homologs, derivatives and analogs of PD-1, and analogs sharing at least one common epitope with PD-1. In the present application, the PD-1 may include human PD-1 and/or monkey (e.g., cynomolgus monkey) PD-1. An exemplary human PD-1 amino acid sequence can be found by NCBI accession No. NP_005009.2. An exemplary cynomolgus monkey PD-1 amino acid sequence can be found by NCBI accession No. NP_001271065.1.

In the present application, the term "PD-L1" generally refers to programmed cell death 1 ligand 1, also known as B7 homolog 1, B7-H1, cluster of differentiation 274, (3)274 or CD274, and it downregulates T cell activation and cytokine secretion upon binding to PD-1. "PD-L1" includes any native PD-L1 from any vertebrate source, including mammals such as primates (e.g., humans and cynomolgus monkeys) and rodents (e.g., mice and rats). The term encompasses "full-length", unprocessed PD-L1, and PD-L1 of any form that results from processing in the cell. PD-L1 may present as a transmembrane protein or as a soluble protein. "PD-L1" includes intact PD-L1 and fragments thereof, and also includes functional variants, isoforms, species homologs, derivatives and analogs of PD-L1, and analogs sharing at least one common epitope with PD-L1. The basic structure of PD-L1 includes four domains: an extracellular Ig-like V-type domain and an Ig-like C2-type domain, a transmembrane domain and a cytoplasmic domain. Exemplary human PD-L1 amino acid sequences can be found by NCBI accession No. NP_001254653 or UniProt accession No. Q9NZQ7. An exemplary cynomolgus monkey PD-L1 amino acid sequence can be found by NCBI accession number XP_005581836.1.

In the present application, the term "CD73", also known as a 5' ectonucleotidase, generally refers to an enzyme (nucleotidase) that is capable of converting extracellular nucleoside 5' monophosphate to a nucleoside, i.e., converting adenosine monophosphate (AMP) to adenosine. The term "CD73" includes any variant or isoform of CD73 that is naturally expressed by a cell. CD73, or any variants and isoforms thereof, may be isolated from cells or tissues in which they are naturally expressed, or may be recombinantly produced using techniques well known in the art and/or those described herein. The amino acid sequence of human CD73 can be found by GenBank accession No. AAH65937.1 (5'-nucleotidase, ecto), or NP_002517 (isoform 1 preprotein) and NP_001191742 (isoform 2 preprotein).

In the present application, the term "antigen-binding protein" generally refers to a protein comprising a moiety that binds to an antigen, and optionally a scaffold or framework moiety that allows the antigen-binding moiety to adopt a conformation that facilitates binding of the antigen-binding protein to the antigen. Examples of the antigen-binding proteins include, but are not limited to, antibodies, antigen-binding fragments (Fab, Fab', Fv fragment, F(ab')$_2$, scFv, di-scFv and/or dAb), immunoconjugates, multispecific antibodies (e.g., bispecific antibodies), antibody fragments, antibody derivatives, antibody analogs or fusion proteins, as long as they exhibit the desired antigen-binding activity.

In the present application, the term "Fab" generally refers to a fragment comprising a heavy chain variable domain and a light chain variable domain, and also comprising the constant domain of the light chain and the first constant domain(CH1) of the heavy chain; the term "Fab'" generally refers to a fragment different from Fab due to the addition of a few residues at the carboxyl terminus of the heavy chain CH1 domain (including one or more cysteines from the antibody hinge region); the term "F(ab')$_2$" generally refers to a dimer of Fab', an antibody fragment comprising two Fab fragments connected by a disulfide bridge at the hinge region. The term "Fv" generally refers to the smallest antibody fragment that contains an intact antigen recognition and binding site. In some cases, the fragment may consist of a dimer of one heavy chain variable region and one light chain variable region in tight, non-covalent association; the term "dsFv" generally refers to disulfide-stabilized Fv fragments in which the bond between a single light chain variable region and a single heavy chain variable region is a disulfide bond. The term "dAb fragment" generally refers to an antibody fragment that consists of a VH domain. In the present application, the term "scFv" generally refers to a monovalent molecule formed by covalently connecting and pairing one heavy chain variable domain and one light chain variable domain of an antibody via a flexible peptide linker; such scFv molecules may have the general structure: NH$_2$-VL-linker-VH-COOH or NH$_2$-VH-linker-VL-COOH.

In the present application, the term "antibody" is used in the broadest sense and specifically covers, but is not limited to, monoclonal antibodies (including full-length monoclonal antibodies comprising two light chains and two heavy chains), polyclonal antibodies, multispecific antibodies (e.g., bispecific antibodies), humanized antibodies, fully human antibodies, chimeric antibodies, heavy-chain antibodies, and camelized single-domain antibodies (e.g., heavy chain variable domain antibodies). Antibodies generally have the structure of an immunoglobulin and may comprise proteins of at least two heavy chains (HC) and two light chains (LC) linked to each other by disulfide bonds, or antigen-binding fragments thereof. Each heavy chain comprises a heavy chain variable region (VH) and a heavy chain constant region. Immunoglobulins differ in amino acid composition and arrangement of their heavy chain constant regions and therefore in their antigenicity. Accordingly, immunoglobulins can be classified into five classes, or isotypes of immunoglobulins, namely IgM, IgD, IgG, IgA and IgE, with their corresponding heavy chains being the μ, δ, γ, α and ε chains, respectively. The Ig of the same class can be divided into different subclasses according to the differences in amino acid composition of the hinge regions and the number and location of disulfide bonds in the heavy chains; for example, IgG can be divided into IgG1, IgG2, IgG3 and IgG4. Light chains are classified into κ or λ chains by the difference in the constant regions. Each of the five classes of Ig can have a κ chain or a λ chain.

In certain naturally occurring IgG, IgD and IgA antibodies, the heavy chain constant region comprises three domains, CH1, CH2 and CH3. In certain naturally occurring antibodies, each light chain comprises a light chain variable region (VL) and a light chain constant region. The light chain constant region comprises a domain CL. The VH and VL regions can be further subdivided into hypervariable regions termed complementary determining regions (CDRs), which alternate with relatively conserved regions termed framework regions (FRs). Each of VH and VL comprises three CDRs and four FRs arranged from amino-terminus to carboxyl-terminus in the following order: FR1, CDR1, FR2, CDR2, FR3, CDR3 and FR4. The variable domains of native heavy and light chains each comprise four FRs (H-FR1, H-FR2, H-FR3, H-FR4, L-FR1, L-FR2, L-FR3, L-FR4) largely in a β-sheet configuration. The FRs are connected by three CDRs to form a loop connection, and in some cases to form part of a β-sheet structure. The CDRs in each chain are held in close proximity by the FR regions and form, together with the CDRs from the other chain, the antigen-binding sites of the antibody. The constant region of the antibody can mediate the binding of immunoglobulins to host tissues or factors, including the binding of various cells of the immune system (e.g., effector cells) to the first component (C1q) of classical complement system.

In the present application, the term "variable" generally refers to the fact that certain portions of the sequences of the variable domains of antibodies vary considerably, resulting in the binding and specificity of various particular antibodies to their particular antigens. However, variability is not evenly distributed throughout the variable region of the antibody. It is concentrated in three segments in each of the light chain and heavy chain variable regions called complementary determining regions (CDRs) or hypervariable regions (HVRs). The more highly conserved portions of the variable domains are called frameworks (FRs). In the art, the CDRs of an antibody can be defined using a variety of methods, such as the Kabat scheme based on sequence variability (see Kabat et al., *Sequences of Proteins of Immunological Interest*, Fifth Edition, National Institutes of Health (U.S.), Bethesda, Maryland (1991)), the Chothia scheme based on the location of the structural loop regions (see *J Mol Biol* 273: 927-948, 1997), and the IMGT scheme based on IMGT ontology and IMGT Scientific chart rules. In the present application, the CDRs of the antigen-binding proteins are defined according to Chothia scheme. The details are shown in Table 1.

TABLE 1

| | Defining of CDRs by Chothia | | | | | |
|---|---|---|---|---|---|---|
| | LCDR1 | LCDR2 | LCDR3 | HCDR1 | HCDR2 | HCDR3 |
| Chothia | L24--L34 | L50--L56 | L89--L97 | H26--H32 | H52--H56 | H95--H102 |

In the present application, the term "isolated" antigen-binding protein generally refers to an antigen-binding protein that has been identified, isolated and/or recovered from a component of the environment where it is produced (e.g., native or recombinant). Contaminating components of the environment where it is produced are often substances that interfere with its research, diagnostic or therapeutic uses and may include enzymes, hormones and other proteinaceous or non-proteinaceous solutes. An isolated antigen-binding protein or antibody will typically be prepared by at least one purification step.

In the present application, the term "monoclonal antibody" generally refers to an antibody obtained from a population of substantially homogeneous antibodies, that is, the individual antibodies in the population are identical except for a small amount of natural mutations that may exist. Monoclonal antibodies are generally highly specific for a single antigenic site. Moreover, unlike conventional polyclonal antibody preparations (which generally have different antibodies directed against different determinants), each monoclonal antibody is directed against a single determinant on the antigen. In addition to their specificity, monoclonal antibodies have the advantage that they can be synthesized by hybridoma culture without contamination by other immunoglobulins. The modifier "monoclonal" indicates the characteristic of the antibody obtained from a population of substantially homogeneous antibodies, and is not to be construed as requiring production of the antibody by any particular method. For example, monoclonal antibodies used herein can be prepared in hybridoma cells or can be prepared by the recombinant DNA method.

In the present application, the term "chimeric antibody" generally refers to an antibody in which the variable region is derived from one species while the constant region is derived from another species. Typically, the variable region is derived from an antibody of an experimental animal such as a rodent ("parent antibody") and the constant region is derived from a human antibody, such that the resulting chimeric antibody is less likely to cause an adverse immune response in a human individual as compared to the parent (e.g., mouse-derived) antibody.

In the present application, the term "humanized antibody" generally refers to an antibody in which some of or all of the amino acids outside the CDR regions of a non-human antibody (e.g., a mouse antibody) are substituted with corresponding amino acids derived from a human immunoglobulin. In the CDR regions, small additions, deletions, insertions, substitutions or modifications of amino acids may also be permissible, so long as they retain the binding ability of the antibody to a particular antigen. The humanized antibody may optionally comprise at least a portion of a human immunoglobulin constant region. "Humanized antibody" retains antigen specificity similar to the original antibody. "Humanized" forms of non-human (e.g., murine) antibodies may be chimeric antibodies that comprise minimal sequences derived from non-human immunoglobulins. In certain cases, residues in the CDR region of a human immunoglobulin (recipient antibody) can be replaced with residues in the CDR region of a non-human species (donor antibody) such as mouse, rat, rabbit, or non-human primate having the desired properties, affinity and/or ability. In certain cases, residues in the FR region of a human immunoglobulin can be replaced with corresponding non-human residues. In addition, humanized antibodies may comprise amino acid modifications that are not present in the recipient antibody or in the donor antibody. Those modifications may be made to further improve the properties of the antibody, such as binding affinity.

In the present application, the term "fully human antibody" generally refers to an antibody that is expressed by a genetically engineered antibody gene-deleted animal into which the gene that encodes an antibody in human is transferred. All parts of the antibody (including the variable and constant regions of the antibody) are encoded by genes of human origin. The fully human antibody can greatly reduce the immune side effects caused in the human body by the heterologous antibody. Methods for obtaining fully human antibodies in the art can include a phage display technique, a transgenic mice technique, a ribosome display technique, an RNA-peptide technique and the like.

In the present application, the term "VHH" generally refers to a heavy chain variable domain antibody. For double-chain antibodies (immunoglobulins), the VHH typically lacks the antibody light and/or heavy chain constant region and comprises only part of the heavy chain variable domain.

In the present application, the term "heavy-chain antibody", also known as HCAb, generally refers to an antibody lacking an antibody light chain and comprising only a heavy chain relative to a double-chain antibody. The heavy-chain antibody may comprise two antibody heavy chains.

In the present application, the term "bind", "specifically bind to" or "specific for . . . " generally refers to a measurable and reproducible interaction, such as binding between an antigen and an antibody, which can determine the presence of a target in the presence of a heterogeneous population of molecules, including biological molecules. For example, an antibody binds to an epitope via its antigen-binding domain, and the binding requires some complementarity between the antigen-binding domain and the epitope. For example, an antibody that specifically binds to a target (which can be an epitope) is an antibody that binds to this target with greater affinity, avidity, more readily, and/or with greater duration than it binds to other targets. An antibody is said to "specifically bind to" an antigen when the antibody more easily binds to an epitope via its antigen-binding domain than it binds to a random, unrelated epitope. In the present application, the term "between . . . " generally means that the C-terminus of an amino acid fragment is linked directly or indirectly to the N-terminus of a first amino acid fragment and that its N-terminus is linked directly or indirectly to the C-terminus of a second amino acid fragment. In the light chain, for example, the N-terminus of the L-FR2 is linked directly or indirectly to the C-terminus of the LCDR1, and the C-terminus of the L-FR2 is linked directly or indirectly to the N-terminus of the LCDR2. For another example, the N-terminus of the L-FR3 is linked directly or indirectly to the C-terminus of the LCDR2, and the C-terminus of the L-FR3 is linked directly or indirectly to the N-terminus of the LCDR3. In the heavy chain, for example, the N-terminus of the H-FR2 is linked directly or indirectly to the C-terminus of the HCDR1, and the C-terminus of the H-FR2 is linked directly or indirectly to the N-terminus of the HCDR2. For another example, the N-terminus of the H-FR3 is linked directly or indirectly to the C-terminus of the HCDR2, and the C-terminus of the H-FR3 is linked directly or indirectly to the N-terminus of the HCDR3. In the present application, the "first amino acid fragment" and the "second amino acid fragment" may be any same or different amino acid fragments.

In the present application, the terms "KD" and "$K_D$" are used interchangeably and generally refer to the equilibrium dissociation constant, and "KD" is the ratio of the dissociation rate constant (kdis, also referred to as "off-rate" (koff) or "kd") to the association rate constant (kon, also referred to as "association rate" or "ka"). The binding affinity of an antigen-binding protein (e.g., an antibody) for an antigen can be expressed using an association rate constant (kon), a dissociation rate constant (kdis) and an equilibrium dissociation constant (KD). Methods for determining the association and dissociation rate constants are well known in the art and include, but are not limited to, biolayer interferometry (BLI), radioimmunoassay (RIA), equilibrium dialysis, surface plasmon resonance (SPR), fluorescence resonance energy transfer (FRET), co-immunoprecipitation (Co-IP), and protein chip technology. The affinity of a particular protein-protein interaction measured may be different if measured under different conditions (e.g., salt concentration or pH).

In the present application, the term "isolated nucleic acid molecule" or "isolated polynucleotide" generally refers to genomic, mRNA, cDNA or synthetic origin of DNA or RNA, or certain combinations thereof, which is not associated with all or a portion of a polynucleotide found in nature, or is linked to a polynucleotide to which it is not linked in nature.

In the present application, the term "vector" generally refers to a nucleic acid molecule capable of self-replication in a suitable host, which transfers and/or inserted nucleic acid molecule into a host cell and/or between host cells. The vector may include a vector for primarily inserting DNA or RNA into a cell, a vector for primarily replicating DNA or RNA, and a vector for primarily expressing transcription and/or translation of DNA or RNA. The vector also includes vectors having a variety of the above-described functions. The vector may be a polynucleotide capable of being transcribed and translated into a polypeptide when introduced into a suitable host cell. Typically, the vector can produce the desired expression product by culturing an appropriate host cell containing the vector.

In the present application, the term "cell" generally refers to an individual cell, cell line or cell culture that may contain or has contained a plasmid or vector comprising the nucleic acid molecule described herein, or that is capable of expressing the antibody or the antigen-binding fragment thereof described herein. The cell may comprise progeny of a single host cell. Due to natural, accidental or deliberate mutations, progeny cells may not necessarily be identical in morphology or in genome to the original parent cell, but are capable of expressing the antibody or the antigen-binding fragment thereof described herein. The cell may be obtained by transfecting cells with the vector described herein in vitro. The cell may be a prokaryotic cell (e.g., *E. coli*) or a eukaryotic cell (e.g., a yeast cell, a COS cell, a Chinese hamster ovary (CHO) cell, a HeLa cell, an HEK293 cell, a COS-1 cell, an NS0 cell, or a myeloma cell). In some cases, the cell may be a mammalian cell. For example, the mammalian cell may be a CHO-K1 cell. In the present application, the term "recombinant cell" generally refers to a cell into which a recombinant expression vector has been introduced. The recombinant host cell includes not only particular cells but also progeny of such cells.

In the present application, the term "pharmaceutically acceptable carrier" generally includes pharmaceutically acceptable carriers, excipients or stabilizers which are non-toxic to cells or mammals being exposed thereto at the dosages and concentrations employed. Typically, the physiologically acceptable carrier is an aqueous pH buffer solution. Examples of physiologically acceptable carriers can include buffers, antioxidants, low-molecular-weight (less than about 10 residues) polypeptides, proteins, hydrophilic polymers, amino acids, monosaccharides, disaccharides, other carbohydrates, chelating agents, sugar alcohols, salt-forming counterions, such as sodium, and/or nonionic surfactants.

In the present application, the term "treatment" or "treating" generally refers to clinical intervention that desires to alter the natural course of the individual being treated and can be performed either for prophylaxis or during the course of clinical pathology. Desired therapeutic effects include, but are not limited to, preventing the occurrence or recurrence of diseases, alleviating symptoms, reducing any direct or indirect pathological outcomes of diseases, preventing metastasis, delaying disease progression, improving or alleviating disease conditions, and alleviating or improving prognosis. In some cases, antibodies (e.g., anti-PD-1 antibodies) can be used to delay disease progression or slow disease progression.

In the present application, the term "administration" or "administering" generally refers to a method of giving a certain dose of a compound (e.g., an anti-cancer therapeutic agent) or a pharmaceutical composition (e.g., a pharmaceutical composition comprising an anti-cancer therapeutic agent) to a subject (e.g., a patient). Administration may be by any suitable means, including parenteral, intrapulmonary and intranasal, and, if local treatment is desired, intralesional administration. Parenteral infusion includes, for example, intramuscular, intravenous, intraarterial, intraperitoneal or subcutaneous administration.

In the present application, the term "tumor" generally refers to all neoplastic cell growth and proliferation, whether being malignant or benign, and all pre-cancerous and cancerous cells and tissues. In the present application, the tumor may be a tumor featuring high expression of PD-1 or PD-L1 in cells and tissues. The tumor can include a solid tumor and/or a non-solid tumor (e.g., hematologic tumor or lymphoma).

In the present application, the term "immunoconjugate" generally refers to a substance formed by linking an antigen-binding protein to other active agents, which may be small molecule active agents, such as chemotherapeutic agents, toxins, immunotherapeutic agents, imaging probes or spectroscopic probes.

In the present application, the term "kit" generally refers to a packaged product containing components for administering the antigen-binding proteins of the present application to treat PD-1-mediated related disorders. The components of the kit may be contained in separate vials (i.e., a kit with separate parts), or provided within a single vial. The kit can comprise reagents such as a buffer, a protein stabilizing reagent, a signal generating system (e.g., a fluorescent signal generating system), an antibody, a control protein, and a test container. The kit may further comprise instructions for carrying out the method.

In the present application, the term "administration device" comprises: (i) an infusion module for administering to a subject a pharmaceutical composition comprising a compound having an active ingredient; (ii) a pharmaceutical composition for infusion comprising an active ingredient selected from the group consisting of: an antigen-binding protein, a multispecific antibody, an immune cell, an antibody-drug conjugate or a combination thereof; and (iii) optionally a pharmacodynamic monitoring module.

In the present application, the term "in combination" generally means that two or more therapeutic agents can be co-administered to a subject in a mixture, simultaneously as single agents or sequentially in any order as single agents.

Reference in the present application to protein, polypeptide and/or amino acid sequence is also to be understood as including at least the following ranges: variants or homologs having the same or similar function as said protein or polypeptide.

In the present application, the variant may be a protein or polypeptide obtained by replacement, deletion or addition of one or more amino acids in the amino acid sequence of the protein and/or the polypeptide (e.g., the antigen-binding protein described herein). For example, the functional variant may comprise a protein or polypeptide with amino acid change by replacements, deletions and/or insertions of at least 1 (e.g., 1-30, 1-20 or 1-10, or e.g., 1, 2, 3, 4 or 5) amino acids. The functional variant may substantially retain the biological properties of the protein or the polypeptide prior to the alteration (e.g., replacement, deletion or addition). For example, the functional variant may retain at least 60%, 70%, 80%, 90% or 100% of the biological activity (e.g., antigen-binding capacity) of the protein or the polypeptide prior to the alteration. For example, the replacement may be a conservative replacement.

In the present application, a portion of the amino acid sequence of the antigen-binding protein may be homologous to a corresponding amino acid sequence in an antibody from a particular species or belong to a particular class. For example, both the variable and constant regions of an antibody may be from the variable and constant regions of an antibody from one animal species (e.g., human). In the present application, the homolog may be a protein or polypeptide having at least about 85% (e.g., having at least about 85%, about 90%, about 91%, about 92%, about 93%, about 94%, about 95%, about 96%, about 97%, about 98%, about 99% or higher) sequence homology to the amino acid sequence of the protein and/or the polypeptide (e.g., the antigen-binding protein described herein).

In the present application, the homology generally refers to similarity, likeness or association between two or more sequences. The "percent sequence homology" can be calculated by the following steps: comparing two sequences to be aligned in a comparison window; determining the number of positions in which nucleic acid bases (e.g., A, T, C and G) or amino acid residues (e.g., Ala, Pro, Ser, Thr, Gly, Val, Leu, Ile, Phe, Tyr, Trp, Lys, Arg, His, Asp, Glu, Asn, Gln, Cys and Met) are the same in the two sequences to give the number of matched positions; dividing the number of matched positions by the total number of positions in the comparison window (i.e., the window size); and multiplying the result by 100 to give a percent sequence homology. Alignment for determining the percent sequence homology can be achieved in a variety of ways known in the art, for example, using publicly available computer software such as BLAST, BLAST-2, ALIGN or Megalign (DNASTAR) software. Those skilled in the art can determine suitable parameters for alignment of the sequences, including any algorithms necessary to achieve optimal alignment in a full-length sequence range or target sequence region being compared. The homology can also be determined by the following methods: FASTA and BLAST. For description of the FASTA algorithm, see W. R. Pearson and D. J. Lipman, "Improved Tools for Biological Sequence Comparison", *Proc. Natl. Acad. Sci. USA*, 85: 2444-2448, 1988; and D. J. Lipman and W. R. Pearson, "Rapid and Sensitive Protein Similarity Searches", *Science*, 227: 1435-1441, 1989. For description of the BLAST algorithm, see S. Altschul, W. Gish, W. Miller, E. W. Myers and D. Lipman, "A Basic Local Alignment Search Tool", *Journal of Molecular Biology*, 215: 403-410, 1990.

As used herein, the term "optional" or "optionally" means that the subsequently described event or circumstance may, but not necessarily, occur.

In the present application, the term "comprise" or "comprising" generally means including, summarizing, containing or encompassing. In some cases, the term also means "being" or "consisting of . . . ".

In the present application, the term "about" generally means varying by 0.5%-10% above or below the stated value, for example, varying by 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5% or 10% above or below the stated value.

DETAILED DESCRIPTION OF THE INVENTION

Antigen-Binding Protein

In one aspect, the present application provides an antigen-binding protein, wherein the antigen-binding protein may comprise at least one CDR in an antibody heavy chain variable region VH, and the VH may comprise an amino acid sequence set forth in SEQ ID NO: 368.

The antigen-binding protein described herein may comprise a heavy chain complementary determining region HCDR1. In the present application, the HCDR1 of the antigen-binding protein may comprise an amino acid sequence set forth in SEQ ID NO: 359: $GX_2X_3X_4SX_6X_7X_8X_9$, wherein $X_2$=D, F, G or L, $X_3$=I, S or T, $X_4$=F, L or V, $X_6$=D, N or S, $X_7$=N or Y, $X_8$=S or no amino acid, and $X_9$=A or no amino acid. For example, this sequence may be a sequence determined according to the Chothia scheme.

For example, the HCDR1 of the antigen-binding protein may comprise an amino acid sequence set forth in any one of SEQ ID NOs: 11-16.

The antigen-binding protein described herein may comprise a heavy chain complementary determining region HCDR2. In the present application, the HCDR2 of the antigen-binding protein may comprise an amino acid sequence set forth in SEQ ID NO: 360: $X_1X_2X_3X_4X_5X_6X_7$, wherein $X_1$=I, L, S, W or Y, $X_2$=G, P, S or Y, $X_3$=D, I, R or S, $X_4$=F, G or S, $X_5$=D, K, S or Y, $X_6$=K, N, S, T or W, and $X_7$=Y or no amino acid. For example, this sequence may be a sequence determined according to the Chothia scheme.

For example, the HCDR2 of the antigen-binding protein may comprise an amino acid sequence set forth in any one of SEQ ID NOs: 50-55.

The antigen-binding protein described herein may comprise a heavy chain complementary determining region HCDR3. In the present application, the HCDR3 of the antigen-binding protein may comprise an amino acid sequence set forth in SEQ ID NO: 361: $X_1X_2X_3X_4X_5X_6X_7X_8X_9X_{10}X_{11}X_{12}X_{13}X_{14}$, wherein $X_1$=E, L, N or S, $X_2$=D, G, P, S or T, $X_3$=D, G, H, L or P, $X_4$=D or Y, $X_5$=S, V, Y or no amino acid, $X_6$=G, S or no amino acid, $X_7$=N, S or no amino acid, $X_8$=G, W or no amino acid, $X_9$=S, Y or no amino acid, $X_{10}$=Q, Y or no amino acid, $X_{11}$=L, Y or no amino acid, $X_{12}$=D, F or no amino acid, $X_{13}$=Q, Y or no amino acid, and $X_{14}$=H or no amino acid. For example, this sequence may be a sequence determined according to the Chothia scheme.

For example, the HCDR3 of the antigen-binding protein may comprise an amino acid sequence set forth in any one of SEQ ID NOs: 92-97.

The antigen-binding protein described herein may comprise heavy chain complementary determining regions HCDR1, HCDR2 and HCDR3, wherein the HCDR1 may comprise an amino acid sequence set forth in SEQ ID NO: 359, the HCDR2 may comprise an amino acid sequence set forth in SEQ ID NO: 360, and the HCDR3 may comprise an amino acid sequence set forth in SEQ ID NO: 361.

The antigen-binding protein described herein may comprise heavy chain complementary determining regions HCDR1, HCDR2 and HCDR3, wherein the HCDR1 may comprise an amino acid sequence set forth in any one of SEQ ID NOs: 11-16, the HCDR2 may comprise an amino acid sequence set forth in any one of SEQ ID NOs: 50-55, and the HCDR3 may comprise an amino acid sequence set forth in any one of SEQ ID NOs: 92-97.

In the present application, the antigen-binding protein may comprise an HCDR1, an HCDR2 and an HCDR3, wherein the HCDR1 may comprise an amino acid sequence set forth in SEQ ID NO: 11, the HCDR2 may comprise an amino acid sequence set forth in SEQ ID NO: 50, and the HCDR3 may comprise an amino acid sequence set forth in SEQ ID NO: 92.

In the present application, the antigen-binding protein may comprise an HCDR1, an HCDR2 and an HCDR3, wherein the HCDR1 may comprise an amino acid sequence set forth in SEQ ID NO: 12, the HCDR2 may comprise an amino acid sequence set forth in SEQ ID NO: 50, and the HCDR3 may comprise an amino acid sequence set forth in SEQ ID NO: 93.

In the present application, the antigen-binding protein may comprise an HCDR1, an HCDR2 and an HCDR3, wherein the HCDR1 may comprise an amino acid sequence set forth in SEQ ID NO: 13, the HCDR2 may comprise an amino acid sequence set forth in SEQ ID NO: 51, and the HCDR3 may comprise an amino acid sequence set forth in SEQ ID NO: 94.

In the present application, the antigen-binding protein may comprise an HCDR1, an HCDR2 and an HCDR3, wherein the HCDR1 may comprise an amino acid sequence set forth in SEQ ID NO: 14, the HCDR2 may comprise an amino acid sequence set forth in SEQ ID NO: 52, and the HCDR3 may comprise an amino acid sequence set forth in SEQ ID NO: 95.

In the present application, the antigen-binding protein may comprise an HCDR1, an HCDR2 and an HCDR3, wherein the HCDR1 may comprise an amino acid sequence set forth in SEQ ID NO: 15, the HCDR2 may comprise an amino acid sequence set forth in SEQ ID NO: 53, and the HCDR3 may comprise an amino acid sequence set forth in SEQ ID NO: 96.

In the present application, the antigen-binding protein may comprise an HCDR1, an HCDR2 and an HCDR3, wherein the HCDR1 may comprise an amino acid sequence set forth in SEQ ID NO: 16, the HCDR2 may comprise an amino acid sequence set forth in SEQ ID NO: 54, and the HCDR3 may comprise an amino acid sequence set forth in SEQ ID NO: 97.

In the present application, the antigen-binding protein may comprise an HCDR1, an HCDR2 and an HCDR3, wherein the HCDR1 may comprise an amino acid sequence set forth in SEQ ID NO: 11, the HCDR2 may comprise an amino acid sequence set forth in SEQ ID NO: 55, and the HCDR3 may comprise an amino acid sequence set forth in SEQ ID NO: 92.

In the present application, the antigen-binding protein may comprise a framework region HFWR1, and the C-terminus of the HFWR1 is directly or indirectly linked to the N-terminus of the HCDR1. In the present application, the HFWR1 may comprise an amino acid sequence set forth in any one of SEQ ID NOs: 1-7.

In the present application, the antigen-binding protein may comprise a framework region HFWR2, and the HFWR2 is located between the HCDR1 and the HCDR2. In the present application, the HFWR2 may comprise an amino acid sequence set forth in any one of SEQ ID NOs: 39-44.

In the present application, the antigen-binding protein may comprise a framework region HFWR3, and the HFWR3 is located between the HCDR2 and the HCDR3. In the present application, the HFWR3 may comprise an amino acid sequence set forth in any one of SEQ ID NOs: 69-75.

In the present application, the antigen-binding protein may comprise a framework region HFWR4, and the N-terminus of the HFWR4 is linked to the C-terminus of the HCDR3. In the present application, the HFWR4 may comprise an amino acid sequence set forth in any one of SEQ ID NOs: 113-115.

In the present application, the antigen-binding protein may comprise a heavy chain variable region VH, and the VH may comprise an amino acid sequence set forth in SEQ ID NO: 368. The antigen-binding protein described herein may comprise at least one CDR in an antibody light chain variable region VL, and the VL may comprise an amino acid sequence set forth in SEQ ID NO: 369.

The antigen-binding protein described herein may comprise a light chain complementary determining region LCDR1. In the present application, the LCDR1 of the antigen-binding protein may comprise an amino acid sequence set forth in SEQ ID NO: 365: RASQX$_5$X$_6$SX$_8$X$_9$LA, wherein X$_5$=S or T, X$_6$=I or V, X$_8$=I, R or S, and X$_9$=D, S, W or Y.

For example, this sequence may be a sequence determined according to the Chothia scheme.

For example, the LCDR1 of the antigen-binding protein may comprise an amino acid sequence set forth in any one of SEQ ID NOs: 121-125.

The antigen-binding protein described herein may comprise a light chain complementary determining region LCDR2. In the present application, the LCDR2 of the antigen-binding protein may comprise an amino acid sequence set forth in SEQ ID NO: 366: X$_1$X$_2$X$_3$X$_4$X$_5$X$_6$X$_7$, wherein X$_1$=D, G or K, X$_2$=A or T, X$_3$=A or S, X$_4$=K, N, S or T, X$_5$=L or R, X$_6$=A or E, and X$_7$=S or T. For example, this sequence may be a sequence determined according to the Chothia scheme.

For example, the LCDR2 of the antigen-binding protein may comprise an amino acid sequence set forth in any one of SEQ ID NOs: 130-135.

The antigen-binding protein described herein may comprise a light chain complementary determining region LCDR3. In the present application, the LCDR3 of the antigen-binding protein may comprise an amino acid sequence set forth in SEQ ID NO: 367: X$_1$QX$_3$X$_4$X$_5$X$_6$X$_7$X$_8$X$_9$, wherein X$_1$=H or Q, X$_3$=F, H, R or Y, X$_4$=N or S, X$_5$=N, S or Y, X$_6$=Y or W, X$_7$=I, P or W, X$_8$=F, I, L or T, and X$_9$=T or no amino acid. For example, this sequence may be a sequence determined according to the Chothia scheme.

For example, the LCDR3 of the antigen-binding protein may comprise an amino acid sequence set forth in any one of SEQ ID NOs: 140-145.

The antigen-binding protein described herein may comprise an LCDR1, an LCDR2 and an LCDR3, wherein the LCDR1 may comprise an amino acid sequence set forth in SEQ ID NO: 365, the LCDR2 may comprise an amino acid sequence set forth in SEQ ID NO: 366, and the LCDR3 may comprise an amino acid sequence set forth in SEQ ID NO: 367.

The antigen-binding protein described herein may comprise an LCDR1, an LCDR2 and an LCDR3, wherein the LCDR1 may comprise an amino acid sequence set forth in any one of SEQ ID NOs: 121-125, the LCDR2 may comprise an amino acid sequence set forth in any one of SEQ ID NOs: 130-135, and the LCDR3 may comprise an amino acid sequence set forth in any one of SEQ ID NOs: 140-145.

In the present application, the antigen-binding protein may comprise an LCDR1, an LCDR2 and an LCDR3, wherein the LCDR1 may comprise an amino acid sequence set forth in SEQ ID NO: 121, the LCDR2 may comprise an amino acid sequence set forth in SEQ ID NO: 130, and the LCDR3 may comprise an amino acid sequence set forth in SEQ ID NO: 140.

In the present application, the antigen-binding protein may comprise an LCDR1, an LCDR2 and an LCDR3, wherein the LCDR1 may comprise an amino acid sequence set forth in SEQ ID NO: 122, the LCDR2 may comprise an amino acid sequence set forth in SEQ ID NO: 131, and the LCDR3 may comprise an amino acid sequence set forth in SEQ ID NO: 141.

In the present application, the antigen-binding protein may comprise an LCDR1, an LCDR2 and an LCDR3, wherein the LCDR1 may comprise an amino acid sequence set forth in SEQ ID NO: 123, the LCDR2 may comprise an amino acid sequence set forth in SEQ ID NO: 132, and the LCDR3 may comprise an amino acid sequence set forth in SEQ ID NO: 142.

In the present application, the antigen-binding protein may comprise an LCDR1, an LCDR2 and an LCDR3, wherein the LCDR1 may comprise an amino acid sequence set forth in SEQ ID NO: 122, the LCDR2 may comprise an amino acid sequence set forth in SEQ ID NO: 133, and the LCDR3 may comprise an amino acid sequence set forth in SEQ ID NO: 143.

In the present application, the antigen-binding protein may comprise an LCDR1, an LCDR2 and an LCDR3, wherein the LCDR1 may comprise an amino acid sequence set forth in SEQ ID NO: 124, the LCDR2 may comprise an amino acid sequence set forth in SEQ ID NO: 134, and the LCDR3 may comprise an amino acid sequence set forth in SEQ ID NO: 144.

In the present application, the antigen-binding protein may comprise an LCDR1, an LCDR2 and an LCDR3, wherein the LCDR1 may comprise an amino acid sequence set forth in SEQ ID NO: 125, the LCDR2 may comprise an amino acid sequence set forth in SEQ ID NO: 135, and the LCDR3 may comprise an amino acid sequence set forth in SEQ ID NO: 145.

In the present application, the antigen-binding protein may comprise an LCDR1, an LCDR2 and an LCDR3, wherein the LCDR1 may comprise an amino acid sequence set forth in SEQ ID NO: 121, the LCDR2 may comprise an amino acid sequence set forth in SEQ ID NO: 130, and the LCDR3 may comprise an amino acid sequence set forth in SEQ ID NO: 140.

In the present application, the antigen-binding protein may comprise a framework region LFWR1, and the C-terminus of the LFWR1 is directly or indirectly linked to the N-terminus of the LCDR1. In the present application, the LFWR1 may comprise an amino acid sequence set forth in any one of SEQ ID NOs: 116-119.

In the present application, the antigen-binding protein may comprise a framework region LFWR2, and the LFWR2 is located between the LCDR1 and the LCDR2. In the present application, the LFWR2 may comprise an amino acid sequence set forth in any one of SEQ ID NOs: 126-129.

In the present application, the antigen-binding protein may comprise a framework region LFWR3, and the LFWR3 is located between the LCDR2 and the LCDR3. In the present application, the LFWR3 may comprise an amino acid sequence set forth in any one of SEQ ID NOs: 136-139.

In the present application, the antigen-binding protein may comprise a framework region LFWR4, and the N-terminus of the LFWR4 is linked to the C-terminus of the LCDR3. In the present application, the LFWR4 may comprise an amino acid sequence set forth in any one of SEQ ID NOs: 147-150.

In the present application, the antigen-binding protein may comprise a light chain variable region VL, and the VL may comprise an amino acid sequence set forth in SEQ ID NO: 369.

In the present application, the antigen-binding protein may comprise an HCDR1, an HCDR2, an HCDR3, an LCDR1, an LCDR2 and an LCDR3, wherein the HCDR1 may comprise an amino acid sequence set forth in SEQ ID NO: 11, the HCDR2 may comprise an amino acid sequence set forth in SEQ ID NO: 50, the HCDR3 may comprise an amino acid sequence set forth in SEQ ID NO: 92, the LCDR1 may comprise an amino acid sequence set forth in SEQ ID NO: 121, the LCDR2 may comprise an amino acid sequence set forth in SEQ ID NO: 130, and the LCDR3 may comprise an amino acid sequence set forth in SEQ ID NO: 140.

In the present application, the antigen-binding protein may comprise an HCDR1, an HCDR2, an HCDR3, an LCDR1, an LCDR2 and an LCDR3, wherein the HCDR1 may comprise an amino acid sequence set forth in SEQ ID NO: 12, the HCDR2 may comprise an amino acid sequence set forth in SEQ ID NO: 50, the HCDR3 may comprise an amino acid sequence set forth in SEQ ID NO: 93, the LCDR1 may comprise an amino acid sequence set forth in SEQ ID NO: 122, the LCDR2 may comprise an amino acid sequence set forth in SEQ ID NO: 131, and the LCDR3 may comprise an amino acid sequence set forth in SEQ ID NO: 141.

In the present application, the antigen-binding protein may comprise an HCDR1, an HCDR2, an HCDR3, an LCDR1, an LCDR2 and an LCDR3, wherein the HCDR1 may comprise an amino acid sequence set forth in SEQ ID NO: 13, the HCDR2 may comprise an amino acid sequence set forth in SEQ ID NO: 51, the HCDR3 may comprise an amino acid sequence set forth in SEQ ID NO: 94, the LCDR1 may comprise an amino acid sequence set forth in SEQ ID NO: 123, the LCDR2 may comprise an amino acid sequence set forth in SEQ ID NO: 132, and the LCDR3 may comprise an amino acid sequence set forth in SEQ ID NO: 142.

In the present application, the antigen-binding protein may comprise an HCDR1, an HCDR2, an HCDR3, an LCDR1, an LCDR2 and an LCDR3, wherein the HCDR1 may comprise an amino acid sequence set forth in SEQ ID NO: 14, the HCDR2 may comprise an amino acid sequence set forth in SEQ ID NO: 52, the HCDR3 may comprise an amino acid sequence set forth in SEQ ID NO: 95, the LCDR1 may comprise an amino acid sequence set forth in SEQ ID NO: 122, the LCDR2 may comprise an amino acid sequence set forth in SEQ ID NO: 133, and the LCDR3 may comprise an amino acid sequence set forth in SEQ ID NO: 143.

In the present application, the antigen-binding protein may comprise an HCDR1, an HCDR2, an HCDR3, an LCDR1, an LCDR2 and an LCDR3, wherein the HCDR1 may comprise an amino acid sequence set forth in SEQ ID NO: 15, the HCDR2 may comprise an amino acid sequence set forth in SEQ ID NO: 53, the HCDR3 may comprise an amino acid sequence set forth in SEQ ID NO: 96, the LCDR1 may comprise an amino acid sequence set forth in SEQ ID NO: 124, the LCDR2 may comprise an amino acid sequence set forth in SEQ ID NO: 134, and the LCDR3 may comprise an amino acid sequence set forth in SEQ ID NO: 144.

In the present application, the antigen-binding protein may comprise an HCDR1, an HCDR2, an HCDR3, an LCDR1, an LCDR2 and an LCDR3, wherein the HCDR1 may comprise an amino acid sequence set forth in SEQ ID NO: 16, the HCDR2 may comprise an amino acid sequence set forth in SEQ ID NO: 54, the HCDR3 may comprise an amino acid sequence set forth in SEQ ID NO: 97, the LCDR1 may comprise an amino acid sequence set forth in SEQ ID NO: 125, the LCDR2 may comprise an amino acid sequence set forth in SEQ ID NO: 135, and the LCDR3 may comprise an amino acid sequence set forth in SEQ ID NO: 145.

In the present application, the antigen-binding protein may comprise an HCDR1, an HCDR2, an HCDR3, an LCDR1, an LCDR2 and an LCDR3, wherein the HCDR1 may comprise an amino acid sequence set forth in SEQ ID NO: 11, the HCDR2 may comprise an amino acid sequence set forth in SEQ ID NO: 55, the HCDR3 may comprise an amino acid sequence set forth in SEQ ID NO: 92, the LCDR1 may comprise an amino acid sequence set forth in SEQ ID NO: 121, the LCDR2 may comprise an amino acid sequence set forth in SEQ ID NO: 130, and the LCDR3 may comprise an amino acid sequence set forth in SEQ ID NO: 140.

In the present application, the antigen-binding protein may comprise a VH and a VL, wherein the VH may comprise an amino acid sequence set forth in SEQ ID NO: 368, and the VL may comprise an amino acid sequence set forth in SEQ ID NO: 369.

In the present application, the antigen-binding protein may comprise a VH and a VL, wherein the VH may comprise an amino acid sequence set forth in any one of SEQ ID NOs: 151-158, and the VL may comprise an amino acid sequence set forth in any one of SEQ ID NOs: 231-236.

In the present application, the antigen-binding protein may comprise a VH and a VL, wherein the VH may comprise an amino acid sequence set forth in SEQ ID NO: 151, and the VL may comprise an amino acid sequence set forth in SEQ ID NO: 231.

In the present application, the antigen-binding protein may comprise a VH and a VL, wherein the VH may comprise an amino acid sequence set forth in SEQ ID NO: 152, and the VL may comprise an amino acid sequence set forth in SEQ ID NO: 232.

In the present application, the antigen-binding protein may comprise a VH and a VL, wherein the VH may comprise an amino acid sequence set forth in SEQ ID NO: 153, and the VL may comprise an amino acid sequence set forth in SEQ ID NO: 233.

In the present application, the antigen-binding protein may comprise a VH and a VL, wherein the VH may comprise an amino acid sequence set forth in SEQ ID NO: 154, and the VL may comprise an amino acid sequence set forth in SEQ ID NO: 234.

In the present application, the antigen-binding protein may comprise a VH and a VL, wherein the VH may comprise an amino acid sequence set forth in SEQ ID NO: 155, and the VL may comprise an amino acid sequence set forth in SEQ ID NO: 235.

In the present application, the antigen-binding protein may comprise a VH and a VL, wherein the VH may comprise an amino acid sequence set forth in SEQ ID NO: 156, and the VL may comprise an amino acid sequence set forth in SEQ ID NO: 232.

In the present application, the antigen-binding protein may comprise a VH and a VL, wherein the VH may comprise an amino acid sequence set forth in SEQ ID NO: 157, and the VL may comprise an amino acid sequence set forth in SEQ ID NO: 236.

In the present application, the antigen-binding protein may comprise a VH and a VL, wherein the VH may comprise an amino acid sequence set forth in SEQ ID NO: 158, and the VL may comprise an amino acid sequence set forth in SEQ ID NO: 231.

In the present application, the antigen-binding protein may comprise an antibody heavy chain and an antibody light chain, wherein the antibody heavy chain may comprise an amino acid sequence set forth in SEQ ID NO: 238, and the antibody light chain may comprise an amino acid sequence set forth in SEQ ID NO: 324.

In the present application, the antigen-binding protein may comprise an antibody heavy chain and an antibody light chain, wherein the antibody heavy chain may comprise an amino acid sequence set forth in SEQ ID NO: 239, and the antibody light chain may comprise an amino acid sequence set forth in SEQ ID NO: 325.

In the present application, the antigen-binding protein may comprise an antibody heavy chain and an antibody light chain, wherein the antibody heavy chain may comprise an amino acid sequence set forth in SEQ ID NO: 240, and the antibody light chain may comprise an amino acid sequence set forth in SEQ ID NO: 326.

In the present application, the antigen-binding protein may comprise an antibody heavy chain and an antibody light chain, wherein the antibody heavy chain may comprise an amino acid sequence set forth in SEQ ID NO: 241, and the antibody light chain may comprise an amino acid sequence set forth in SEQ ID NO: 327.

In the present application, the antigen-binding protein may comprise an antibody heavy chain and an antibody light chain, wherein the antibody heavy chain may comprise an amino acid sequence set forth in SEQ ID NO: 242, and the antibody light chain may comprise an amino acid sequence set forth in SEQ ID NO: 328.

In the present application, the antigen-binding protein may comprise an antibody heavy chain and an antibody light chain, wherein the antibody heavy chain may comprise an amino acid sequence set forth in SEQ ID NO: 243, and the antibody light chain may comprise an amino acid sequence set forth in SEQ ID NO: 325.

In the present application, the antigen-binding protein may comprise an antibody heavy chain and an antibody light chain, wherein the antibody heavy chain may comprise an amino acid sequence set forth in SEQ ID NO: 244, and the antibody light chain may comprise an amino acid sequence set forth in SEQ ID NO: 329.

In the present application, the antigen-binding protein may comprise an antibody heavy chain and an antibody light chain, wherein the antibody heavy chain may comprise an amino acid sequence set forth in SEQ ID NO: 245, and the antibody light chain may comprise an amino acid sequence set forth in SEQ ID NO: 324.

In one aspect, the present application provides an antigen-binding protein, wherein the antigen-binding protein may comprise at least one CDR in an antibody heavy chain variable region VH, and the VH may comprise an amino acid sequence set forth in SEQ ID NO: 254.

The antigen-binding protein described herein may comprise a heavy chain complementary determining region HCDR1. In the present application, the HCDR1 of the antigen-binding protein may comprise an amino acid sequence set forth in SEQ ID NO: 362: GFX$_3$VX$_5$X$_6$X$_7$, wherein X$_3$=A, F, N or S, X$_5$=D, R, S or V, X$_6$=F, G, R, S or Y, and X$_7$=F, H, N or Y. For example, this sequence may be a sequence determined according to the Chothia scheme.

For example, the HCDR1 of the antigen-binding protein may comprise an amino acid sequence set forth in any one of SEQ ID NOs: 18-33.

The antigen-binding protein described herein may comprise a heavy chain complementary determining region HCDR2. In the present application, the HCDR2 of the antigen-binding protein may comprise an amino acid sequence set forth in SEQ ID NO: 363: X$_1$X$_2$X$_3$GX$_5$, wherein X$_1$=D or H, X$_2$=G, I, K, R or S, X$_3$=A, G or S, and X$_5$=G or S. For example, this sequence may be a sequence determined according to the Chothia scheme.

For example, the HCDR2 of the antigen-binding protein may comprise an amino acid sequence set forth in any one of SEQ ID NOs: 57-68.

The antigen-binding protein described herein may comprise a heavy chain complementary determining region HCDR3. In the present application, the HCDR3 of the antigen-binding protein may comprise an amino acid sequence set forth in SEQ ID NO: 364: AX$_2$X$_3$VX$_5$EX$_7$X$_8$GYNYPFNY, wherein X$_2$=I or T, X$_3$=A, E, M, Q or R, X$_5$=A, P or R, X$_7$=A, E or K, and X$_8$=G, N or Q. For example, this sequence may be a sequence determined according to the Chothia scheme.

For example, the HCDR3 of the antigen-binding protein may comprise an amino acid sequence set forth in any one of SEQ ID NOs: 99-101 and 103-111.

The antigen-binding protein described herein may comprise heavy chain complementary determining regions HCDR1, HCDR2 and HCDR3, wherein the HCDR1 may comprise an amino acid sequence set forth in SEQ ID NO: 362, the HCDR2 may comprise an amino acid sequence set forth in SEQ ID NO: 363, and the HCDR3 may comprise an amino acid sequence set forth in SEQ ID NO: 364.

The antigen-binding protein described herein may comprise heavy chain complementary determining regions HCDR1, HCDR2 and HCDR3, wherein the HCDR1 may comprise an amino acid sequence set forth in any one of SEQ ID NOs: 18-33, the HCDR2 may comprise an amino acid sequence set forth in any one of SEQ ID NOs: 57-68, and the HCDR3 may comprise an amino acid sequence set forth in any one of SEQ ID NOs: 99-101 and 103-111.

In the present application, the antigen-binding protein may comprise an HCDR1, an HCDR2 and an HCDR3, wherein the HCDR1 may comprise an amino acid sequence set forth in SEQ ID NO: 18, the HCDR2 may comprise an amino acid sequence set forth in SEQ ID NO: 57, and the HCDR3 may comprise an amino acid sequence set forth in SEQ ID NO: 100.

In the present application, the antigen-binding protein may comprise an HCDR1, an HCDR2 and an HCDR3, wherein the HCDR1 may comprise an amino acid sequence set forth in SEQ ID NO: 18, the HCDR2 may comprise an amino acid sequence set forth in SEQ ID NO: 57, and the HCDR3 may comprise an amino acid sequence set forth in SEQ ID NO: 99.

In the present application, the antigen-binding protein may comprise an HCDR1, an HCDR2 and an HCDR3, wherein the HCDR1 may comprise an amino acid sequence set forth in SEQ ID NO: 19, the HCDR2 may comprise an amino acid sequence set forth in SEQ ID NO: 57, and the HCDR3 may comprise an amino acid sequence set forth in SEQ ID NO: 99.

In the present application, the antigen-binding protein may comprise an HCDR1, an HCDR2 and an HCDR3, wherein the HCDR1 may comprise an amino acid sequence set forth in SEQ ID NO: 18, the HCDR2 may comprise an amino acid sequence set forth in SEQ ID NO: 57, and the HCDR3 may comprise an amino acid sequence set forth in SEQ ID NO: 101.

In the present application, the antigen-binding protein may comprise an HCDR1, an HCDR2 and an HCDR3, wherein the HCDR1 may comprise an amino acid sequence set forth in SEQ ID NO: 18, the HCDR2 may comprise an amino acid sequence set forth in SEQ ID NO: 58, and the HCDR3 may comprise an amino acid sequence set forth in SEQ ID NO: 100.

In the present application, the antigen-binding protein may comprise an HCDR1, an HCDR2 and an HCDR3, wherein the HCDR1 may comprise an amino acid sequence set forth in SEQ ID NO: 20, the HCDR2 may comprise an amino acid sequence set forth in SEQ ID NO: 60, and the HCDR3 may comprise an amino acid sequence set forth in SEQ ID NO: 103.

In the present application, the antigen-binding protein may comprise an HCDR1, an HCDR2 and an HCDR3, wherein the HCDR1 may comprise an amino acid sequence set forth in SEQ ID NO: 20, the HCDR2 may comprise an amino acid sequence set forth in SEQ ID NO: 59, and the HCDR3 may comprise an amino acid sequence set forth in SEQ ID NO: 103.

In the present application, the antigen-binding protein may comprise an HCDR1, an HCDR2 and an HCDR3, wherein the HCDR1 may comprise an amino acid sequence set forth in SEQ ID NO: 20, the HCDR2 may comprise an amino acid sequence set forth in SEQ ID NO: 61, and the HCDR3 may comprise an amino acid sequence set forth in SEQ ID NO: 103.

In the present application, the antigen-binding protein may comprise an HCDR1, an HCDR2 and an HCDR3, wherein the HCDR1 may comprise an amino acid sequence set forth in SEQ ID NO: 21, the HCDR2 may comprise an amino acid sequence set forth in SEQ ID NO: 60, and the HCDR3 may comprise an amino acid sequence set forth in SEQ ID NO: 103.

In the present application, the antigen-binding protein may comprise an HCDR1, an HCDR2 and an HCDR3, wherein the HCDR1 may comprise an amino acid sequence set forth in SEQ ID NO: 21, the HCDR2 may comprise an amino acid sequence set forth in SEQ ID NO: 59, and the HCDR3 may comprise an amino acid sequence set forth in SEQ ID NO: 103.

In the present application, the antigen-binding protein may comprise an HCDR1, an HCDR2 and an HCDR3, wherein the HCDR1 may comprise an amino acid sequence set forth in SEQ ID NO: 21, the HCDR2 may comprise an amino acid sequence set forth in SEQ ID NO: 61, and the HCDR3 may comprise an amino acid sequence set forth in SEQ ID NO: 103.

In the present application, the antigen-binding protein may comprise an HCDR1, an HCDR2 and an HCDR3, wherein the HCDR1 may comprise an amino acid sequence set forth in SEQ ID NO: 20, the HCDR2 may comprise an amino acid sequence set forth in SEQ ID NO: 58, and the HCDR3 may comprise an amino acid sequence set forth in SEQ ID NO: 100.

In the present application, the antigen-binding protein may comprise an HCDR1, an HCDR2 and an HCDR3, wherein the HCDR1 may comprise an amino acid sequence set forth in SEQ ID NO: 18, the HCDR2 may comprise an amino acid sequence set forth in SEQ ID NO: 58, and the HCDR3 may comprise an amino acid sequence set forth in SEQ ID NO: 104.

In the present application, the antigen-binding protein may comprise an HCDR1, an HCDR2 and an HCDR3, wherein the HCDR1 may comprise an amino acid sequence set forth in SEQ ID NO: 18, the HCDR2 may comprise an amino acid sequence set forth in SEQ ID NO: 58, and the HCDR3 may comprise an amino acid sequence set forth in SEQ ID NO: 105.

In the present application, the antigen-binding protein may comprise an HCDR1, an HCDR2 and an HCDR3, wherein the HCDR1 may comprise an amino acid sequence set forth in SEQ ID NO: 21, the HCDR2 may comprise an amino acid sequence set forth in SEQ ID NO: 58, and the HCDR3 may comprise an amino acid sequence set forth in SEQ ID NO: 100.

In the present application, the antigen-binding protein may comprise an HCDR1, an HCDR2 and an HCDR3, wherein the HCDR1 may comprise an amino acid sequence set forth in SEQ ID NO: 22, the HCDR2 may comprise an amino acid sequence set forth in SEQ ID NO: 58, and the HCDR3 may comprise an amino acid sequence set forth in SEQ ID NO: 100.

In the present application, the antigen-binding protein may comprise an HCDR1, an HCDR2 and an HCDR3, wherein the HCDR1 may comprise an amino acid sequence set forth in SEQ ID NO: 18, the HCDR2 may comprise an amino acid sequence set forth in SEQ ID NO: 58, and the HCDR3 may comprise an amino acid sequence set forth in SEQ ID NO: 106.

In the present application, the antigen-binding protein may comprise an HCDR1, an HCDR2 and an HCDR3, wherein the HCDR1 may comprise an amino acid sequence set forth in SEQ ID NO: 18, the HCDR2 may comprise an amino acid sequence set forth in SEQ ID NO: 58, and the HCDR3 may comprise an amino acid sequence set forth in SEQ ID NO: 107.

In the present application, the antigen-binding protein may comprise an HCDR1, an HCDR2 and an HCDR3, wherein the HCDR1 may comprise an amino acid sequence set forth in SEQ ID NO: 18, the HCDR2 may comprise an amino acid sequence set forth in SEQ ID NO: 58, and the HCDR3 may comprise an amino acid sequence set forth in SEQ ID NO: 103.

In the present application, the antigen-binding protein may comprise an HCDR1, an HCDR2 and an HCDR3, wherein the HCDR1 may comprise an amino acid sequence set forth in SEQ ID NO: 18, the HCDR2 may comprise an amino acid sequence set forth in SEQ ID NO: 62, and the HCDR3 may comprise an amino acid sequence set forth in SEQ ID NO: 100.

In the present application, the antigen-binding protein may comprise an HCDR1, an HCDR2 and an HCDR3, wherein the HCDR1 may comprise an amino acid sequence set forth in SEQ ID NO: 18, the HCDR2 may comprise an amino acid sequence set forth in SEQ ID NO: 61, and the HCDR3 may comprise an amino acid sequence set forth in SEQ ID NO: 100.

In the present application, the antigen-binding protein may comprise an HCDR1, an HCDR2 and an HCDR3, wherein the HCDR1 may comprise an amino acid sequence set forth in SEQ ID NO: 18, the HCDR2 may comprise an amino acid sequence set forth in SEQ ID NO: 59, and the HCDR3 may comprise an amino acid sequence set forth in SEQ ID NO: 100.

In the present application, the antigen-binding protein may comprise an HCDR1, an HCDR2 and an HCDR3, wherein the HCDR1 may comprise an amino acid sequence set forth in SEQ ID NO: 18, the HCDR2 may comprise an amino acid sequence set forth in SEQ ID NO: 60, and the HCDR3 may comprise an amino acid sequence set forth in SEQ ID NO: 100.

In the present application, the antigen-binding protein may comprise an HCDR1, an HCDR2 and an HCDR3, wherein the HCDR1 may comprise an amino acid sequence set forth in SEQ ID NO: 18, the HCDR2 may comprise an amino acid sequence set forth in SEQ ID NO: 63, and the HCDR3 may comprise an amino acid sequence set forth in SEQ ID NO: 100.

In the present application, the antigen-binding protein may comprise an HCDR1, an HCDR2 and an HCDR3, wherein the HCDR1 may comprise an amino acid sequence set forth in SEQ ID NO: 23, the HCDR2 may comprise an amino acid sequence set forth in SEQ ID NO: 64, and the HCDR3 may comprise an amino acid sequence set forth in SEQ ID NO: 108.

In the present application, the antigen-binding protein may comprise an HCDR1, an HCDR2 and an HCDR3, wherein the HCDR1 may comprise an amino acid sequence set forth in SEQ ID NO: 24, the HCDR2 may comprise an amino acid sequence set forth in SEQ ID NO: 65, and the HCDR3 may comprise an amino acid sequence set forth in SEQ ID NO: 108.

In the present application, the antigen-binding protein may comprise an HCDR1, an HCDR2 and an HCDR3, wherein the HCDR1 may comprise an amino acid sequence set forth in SEQ ID NO: 26, the HCDR2 may comprise an amino acid sequence set forth in SEQ ID NO: 64, and the HCDR3 may comprise an amino acid sequence set forth in SEQ ID NO: 108.

In the present application, the antigen-binding protein may comprise an HCDR1, an HCDR2 and an HCDR3, wherein the HCDR1 may comprise an amino acid sequence set forth in SEQ ID NO: 25, the HCDR2 may comprise an amino acid sequence set forth in SEQ ID NO: 66, and the HCDR3 may comprise an amino acid sequence set forth in SEQ ID NO: 108.

In the present application, the antigen-binding protein may comprise an HCDR1, an HCDR2 and an HCDR3, wherein the HCDR1 may comprise an amino acid sequence set forth in SEQ ID NO: 25, the HCDR2 may comprise an amino acid sequence set forth in SEQ ID NO: 65, and the HCDR3 may comprise an amino acid sequence set forth in SEQ ID NO: 108.

In the present application, the antigen-binding protein may comprise an HCDR1, an HCDR2 and an HCDR3, wherein the HCDR1 may comprise an amino acid sequence set forth in SEQ ID NO: 26, the HCDR2 may comprise an amino acid sequence set forth in SEQ ID NO: 67, and the HCDR3 may comprise an amino acid sequence set forth in SEQ ID NO: 109.

In the present application, the antigen-binding protein may comprise an HCDR1, an HCDR2 and an HCDR3, wherein the HCDR1 may comprise an amino acid sequence set forth in SEQ ID NO: 27, the HCDR2 may comprise an amino acid sequence set forth in SEQ ID NO: 64, and the HCDR3 may comprise an amino acid sequence set forth in SEQ ID NO: 110.

In the present application, the antigen-binding protein may comprise an HCDR1, an HCDR2 and an HCDR3, wherein the HCDR1 may comprise an amino acid sequence set forth in SEQ ID NO: 18, the HCDR2 may comprise an amino acid sequence set forth in SEQ ID NO: 64, and the HCDR3 may comprise an amino acid sequence set forth in SEQ ID NO: 108.

In the present application, the antigen-binding protein may comprise an HCDR1, an HCDR2 and an HCDR3, wherein the HCDR1 may comprise an amino acid sequence set forth in SEQ ID NO: 28, the HCDR2 may comprise an amino acid sequence set forth in SEQ ID NO: 64, and the HCDR3 may comprise an amino acid sequence set forth in SEQ ID NO: 111.

In the present application, the antigen-binding protein may comprise an HCDR1, an HCDR2 and an HCDR3, wherein the HCDR1 may comprise an amino acid sequence set forth in SEQ ID NO: 18, the HCDR2 may comprise an amino acid sequence set forth in SEQ ID NO: 66, and the HCDR3 may comprise an amino acid sequence set forth in SEQ ID NO: 111.

In the present application, the antigen-binding protein may comprise an HCDR1, an HCDR2 and an HCDR3, wherein the HCDR1 may comprise an amino acid sequence set forth in SEQ ID NO: 23, the HCDR2 may comprise an amino acid sequence set forth in SEQ ID NO: 68, and the HCDR3 may comprise an amino acid sequence set forth in SEQ ID NO: 108.

In the present application, the antigen-binding protein may comprise an HCDR1, an HCDR2 and an HCDR3, wherein the HCDR1 may comprise an amino acid sequence set forth in SEQ ID NO: 18, the HCDR2 may comprise an amino acid sequence set forth in SEQ ID NO: 64, and the HCDR3 may comprise an amino acid sequence set forth in SEQ ID NO: 111.

In the present application, the antigen-binding protein may comprise an HCDR1, an HCDR2 and an HCDR3, wherein the HCDR1 may comprise an amino acid sequence set forth in SEQ ID NO: 18, the HCDR2 may comprise an amino acid sequence set forth in SEQ ID NO: 66, and the HCDR3 may comprise an amino acid sequence set forth in SEQ ID NO: 109.

In the present application, the antigen-binding protein may comprise an HCDR1, an HCDR2 and an HCDR3, wherein the HCDR1 may comprise an amino acid sequence set forth in SEQ ID NO: 30, the HCDR2 may comprise an amino acid sequence set forth in SEQ ID NO: 64, and the HCDR3 may comprise an amino acid sequence set forth in SEQ ID NO: 111.

In the present application, the antigen-binding protein may comprise an HCDR1, an HCDR2 and an HCDR3, wherein the HCDR1 may comprise an amino acid sequence set forth in SEQ ID NO: 29, the HCDR2 may comprise an amino acid sequence set forth in SEQ ID NO: 66, and the HCDR3 may comprise an amino acid sequence set forth in SEQ ID NO: 111.

In the present application, the antigen-binding protein may comprise an HCDR1, an HCDR2 and an HCDR3, wherein the HCDR1 may comprise an amino acid sequence set forth in SEQ ID NO: 23, the HCDR2 may comprise an amino acid sequence set forth in SEQ ID NO: 68, and the HCDR3 may comprise an amino acid sequence set forth in SEQ ID NO: 111.

In the present application, the antigen-binding protein may comprise an HCDR1, an HCDR2 and an HCDR3, wherein the HCDR1 may comprise an amino acid sequence set forth in SEQ ID NO: 29, the HCDR2 may comprise an amino acid sequence set forth in SEQ ID NO: 65, and the HCDR3 may comprise an amino acid sequence set forth in SEQ ID NO: 111.

In the present application, the antigen-binding protein may comprise an HCDR1, an HCDR2 and an HCDR3, wherein the HCDR1 may comprise an amino acid sequence set forth in SEQ ID NO: 30, the HCDR2 may comprise an amino acid sequence set forth in SEQ ID NO: 64, and the HCDR3 may comprise an amino acid sequence set forth in SEQ ID NO: 109.

In the present application, the antigen-binding protein may comprise an HCDR1, an HCDR2 and an HCDR3, wherein the HCDR1 may comprise an amino acid sequence set forth in SEQ ID NO: 31, the HCDR2 may comprise an amino acid sequence set forth in SEQ ID NO: 64, and the HCDR3 may comprise an amino acid sequence set forth in SEQ ID NO: 111.

In the present application, the antigen-binding protein may comprise an HCDR1, an HCDR2 and an HCDR3, wherein the HCDR1 may comprise an amino acid sequence set forth in SEQ ID NO: 23, the HCDR2 may comprise an amino acid sequence set forth in SEQ ID NO: 66, and the HCDR3 may comprise an amino acid sequence set forth in SEQ ID NO: 111.

In the present application, the antigen-binding protein may comprise an HCDR1, an HCDR2 and an HCDR3, wherein the HCDR1 may comprise an amino acid sequence set forth in SEQ ID NO: 23, the HCDR2 may comprise an amino acid sequence set forth in SEQ ID NO: 64, and the HCDR3 may comprise an amino acid sequence set forth in SEQ ID NO: 111.

In the present application, the antigen-binding protein may comprise an HCDR1, an HCDR2 and an HCDR3, wherein the HCDR1 may comprise an amino acid sequence set forth in SEQ ID NO: 32, the HCDR2 may comprise an amino acid sequence set forth in SEQ ID NO: 64, and the HCDR3 may comprise an amino acid sequence set forth in SEQ ID NO: 109.

In the present application, the antigen-binding protein may comprise an HCDR1, an HCDR2 and an HCDR3, wherein the HCDR1 may comprise an amino acid sequence set forth in SEQ ID NO: 23, the HCDR2 may comprise an amino acid sequence set forth in SEQ ID NO: 66, and the HCDR3 may comprise an amino acid sequence set forth in SEQ ID NO: 109.

In the present application, the antigen-binding protein may comprise an HCDR1, an HCDR2 and an HCDR3, wherein the HCDR1 may comprise an amino acid sequence set forth in SEQ ID NO: 33, the HCDR2 may comprise an amino acid sequence set forth in SEQ ID NO: 65, and the HCDR3 may comprise an amino acid sequence set forth in SEQ ID NO: 111.

In the present application, the antigen-binding protein may comprise a framework region HFWR1, and the C-terminus of the HFWR1 is directly or indirectly linked to the N-terminus of the HCDR1. In the present application, the HFWR1 may comprise an amino acid sequence set forth in SEQ ID NO: 9.

In the present application, the antigen-binding protein may comprise a framework region HFWR2, and the HFWR2 is located between the HCDR1 and the HCDR2. In the present application, the HFWR2 may comprise an amino acid sequence set forth in any one of SEQ ID NOs: 46-49.

In the present application, the antigen-binding protein may comprise a framework region HFWR3, and the HFWR3 is located between the HCDR2 and the HCDR3. In the present application, the HFWR3 may comprise an amino acid sequence set forth in any one of SEQ ID NOs: 77-80 and 82-91.

In the present application, the antigen-binding protein may comprise a framework region HFWR4, and the N-terminus of the HFWR4 is linked to the C-terminus of the HCDR3. In the present application, the HFWR4 may comprise an amino acid sequence set forth in SEQ ID NO: 113.

In the present application, the antigen-binding protein may comprise a heavy chain variable region VH, and the VH may comprise an amino acid sequence set forth in any one of SEQ ID NOs: 160-166 and 168-221.

In the present application, the antigen-binding protein may comprise an antibody heavy chain, and the antibody heavy chain may comprise an amino acid sequence set forth in any one of SEQ ID NOs: 247-253 and 255-309.

In one aspect, the present application provides an antigen-binding protein, wherein the antigen-binding protein may comprise at least one CDR in an antibody heavy chain variable region VH, and the VH may comprise an amino acid sequence set forth in SEQ ID NO: 167.

The antigen-binding protein described herein may comprise a heavy chain complementary determining region HCDR1. In the present application, the HCDR1 of the antigen-binding protein may comprise an amino acid sequence set forth in SEQ ID NO: 10: $GFX_3VX_5X_6X_7$, wherein $X_3$=N or T, $X_5$=A or S, $X_6$=F or S, and $X_7$=F, H or Y. For example, this sequence may be a sequence determined according to the Chothia scheme.

For example, the HCDR1 of the antigen-binding protein may comprise an amino acid sequence set forth in any one of SEQ ID NOs: 18, 25, 28 and 34-38.

The antigen-binding protein described herein may comprise a heavy chain complementary determining region HCDR2. In the present application, the HCDR2 of the antigen-binding protein may comprise an amino acid sequence set forth in SEQ ID NO: 81: DKX₃GS, wherein X₃=A, G or S. For example, this sequence may be a sequence determined according to the Chothia scheme.

For example, the HCDR2 of the antigen-binding protein may comprise an amino acid sequence set forth in any one of SEQ ID NOs: 64-66.

The antigen-binding protein described herein may comprise a heavy chain complementary determining region HCDR3. In the present application, the HCDR3 of the antigen-binding protein may comprise an amino acid sequence set forth in SEQ ID NO: 102: ATX₂VREKX₈GYNYPFNY, wherein X₂=A or E, and X₈=N or Q. For example, this sequence may be a sequence determined according to the Chothia scheme.

For example, the HCDR3 of the antigen-binding protein may comprise an amino acid sequence set forth in any one of SEQ ID NOs: 108, 111 and 112.

The antigen-binding protein described herein may comprise heavy chain complementary determining regions HCDR1, HCDR2 and HCDR3, wherein the HCDR1 may comprise an amino acid sequence set forth in SEQ ID NO: 10, the HCDR2 may comprise an amino acid sequence set forth in SEQ ID NO: 81, and the HCDR3 may comprise an amino acid sequence set forth in SEQ ID NO: 102.

The antigen-binding protein described herein may comprise heavy chain complementary determining regions HCDR1, HCDR2 and HCDR3, wherein the HCDR1 may comprise an amino acid sequence set forth in any one of SEQ ID NOs: 18, 25, 28 and 34-38, the HCDR2 may comprise an amino acid sequence set forth in any one of SEQ ID NOs: 64-66, and the HCDR3 may comprise an amino acid sequence set forth in any one of SEQ ID NOs: 108, 111 and 112.

In the present application, the antigen-binding protein may comprise an HCDR1, an HCDR2 and an HCDR3, wherein the HCDR1 may comprise an amino acid sequence set forth in SEQ ID NO: 25, the HCDR2 may comprise an amino acid sequence set forth in SEQ ID NO: 66, and the HCDR3 may comprise an amino acid sequence set forth in SEQ ID NO: 108.

In the present application, the antigen-binding protein may comprise an HCDR1, an HCDR2 and an HCDR3, wherein the HCDR1 may comprise an amino acid sequence set forth in SEQ ID NO: 25, the HCDR2 may comprise an amino acid sequence set forth in SEQ ID NO: 65, and the HCDR3 may comprise an amino acid sequence set forth in SEQ ID NO: 108.

In the present application, the antigen-binding protein may comprise an HCDR1, an HCDR2 and an HCDR3, wherein the HCDR1 may comprise an amino acid sequence set forth in SEQ ID NO: 25, the HCDR2 may comprise an amino acid sequence set forth in SEQ ID NO: 65, and the HCDR3 may comprise an amino acid sequence set forth in SEQ ID NO: 111.

In the present application, the antigen-binding protein may comprise an HCDR1, an HCDR2 and an HCDR3, wherein the HCDR1 may comprise an amino acid sequence set forth in SEQ ID NO: 34, the HCDR2 may comprise an amino acid sequence set forth in SEQ ID NO: 65, and the HCDR3 may comprise an amino acid sequence set forth in SEQ ID NO: 111.

In the present application, the antigen-binding protein may comprise an HCDR1, an HCDR2 and an HCDR3, wherein the HCDR1 may comprise an amino acid sequence set forth in SEQ ID NO: 18, the HCDR2 may comprise an amino acid sequence set forth in SEQ ID NO: 64, and the HCDR3 may comprise an amino acid sequence set forth in SEQ ID NO: 108.

In the present application, the antigen-binding protein may comprise an HCDR1, an HCDR2 and an HCDR3, wherein the HCDR1 may comprise an amino acid sequence set forth in SEQ ID NO: 18, the HCDR2 may comprise an amino acid sequence set forth in SEQ ID NO: 64, and the HCDR3 may comprise an amino acid sequence set forth in SEQ ID NO: 111.

In the present application, the antigen-binding protein may comprise an HCDR1, an HCDR2 and an HCDR3, wherein the HCDR1 may comprise an amino acid sequence set forth in SEQ ID NO: 35, the HCDR2 may comprise an amino acid sequence set forth in SEQ ID NO: 64, and the HCDR3 may comprise an amino acid sequence set forth in SEQ ID NO: 111.

In the present application, the antigen-binding protein may comprise an HCDR1, an HCDR2 and an HCDR3, wherein the HCDR1 may comprise an amino acid sequence set forth in SEQ ID NO: 36, the HCDR2 may comprise an amino acid sequence set forth in SEQ ID NO: 64, and the HCDR3 may comprise an amino acid sequence set forth in SEQ ID NO: 111.

In the present application, the antigen-binding protein may comprise an HCDR1, an HCDR2 and an HCDR3, wherein the HCDR1 may comprise an amino acid sequence set forth in SEQ ID NO: 36, the HCDR2 may comprise an amino acid sequence set forth in SEQ ID NO: 64, and the HCDR3 may comprise an amino acid sequence set forth in SEQ ID NO: 112.

In the present application, the antigen-binding protein may comprise an HCDR1, an HCDR2 and an HCDR3, wherein the HCDR1 may comprise an amino acid sequence set forth in SEQ ID NO: 37, the HCDR2 may comprise an amino acid sequence set forth in SEQ ID NO: 64, and the HCDR3 may comprise an amino acid sequence set forth in SEQ ID NO: 111.

In the present application, the antigen-binding protein may comprise an HCDR1, an HCDR2 and an HCDR3, wherein the HCDR1 may comprise an amino acid sequence set forth in SEQ ID NO: 28, the HCDR2 may comprise an amino acid sequence set forth in SEQ ID NO: 64, and the HCDR3 may comprise an amino acid sequence set forth in SEQ ID NO: 111.

In the present application, the antigen-binding protein may comprise an HCDR1, an HCDR2 and an HCDR3, wherein the HCDR1 may comprise an amino acid sequence set forth in SEQ ID NO: 38, the HCDR2 may comprise an amino acid sequence set forth in SEQ ID NO: 64, and the HCDR3 may comprise an amino acid sequence set forth in SEQ ID NO: 111.

In the present application, the antigen-binding protein may comprise a framework region HFWR1, and the C-terminus of the HFWR1 is directly or indirectly linked to the N-terminus of the HCDR1. In the present application, the HFWR1 may comprise an amino acid sequence set forth in SEQ ID NO: 9.

In the present application, the antigen-binding protein may comprise a framework region HFWR2, and the HFWR2 is located between the HCDR1 and the HCDR2. In the present application, the HFWR2 may comprise an amino acid sequence set forth in SEQ ID NO: 47.

In the present application, the antigen-binding protein may comprise a framework region HFWR3, and the HFWR3 is located between the HCDR2 and the HCDR3. In the present application, the HFWR3 may comprise an amino acid sequence set forth in any one of SEQ ID NOs: 82, 84, 85, 87, 88 and 89.

In the present application, the antigen-binding protein may comprise a framework region HFWR4, and the N-terminus of the HFWR4 is linked to the C-terminus of the HCDR3. In the present application, the HFWR4 may comprise an amino acid sequence set forth in SEQ ID NO: 113.

In the present application, the antigen-binding protein may comprise a heavy chain variable region VH, and the VH may comprise an amino acid sequence set forth in any one of SEQ ID NOs: 196, 197, 201, 202 and 222-230.

In the present application, the antigen-binding protein may comprise an antibody heavy chain, and the antibody heavy chain may comprise an amino acid sequence set forth in any one of SEQ ID NOs: 310-323.

The PD-1 antigen-binding protein or fusion protein described herein can be identified, screened, or characterized for physical/chemical properties and/or bioactivity thereof through a variety of assays known in the art.

In one aspect, the antigen-binding activity of the antigen-binding protein or fusion protein of the present application can be tested, for example, by known methods such as enzyme-linked immunosorbent assay (ELISA), immunoblotting (e.g., western blotting), flow cytometry (e.g., FACS), immunohistochemistry and immunofluorescence. The antigen-binding protein described herein (e.g., a PD-1 antibody) is capable of specifically binding to a PD-1 antigen.

An antigen-binding protein that "specifically binds" to a PD-1 antigen (e.g., a PD-1 antibody) can generally bind to PD-1, but not to other proteins lacking PD-1 sequences. The antigen-binding protein described herein (e.g., a PD-1 antibody) is capable of specifically binding to a PD-1 antigen or a labeled form thereof (e.g., a fluorescently labeled PD-1 antigen), but does not bind to other proteins lacking PD-1 epitopes. Whether an antigen-binding protein (e.g., an antibody) binds to a PD-1 antigen can be determined using any assay known in the art. Examples of assays known in the art for determining binding affinity include surface plasmon resonance (SPR) and biolayer interferometry (BLI) technique.

The antigen-binding protein described herein can bind to human PD-1 protein. In certain instances, the antigen-binding protein described herein can also cross-react with monkey (e.g., cynomolgus monkey) PD-1, for example, as assayed by flow cytometry technique and enzyme-linked immunosorbent assay. As used herein, "cross-reactivity" refers to the ability of an antibody to react with homologous proteins from other species.

In certain instances, the binding activity of the antigen-binding protein described herein to PD-1 can be assayed using flow cytometry or enzyme-linked immunosorbent assay. For example, host cells (e.g., CHO-K1 cells) stably expressing human or monkey PD-1 are used in the FACS assays, and the $EC_{50}$ value of the PD-1 antigen-binding protein to PD-1 is between about 0.0001 nM and about 100 nM, e.g., between about 0.001 nM and about 80 nM, between about 0.01 nM and about 60 nM, between about 0.05 nM and about 50 nM, between about 0.05 nM and about 40 nM, between about 0.05 nM and about 30 nM, between about 0.05 nM and about 20 nM, between about 0.05 nM and about 10 nM or between about 0.05 nM and about 5 nM. For another example, human PD-1 antigenic protein is used in the ELISA assays, and the $EC_{50}$ value of the PD-1 antigen-binding protein to PD-1 is between about 0.0001 nM and about 100 nM, e.g., between about 0.001 nM and about 10 nM, between about 0.001 nM and about 5 nM, between about 0.001 nM and about 1 nM or between about 0.01 nM and about 1 nM.

In another aspect, the antigen-binding protein described herein is capable of blocking the binding of PD-1 to PD-L1. In certain instances, the antigen-binding protein's blocking the binding of PD-1 to PD-L1 can be determined by flow cytometry FACS and enzyme-linked immunosorbent assay ELISA. For example, host cells (e.g., CHO-K1 cells) stably expressing PD-L1 are incubated first with a decreasing amount of the antigen-binding protein which is unlabeled, followed by incubation with a biotin-labeled PD-1 protein. The cells are then analyzed using FACS to confirm that the antigen-binding protein blocks the binding of PD-1 to PD-L1. For another example, PD-L1 antigenic protein is coated first on a plate, and a decreasing amount of the antigen-binding protein, which is unlabeled, is mixed with a biotin-labeled PD-1 protein for co-incubation. The cells are then analyzed using ELISA to confirm that the antigen-binding protein can block the binding of PD-1 to PD-L1.

In another aspect, the antigen-binding protein described herein is capable of blocking the binding of PD-1 to PD-L2. In certain instances, the antigen-binding protein's blocking the binding of PD-1 to PD-L2 can be determined by flow cytometry FACS and enzyme-linked immunosorbent assay ELISA. For example, host cells (e.g., CHO-K1 cells) stably expressing PD-1 are incubated first with a decreasing amount of the antigen-binding protein which is unlabeled, followed by incubation with a biotin-labeled PD-L2 protein. The cells are then analyzed using FACS to confirm that the antigen-binding protein blocks the binding of PD-1 to PD-L2. For another example, PD-1 antigenic protein is coated first on a plate, and a decreasing amount of the antigen-binding protein, which is unlabeled, is mixed with a biotin-labeled PD-L2 protein for co-incubation. The cells are then analyzed using ELISA to confirm that the antigen-binding protein can block the binding of PD-1 to PD-L2.

The antigen-binding protein described herein is capable of stimulating the secretion of IFN-γ and/or IL2 in immune cells. The immune cells may include lymphocytes such as B cells, T cells and natural killer cells; and myeloid cells such as monocytes, macrophages, mast cells, basophils and granulocytes. The secretion of cytokines in immune cells can be determined by any method known to those skilled in the art. For example, the proliferation of immune cells (e.g., T cells) or cytokines produced by immune cells (e.g., IFN-γ or IL-2 produced by T cells) can be determined quantitatively by enzyme-linked immunosorbent assay (ELISA).

Fusion Protein

In another aspect, the present application provides a fusion protein, which comprises a first targeting moiety and a second targeting moiety, wherein the first targeting moiety comprises a PD-1 binding moiety, and the PD-1 binding moiety comprises the isolated antigen-binding protein described herein.

In the present application, the second targeting moiety of the fusion protein may comprise a CD73 binding moiety. In the present application, the CD73 binding moiety may comprise an antibody or an antigen-binding fragment thereof that specifically binds to CD73.

In the present application, the CD73 binding moiety of the fusion protein may comprise an antibody heavy chain or a fragment thereof, wherein the antibody heavy chain or the fragment thereof may comprise an HCDR1, and the HCDR1 may comprise an amino acid sequence set forth in SEQ ID NO: 17.

In the present application, the CD73 binding moiety of the fusion protein may comprise an antibody heavy chain or a fragment thereof, wherein the antibody heavy chain or the fragment thereof may comprise an HCDR2, and the HCDR2 may comprise an amino acid sequence set forth in SEQ ID NO: 56.

In the present application, the CD73 binding moiety of the fusion protein may comprise an antibody heavy chain or a fragment thereof, wherein the antibody heavy chain or the fragment thereof may comprise an HCDR3, and the HCDR3 may comprise an amino acid sequence set forth in SEQ ID NO: 98.

In the present application, the CD73 binding moiety of the fusion protein may comprise an antibody heavy chain or a fragment thereof, wherein the antibody heavy chain or the fragment thereof may comprise an HCDR1, an HCDR2 and an HCDR3, and the HCDR1, HCDR2 and HCDR3 may comprise amino acid sequences set forth in SEQ ID NO: 17, SEQ ID NO: 56 and SEQ ID NO: 98, respectively.

In the present application, the CD73 binding moiety of the fusion protein may comprise an antibody heavy chain variable region VH, and the VH may comprise an amino acid sequence set forth in SEQ ID NO: 159.

In the present application, the CD73 binding moiety of the fusion protein may comprise an antibody light chain or a fragment thereof, wherein the antibody light chain or the fragment thereof may comprise an LCDR1, and the LCDR1 may comprise an amino acid sequence set forth in SEQ ID NO: 123.

In the present application, the CD73 binding moiety of the fusion protein may comprise an antibody light chain or a fragment thereof, wherein the antibody light chain or the fragment thereof may comprise an LCDR2, and the LCDR2 may comprise an amino acid sequence set forth in SEQ ID NO: 130.

In the present application, the CD73 binding moiety of the fusion protein may comprise an antibody light chain or a fragment thereof, wherein the antibody light chain or the fragment thereof may comprise an LCDR3, and the LCDR3 may comprise an amino acid sequence set forth in SEQ ID NO: 146.

In the present application, the CD73 binding moiety of the fusion protein may comprise an antibody light chain or a fragment thereof, wherein the antibody light chain or the fragment thereof may comprise an LCDR1, an LCDR2 and an LCDR3, and the LCDR1, LCDR2 and LCDR3 may comprise amino acid sequences set forth in SEQ ID NO: 123, SEQ ID NO: 130 and SEQ ID NO: 146, respectively.

In the present application, the CD73 binding moiety of the fusion protein may comprise an antibody light chain variable region VL, and the VL may comprise an amino acid sequence set forth in SEQ ID NO: 237.

In the present application, the CD73 binding moiety of the fusion protein may comprise an HCDR1, an HCDR2, an HCDR3, an LCDR1, an LCDR2 and an LCDR3, wherein the HCDR1, HCDR2 and HCDR3 may comprise amino acid sequences set forth in SEQ ID NO: 17, SEQ ID NO: 56 and SEQ ID NO: 98, respectively; and the LCDR1, LCDR2, and LCDR3 may comprise amino acid sequences set forth in SEQ ID NO: 123, SEQ ID NO: 130 and SEQ ID NO: 146, respectively.

In the present application, the CD73 binding moiety of the fusion protein may comprise a VH and a VL, wherein the VH may comprise an amino acid sequence set forth in SEQ ID NO: 159, and the VL may comprise an amino acid sequence set forth in SEQ ID NO: 237.

In the present application, the CD73 binding moiety of the fusion protein may comprise a Fab.

In the present application, the CD73 binding moiety of the fusion protein may comprise an antibody heavy chain, and the antibody heavy chain may comprise an amino acid sequence set forth in SEQ ID NO: 246.

In the present application, the CD73 binding moiety of the fusion protein may comprise an antibody light chain, and the antibody light chain may comprise an amino acid sequence set forth in SEQ ID NO: 330.

In the present application, in the fusion protein, the PD-1 binding moiety may be located at the N-terminus of the CD73 binding moiety. In the present application, in the fusion protein, the PD-1 binding moiety may be located at the C-terminus of the CD73 binding moiety.

In the present application, the fusion protein may comprise a first polypeptide chain and a second polypeptide chain. In the present application, the first polypeptide chain of the fusion protein may comprise the VH of the PD-1 binding moiety and the VH of the CD73 binding moiety. In the present application, the second polypeptide chain of the fusion protein may comprise the VL of the CD73 binding moiety.

In the present application, the first polypeptide chain of the fusion protein may comprise the VH of the PD-1 binding moiety and the VH of the CD73 binding moiety sequentially from the N-terminus to the C-terminus.

In the present application, the first polypeptide chain of the fusion protein may comprise an antibody heavy chain constant region. In the present application, the first polypeptide chain of the fusion protein may comprise the VH of the PD-1 binding moiety, the VH of the CD73 binding moiety and the antibody heavy chain constant region sequentially from the N-terminus to the C-terminus.

In the present application, the first polypeptide chain of the fusion protein may comprise the VH of the PD-1 binding moiety and the antibody heavy chain of the CD73 binding moiety. In the present application, the first polypeptide chain of the fusion protein may comprise the VH of the PD-1 binding moiety and the antibody heavy chain of the CD73 binding moiety sequentially from the N-terminus to the C-terminus.

In the present application, in the first polypeptide chain of the fusion protein, the PD-1 binding moiety and the CD73 binding moiety may be directly linked.

In the present application, in the first polypeptide chain of the fusion protein, the PD-1 binding moiety and the CD73 binding moiety may be linked by a linker peptide. In the present application, the linker peptide may comprise an amino acid sequence set forth in any one of SEQ ID NOs: 334-352.

For example, the first polypeptide chain may comprise an amino acid sequence set forth in SEQ ID NO: 333.

In the present application, the second polypeptide chain of the fusion protein may further comprise an antibody light chain constant region. For example, the first polypeptide chain may comprise an amino acid sequence set forth in SEQ ID NO: 330.

In the present application, the fusion protein may comprise two the first polypeptide chains and two the second polypeptide chains. In the present application, the fusion protein may be a homodimer. In the present application, the fusion protein is of a symmetric structure.

Figure 10:
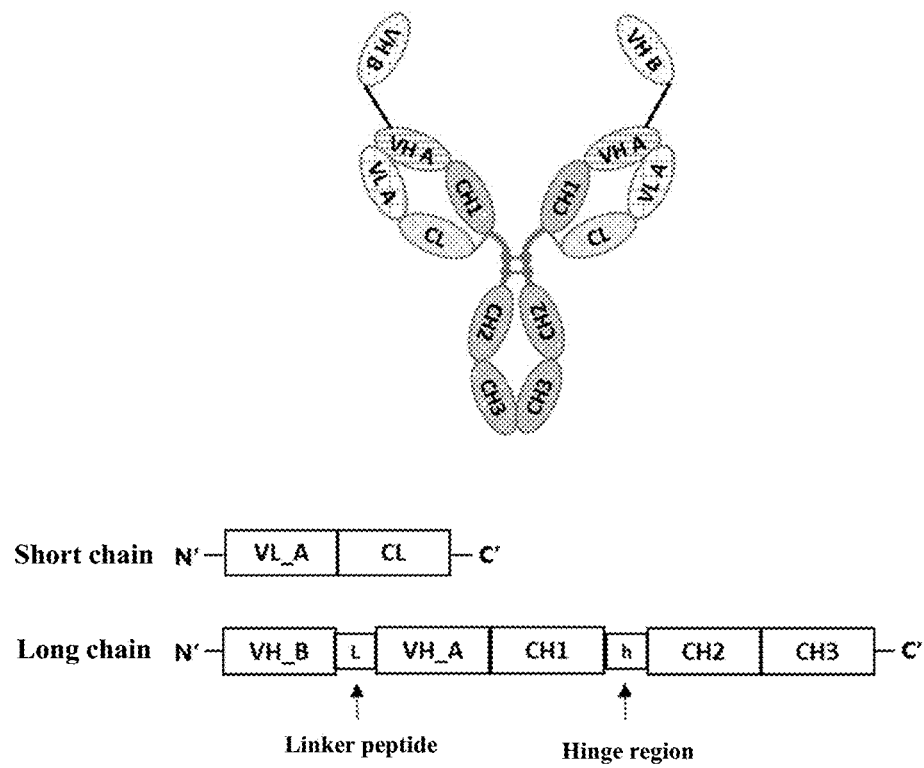
FIG. 10 shows the exemplary molecular structure of the fusion protein described herein.

An exemplary structure of the fusion protein described herein may be as shown in FIG. 10, which comprises two polypeptide chains: a first polypeptide chain, also known as a short chain, comprising VL_A-CL from the amino-terminus to the carboxyl-terminus; and a second polypeptide chain, also known as a long chain, comprising VH_B-L-VH_A-CH1-h-CH2-CH3 from the amino-terminus to the carboxyl-terminus. VH_A and VL_A are heavy chain and light chain variable regions of any CD73 antibody, respectively. VH_B is a heavy chain variable region of the PD-1 heavy-chain antibody described herein. CL is any light chain constant region domain. CH1, CH2 and CH3 are first, second and third domains of any heavy chain constant region, respectively. L is any linker peptide (e.g., those mentioned herein), and h is a hinge region or a derivative sequence of any IgG antibody.

In the present application, the fusion protein has the bioactivity of the antigen-binding protein, such as binding to a PD-1 antibody, blocking the binding of PD-1 to its ligand (e.g., PD-L1 and/or PD-L2), and stimulating T cells to secrete cytokines. In addition, the fusion protein described herein is capable of binding to CD73 protein and inhibiting the enzymatic activity of CD73.

Nucleic Acid Molecule, Vector and Cell

In another aspect, the present application provides one or more nucleic acid molecules that can encode the isolated antigen-binding protein described herein and/or the multispecific antibody described herein. The nucleic acid molecule described herein may be isolated. For example, it may be produced or synthesized by the following methods: (i) in vitro amplification, such as amplification by polymerase chain reaction (PCR); (ii) cloning and recombination; (iii) purification, such as separation by enzymatic digestion and gel electrophoresis fractionation; or (iv) synthesis, such as chemical synthesis. In certain embodiments, the isolated nucleic acid is a nucleic acid molecule prepared by recombinant DNA techniques.

In another aspect, the present application provides a vector, which may comprise the nucleic acid molecule described herein. In addition, the vector may further comprise other genes, such as marker genes that allow selection of the vector in an appropriate host cell and under appropriate conditions. In addition, the vector may further comprise expression control elements that allow proper expression of the coding region in an appropriate host. Such control elements are well known to those skilled in the art and may include, for example, promoters, ribosome binding sites, enhancers and other control elements for regulating gene transcription or mRNA translation,. The vector may include, for example, a plasmid, a cosmid, a virus, a phage or other vectors commonly used in, for example, genetic engineering. For example, the vector is an expression vector.

In another aspect, the present application provides a cell, which may comprise the nucleic acid molecule described herein or the vector described herein. In certain embodiments, each type of or each host cell may comprise one type of or one nucleic acid molecule or vector described herein. In certain embodiments, each type of or each host cell may comprise multiple (e.g., two or more) or multiple types (e.g., two or more) of nucleic acid molecules or vectors described herein. For example, the vector described herein can be introduced into the host cell described herein, e.g., a eukaryotic cell, such as a plant-derived cell or a fungal or yeast cell. The vector described herein can be introduced into the host cell described herein based on methods known in the art, such as electroporation, lipofectine transfection and lipofectamin transfection.

Pharmaceutical Composition

In another aspect, the present application provides a pharmaceutical composition, which may comprise the antigen-binding protein and/or the multispecific antibody, the nucleic acid molecule, the vector or the host cell described herein, and optionally a pharmaceutically acceptable carrier. The pharmaceutically acceptable carrier is non-toxic to a subject at the dosages and concentrations employed, and may include buffers, antioxidants, preservatives, low-molecular-weight (less than about 10 residues) polypeptides, proteins, hydrophilic polymers, amino acids, carbohydrates, salt-forming counterions, metal complexes, and/or non-ionic surfactants. The pharmaceutical composition of the present application may further comprise more than one active compound, typically those having complementary activities that do not adversely affect one another. The type and effective amount of such pharmaceuticals depend on, for example, the amount and type of antagonist present in the formulation, as well as the clinical parameters of the subject.

The pharmaceutical composition described herein may comprise a prophylactically and/or therapeutically effective amount of the antigen-binding protein and multispecific antibody. The prophylactically and/or therapeutically effective amount is the dose required to prevent and/or treat (at least partially treat) a disease or disorder and/or any complication thereof in a subject suffering from or at risk of developing the disease or disorder.

In another aspect, the present application provides an immunoconjugate, which may comprise a cytotoxic agent and the antigen-binding protein described herein. Immunoconjugate generally refers to a conjugation of an antigen-binding protein and a small molecule cytotoxic drug using a specific linker, and may comprise the antigen-binding protein, the linker and the small molecule cytotoxic drug as main components.

In another aspect, the present application provides a kit, which may comprise the antigen-binding protein, the vector, the nucleic acid molecule, the cell, the immunoconjugate and/or the pharmaceutical composition described herein. The antigen-binding protein, the vector, the nucleic acid molecule, the cell, the immunoconjugate and/or the pharmaceutical composition described herein may be comprised in a single common container in the kit, and may optionally be in combination with one or more therapeutic agents and optionally formulated together in the kit.

In another aspect, the present application provides an administration device, which can be used to administer the antigen-binding protein, the vector, the nucleic acid molecule, the cell, the immunoconjugate and/or the pharmaceutical composition described herein.

Preparation Method

In another aspect, the present application provides a method for preparing the antigen-binding protein described herein. The method may comprise culturing the host cell described herein under a condition that allows expression of the antigen-binding protein, for example, by adopting an appropriate culture medium, an appropriate temperature, an appropriate incubation time and the like. These methods are known to those of ordinary skill in the art.

Any method suitable for producing monoclonal antibodies can be used to produce the antigen-binding protein of the present application. For example, an animal can be immunized with a linked or naturally occurring PD-1 protein or a fragment thereof. Suitable immunization methods, including adjuvants, immunostimulants and repeated booster immunizations, may be used, and one or more routes may be used.

Any suitable form of PD-1 may be used as an immunogen (antigen) to generate a non-human antibody specific for PD-1 and screen the biological activity of the antibody. The stimulating immunogen may be a full-length mature human PD-1, including a native homodimer, or a peptide containing a single epitope/multiple epitopes. The immunogen may be used alone or in combination with one or more immunogenicity enhancers known in the art.

The humanized antibody may be selected from any class of immunoglobulins, including IgM, IgD, IgG, IgA and IgE. In the present application, the antibody is an IgG antibody and is of IgG1 or IgG4 subtype. The optimization of the sequence of the essential constant domain can be achieved by screening antibodies using the biological assays described in the examples below to produce the desired biological activity. Likewise, any type of light chains can be used in the compounds and methods herein. In particular, κ and λ chains or variants thereof can be used in the compounds and methods of the present application.

The sequence of the DNA molecule of the antigen-binding protein or the fragment thereof of the present application can be obtained by conventional techniques such as PCR amplification or genomic library screening. In addition, the coding sequences of the light and heavy chains may be fused together to form a single chain antibody.

The relevant sequence, once obtained, can be replicated in large amount by recombination. This is usually implemented by cloning the sequence into a vector, transferring into a cell, and then isolating from proliferated host cells based on conventional methods. In addition, the relevant sequence may be synthesized by artificial synthesis, especially when the length of the fragment is short. Typically, a fragment with a long sequence is obtained by first synthesizing multiple small fragments and then ligating them together. The nucleic acid molecule can then be introduced into various existing DNA molecules (or such as vectors) and cells known in the art.

The present application also relates to a vector comprising the above appropriate nucleic acid molecule and an appropriate promoter or control sequence. These vectors can be used to transform appropriate host cells, allowing them to express proteins. The host cells may be prokaryotic cells, such as bacterial cells; or lower eukaryotic cells, such as yeast cells; or higher eukaryotic cells, such as mammalian cells. For example, animal cells may include (but are not limited to): CHO-S, CHO-K1 and HEK-293 cells.

The step of transforming host cells with recombinant DNA described herein may be performed using techniques well known in the art. The obtained transformants can be cultured by conventional methods to express the polypeptide encoded by the nucleic acid molecules of the present application. Depending on the host cells used, the culturing is performed with a conventional medium under suitable conditions. Typically, the transformed host cells are cultured under conditions suitable for expression of the antigen-binding protein of the present application. The antigen-binding protein of the present application is then obtained by purification by conventional immunoglobulin purification procedures, such as protein A-Sepharose, hydroxylapatite chromatography, gel electrophoresis, dialysis, ion exchange chromatography, hydrophobic chromatography, molecular sieve chromatography, affinity chromatography or other conventional separation and purification means well known to those skilled in the art.

The obtained monoclonal antibody can be identified by conventional means. For example, the binding specificity of the monoclonal antibody can be determined by immunoprecipitation or in vitro binding assays, such as fluorescence-activated cell sorting (FACS) or enzyme-linked immunosorbent assay (ELISA).

Method and Use

In another aspect, the present application provides a method for inhibiting the binding of PD-1 to PD-L1, which comprises administering the antigen-binding protein described herein. The method may be an ex vivo or in vitro method. In certain instances, the method may comprise contacting a biological sample with the antigen-binding protein described herein and/or PD-L1 under conditions allowing binding of the antigen-binding protein and/or PD-1 to PD-L1, detecting whether a complex is formed by the antigen-binding protein and PD-1, and detecting whether a complex is formed by PD-1 and PD-L1.

In another aspect, the present application provides a method for inhibiting the binding of PD-1 to PD-L2, which comprises administering the antigen-binding protein described herein. The method may be an ex vivo or in vitro method. In certain instances, the method comprises contacting a biological sample with the antigen-binding protein described herein and/or PD-L2 under conditions allowing binding of the antigen-binding protein and/or PD-L2 to PD-1, detecting whether a complex is formed by the antigen-binding protein and PD-1, and detecting whether a complex is formed by PD-L2 and PD-1. The antigen-binding protein and/or pharmaceutical composition described herein can be used to inhibit tumor growth. For example, the pharmaceutical composition of the present application may inhibit or delay the development or progression of a disease, may reduce the size of a tumor (even substantially eliminate the tumor), and/or may alleviate and/or stabilize the disease state.

In another aspect, the present application provides use of the antigen-binding protein and/or the multispecific antibody in preparing a medicament. The medicament can be used for treating a cancer, inhibiting tumor growth and/or inhibiting tumor cell proliferation.

In another aspect, the present application provides a method for stimulating immune cells to secrete cytokines, which comprises administering the isolated antigen-binding protein and/or the polypeptide. The cytokine may be IL-2. The immune cells may be lymphocytes, such as T lymphocytes. For example, the method may be an ex vivo or in vitro method. For example, the method may be a method for non-diagnostic and/or non-therapeutic purposes.

In another aspect, the present application provides a method for detecting presence and/or content of a PD-1 protein, which comprises administering the isolated antigen-binding protein and/or the fusion protein. For example, the method may be an ex vivo or in vitro method. For example, the method may be a method for non-diagnostic and/or non-therapeutic purposes. The present application further provides use of the antigen-binding protein in a method for diagnosing a subject suffering from a tumor or cancer, and the method comprises: determining the presence or expression level of PD-1 in a sample obtained from the subject by contacting the sample with the antigen-binding protein of the present application and detecting the presence of bound antibody.

Without being limited by any theory, the following examples are intended only to illustrate the fusion protein, preparation method, use, etc., of the present application, and are not intended to limit the scope of the present application.

EXAMPLES

The examples shown below are intended to illustrate specific embodiments of the present invention and are not intended to limit the scope of the specification or claims in any way. The examples do not include detailed descriptions of conventional methods, such as those methods for constructing vectors and plasmids, methods for inserting genes encoding proteins into such vectors and plasmids, or methods for introducing plasmids into host cells. Such methods are well known to those of ordinary skill in the art and are described in numerous publications, including Sambrook, J., Fritsch, E. F. and Maniais, T. (1989) MolecuLar Cloning: A Laboratory Manual, 2nd edition, Cold Spring Harbor Laboratory Press. Experimental procedures without specified conditions in the following examples are performed in accordance with conventional procedures and conditions, or in accordance with instructions.

Example 1. Preparation of Antigen-Binding Protein

To obtain antibody molecules specifically binding to PD-1, typically the PD-1 antigen can be used to immunize experimental animals such as mice, rats, rabbits, sheep and camels. Typically, the resulting antibody molecules are non-human antibodies. After obtaining non-human antibodies, these molecules need to be humanized by antibody engineering technology to reduce immunogenicity and improve druggability. However, the humanization of antibodies is complex in terms of the technology, and the humanized molecules tend to have reduced affinity for antigens. On the other hand, advances in transgenic technology have made it possible to develop genetically engineered mice that carry a human immunoglobulin immune repertoire and have the endogenous murine immune repertoire deleted. The antibodies produced by the transgenic mice have fully human sequences, so that further humanization is not needed, and the efficiency of developing therapeutic antibodies is greatly improved. The Harbour H2L2 mouse (Harbour Antibodies BV) is a transgenic mouse carrying an immune repertoire of human immunoglobulins that produces antibodies with intact human antibody variable domains and rat constant domains; that is, the antibody in the form of H2L2 has two antibody heavy chains and two antibody light chains.

The Harbour HCAb mouse (Harbour Antibodies BV, WO 2002/085945 A3) is a transgenic mouse carrying an immune repertoire of human immunoglobulins and capable of producing novel "heavy chain"-only antibodies that are only half the size of conventional IgG antibodies. The antibodies produced have only human antibody "heavy chain" variable domains and mouse Fc constant domains. Due to the absence of light chain, this antibody almost solves the problems of light chain mismatch and heterodimerization, allowing the technical platform to develop products that are difficult to realize by the conventional antibody platform. That is, the antibody in the form of HCAb comprises two antibody heavy chains and no antibody light chain.

1.1 Immunization of Mice with PD-1

(1) Immunization of H2L2 Mice

Harbour H2L2 mice were subjected to multiple rounds of immunization with a soluble recombinant human PD-1-hFc fusion protein (ChemPartner, Shanghai). The antigenic protein was mixed with an immunoadjuvant to form an immunogenic reagent, which was then injected subcutaneously via the groin or intraperitoneally. In each round of immunization, each mouse received a total injection dose of 100 μL. In the first round of immunization, each mouse received an immunization with an immunogenic reagent prepared by mixing 50 μg of antigenic protein (human PD-1-hFc) with complete Freund's adjuvant (Sigma, #F5881) in a 1:1 volume ratio. In each subsequent round of booster immunization, each mouse received an immunization with an immunogenic reagent prepared by mixing 25 μg of antigenic protein with Ribi adjuvant (Sigma Adjuvant System, #S6322). The interval between rounds of booster immunization was at least two weeks. In general, there are no more than five rounds of booster immunizations. The immunization was performed at days 0, 14, 28, 42, 56 and 70; and the antibody titer in serum of mice was determined at days 49 and 77. The last round of booster immunization was performed at a dose of 25 μg of antigenic protein per mouse 3 days before the cell fusion.

(2) Immunization of HCAb Mice

For 6-8 week-old Harbour human antibody transgenic mice, two immunization schemes were adopted to subject Harbour HCAb mice to multiple rounds of immunization. As immunization scheme 1, immunization was performed with recombinant human PD-1-hFc (ChemPartner, Shanghai) antigenic protein. In each round of immunization, each mouse received a subcutaneous inguinal injection or intraperitoneal injection of 100 μL in total. In the first round of immunization, each mouse received an immunization with an immunogenic reagent prepared by mixing 50 μg of antigenic protein with complete Freund's adjuvant (Sigma, #F5881) in a 1:1 volume ratio. In each subsequent round of booster immunization, each mouse received an immunization with an immunogenic reagent prepared by mixing 25 μg of antigenic protein with Ribi adjuvant (Sigma Adjuvant System, Sigma, #S6322). As immunization scheme 2, immunization was performed with an HEK293/hPD-1 (ChemPartner, Shanghai) stable cell line overexpressing human PD-1. In each round of immunization, each mouse received an intraperitoneal injection of a suspension containing $2\times10^6$ cells. The interval between rounds of booster immunization was at least two weeks. In general, there are no more than five rounds of booster immunizations. The immunization was performed at days 0, 14, 28, 42, 56 and 70; and the antibody titer in serum of mice was determined at days 49 and 77. The last round of booster immunization was performed at a dose of 25 μg of antigenic protein per mouse 5 days before the isolation of HCAb mouse splenic B cells.

Blood of mice was collected, 10-fold diluted to obtain 5 concentrations (1:100, 1:1000, 1:10000, 1:100000 and 1:1000000), and subjected to an ELISA assay on an ELISA plate coated with human PD-1-His (ChemPartner, Shanghai) for the titer of anti-human PD-1 in the blood of mice. The blood of mice at two concentrations (1:100 and 1:1000) were assayed by flow cytometry for the specific reactivity to CHO-K1/hPD-1 cells (ChemPartner, Shanghai) and CHO- K1 blast cells highly expressing PD-1. Serum of mice before immunization was used as a blank control group (PB).

1.2 Acquisition of Hybridoma Monoclonal Antibodies and Antibody Sequences

(1) Acquisition of Sequences of Anti-PD-1 H2L2 Antibodies

When the titer of the PD-1-specific antibody in the serum of H2L2 mice was detected to reach a certain level, spleen cells of the mice were taken and fused with a myeloma cell line to obtain hybridoma cells. After multiple rounds of screening and cloning of the hybridoma cells, at least 8 hybridomas expressing anti-PD-1 monoclonal antibody molecules were isolated. The isolated hybridoma cells and the monoclonal antibodies expressed by them were represented by the corresponding clone numbers, e.g., 4004_10H9A12 or 4004_12H9C1. The isolated hybridomas expressed antibody molecules with heavy and light chains of intact human variable domains and rat constant domains. The above monoclonal antibodies were further identified, and several candidate hybridoma clones were selected for sequencing according to parameters such as the binding ability to human PD-1, the binding ability to cynomolgus monkey PD-1, and the ability to inhibit the binding of PD-1 to PD-L1. The nucleotide sequences encoding the variable domains of the antibody molecules and the corresponding amino acid sequences were obtained through conventional sequencing means for hybridomas. In this example, the sequences of the variable domains of the anti-PD-1 monoclonal antibody molecules obtained from immunized Harbour H2L2 mice were human antibody sequences. In the present application, the CDR sequences were defined according to the Chothia scheme.

(2) Acquisition of Sequences of Anti-PD-1 HCAb Antibodies

When the titer of the PD-1-specific antibody in the serum of mice was detected to reach a certain level, spleen cells of the mice were taken, from which B cells were isolated, and the CD138-positive plasma cells and human PD-1 antigen-positive B cell populations were sorted using a BD FACS Ariall cell sorter. The RNA of the B cells was extracted and reversely transcribed into cDNA (SuperScript IV First-Strand synthesis system, Invitrogen, #18091200), and human VH genes were amplified by PCR using specific primers. PCR primers were 5'-GGTGTCCAGTGT(G/C)AGGTGCAGCTG-3' (SEQ ID NO: 357) and 5'-AATCCCTGGGCACTGAAGAGACGGTGACC-3' (SEQ ID NO: 358). The amplified VH gene fragments were constructed into mammalian cell expression plasmid pCAG vectors encoding the sequence of the heavy chain Fc domain of the human IgG1 antibody (SEQ ID NO: 355).

Mammal host cells (e.g., human embryonic kidney cell HEK293) were transfected with the constructed plasmids and allowed to express HCAb antibodies. The binding of the HCAb-expressing supernatant to a stable cell line CHO-K1/hPD-1 (GenScript, #M00529) overexpressing human PD-1 was assayed, while screening was performed by a Miroball fluorescent flow cytometer (Sptlabtech) with positive antibody used as a positive control. The specific procedures were as follows: CHO-K1/hPD-1 cells were washed with a serum-free F12K medium (Thermofisher, #21127022) and resuspended in a serum-free medium to $1 \times 10^6$ cells/mL. Draq5 fluorescence probe (CTS, #4048L) (1 μL of Draq5 added to 1 mL of CHO-K1/hPD-1 cells, diluted in a 1:1000 ratio) was added, and the mixture was incubated for min away from the light. After centrifugation, the cells were washed with a medium and the cell density was adjusted to $1.0 \times 10^5$ cells/mL. Then, Alexa Fluor® 488, AffiniPure Goat Anti-Human IgG, Fcγ Fragment Specific secondary antibody (Jackson, #109-545-098) diluted in a 1:1000 ratio was added, and the mixture was added to a 384-well plate (Greiner, #781091) at 30 μL/well. Then, the positive control or HCAb-expressing supernatant was added to the 384-well plate at 10 μL/well, and the mixture was incubated for 2 h. Fluorescence values were read on a Miroball fluorescent flow cytometer. The positive clone antibodies were further assayed by FACS for the binding to CHO-K1/hPD-1 cells, and assayed by ELISA to determine the cross-binding activity to cynomolgus monkey PD-1-his protein (Novoprotein, #CM98). The nucleotide sequences encoding the variable domains of the antibody molecules and the corresponding amino acid sequences were obtained by sequencing the positive antibodies using conventional sequencing means.

The sequences of the heavy chain variable domain of the antibody are derived from events such as gene rearrangements of germline gene V, D and J segments of heavy chain gene clusters and somatic hypermutations on chromosomes; the sequences of the light chain variable domain are derived from the events such as gene rearrangements of germline gene V, J segments of light chain gene clusters and somatic hypermutations. Gene rearrangement and somatic hypermutation are major factors in increasing antibody diversity. Antibodies derived from the same germline V gene segment may also produce different sequences, but with relatively high similarity overall. The germline gene segments that are likely to undergo gene rearrangement can be deduced from the antibody variable domain sequences using algorithms such as IMGT/DomainGapAlign (http://imgt.org/3Dstructure-DB/cgi/DomainGapAlign.cgi) or NCBI/IgBLAST (https://www.ncbi.nlm.nih.gov/igblast/).

The germline gene analysis of the antibodies obtained above is shown in Table 2 below, and the sequence numbers and the sequence of each fragment of the antibodies are shown in Table 3 and Table 4 below.

Meanwhile, the corresponding antibody number of the anti-PD-1 positive control antibody pembrolizumab analog of the present application was PR000150, and the corresponding amino acid sequences were found in the IMGT database, in which the amino acid sequence of the antibody heavy chain was set forth in SEQ ID NO: 332, and the amino acid sequence of the antibody light chain was set forth in SEQ ID NO: 331.

TABLE 2

Germline gene analysis of sequences of anti-PD-1 H2L2 and HCAb antibodies

| Clone No. | Antibody No. | Molecular structure | IgG subtype | VH germline V gene | VL germline V gene |
| --- | --- | --- | --- | --- | --- |
| 4004_10H9A12 | PR000673 | H2L2 | Human IgG4 | IGHV3-33 | IGKV3-11 |
| 4004_12H9C1 | PR000674 | H2L2 | Human IgG4 | IGHV3-33 | IGKV3-11 |

TABLE 2-continued

Germline gene analysis of sequences of anti-PD-1 H2L2 and HCAb antibodies

| Clone No. | Antibody No. | Molecular structure | IgG subtype | VH germline V gene | VL germline V gene |
|---|---|---|---|---|---|
| 4004_19G8F2 | PR000675 | H2L2 | Human IgG4 | IGHV3-23 | IGKV3-11 |
| 4004_1A7A1 | PR000676 | H2L2 | Human IgG4 | IGHV3-30 | IGKV3-11 |
| 4004_33B9E4 | PR000677 | H2L2 | Human IgG4 | IGHV6-1 | IGKV3-15 |
| 4004_4D9B1 | PR000678 | H2L2 | Human IgG4 | IGHV3-33 | IGKV3-11 |
| 4004_6C11C6 | PR000679 | H2L2 | Human IgG4 | IGHV1-69 | IGKV1-5 |
| 4004_8H2B1 | PR000680 | H2L2 | Human IgG4 | IGHV3-33 | IGKV3-11 |
| R4004P541H11 | PR002473 | HCAb | Human IgG1 | IGHV3-53 | — |
| R4004P547D3 | PR002474 | HCAb | Human IgG1 | IGHV3-53 | — |
| R4004P547D9 | PR002475 | HCAb | Human IgG1 | IGHV3-53 | — |
| R4004P547H11 | PR002476 | HCAb | Human IgG1 | IGHV3-53 | — |
| R4004P547H9 | PR002477 | HCAb | Human IgG1 | IGHV3-53 | — |
| R4004P548A8 | PR002478 | HCAb | Human IgG1 | IGHV3-53 | — |
| R4004P551D6 | PR002479 | HCAb | Human IgG1 | IGHV3-53 | — |
| R4004P556D1 | PR002481 | HCAb | Human IgG1 | IGHV3-53 | — |

TABLE 3

Sequence numbers of anti-PD-1 H2L2 and HCAb antibodies

| Antibody No. | Light chain | Heavy chain | VL | VH | LCDR1 | LCDR2 | LCDR3 | HCDR1 | HCDR2 | HCDR3 |
|---|---|---|---|---|---|---|---|---|---|---|
| PR000150 (Pembrolizumab) | 331 | 332 | — | — | — | — | — | — | — | — |
| PR000673 | 324 | 238 | 231 | 151 | 121 | 130 | 140 | 11 | 50 | 92 |
| PR000674 | 325 | 239 | 232 | 152 | 122 | 131 | 141 | 12 | 50 | 93 |
| PR000675 | 326 | 240 | 233 | 153 | 123 | 132 | 142 | 13 | 51 | 94 |
| PR000676 | 327 | 241 | 234 | 154 | 122 | 133 | 143 | 14 | 52 | 95 |
| PR000677 | 328 | 242 | 235 | 155 | 124 | 134 | 144 | 15 | 53 | 96 |
| PR000678 | 325 | 243 | 232 | 156 | 122 | 131 | 141 | 12 | 50 | 93 |
| PR000679 | 329 | 244 | 236 | 157 | 125 | 135 | 145 | 16 | 54 | 97 |
| PR000680 | 324 | 245 | 231 | 158 | 121 | 130 | 140 | 11 | 55 | 92 |
| PR002473 | — | 247 | — | 160 | — | — | — | 18 | 57 | 99 |
| PR002474 | — | 248 | — | 161 | — | — | — | 18 | 57 | 100 |
| PR002475 | — | 249 | — | 162 | — | — | — | 19 | 57 | 99 |
| PR002476 | — | 250 | — | 163 | — | — | — | 18 | 57 | 100 |
| PR002477 | — | 251 | — | 164 | — | — | — | 18 | 57 | 99 |
| PR002478 | — | 252 | — | 165 | — | — | — | 19 | 57 | 99 |
| PR002479 | — | 253 | — | 166 | — | — | — | 18 | 57 | 101 |
| PR002481 | — | 255 | — | 168 | — | — | — | 18 | 58 | 100 |

TABLE 4

Amino acid sequences of anti-PD-1 H2L2 and HCAb antibodies

| Antibody No. | LCDR1 | LCDR2 | LCDR3 | HCDR1 | HCDR2 | HCDR3 |
|---|---|---|---|---|---|---|
| PR000673 | RASQSVSSDLA | DASNRAT | HQRNNWPLT | GFIFSNY | WYDGSK | NDDY |
| PR000674 | RASQSVSSYLA | DTSKRAT | QQHNNWIFT | GLTFSDN | WYDGSK | NSDY |
| PR000675 | RASQSVSRYLA | DAANRAT | QQRNNWPLT | GFTFSSY | SGSGYS | LSLDY |
| PR000676 | RASQSVSSYLA | DASTRAT | QQRSNWPLT | GFTLSSY | LSDGSN | LGGDV |
| PR000677 | RASQSVSSSLA | GASTRAT | QQYNYWPIT | GDSVSSNSA | YYRSKWY | ETHYYGSGSYLDY |
| PR000678 | RASQSVSSYLA | DTSKRAT | QQHNNWIFT | GLTFSDN | WYDGSK | NSDY |
| PR000679 | RASQTISIWLA | KASSLES | QQFNSYWT | GGTFSSY | IPIFDT | SPPYSSNWYQYFQH |
| PR000680 | RASQSVSSDLA | DASNRAT | HQRNNWPLT | GFIFSNY | WYDGSN | NDDY |
| PR002473 | — | — | — | GFNVSSH | HSGGS | AIAVAEKNGYNYPFNY |
| PR002474 | — | — | — | GFNVSSH | HSGGS | ATAVAEKNGYNYPFNY |

TABLE 4-continued

Amino acid sequences of anti-PD-1 H2L2 and HCAb antibodies

| Antibody No. | LCDR1 | LCDR2 | LCDR3 | HCDR1 | HCDR2 | HCDR3 |
|---|---|---|---|---|---|---|
| PR002475 | – | – | – | GFNVSSN | HSGGS | AIAVAEKNGYNYPFNY |
| PR002476 | – | – | – | GFNVSSH | HSGGS | ATAVAEKNGYNYPFNY |
| PR002477 | – | – | – | GFNVSSH | HSGGS | AIAVAEKNGYNYPFNY |
| PR002478 | – | – | – | GFNVSSN | HSGGS | AIAVAEKNGYNYPFNY |
| PR002479 | – | – | – | GFNVSSH | HSGGS | ATAVAEENGYNYPFNY |
| PR002481 | – | – | – | GFNVSSH | DGGGS | ATAVAEKNGYNYPFNY |

1.3 Preparation of Recombinant Fully Human Antibodies

After obtaining the sequences of light and heavy chain variable domains encoding the antibody molecules in Examples 1.2 and 1.3 above, the sequences of the light and heavy chain variable domains can be fused with the corresponding sequences of the light and heavy chain constant domains of the human antibody and expressed by conventional recombinant DNA techniques to obtain recombinant antibody molecules, and the light and heavy chain sequences of the recombinant antibody molecules are shown in Table 3.

In this example, the sequence of the light chain variable domain (VL) of the antibody obtained from Harbour H2L2 mice was genetically synthesized and cloned into a mammalian cell expression plasmid vector encoding the sequence of the κ light chain constant domain of the human antibody to encode and produce a full-length light chain of the antibody. The sequence of the heavy chain variable domain (VH) of the antibody was genetically synthesized and cloned into a mammalian cell expression plasmid vector encoding the sequence of the heavy chain constant domain of the human IgG4 antibody (SEQ ID NO: 354) to encode and produce a full-length heavy chain of the IgG4 antibody.

The plasmids encoding the heavy chain and the light chain of the Harbour H2L2 antibody were simultaneously transfected into a mammalian host cell (e.g., human embryonic kidney cell HEK293), and a purified recombinant antibody with light and heavy chain correctly assembled in pairs can be obtained by the conventional recombinant protein expression and purification techniques. Alternatively, the plasmid encoding the heavy chain of the Harbour HCAb antibody was transfected into a mammalian host cell (e.g., human embryonic kidney cell HEK293), and a recombinant antibody with HCAb heavy chain can be obtained using conventional recombinant protein expression and purification techniques.

Specifically, HEK293 cells were expanded in FreeStyle™ F17 Expression Medium (Thermo, #A1383504). Before the transient transfection, the cells were adjusted to a concentration of (6-8)×10$^5$ cells/mL, and cultured in a shaker at 37° C. with 8% $CO_2$ for 24 h to make a concentration of 1.2×10$^6$ cells/mL. 30 mL of cultured cells were taken. The mixture of the plasmid encoding the heavy chain of the H2L2 antibody and the plasmid encoding the light chain of the antibody described above (mixed at a ratio of 2:3) or the plasmid encoding the heavy chain of HCAb was dissolved in 1.5 mL of Opti-MEM reduced serum medium (Thermo, #31985088), and the mixture was filtered through a 0.22 μm filter membrane for sterilization. Then, 1.5 mL of Opti-MEM was dissolved in 120 μL of 1 mg/mL PEI (Polysciences Inc, #23966-2), and the mixture was left to stand for 5 min. PEI was slowly added to the plasmid, and the mixture was incubated at room temperature for 10 min. The mixed solution of plasmid and PEI was slowly added dropwise while shaking the culture flask, and the cells were cultured in a shaker at 37° C. with 8% $CO_2$ for 5 days. Cell viability was measured after 5 days. The culture was collected and centrifuged at 3300 g for 10 min, and then the supernatant was collected and centrifuged at high speed to remove impurities. A gravity column (Bio-Rad, #7311550) containing MabSelect™ (GE Healthcare Life Science, #71-5020-91 AE) was equilibrated with PBS (pH 7.4) and rinsed with 2-5 column volumes of PBS. The supernatant sample was loaded onto the column. The column was rinsed with 5-10 column volumes of PBS. The target protein was eluted with 0.1 M glycine (pH 3.5). The eluate was adjusted to neutrality with Tris-HCl (pH 8.0), and concentrated and buffer exchanged into PBS buffer with an ultrafiltration tube (Millipore, #UFC901024) to obtain a purified antibody solution. Then, the purified antibody solution was subjected to concentration determination using NanoDrop (Thermo Scientific™ NanoDrop™ One), subpackaged and stored for later use.

1.4 Analysis of Protein Purity and Polymers by HPLC-SEC

Analytical size-exclusion chromatography (SEC) was used to analyze the protein sample for purity and polymer form. An analytical chromatography column TSKgel G3000SWxl (Tosoh Bioscience, #08541, 5 μm, 7.8 mm×30 cm) was connected to a high-performance liquid chromatograph (HPLC, model: Agilent Technologies, Agilent 1260 Infinity II) and equilibrated with a PBS buffer at room temperature for at least 1 h. A proper amount of the protein sample (at least 10 μg, with the concentration adjusted to 1 mg/mL) was filtered through a 0.22 μm filter membrane and then injected into the system, and an HPLC program was set: the sample was passed through the chromatography column with PBS buffer (pH 7.4) at a flow rate of 1.0 mL/min for a maximum of 25 min. The detection wavelength was 280 nm. After being recorded, the chromatogram was integrated using ChemStation software and relevant data were calculated. An analysis was generated, with the retention time of the components with different molecular sizes in the sample reported.

The yields, purities, and the like of the fully human H2L2 and HCAb antibodies obtained above are shown in Table 5 below.

TABLE 5

| Antibody No. | Type of molecule | Expression system and volume | Yield (mg/L) after first purification | HPLC-SEC purity (%) |
|---|---|---|---|---|
| PR000673 | H2L2 | HEK293-F (30 mL) | 86.0 | 99.72 |
| PR000674 | H2L2 | HEK293-F (30 mL) | 119.0 | 99.53 |
| PR000675 | H2L2 | HEK293-F (30 mL) | 179.0 | 99.63 |
| PR000676 | H2L2 | HEK293-F (30 mL) | 181.0 | 99.23 |
| PR000677 | H2L2 | HEK293-F (30 mL) | 151.0 | 99.53 |
| PR000678 | H2L2 | HEK293-F (30 mL) | 68.0 | 99.93 |
| PR000679 | H2L2 | HEK293-F (30 mL) | 2.7 | 98.58 |
| PR000680 | H2L2 | HEK293-F (30 mL) | 89.3 | 99.77 |
| PR002473 | HCAb | HEK293-6E (40 mL) | 20.0 | 96.46 |
| PR002474 | HCAb | HEK293-6E (40 mL) | 25.8 | 97.89 |
| PR002475 | HCAb | HEK293-6E (40 mL) | 17.5 | 96.85 |
| PR002476 | HCAb | HEK293-6E (40 mL) | 23.0 | 98.33 |
| PR002477 | HCAb | HEK293-6E (40 mL) | 23.0 | 97.99 |
| PR002478 | HCAb | HEK293-6E (40 mL) | 23.3 | 97.92 |
| PR002479 | HCAb | HEK293-6E (40 mL) | 18.5 | 98.01 |
| PR002481 | HCAb | HEK293-6E (40 mL) | 27.5 | 98.70 |

1.5 Optimization of HCAb Antibody Sequences to Improve Binding Affinity for PD-1

In this example, an affinity modification was performed on the anti-PD-1 HCAb antibody PR002481 by site-directed saturation mutagenesis. This method of affinity maturation was divided into two rounds.

In the first round, 28 amino acids of three CDRs of the molecule PR002481 were scanned site by site. Small yeast libraries of single-site saturation mutagenesis for 28 amino acid positions were created. The small libraries of each of the 3 CDRs were mixed to form yeast mutagenesis libraries of the 3 CDRs. The mutagenesis libraries of the three CDRs were sorted on a flow cytometer, the yeast cells sorted out were sequenced, and these positive molecules were further identified to select several mutation hot sites according to the binding ability of the positive molecules to human PD-1. In this example, the CDR sequences of the antibody variable domains were analyzed according to the Chothia CDR scheme.

In the second round, the hot sites found by the saturation mutagenesis in the first round were randomly combined to create a yeast library containing all mutation combinations. The combination library was then sorted on a flow cytometer. Several mutants were selected by sequencing the yeast cells sorted out and identifying their binding ability to human PD-1.

In this example, the sequence of the heavy chain variable domain (VH) of the antibody obtained by the affinity maturation was genetically synthesized and cloned into a mammalian cell expression plasmid vector encoding Flag and 6×His tag to encode and produce a PD1 single-domain antibody (VH) molecule.

Alternatively, the VH gene fragments of the antibody obtained by the affinity maturation were constructed into a mammalian cell expression plasmid vector encoding the sequence of the heavy chain Fc domain of the human IgG1 antibody (SEQ ID NO: 355) to encode a full-length heavy chain of HCAb.

The monovalent variants of PR002481 (all single-domain antibodies with Flag-6His tag) obtained by the above method of affinity maturation in the present invention and the sequences thereof are shown in the Table 6 below (involving HCDR1, SEQ ID NOs: 18 and 20-33; HCDR2, SEQ ID NOs: 58-68; and HCDR3, SEQ ID NOs: 100 and 103-111). In the table, PR005090 is a single-domain antibody (with Flag-6His tag) corresponding to the PR002481 parent sequence. The single-domain antibodies in Table 6 were evaluated based on the results of Koff ranking, expression level and reporter gene activity. The expression of HCAb was achieved by comprehensive analysis or direct selection of the single domain antibodies, or by recombination of the existing CDRs in Table 6, or some hot-site mutation designs were introduced into the existing CDR regions to generate new CDRs for the expression of HCAb antibodies. The HCAb antibodies obtained by mutations and screening in the present invention are shown in Table 7 (involving HCDR1, SEQ ID NOs: 18, 25, 28 and 34-38; HCDR2, SEQ ID NOs: 64-65; and HCDR3, SEQ ID NOs: 108 and 111-112).

TABLE 6

Sequence listing for monovalent variant (single-domain) antibodies of PR002481

| Antibody No. | VH Heavy chain SEQ ID NO | HCDR1 SEQ ID NO | HCDR1 Sequence | HCDR2 SEQ ID NO | HCDR2 Sequence | HCDR3 SEQ ID NO | HCDR3 Sequence |
|---|---|---|---|---|---|---|---|
| PR005090 | 264 | 168 | 18 GFNVSSH | 58 | DGGGS | 100 | ATAVAEKNGYNYPFNY |
| PR005082 | 256 | 169 | 20 GFAVDRY | 59 | DRGGS | 103 | ATQVREKGGYNYPFNY |
| PR005083 | 257 | 170 | 20 GFAVDRY | 60 | DRGGG | 103 | ATQVREKGGYNYPFNY |
| PR005084 | 258 | 171 | 20 GFAVDRY | 59 | DRGGS | 103 | ATQVREKGGYNYPFNY |
| PR005085 | 259 | 172 | 20 GFAVDRY | 61 | DKGGG | 103 | ATQVREKGGYNYPFNY |
| PR005086 | 260 | 173 | 21 GFSVVGH | 59 | DRGGS | 103 | ATQVREKGGYNYPFNY |
| PR005087 | 261 | 174 | 21 GFSVVGH | 60 | DRGGG | 103 | ATQVREKGGYNYPFNY |
| PR005088 | 262 | 175 | 21 GFSVVGH | 59 | DRGGS | 103 | ATQVREKGGYNYPFNY |
| PR005089 | 263 | 176 | 21 GFSVVGH | 61 | DKGGG | 103 | ATQVREKGGYNYPFNY |
| PR005091 | 265 | 177 | 20 GFAVDRY | 58 | DGGGS | 100 | ATAVAEKNGYNYPFNY |
| PR005092 | 266 | 178 | 18 GFNVSSH | 58 | DGGGS | 104 | ATAVAEKGGYNYPFNY |

TABLE 6-continued

Sequence listing for monovalent variant (single-domain) antibodies of PR002481

| Antibody No. | Heavy chain SEQ ID NO | VH SEQ ID NO | HCDR1 SEQ ID NO | HCDR1 Sequence | HCDR2 SEQ ID NO | HCDR2 Sequence | HCDR3 SEQ ID NO | HCDR3 Sequence |
|---|---|---|---|---|---|---|---|---|
| PR005093 | 267 | 179 | 18 | GFNVSSH | 58 | DGGGS | 105 | ATRVREANGYNYPFNY |
| PR005094 | 268 | 180 | 21 | GFSVVGH | 58 | DGGGS | 100 | ATAVAEKNGYNYPFNY |
| PR005095 | 269 | 181 | 22 | GFFVRSH | 58 | DGGGS | 100 | ATAVAEKNGYNYPFNY |
| PR005096 | 270 | 182 | 18 | GFNVSSH | 58 | DGGGS | 106 | ATRVPEKGGYNYPFNY |
| PR005097 | 271 | 183 | 18 | GFNVSSH | 58 | DGGGS | 107 | ATAVREKNGYNYPFNY |
| PR005098 | 272 | 184 | 18 | GFNVSSH | 58 | DGGGS | 103 | ATQVREKGGYNYPFNY |
| PR005099 | 273 | 185 | 18 | GFNVSSH | 62 | DSAGS | 100 | ATAVAEKNGYNYPFNY |
| PR005100 | 274 | 186 | 18 | GFNVSSH | 59 | DRGGS | 100 | ATAVAEKNGYNYPFNY |
| PR005101 | 275 | 187 | 18 | GFNVSSH | 61 | DKGGG | 100 | ATAVAEKNGYNYPFNY |
| PR005102 | 276 | 188 | 18 | GFNVSSH | 59 | DRGGS | 100 | ATAVAEKNGYNYPFNY |
| PR005103 | 277 | 189 | 18 | GFNVSSH | 60 | DRGGG | 100 | ATAVAEKNGYNYPFNY |
| PR005104 | 278 | 190 | 18 | GFNVSSH | 63 | DISGS | 100 | ATAVAEKNGYNYPFNY |
| PR005139 | 279 | 191 | 23 | GFNVRSH | 64 | DKAGS | 108 | ATEVREKNGYNYPFNY |
| PR005140 | 280 | 192 | 23 | GFNVRSH | 64 | DKAGS | 108 | ATEVREKNGYNYPFNY |
| PR005141 | 281 | 193 | 24 | GFNVSYF | 65 | DKGGS | 108 | ATEVREKNGYNYPFNY |
| PR005142 | 282 | 194 | 25 | GFNVSFY | 65 | DKGGS | 108 | ATEVREKNGYNYPFNY |
| PR005143 | 283 | 195 | 26 | GFNVSFH | 64 | DKAGS | 108 | ATEVREKNGYNYPFNY |
| PR005144 | 284 | 196 | 25 | GFNVSFY | 66 | DKSGS | 108 | ATEVREKNGYNYPFNY |
| PR005145 | 285 | 197 | 25 | GFNVSFY | 65 | DKGGS | 108 | ATEVREKNGYNYPFNY |
| PR005146 | 286 | 198 | 26 | GFNVSFH | 67 | DGAGS | 109 | ATMVREKQGYNYPFNY |
| PR005147 | 287 | 199 | 27 | GFNVSYY | 64 | DKAGS | 110 | ATMVREKNGYNYPFNY |
| PR005148 | 288 | 200 | 18 | GFNVSSH | 64 | DKAGS | 108 | ATEVREKNGYNYPFNY |
| PR005149 | 289 | 201 | 18 | GFNVSSH | 64 | DKAGS | 111 | ATEVREKQGYNYPFNY |
| PR005150 | 290 | 202 | 28 | GFNVSSF | 64 | DKAGS | 111 | ATEVREKQGYNYPFNY |
| PR005151 | 291 | 203 | 18 | GFNVSSH | 66 | DKSGS | 111 | ATEVREKQGYNYPFNY |
| PR005152 | 292 | 204 | 23 | GFNVRSH | 68 | DRAGS | 108 | ATEVREKNGYNYPFNY |
| PR005153 | 293 | 205 | 18 | GFNVSSH | 64 | DKAGS | 111 | ATEVREKQGYNYPFNY |
| PR005154 | 294 | 206 | 18 | GFNVSSH | 66 | DKSGS | 109 | ATMVREKQGYNYPFNY |
| PR005155 | 295 | 207 | 29 | GFNVRFY | 65 | DKGGS | 111 | ATEVREKQGYNYPFNY |
| PR005156 | 296 | 208 | 30 | GFNVRFH | 64 | DKAGS | 111 | ATEVREKQGYNYPFNY |
| PR005157 | 297 | 209 | 29 | GFNVRFY | 66 | DKSGS | 111 | ATEVREKQGYNYPFNY |
| PR005158 | 298 | 210 | 23 | GFNVRSH | 64 | DKAGS | 111 | ATEVREKQGYNYPFNY |
| PR005159 | 299 | 211 | 23 | GFNVRSH | 68 | DRAGS | 111 | ATEVREKQGYNYPFNY |
| PR005160 | 300 | 212 | 29 | GFNVRFY | 65 | DKGGS | 111 | ATEVREKQGYNYPFNY |
| PR005161 | 301 | 213 | 23 | GFNVRSH | 64 | DKAGS | 111 | ATEVREKQGYNYPFNY |
| PR005162 | 302 | 214 | 30 | GFNVRFH | 64 | DKAGS | 109 | ATMVREKQGYNYPFNY |

TABLE 6-continued

Sequence listing for monovalent variant (single-domain) antibodies of PR002481

| Antibody No. | Heavy chain SEQ ID NO | VH SEQ ID NO | HCDR1 SEQ ID NO | HCDR1 Sequence | HCDR2 SEQ ID NO | HCDR2 Sequence | HCDR3 SEQ ID NO | HCDR3 Sequence |
|---|---|---|---|---|---|---|---|---|
| PR005163 | 303 | 215 | 23 | GFNVRSH | 64 | DKAGS | 111 | ATEVREKQGYNYPFNY |
| PR005164 | 304 | 216 | 31 | GFNVRSF | 64 | DKAGS | 111 | ATEVREKQGYNYPFNY |
| PR005165 | 305 | 217 | 23 | GFNVRSH | 66 | DKSGS | 111 | ATEVREKQGYNYPFNY |
| PR005166 | 306 | 218 | 23 | GFNVRSH | 64 | DKAGS | 111 | ATEVREKQGYNYPFNY |
| PR005167 | 307 | 219 | 32 | GFNVRYY | 64 | DKAGS | 109 | ATMVREKQGYNYPFNY |
| PR005168 | 308 | 220 | 23 | GFNVRSH | 66 | DKSGS | 109 | ATMVREKQGYNYPFNY |
| PR005169 | 309 | 221 | 33 | GFNVRYF | 65 | DKGGS | 111 | ATEVREKQGYNYPFNY |

TABLE 7

Sequence listing for variant (HCAb) antibodies of PR002481

| Antibody No. | Heavy chain SEQ ID NO | VH SEQ ID NO | HCDR1 SEQ ID NO | HCDR1 Sequence | HCDR2 SEQ ID NO | HCDR2 Sequence | HCDR3 SEQ ID NO | HCDR3 Sequence |
|---|---|---|---|---|---|---|---|---|
| PR005569 | 310 | 196 | 25 | GFNVSFY | 66 | DKSGS | 108 | ATEVREKNGYNYPFNY |
| PR005570 | 311 | 197 | 25 | GFNVSFY | 65 | DKGGS | 108 | ATEVREKNGYNYPFNY |
| PR005571 | 312 | 222 | 25 | GFNVSFY | 65 | DKGGS | 111 | ATEVREKQGYNYPFNY |
| PR005572 | 313 | 223 | 34 | GFNVAFY | 65 | DKGGS | 111 | ATEVREKQGYNYPFNY |
| PR005573 | 314 | 200 | 18 | GFNVSSH | 64 | DKAGS | 108 | ATEVREKNGYNYPFNY |
| PR005574 | 315 | 201 | 18 | GFNVSSH | 64 | DKAGS | 111 | ATEVREKQGYNYPFNY |
| PR005575 | 316 | 224 | 35 | GFNVASH | 64 | DKAGS | 111 | ATEVREKQGYNYPFNY |
| PR005577 | 317 | 225 | 36 | GFNVASY | 64 | DKAGS | 111 | ATEVREKQGYNYPFNY |
| PR005578 | 318 | 226 | 36 | GFNVASY | 64 | DKAGS | 112 | ATAVREKQGYNYPFNY |
| PR005581 | 319 | 202 | 28 | GFNVSSF | 64 | DKAGS | 111 | ATEVREKQGYNYPFNY |
| PR005582 | 320 | 227 | 37 | GFNVASF | 64 | DKAGS | 111 | ATEVREKQGYNYPFNY |
| PR005583 | 321 | 228 | 37 | GFNVASF | 64 | DKAGS | 111 | ATEVREKQGYNYPFNY |
| PR005584 | 322 | 229 | 28 | GFNVSSF | 64 | DKAGS | 111 | ATEVREKQGYNYPFNY |
| PR005585 | 323 | 230 | 38 | GFTVSSF | 64 | DKAGS | 111 | ATEVREKQGYNYPFNY |

1.6 Production and Purification of Affinity Variants of PR002481

After obtaining the sequences encoding variable domains of the affinity variants of PR002481 in Example 1.5 above, the sequences of the heavy chain variable domains can be fused with the corresponding purification tags and expressed by conventional recombinant DNA techniques to obtain recombinant HCAb single-domain antibody molecules.

The plasmids encoding recombinant HCAb single-domain antibodies were transfected into mammalian host cells (e.g., Chinese Hamster Ovary (CHO) cells), and the corresponding purified recombinant antibodies can be obtained using conventional recombinant protein expression and purification techniques.

The method for producing and purifying the single-domain antibodies was specifically as follows: ExpiCHO-S™ cells (Gibco, #A29127) were expanded in ExpiCHO™ Expression Medium (Gibco, #A2910001). Before the transient transfection, the cells were adjusted to a concentration of $(3-4) \times 10^6$ cells/mL, and cultured in a shaker at 37° C. with 8% $CO_2$ for 24 h to make a concentration of $(7-10) \times 10^6$ cells/mL. The cells were then diluted to $6 \times 10^6$ cells/mL, and 10 mL of the cultured cells was taken. 8 μg of the above plasmids encoding HCAb single-domain antibodies (the ratio of the plasmids to cells was 0.8 μg:1 mL) was dissolved in 0.4 mL of OptiPRO™ SFM medium (Gibco, #12309019), and the mixture was filtered through a 0.22 μm filter membrane for sterilization. Then 32 μL of ExpiFectamine™ CHO reagent (Gibco, #A29129) was added to 0.37 mL of OptiPRO™ SFM medium (Gibco, #12309019). The ExpiFectamine™ CHO reagent solution was immediately added slowly to the plasmid solution. The mixture was inverted to be well mixed. The mixed solution of plasmids and transfection reagent was slowly added dropwise while shaking the culture flask, and the cells were cultured in a shaker at 37° C. with 8% $CO_2$ for 8-9 days. Cell viability was measured after 8 days. The culture was collected and centrifuged at 3300 g for 10 min, and then the supernatant was collected and filtered through a 0.22 μm filter membrane to remove impurities. A gravity column (Bio-Rad, #7311550) containing Ni Sepharose excel (GE Healthcare Life Science, #17531802) was equilibrated with PBS (pH 7.4) and rinsed with 2-5 column volumes of PBS. The supernatant sample was loaded onto the column. The column was rinsed successively with 5-10 column volumes of PBS and 5-10 column volumes of a 20 mM imidazole solution (pH 7.4). The target protein was eluted with a 500 mM imidazole solution (pH 7.4), and the eluate was concentrated and buffer exchanged into PBS buffer with an ultrafiltration tube (Millipore, #UFC901024) to obtain a purified antibody solution. Then, the purified antibody solution was subjected to concentration determination using NanoDrop (Thermo Scientific™ NanoDrop™ One), subpackaged and stored for later use.

The method for producing and purifying the HCAb antibodies was specifically as follows: HEK293 cells were expanded in FreeStyle™ F17 Expression Medium (Thermo, #A1383504). Before the transient transfection, the cells were adjusted to a concentration of $(6-8) \times 10^5$ cells/mL, and cultured in a shaker at 37° C. with 8% $CO_2$ for 24 h to make a concentration of $1.2 \times 10^6$ cells/mL. 30 mL of cultured cells were taken. The plasmids encoding the heavy chain of HCAbs were dissolved in 1.5 mL of Opti-MEM reduced serum medium (Thermo, #31985088), and the mixture was filtered through a 0.22 μm filter membrane for sterilization. Then, 1.5 mL of Opti-MEM was dissolved in 120 μL of 1 mg/mL PEI (Polysciences Inc, #23966-2), and the mixture was left to stand for 5 min. PEI was slowly added to the plasmid, and the mixture was incubated at room temperature for 10 min. The mixed solution of plasmid and PEI was slowly added dropwise while shaking the culture flask, and the cells were cultured in a shaker at 37° C. with 8% $CO_2$ for 5 days. Cell viability was measured after 5 days. The culture was collected and centrifuged at 3300 g for 10 min, and then the supernatant was collected and centrifuged at high speed to remove impurities. A gravity column (Bio-Rad, #7311550) containing MabSelect™ (GE Healthcare Life Science, #71-5020-91 AE) was equilibrated with PBS (pH 7.4) and rinsed with 2-5 column volumes of PBS. The supernatant sample was loaded onto the column. The column was rinsed with 5-10 column volumes of PBS. The target protein was eluted with 0.1 M glycine (pH 3.5). The eluate was adjusted to neutrality with Tris-HCl (pH 8.0), and concentrated and buffer exchanged into PBS buffer with an ultrafiltration tube (Millipore, #UFC901024) to obtain a purified antibody solution. Then, the purified antibody solution was subjected to concentration determination using NanoDrop (Thermo Scientific™ NanoDrop™ One), subpackaged and stored for later use.

Analysis of Protein Purity and Polymers by HPLC-SEC

Analytical size-exclusion chromatography (SEC) was used to analyze the protein sample for purity and polymer form. An analytical chromatography column TSKgel G3000SWxl (Tosoh Bioscience, 08541, 5 μm, 7.8 mm×30 cm) was connected to a high-performance liquid chromatograph (HPLC, model: Agilent Technologies, Agilent 1260 Infinity II) and equilibrated with a PBS buffer at room temperature for at least 1 h. A proper amount of the protein sample (at least 10 μg, with the concentration adjusted to 1 mg/mL) was filtered through a 0.22 μm filter membrane and then injected into the system, and an HPLC program was set: the sample was passed through the chromatography column with PBS buffer (pH 7.4) at a flow rate of 1.0 mL/min for a maximum of 20 min. The detection wavelength was 280 nm. After being recorded, the chromatogram was integrated using ChemStation software and relevant data were calculated. An analysis was generated, with the retention time of the components with different molecular sizes in the sample reported.

Analysis of Protein Purity and Hydrophobicity by HPLC-HIC

Analytical hydrophobic interaction chromatography (HIC) was used to analyze the protein sample for purity and hydrophobicity. An analytical chromatography column TSKgel Butyl-NPR (Tosoh Bioscience, 14947, 4.6 mm×3.5 cm) was connected to a high-performance liquid chromatograph (HPLC, model: Agilent Technologies, Agilent 1260 Infinity II) and equilibrated with a PBS buffer at room temperature for at least 1 h. The program for HPLC was set: a linear gradient from 100% mobile phase A (20 mM histidine, 1.8 M ammonium sulfate, pH 6.0) to 100% mobile phase B (20 mM histidine, pH 6.0) over 16 min; flow rate: 0.7 mL/min; protein sample concentration: 1 mg/mL; and injection volume: 20 μL. The detection wavelength was 280 nm. After being recorded, the chromatogram was integrated using ChemStation software and relevant data were calculated. An analysis was generated, with the retention time of the components with different molecular sizes in the sample reported.

Determination of Thermostability of Protein Molecules by DSF

Differential scanning fluorimetry (DSF) is a commonly used high-throughput method for determining the thermostability of proteins. In this method, changes in the fluorescence intensity of the dye that binds to unfolded protein molecules were monitored using a real-time quantitative fluorescence PCR instrument to reflect the denaturation process of the protein and thus to reflect the thermostability of the protein. In this example, the thermal denaturation temperature (Tm) of a protein molecule was measured by DSF. 10 μg of protein was added to a 96-well PCR plate (Thermo, AB-0700/W), followed by the addition of 2 μL of 100× diluted dye SYPRO™ (Invitrogen, 2008138), and then the mixture in each well was brought to a final volume of 40 μL by adding buffer. The PCR plate was sealed, incubated in a real-time quantitative fluorescence PCR instrument (Bio-Rad CFX96 PCR System) at 25° C. for 5 min, then gradually warmed from 25° C. to 95° C. at a gradient of 0.2° C./0.2 min, and cooled to 25° C. at the end of the test. The FRET scanning mode was used and data analysis was performed using Bio-Rad CFX Maestro software to calculate the Tm of the sample.

The expression and physicochemical properties of the affinity-matured variant HCAbs of PR002481 are shown in Table 8, and the results show that the tested antibodies had high yield, high purity and stable physicochemical properties.

TABLE 8

Physicochemical properties of affinity-matured variants (HCAbs) of PR002481

| Antibody No. | Description | Concentration (mg/mL) | Yield (mg/L) after first purification | HPLC-SEC purity (%) | HPLC-HIC retention time (min) | DSF TM1(° C.) |
|---|---|---|---|---|---|---|
| PR002481 | anti-PD1 R4004P556D1 HCAb hG1 | 1.15 | 57.4 | 98.73 | 18.60 | 64.4 |
| PR005569 | anti-PD1 PR002481R2M4_E2 HCAb hIgG1 | 0.66 | 46.2 | 100 | 17.92 | 62.4 |
| PR005570 | anti-PD1 PR002481R2M1_H3 HCAb hIgG1 | 0.86 | 46.2 | 100 | 18.08 | 61.4 |
| PR005571 | anti-PD1 PR002481Com_31 HCAb hIgG1 | 0.71 | 38.4 | 100 | 17.61 | 63 |
| PR005572 | anti-PD1 PR002481Com_32 HCAb hIgG1 | 0.47 | 16.1 | 100 | 18.30 | 55.8 |
| PR005573 | anti-PD1 PR002481R2M3_D1 HCAb hIgG1 | 0.72 | 38.6 | 97.81 | 18.40 | 63 |
| PR005574 | anti-PD1 PR002481R2M1_F1 HCAb hIgG1 | 1.4 | 71.6 | 98.84 | 18.02 | 64.6 |
| PR005575 | anti-PD1 PR002481Com_24 HCAb hIgG1 | 0.45 | 26.2 | 96.99 | 18.86 | 60.6 |
| PR005577 | anti-PD1 PR002481Com_26 HCAb hIgG1 | 0.38 | 28.4 | 95.61 | 18.64 | 58.8 |
| PR005578 | anti-PD1 PR002481Com_27 HCAb hIgG1 | 0.27 | 9.5 | Low signal | 18.5 | 56.6 |
| PR005581 | anti-PD1 PR002481R2M1_A1 HCAb hIgG1 | 0.76 | 59.8 | 100 | 17.60 | 62.8 |
| PR005582 | anti-PD1 PR002481Com_28 HCAb hIgG1 | 0.84 | 0.5 | Not detected | Not detected | Not detected |
| PR005583 | anti-PD1 PR002481Com_29 HCAb hIgG1 | 0.71 | 50 | 100 | 17.64 | 60.8 |
| PR005584 | anti-PD1 PR002481Com_30 HCAb hIgG1 | 1.99 | 108 | 98.04 | 17.11 | 65 |
| PR005585 | anti-PD1 PR002481Com_35 HCAb hIgG1 | 1.03 | 64 | 100 | 17.66 | 55.6 |

Example 2. Binding of Antigen-Binding Proteins to Human and Cynomolgus Monkey PD-1 Protein 2.1 Binding of Antigen-Binding Protein to Human PD-1 Protein (ELISA)

Human PD-1-His protein (ACROBiosystems, # PD1-H5221) was diluted to 2 μg/mL with PBS, added to a 96-well plate (Corning, cat#9018) at 100 μL/well, and incubated at 4° C. overnight. After the liquid was discarded, the plate was washed 3 times with PBST buffer (pH 7.4, containing 0.05% Tween-20), and 250 μL of 2% BSA blocking buffer was added. The plate was incubated at 37° C. for 1 h. The blocking buffer was discarded, and the plate was washed 3 times with PBST buffer (pH 7.4, containing 0.05% Tween-20). The test antigen-binding protein was 5-fold diluted in sequence at an initial concentration of 100 nM for a total of 8-10 concentration gradients, and added at 100 μL/well. The plate was incubated at 37° C. for 1 h. An isotype antibody was taken as a control. After the plate was washed 3 times with PBST buffer (pH 7.4, containing 0.05% Tween-20), a 4000-fold diluted goat anti-human HRP secondary antibody (Invitrogen, #A18805) was added. The plate was incubated away from light at 37° C. for 1 h. After the plate was washed 3 times with PBST buffer (pH 7.4, containing 0.05% Tween-20), TMB (Biopanda, # TMB-S-003) was added at 100 μL/well. The plate was left away from light at room temperature for about 5 min. The reactions were terminated by adding 50 μL of stop buffer (BBI life sciences, #E661006-0200) to each well, and the absorbance values at 450 nm (OD450) were measured using a microplate reader (PerkinElemer, #Enspire). The half maximal effective concentration ($EC_{50}$) was calculated from the measurement results.

Figure 1B:
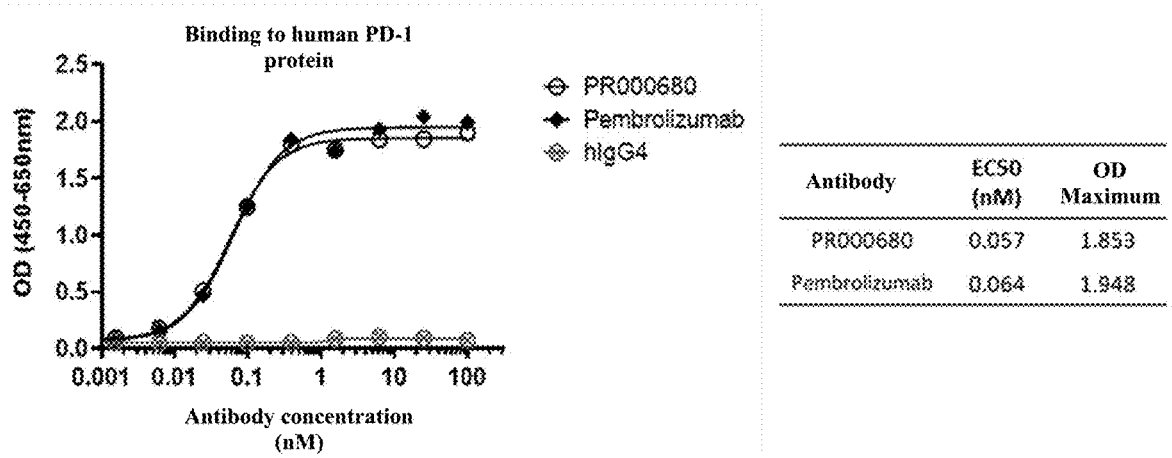
FIG. 1B shows the binding activity of the antigen-binding protein PR000680 described herein to human PD-1 protein.
Figure 1C:
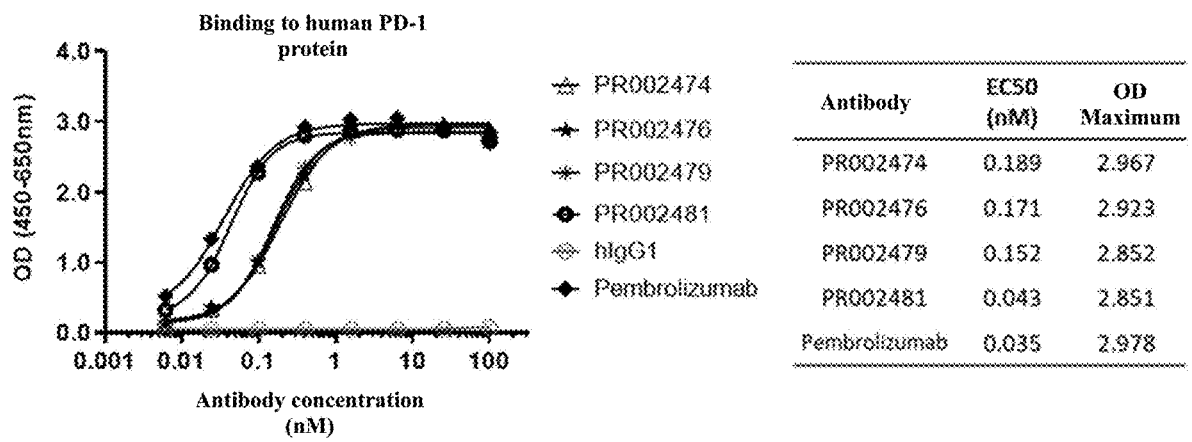
FIG. 1C shows the binding activity of the antigen-binding proteins PR002474, PR002476, PR002479 and PR002481 described herein to human PD-1 protein.

The results are shown in FIGS. 1A-1C. FIGS. 1A and 1B show that the anti-PD-1 H2L2 antibodies PR000673, PR000674, PR000675, PR000676, PR000677, PR000678, PR000679 and PR000680 described herein were all capable of binding to human PD-1 antigen, and demonstrated comparable binding activities to that of the positive control antibody pembrolizumab. The results in FIG. 1C show that the anti-PD-1 HCAb antibodies PR002474, PR002476, PR002479 and PR002481 described herein were all capable of binding to human PD-1 antigen, and demonstrated comparable binding activities to that of the positive control antibody pembrolizumab.

2.2 Binding of Antigen-Binding Protein to Cynomolgus Monkey PD-1 Protein (ELISA)

Cynomolgus monkey PD-1-His protein (AcroBiosystems, # PD1-05223) was diluted to 2 μg/mL with PBS, added to a 96-well plate (Corning, #9018) at 100 μL/well, and incubated at 4° C. overnight. After the liquid was discarded, the plate was washed 3 times with PBST, blocked by adding 250 μL of 2% BSA, and incubated at room temperature for 1 h. The blocking buffer was discarded, and the plate was washed 3 times with PBST buffer (pH 7.4, containing 0.05% Tween-20). The test antigen-binding protein was diluted to 5 μg/mL, and added at 100 μL/well. The plate was incubated at 37° C. for 1 h. After the plate was washed 3 times with PBST buffer (pH 7.4, containing 0.05% Tween-20), a 4000-fold diluted goat anti-human HRP secondary antibody (Invitrogen, #A18805) was added. The plate was incubated at 37° C. for 1 h. After the plate was washed, TMB (Biopanda, # TMB-S-003) was added at 100 μL/well. The plate was left away from light at room temperature for 5 min. The reactions were terminated by adding 50 μL of stop buffer (BBI life sciences, #E661006-0200) to each well, and the absorbance values at 450 nm (OD450) were measured using a microplate reader (PerkinElemer, #Enspire).

Figure 2:
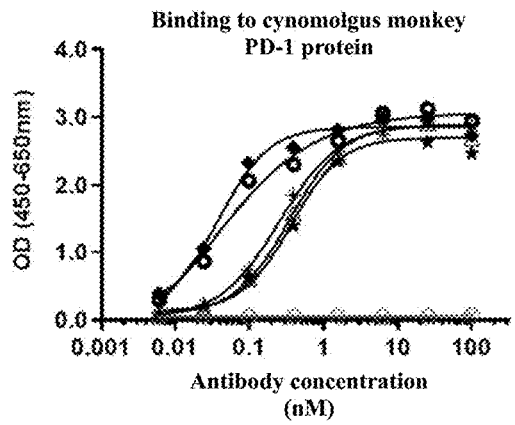
FIG. 2 shows the binding activity of the antigen-binding proteins PR002474, PR002476, PR002479 and PR002481 described herein to cynomolgus monkey PD-1 protein.

The results in FIG. 2 show that the anti-PD-1 HCAb antibodies PR002474, PR002476, PR002479 and PR002481 described herein were all capable of binding to cynomolgus monkey PD-1 protein, and demonstrated comparable binding activities to that of the positive control antibody pembrolizumab.

Example 3. Binding of Antigen-Binding Proteins to Cells Overexpressing Human/Cynomolgus Monkey PD-1 (FACS)

In order to investigate the in vitro binding activity of the PD-1 antigen-binding proteins to human/cynomolgus monkey PD-1, the binding assay at the cellular level was performed using a CHO-K1 cell strain overexpressing human or cynomolgus monkey PD-1 (CHO-K1/hPD-1 or CHO-K1/cyno PD-1, from GenScript). Briefly, the CHO-K1-hPD-1 cells were digested and resuspended in an F-12K complete medium, and the cell density was adjusted to 1×10⁶ cells/mL. The cells were seeded in a 96-well V-bottom plate (Corning, Cat#3894) at 100 μL/well, followed by the addition of the test antigen-binding proteins with concentrations 2-fold of final concentrations obtained by 5-fold gradient dilution were each added at 100 μL/well. The mixtures were well mixed. The maximum final concentration of the antigen-binding proteins was 100 nM or 300 nM. A total of 8-11 concentrations were set. hIgG was used as a control. The cells were incubated at 4° C. for 1 h away from light. Thereafter, the cells in each well were rinsed twice with 100 μL of pre-cooled PBS, and centrifuged at 500 g at 4° C. for 5 min, and then the supernatant was discarded. Then 100 μL of a fluorescent secondary antibody (goat anti-human IgG (H+L) secondary antibody, Alexa Fluor® 488 conjugate, Invitrogen, Cat #A11013, 1:1000) was added to each well. The plate was incubated away from light at 4° C. for 30 min. The cells in each well were rinsed twice with 200 μL of pre-cooled PBS, and centrifuged at 500 g at 4° C. for 5 min, and then the supernatant was discarded. Finally, the cells in each well were resuspended in 200 μL of pre-cooled PBS, and the fluorescence signal values were read using a BD FACS CANTOII.

Figure 3A:
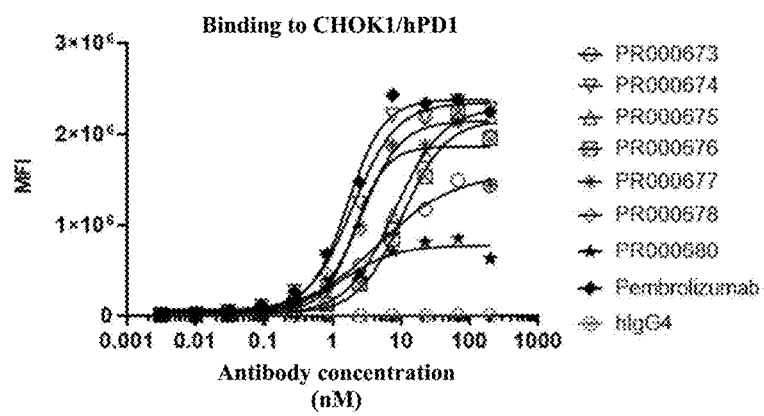
FIG. 3A shows the binding activity of the antigen-binding proteins PR000673, PR000674, PR000675, PR000676, PR000677, PR000678 and PR000680 described herein to human PD-1 protein expressed on CHO-K 1 cells.

The results in FIG. 3A show that the anti-PD-1 H2L2 antibodies PR000673, PR000674, PR000675, PR000676, PR000677, PR000678 and PR000680 described herein were all capable of binding to CHO-K1 cells overexpressing human PD-1, and that some of the antibodies demonstrated comparable binding activities to that of the positive control antibody pembrolizumab.

Figure 3B:
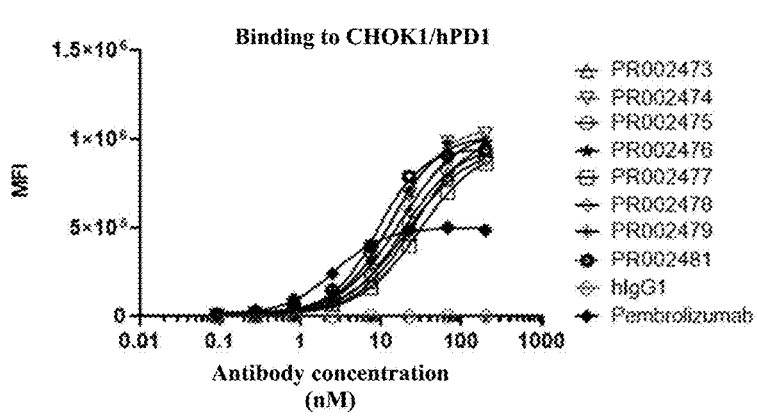
FIG. 3B shows the binding activity of the antigen-binding proteins PR002473, PR002474, PR002475, PR002476, PR002477, PR002478, PR002479 and PR002481 described herein to human PD-1 protein expressed on CHO-K 1 cells.

The results in FIG. 3B show that the anti-PD-1 HCAb antibodies PR002473, PR002474, PR002475, PR002476, PR002477, PR002478, PR002479 and PR002481 described herein were all capable of binding to CHO-K1 cells overexpressing human PD-1.

Figure 3C:
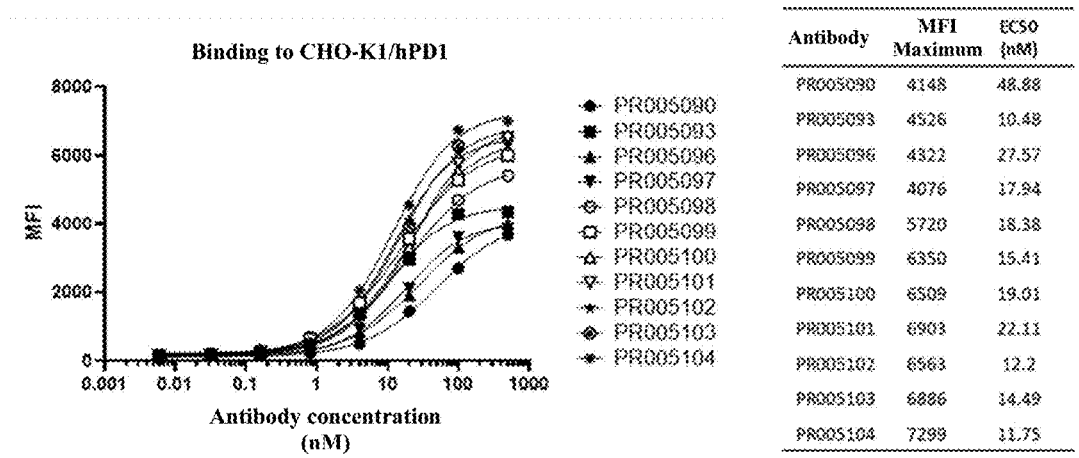
FIG. 3C shows the binding activity of the antigen-binding proteins PR005090, PR005093, PR005096, PR005097, PR005098, PR005099, PR005100, PR005101, PR005102, PR005103 and PR005104 described herein to human PD-1 protein expressed on CHO-K 1 cells.

The results in FIG. 3C show that the HCAb antibodies PR005093, PR005096, PR005097, PR005098, PR005099, PR005100, PR005101, PR005102, PR005103 and PR005104 of the PR002481 mutants were all capable of binding to CHO-K1 cells overexpressing human PD-1, and demonstrated better affinity than that of PR005090.

Figure 3D:
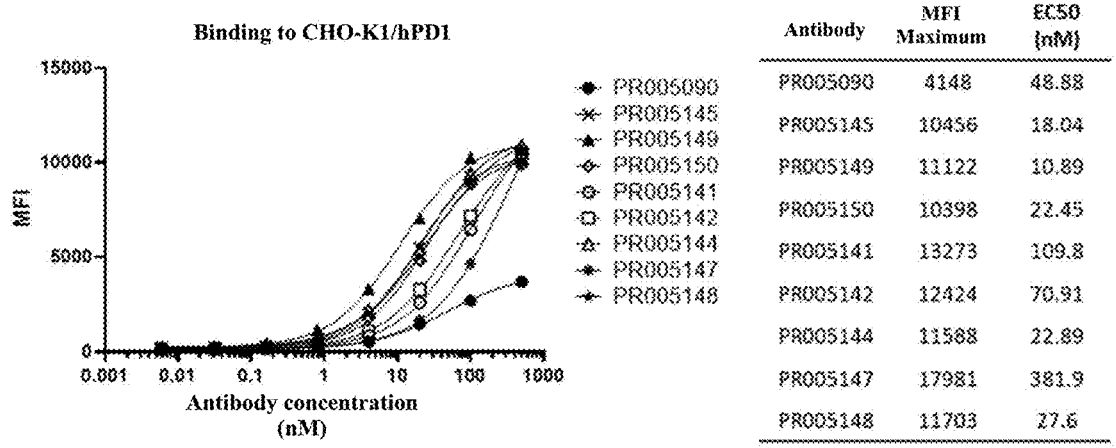
FIG. 3D shows the binding activity of the antigen-binding proteins PR005090, PRO05145, PR005149, PR005150, PR005141, PR005142, PR005144, PR005147 and PR005148 described herein to human PD-1 protein expressed on CHO-K1 cells.

The results in FIG. 3D show that the HCAb antibodies PR005145, PR005149, PR005150, PR005141, PR005142, PR005144, PR005147 and PR005148 of the PR002481 mutants were all capable of binding to CHO-K1 cells overexpressing human PD-1, and demonstrated better affinity than that of PR005090.

Figure 3E:
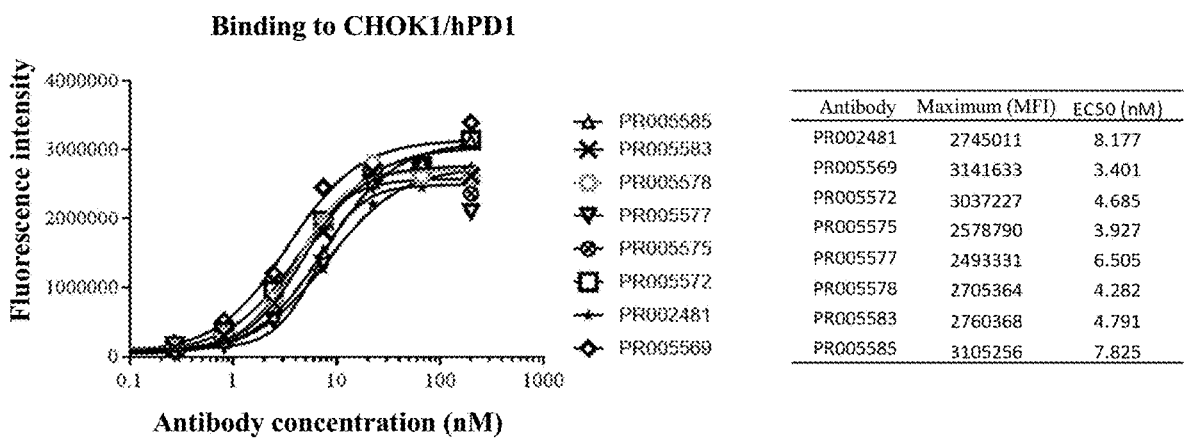
FIG. 3E shows the binding activity of the antigen-binding proteins PR002481, PR005585, PR005583, PR005578, PR005577, PR005575, PR005572, and PR005569 described herein to human PD-1 protein expressed on CHO-K1 cells.

The results in FIG. 3E show that the HCAb antibodies PR005585, PR005583, PR005578, PR005577, PR005575, PR005572 and PR005569 of the PR002481 mutants were all capable of binding to CHO-K1 cells overexpressing human PD-1, and demonstrated better affinity than that of the parent antibody PR002481.

Figure 3F:
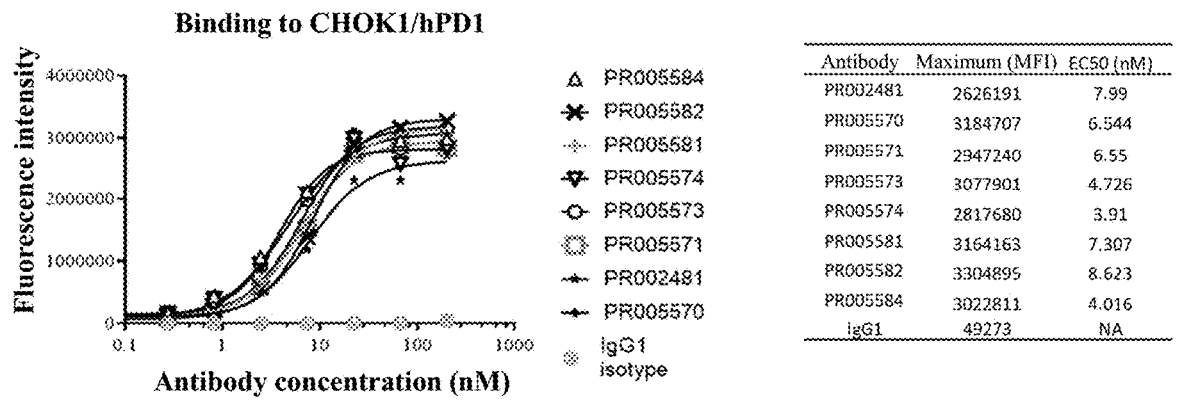
FIG. 3F shows the binding activity of the antigen-binding proteins PR002481, PR005584, PR005582, PR005581, PR005574, PR005573, PR005571 and PR005570 described herein to human PD-1 protein expressed on CHO-K1 cells.

The results in FIG. 3F show that the HCAb antibodies PR005584, PR005582, PR005581, PR005574, PR005573, PR005571 and PR005570 of the PR002481 mutants were all capable of binding to CHO-K1 cells overexpressing human PD-1, and demonstrated better affinity than that of PR002481.

Figure 4:
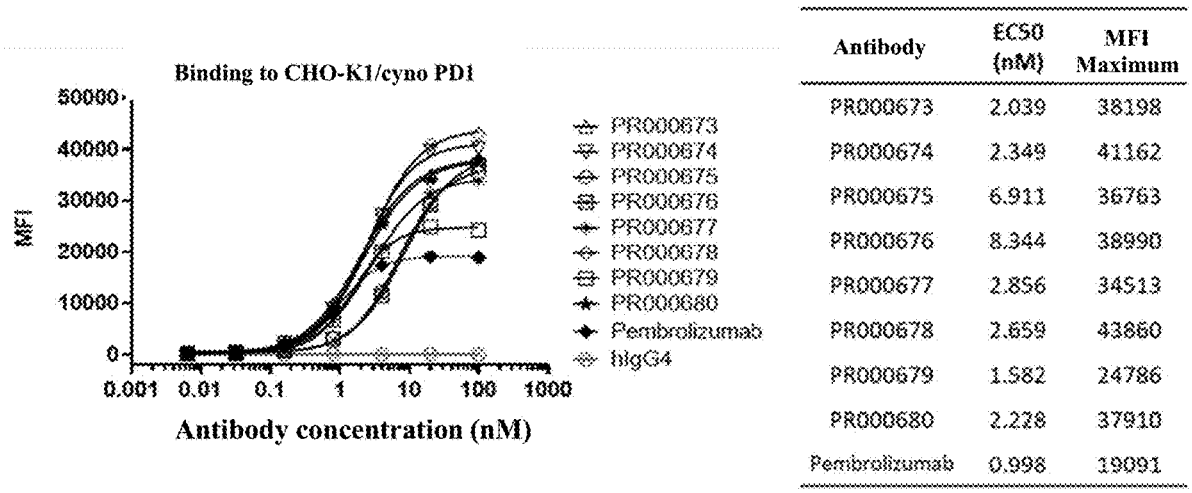
FIG. 4 shows the binding activity of the antigen-binding proteins PR000673, PR000674, PR000675, PR000676, PR000677, PR000678, PR000679 and PR000680 described herein to cynomolgus monkey PD-1 protein expressed on CHO-K1 cells.

The results in FIG. 4 show that the H2L2 antibodies PR000673, PR000674, PR000675, PR000676, PR000677, PR000678, PR000679 and PR000680 described herein were all capable of binding to CHO-K1 cells overexpressing cynomolgus monkey PD-1, and that some of the antibodies demonstrated comparable binding activities to that of the positive control antibody pembrolizumab.

Example 4. Determination of Affinity of Antigen-Binding Proteins for Human PD-1 by BLI Method In this example, kinetic assays were performed on the affinity-matured mutants of PR002481 using an Octet Red96e instrument. Human PD-1 proteins with histidine and avi tags were purchased from the manufacturer ACRO Biosystems (Cat#: PD1-H82E4), and the assay buffer was 1× kinetics buffer (diluted from 10× kinetics buffer (ForteBio, Cat#: 18-1105)) for kinetic assay and dilution of antigens and antibodies. The binding kinetics between the antigen and the antibody was analyzed by the biolayer interferometry (BLI) technique using an Octet molecular interaction analyzer (ForteBio, model: Octet Red96e).

When the binding kinetics between the antigen and the antibody was determined, the rotation speed of the sensor was set at 1000 rpm/min. The eight SA sensors placed in a column were first equilibrated in an assay buffer for 10 min and then used to capture PD-1 at a capture height of 0.5 nm. Thereafter, the SA sensors were equilibrated in the assay buffer for 100 s, and then were associated with each antibody diluted to a single concentration and with a row of blank buffer wells for 180 s, followed by dissociation for 600 s. A new column of SA sensors were used in each cycle.

When data analysis was performed using Octet Data Analysis software (Fortebio, version 11.0), the reference signals were subtracted by a single reference mode (reference well), the data were fitted by a "1:1 Local fitting" method, and the kinetic parameters of the binding of the antigen to the antibody were calculated to obtain kon (1/Ms) values, kdis (1/s) values and KD (M) values.

The results in Table 9 show that the affinity-matured variants of PR002481 were all capable of binding to PD-1 with KD values mostly between 1E9 and 1E8, or even less than 1E12, and that the affinity of most variants was significantly improved as compared with that of PR005090 (a single-domain antibody based on the parent sequence).

TABLE 9

Affinity of affinity-matured variants of PR002481 for human PD-1 protein

| Antibody No. | Concentration (nM) | KD (M) | kon (1/Ms) | kdis (1/s) | kdis ratio | Full R^2 |
|---|---|---|---|---|---|---|
| PR005090 | 60 | 2.08E−08 | 5.50E+04 | 1.14E−03 |  | 0.9955 |
| PR005093 | 80 | 4.82E−09 | 1.32E+05 | 6.36E−04 | 1.80 | 0.9988 |
| PR005096 | 80 | 1.04E−08 | 5.79E+04 | 5.99E−04 | 1.91 | 0.9983 |
| PR005097 | 80 | 1.39E−08 | 5.66E+04 | 7.84E−04 | 1.46 | 0.9981 |
| PR005098 | 80 | 5.88E−09 | 6.71E+04 | 3.94E−04 | 2.90 | 0.9985 |
| PR005099 | 80 | 4.32E−09 | 1.05E+05 | 4.55E−04 | 2.51 | 0.9991 |
| PR005100 | 80 | 1.16E−08 | 2.60E+04 | 3.01E−04 | 3.80 | 0.9972 |
| PR005101 | 80 | 5.88E−08 | 2.94E+03 | 1.73E−04 | 6.61 | 0.9946 |
| PR005102 | 80 | 5.99E−09 | 4.48E+04 | 2.68E−04 | 4.25 | 0.9985 |
| PR005103 | 80 | 7.96E−08 | 3.16E+03 | 2.52E−04 | 4.54 | 0.9953 |
| PR005104 | 80 | 3.08E−09 | 7.90E+04 | 2.43E−04 | 4.70 | 0.9992 |
| PR005141 | NA | 1.49E−09 | 5.21E+04 | 7.75E−05 | 14.73 | 0.9908 |
| PR005142 | 80 | 6.76E−09 | 8.20E+03 | 5.55E−05 | 20.60 | 0.9992 |
| PR005144 | 80 | 4.51E−09 | 1.00E+04 | 4.52E−05 | 25.25 | 0.9993 |
| PR005145 | 80 | 5.31E−09 | 9.86E+03 | 5.24E−05 | 21.81 | 0.9984 |
| PR005146 | 900 | 1.02E−06 | 5.93E+02 | 6.05E−04 | 1.89 | 0.9492 |
| PR005147 | 80 | 1.65E−08 | 1.66E+03 | 2.74E−05 | 41.74 | 0.9713 |
| PR005148 | 80 | 1.21E−09 | 4.72E+04 | 5.72E−05 | 19.98 | 0.999 |
| PR005149 | 80 | 1.40E−08 | 3.45E+03 | 4.83E−05 | 23.66 | 0.998 |
| PR005150 | 80 | <1.0E−12 | 5.90E+04 | <1.0E−07 | NA | 0.9388 |
| PR002481 | 600-150 | 7.70E−08 | 2.29E+05 | 1.62E−03 | — | 0.9928 |
| PR005569 | 600-150 | 4.82E−10 | 9.97E+03 | 7.68E−04 | — | 0.9978 |
| PR005572 | 600-150 | 3.32E−09 | 1.19E+04 | 5.75E−06 | — | 0.9986 |
| PR005575 | 600-150 | 6.46E−09 | 1.29E+04 | 4.28E−05 | — | 0.9991 |
| PR005583 | 600-150 | 1.69E−09 | 8.28E+03 | 1.65E−05 | — | 0.9990 |
| PR005585 | 600-150 | 3.08E−09 | 1.32E+04 | 2.22E−05 | — | 0.9986 |
| Pembrolizumab | 80-20 | 7.07E−09 | 2.29E+05 | 1.62E−03 | — | 0.9928 |

Example 5. Blocking of Binding of Human PD-L1 or PD-L2 to CHO-K1 Cells Overexpressing Human PD-1 by Antigen-Binding Proteins In order to investigate the in vitro activity of the human PD-1 binding proteins in blocking the binding of human PD-1 to human PD-L1 and PD-L2, the blocking assays on human PD-1/human PD-L1 binding and human PD-1/human PD-L2 binding were performed at the cellular level using a CHO-K1 cell strain overexpressing human PD-1 (CHO-K1-hPD-1).

Briefly, the CHO-K1-hPD-1 cells were digested and resuspended in an F-12K complete medium, and the cell density was adjusted to $1 \times 10^6$ cells/mL. The cells were seeded in a 96-well V-bottom plate (Corning, Cat#3894) at 100 μL/well, followed by the addition of the test antigen-binding proteins with concentrations 2-fold of final concentrations obtained by 3-fold or 5-fold gradient dilution were each added at 100 μL/well. The mixtures were well mixed. The maximum final concentration of the antigen-binding proteins was 100 nM or 300 nM. A total of 8 concentrations were set. hIgG was used as a control. The cells were incubated at 4° C. for 1 h away from light. Thereafter, centrifugation was carried out at 4° C. for 5 min, the supernatant was discarded, and then a biotin-labeled human PD-L1 protein (AcroBiosystems, PD1-H82F2) with a concentration of 1 μg/mL or a biotin-labeled human PD-L2 protein (AcroBiosystems, PD2-H82F6) with a concentration of 1 μg/mL was added at 50 μL/well. The cells were incubated at 4° C. away from light for 30 min. The cells in each well were rinsed twice with 100 μL of pre-cooled PBS, and centrifuged at 500 g at 4° C. for 5 min, and then the supernatant was discarded. A fluorescent secondary antibody (PE Streptavidin, BD, Cat# 554061, 1:200) was added at 100 μL/well, and the cells were incubated at 4° C. away from light for 30 min. The cells in each well were rinsed twice with 200 μL of pre-cooled PBS, and centrifuged at 500 g at 4° C. for 5 min, and then the supernatant was discarded. Finally, the cells in each well were resuspended in 200 μL of pre-cooled PBS, the fluorescence signal values were read using a BD FACS CANTOII, and the $IC_{50}$ values were calculated.

Figure 5A:
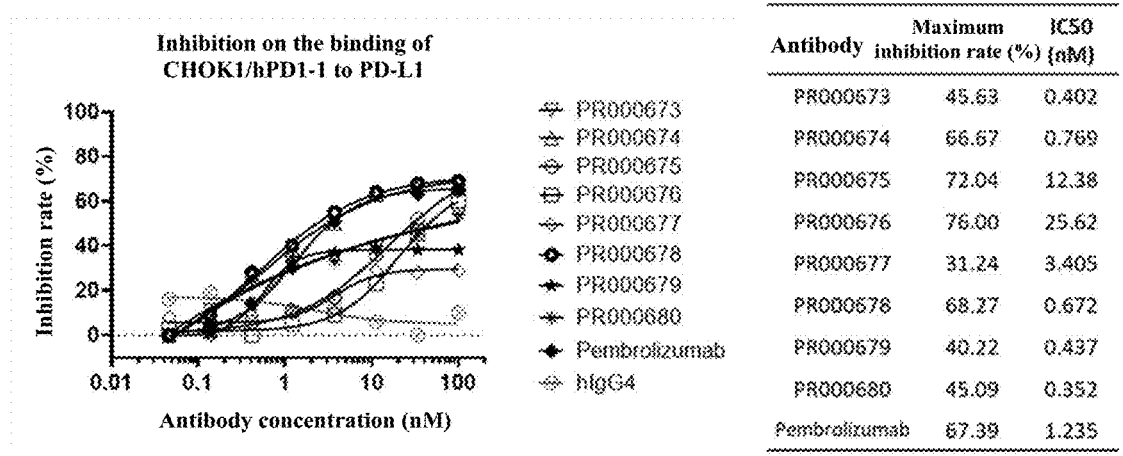
FIG. 5A shows the activity of the antigen-binding proteins PR000673, PR000674, PR000675, PR000676, PR000677, PR000678, PR000679 and PR000680 described herein in blocking the binding of human PD-1 protein expressed on CHO-K1 cells to PD-L1 protein.

The results are shown in FIGS. 5A, 5B and 5C. FIGS. 5A and 5B respectively show that the H2L2 antibodies PR000673, PR000674, PR000675, PR000676, PR000677, PR000678, PR000679 and PR000680, and the HCAb antibodies PR002473, PR002474, PR002475, PR002476, PR002477, PR002478, PR002479 and PR002481 described herein were all capable of blocking the binding of human PD-L1 to human PD-1 on the cell surface, and demonstrated comparable inhibition ability to that of the positive control pembrolizumab. FIG. 5C shows that the H2L2 antibodies PR000673, PR000674, PR000675, PR000676, PR000677, PR000678, PR000679 and PR000680 described herein were all capable of blocking the binding of human PD-L2 to human PD-1 on the cell surface.

Example 6. Inhibition of PD-1 Signaling Pathway by Antigen-Binding Proteins as Detected Using Reporter Gene Cell Line Hep3B (constructed by ChemPartner, Shanghai) cells overexpressing PD-L1 and OS8 (CD3 single-chain antibody transmembrane protein) or HEK293T cells overexpressing PD-L1 and were plated on a 96-well plate at $1.25 \times 10^4$ cells/well, 100 μL/well. The cells were incubated at 37° C. with 5% $CO_2$ overnight. The supernatant was removed, and a dilution of the test antigen-binding protein was added at 50 μL/well. The initial concentration was 50 nM, and 4-fold dilution was performed (or the initial concentration was 500 nM, and 5-fold dilution was performed). hIgG1 was used as a control group. Jurkat reporter cells capable of constantly expressing PD-1 and NFAT-luciferase reporter genes (constructed by ChemPartner, Shanghai) were added at $5 \times 10^4$ cells/well, 50 μL/well. The cells were incubated at 37° C. with 5% $CO_2$ for 6 h. ONE-Glo™ luciferase reagent (Promega, #E6110) was added. The cells were incubated at room temperature for 5 min, and the luminescence values were measured using a microplate reader.

The results in FIGS. 6A-6F show that the abilities of the antibodies of the present application in inhibiting the PD-1 signaling pathway were comparable to that of the positive control.

FIG. 6A shows that the H2L2 antibodies PR000673, PR000674, PR000678, PR000679 and PR000680 described herein had inhibitory effect on the PD-1 signaling pathway.

Figure 6B:
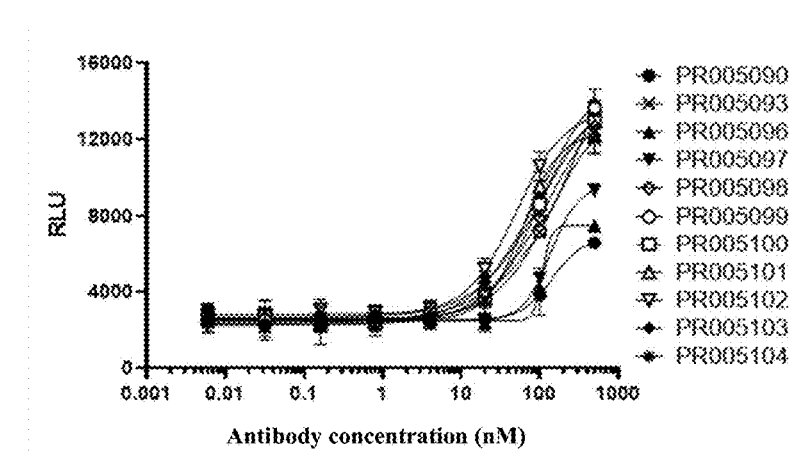
FIG. 6B shows the inhibition of the PD-1 signaling pathway by the antigen-binding proteins PR005090, PR005093, PR005096, PR005097, PR005098, PR005099, PR005100, PR005101, PRO05102, PRO05103 and PRO05104 described herein (as detected by using reporter gene cell line).

FIG. 6B shows that the HCAb antibodies PR005090, PR005093, PR005096, PR005097, PR005098, PR005099, PR005100, PR005101, PR005102, PR005103 and PR005104 of the PR002481 mutants had inhibitory effect on the PD-1 signaling pathway.

Figure 6C:
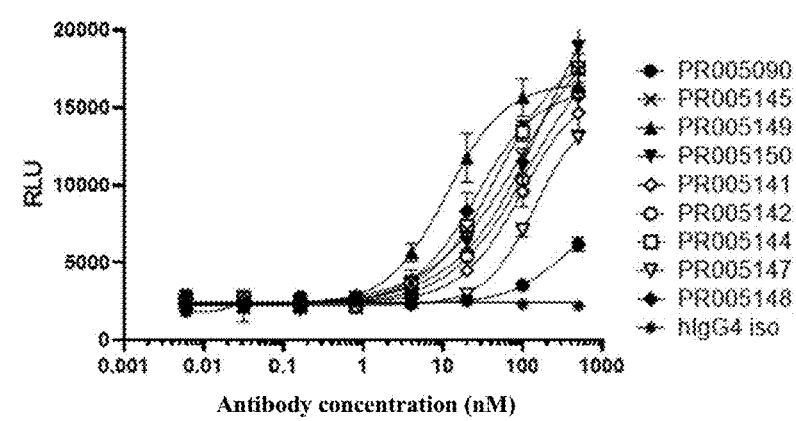
FIG. 6C shows the inhibition of the PD-1 signaling pathway by the antigen-binding proteins PR005090, PR005145, PR005149, PR005150, PR005141, PR005142, PR005144, PR005147 and PRO05148 described herein (as detected by using reporter gene cell line).

FIG. 6C shows that the HCAb antibodies PR005090, PR005145, PR005149, PR005150, PR005141, PR005142, PR005144, PR005147 and PR005148 of the PR002481 mutants had inhibitory effect on the PD-1 signaling pathway.

Figure 6D:
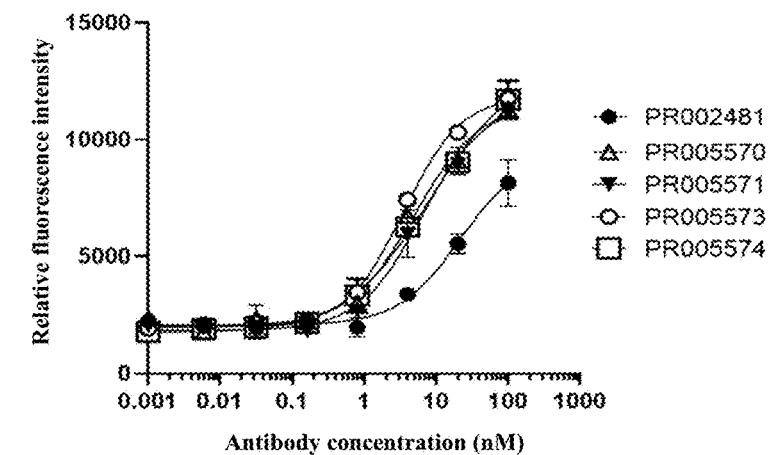
FIG. 6D shows the inhibition of the PD-1 signaling pathway by the antigen-binding proteins PR002481, PR005570, PR005571, PR005573 and PR005574 described herein (as detected by using reporter gene cell line).
Figure 6E:
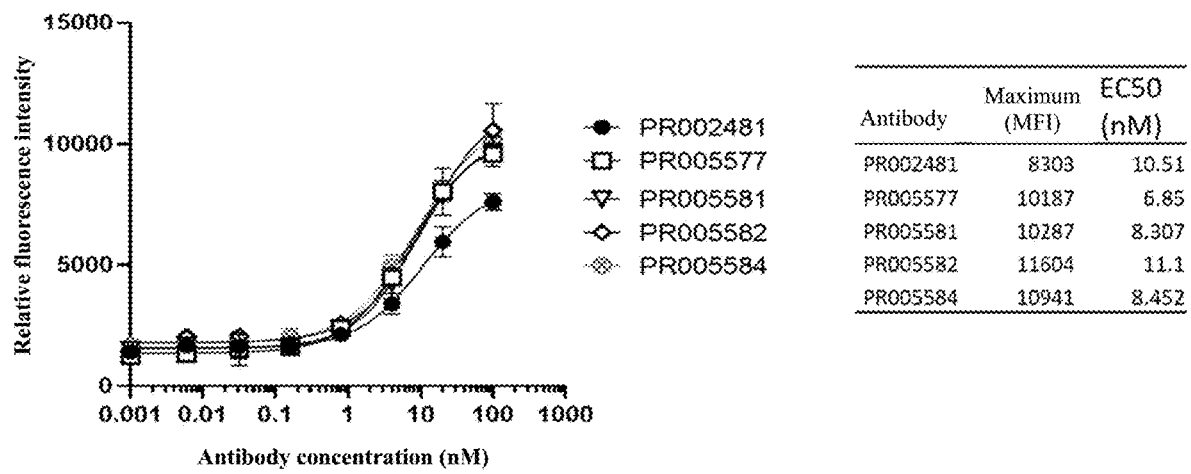
FIG. 6E shows the inhibition of the PD-1 signaling pathway by the antigen-binding proteins PR002481, PR005577, PR005581, PR005582 and PR005584 described herein (as detected by using reporter gene cell line).

FIGS. 6D and 6E show that the HCAb antibodies of the PR002481 mutants had inhibitory effect on the PD-1 signaling pathway.

Figure 6F:
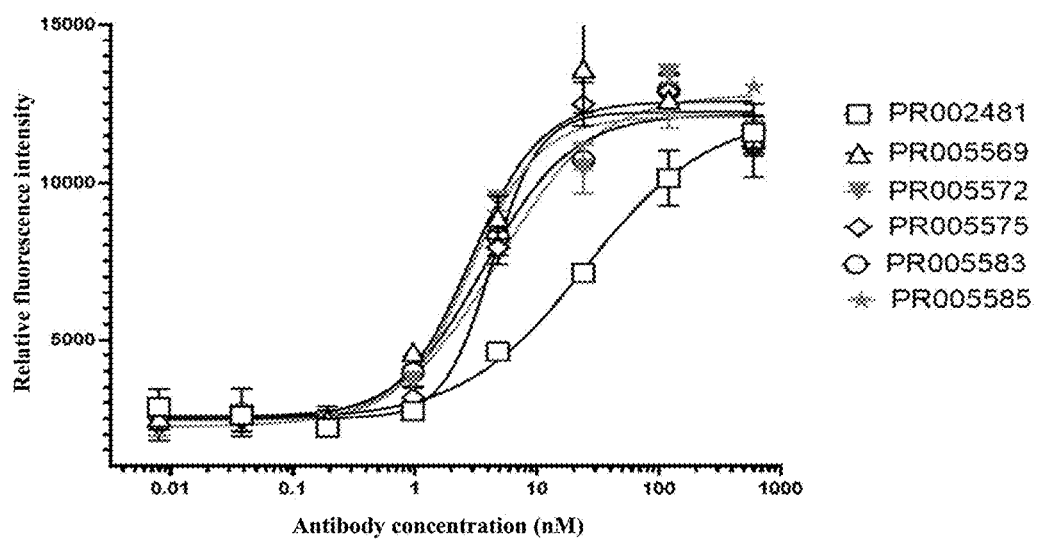
FIG. 6F shows the inhibition of the PD-1 signaling pathway by the antigen-binding proteins PR002481, PR005569, PR005572, PR005575, PR005583 and PR005585 described herein (as detected by using reporter gene cell line).

FIG. 6F shows that the HCAb antibodies PR005569, PR005572, PR005575, PR005583 and PR005585 of the PR002481 mutants all had inhibitory effect on the PD-1 signaling pathway.

Example 7. Stimulation of Cytokine Secretion by Antigen-Binding Proteins in Mixed Lymphocyte Reaction (MLR)

AllCells PBMC cells were purchased, monocytes cells were isolated, and recombinant human interleukin 4 (IL-4) (R&D, #204-GMP) and human GM-CSF (R&D, #215-GM/CF) were added. After 6 days of induction, immature human CD14+ dendritic cells (iDC cells) were obtained. 1 μg/mL lipopolysaccharide (LPS; Sigma, #L2630) was then added, and after 24 h of induction, mature dendritic cells (mDC cells) were obtained. T lymphocytes were isolated from PBMC cells of a second donor using a T cell isolation kit (StemCell, #17951). T lymphocytes and mDC cells were seeded in a 96-well plate (T lymphocytes at $1 \times 10^5$ cells/well and mDC cells at $1 \times 10^4$ cells/well) at a ratio of 10:1. The antigen-binding proteins and the negative and positive control antibodies were each added at 10 μg/mL, and 10-fold or corresponding-fold dilution was performed. The cells were incubated in an incubator at 37° C. with 5% $CO_2$ for 5 days. Supernatants on day 3 and on day 5 were collected and assayed for the secretion of IL-2 (ThermoFisher, #88-7025-88) and IFN-γ (ThermoFisher, #88-7316-88), respectively, using an ELISA kit.

Figure 7:
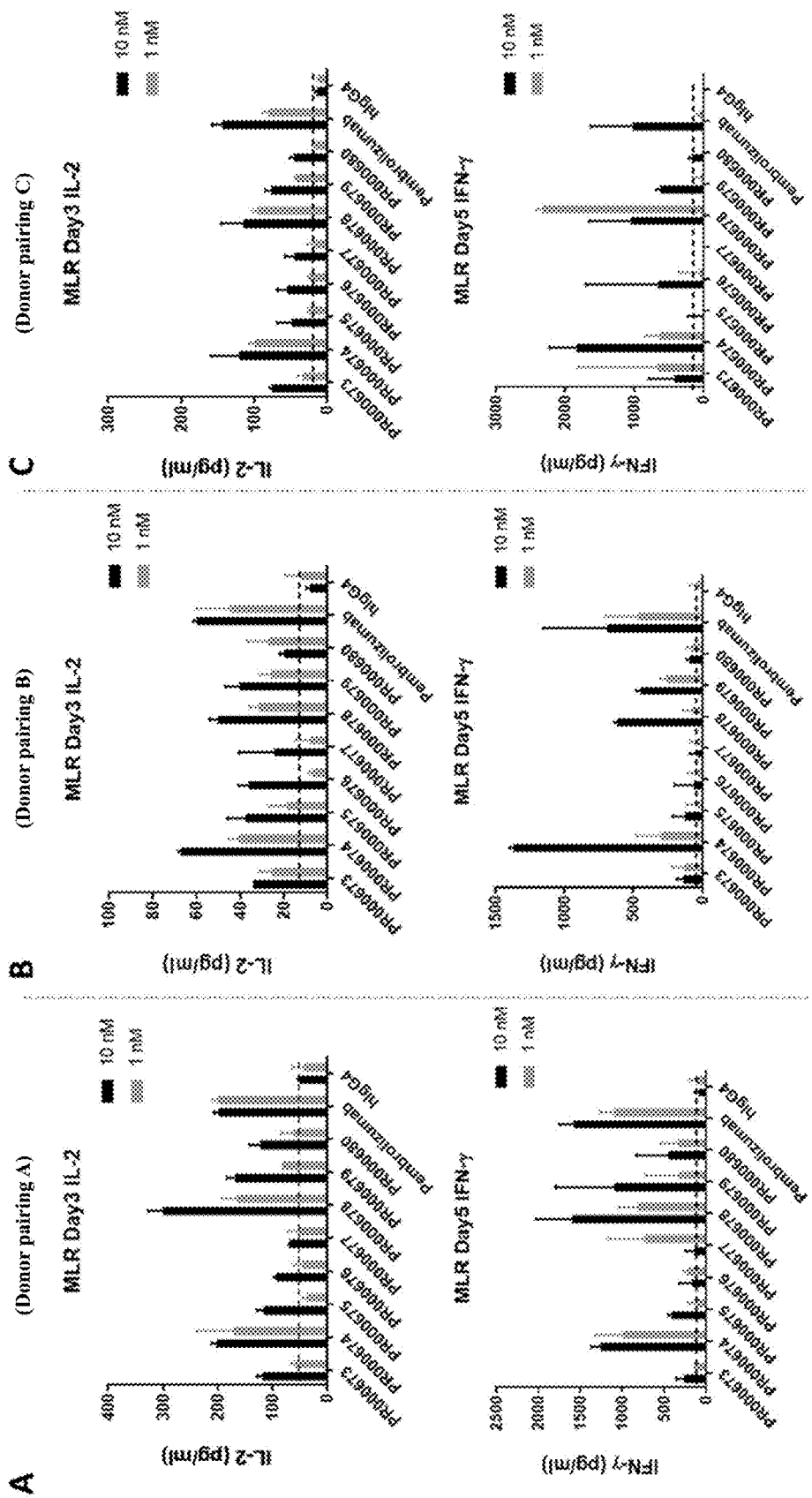
FIGS. 7A, 7B and 7C show the ability of the antigen-binding proteins PR000673, PR000674, PR000675, PR000676, PR000677, PR000678, PR000679 and PR000680 described herein to activate T cells (mixed lymphocyte reaction experiment).
Figure 8:
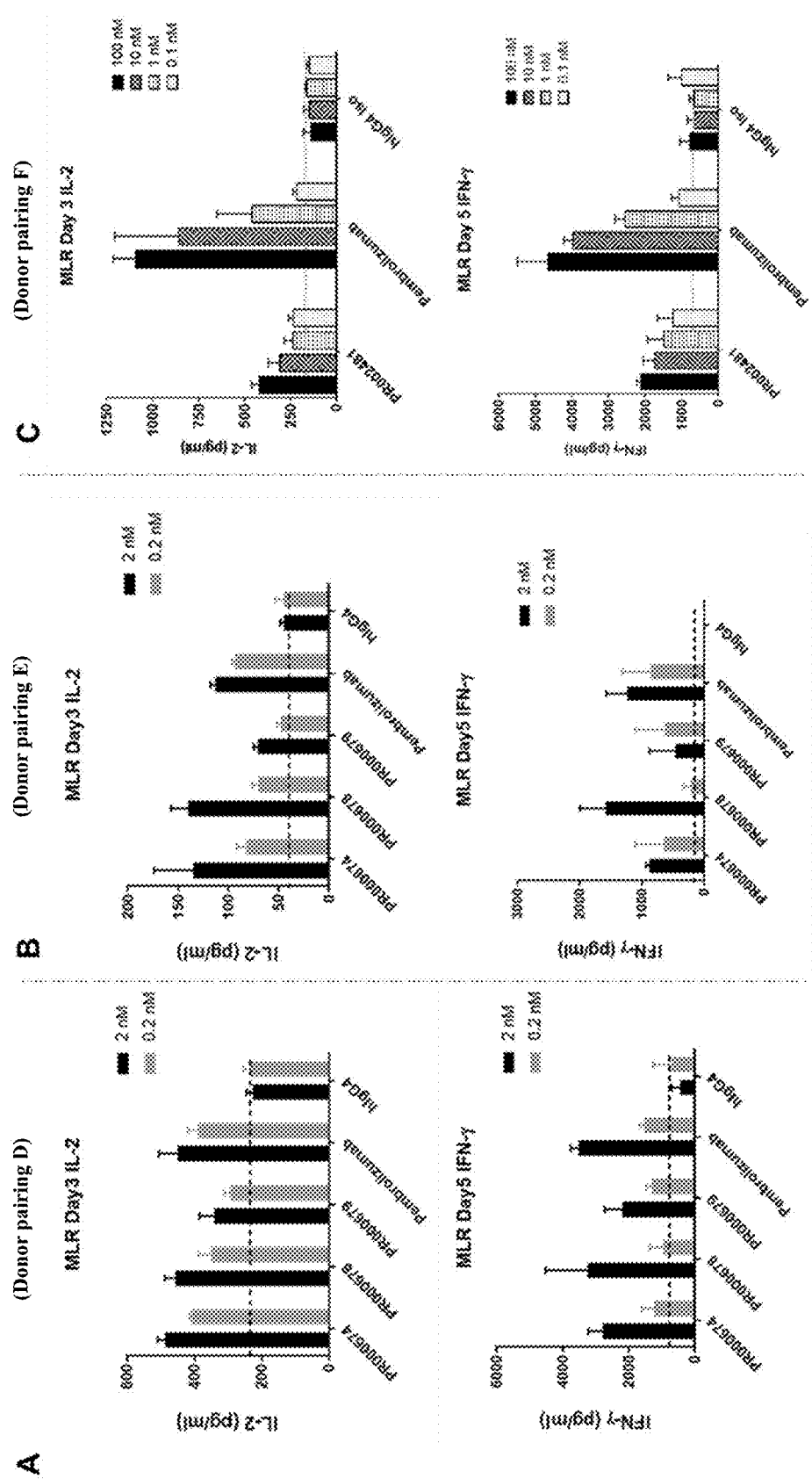
FIGS. 8A and 8B show the ability of the antigen-binding proteins PR000674, PR000678 and PR000679 described herein to activate T cells (mixed lymphocyte reaction experiment).
FIG. 8C shows the ability of the antigen-binding protein PR002481 described herein to activate T cells (mixed lymphocyte reaction experiment).

First, PBMCs of 12 donors were divided into six donor pairings for mixed lymphocyte reaction (MLR). The results in FIGS. 7 and 8 show that in six independent MLR experiments, the H2L2 antibodies PR000673, PR000674, PR000675, PR000676, PR000677, PR000678, PR000679 and PR000680, as well as PR002481, were all capable of enhancing the secretion of cytokines IL-2 and IFN-γ by activated T lymphocytes.

Figure 9:
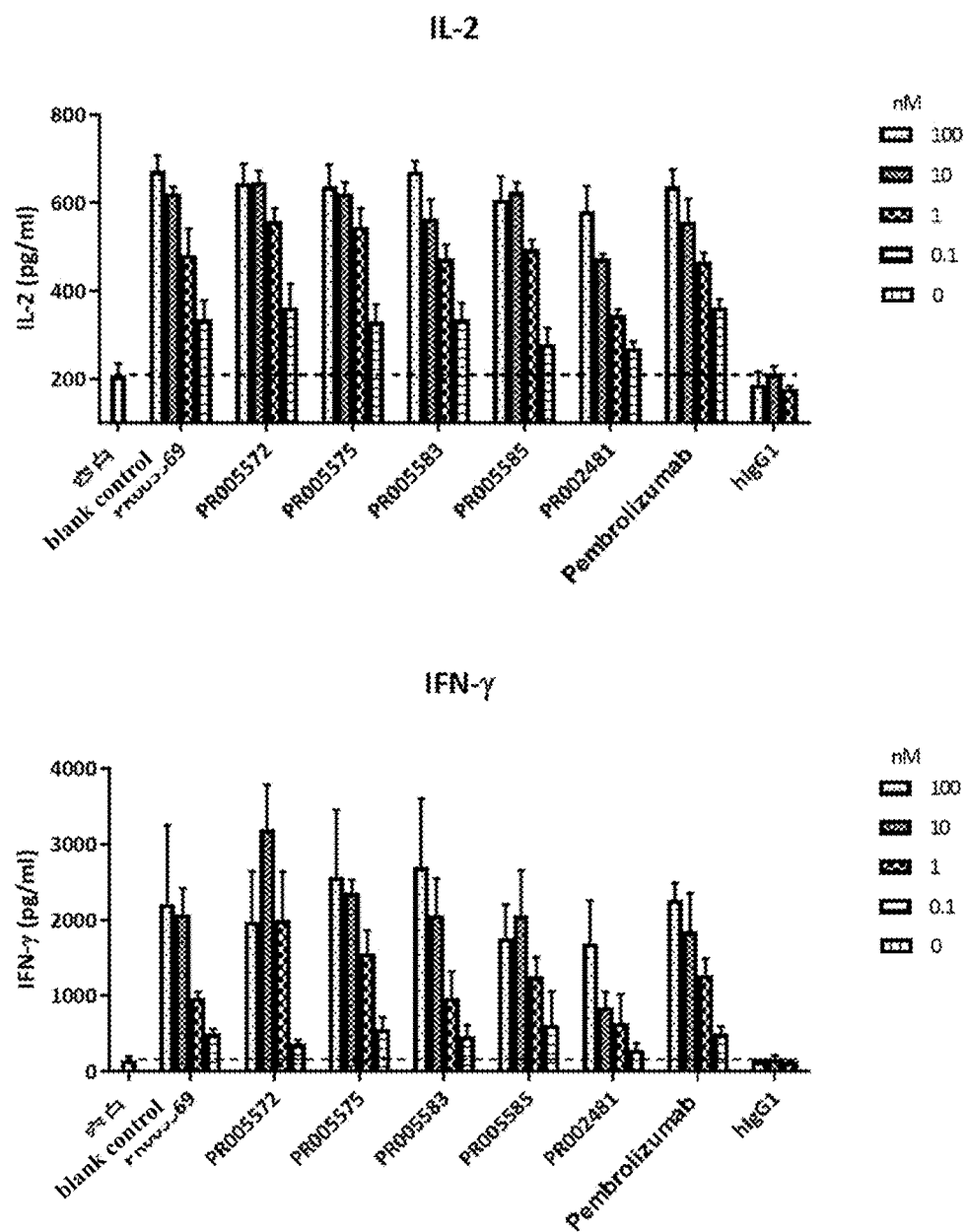
FIG. 9 shows the ability of the antigen-binding proteins PR005569, PR005572, PR005575, PR005583, PR005585 and PR002481 described herein to activate T cells (mixed lymphocyte reaction experiment).

FIG. 9 shows that HCAb antibodies PR005569, PR005572, PR005575, PR005583 and PR005585 of the PR002481 mutants were all capable of enhancing the secretion of cytokines IL-2 and IFN-γ by activated T lymphocytes, and demonstrated comparable activation abilities to that of the positive control.

Example 8. Structure and Design of CD73×PD-1 Bispecific Antibody

In this example, PD-1×CD73 bispecific antibody molecules were constructed using the antigen-binding domain Fab of the anti-CD73 IgG antibody PR000846 and the antigen-binding domain VH of the anti-PD-1 HCAb antibody PR002481. The amino acid sequences of the light and heavy chains of PR000846 are shown in Table 10.

TABLE 10

| Sequence numbers of anti-CD73 H2L2 antibody PR000846 | | | | |
|---|---|---|---|---|
| Antibody No. | Light chain | Heavy chain | VL | VH |
| PR000846 | SEQ ID NO: 330 | SEQ ID NO: 246 | SEQ ID NO: 237 | SEQ ID NO: 159 |

In this and subsequent examples, the anti-CD73 IgG monoclonal antibody PR000846 was used as a positive control molecule, and was also the parent monoclonal antibody of the CD73 end of the CD73×PD-1 bispecific antibody molecule. The anti-PD-1 IgG monoclonal antibody PR002481 was used as a positive control molecule, and was also the parent monoclonal antibody of the PD-1 end of the CD73×PD-1 bispecific antibody molecule.

Taking FIG. 10 as an example for illustration, the Fab end is derived from a conventional antibody PR000846, and VH_A and VL_A are the heavy chain variable region and the light chain variable region of the antibody PR000846, respectively. The VH end is derived from a heavy-chain antibody PR002481, and VH_B is a heavy chain variable region of the heavy-chain antibody PR002481. CL is a light chain constant region domain. CH1, CH2 and CH3 are first, second and third domains of a heavy chain constant region, respectively. L is a linker peptide GS_15 (SEQ ID NO: 338), and h is a hinge region or a derived sequence of an IgG antibody. VH_B is at the N-terminus of VH_A. IgG1 has mutations L234A and L235A. The prepared bispecific antibody of a tetravalent symmetric structure was PR003568 containing two polypeptide chains, wherein the long chain had an amino acid sequence set forth in SEQ ID NO: 333, and the short chain had an amino acid sequence set forth in SEQ ID NO: 330. The prepared bispecific antibody molecule samples were analyzed for physicochemical properties and summarized in Table 11.

TABLE 11

Expression and physicochemical properties of bispecific antibody molecule protein

| Bispecific antibody | Expression system and volume | Yield (mg/L) after first purification | HPLC-SEC purity (%) |
|---|---|---|---|
| PR003568 | HEK293-F (30 mL) | 26.5 | 100% |
| PR003568 | Expi-CHO (1000 mL) | 177 | >90% |

Example 9. Binding of CD73×PD-1 Bispecific Antibody to Cells Overexpressing Human PD-1 or Human CD73 (FACS)

In order to investigate the binding activity of the CD73× PD-1 bispecific antibody to human CD73 and PD-1, the binding assay at the cellular level was performed using a CHO-K1 cell strain overexpressing human CD73 or PD-1 (CHO-K1-hCD73 or CHO-K1-hPD-1). Briefly, the CHO-K1-hCD73 and CHO-K1-hPD-1 cells were digested and resuspended in an F-12K complete medium, and the cell density was adjusted to $1×10^6$ cells/mL. The cells were seeded in a 96-well V-bottom plate (Corning, #3894) at 100 µL/well, followed by the addition at 100 µL/well and centrifugation at 500 g at 4° C. for 5 min, and then the supernatant was discarded. Antibodies were 3-fold diluted to a maximum final concentration of 50 nM, and a total of 8 concentrations were set. 100 µL of the diluted antibodies was added to each well, and the cells were incubated at 4° C. for 1 h away from light. Thereafter, the cells in each well were rinsed twice with 100 µL of pre-cooled PBS, and centrifuged at 500 g at 4° C. for 5 min, and then the supernatant was discarded. Then 100 µL of a fluorescent secondary antibody (goat anti-human IgG (H+L) secondary antibody, Alexa Fluor® 488 conjugate, Invitrogen, Cat #A11013, 1:1000) was added to each well. The plate was incubated away from light at 4° C. for 30 min. The cells in each well were rinsed twice with 200 µL of pre-cooled PBS, and centrifuged at 500 g at 4° C. for 5 min, and then the supernatant was discarded. Finally, the cells in each well were resuspended in 200 µL of pre-cooled PBS, and the fluorescence signal values were read using a BD FACS CANTOII.

Figure 11:
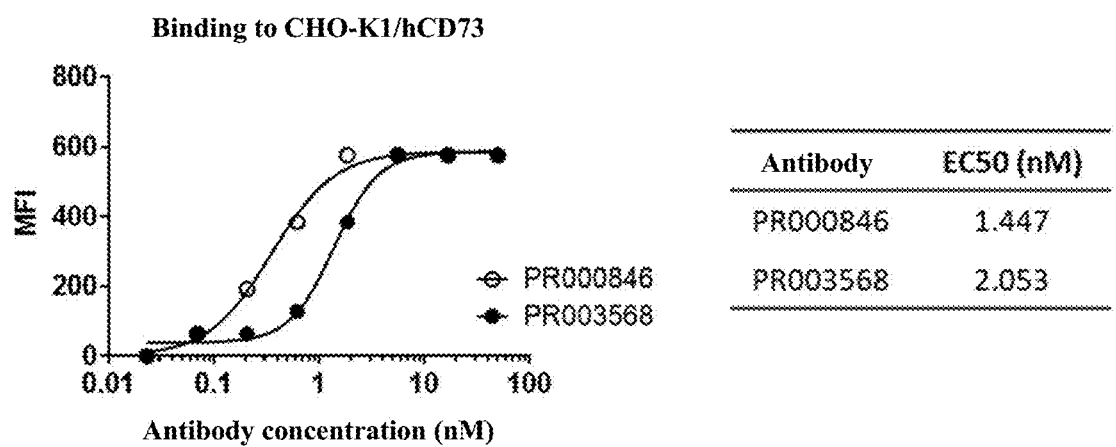
FIG. 11 shows the binding activity of the fusion protein PR003568 described herein to human CD73 cells expressed on CHO-K 1 cells.
Figure 12:
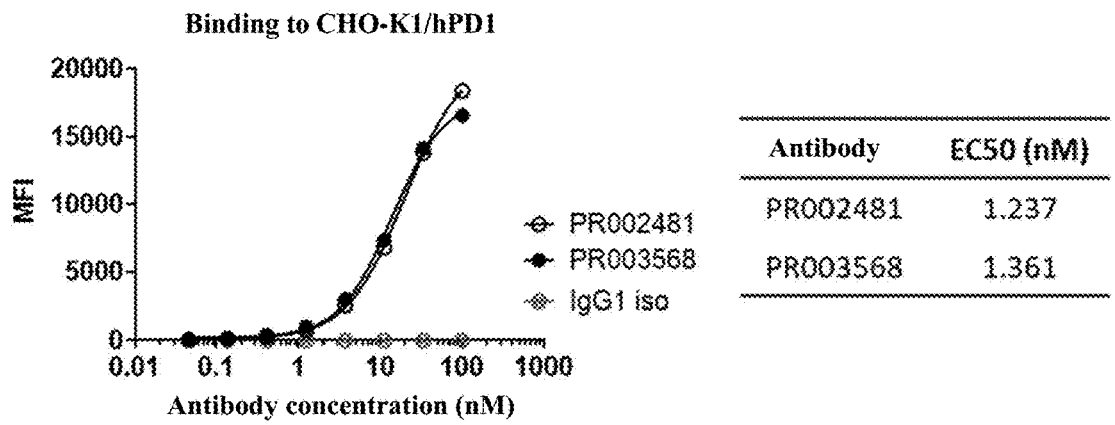
FIG. 12 shows the binding activity of the fusion protein PR003568 described herein to human PD-1 cells expressed on CHO-K 1 cells.

As shown in FIGS. 11 and 12, PR003568 had good binding activity to CD73 and PD-1. The activity of the PD-1 end of the bispecific antibody PR003568 was consistent with that of the parent monoclonal antibody PR002481, and the activity of its CD73 end was slightly reduced as compared with that of the parent monoclonal antibody PR000846.

Example 10. Inhibition of Enzymatic Activity of CD73 by CD73×PD-1 Bispecific Antibody The activity of soluble recombinant CD73 was determined using the malachite green method. First, a 384-well plate (Corning, #3799) was added with 12.5 µL of 1 nM recombinant CD73 and 12.5 µL of 1 nM antibody (the experimental buffer was 25 mM Tris (pH 7.5), 5 mM $MgCl_2$ and 0.005% Tween-20), and incubated at room temperature for 1 h. 25 µL of AMP (with a maximum concentration of 200 µM, 2-fold diluted with experimental buffer to 8 concentrations) was added, and the plate was incubated at room temperature for 15 min. The concentration of inorganic phosphate in each well was determined by the malachite green method according to the manufacturer's instructions. After the determination was completed, the absorbance values at 620 nm were recorded using a Molecular Devices plate reader (SPECTRAMax plus384). The experimental results were analyzed and plotted using GraphPad Prism 8.0.

Figure 13:
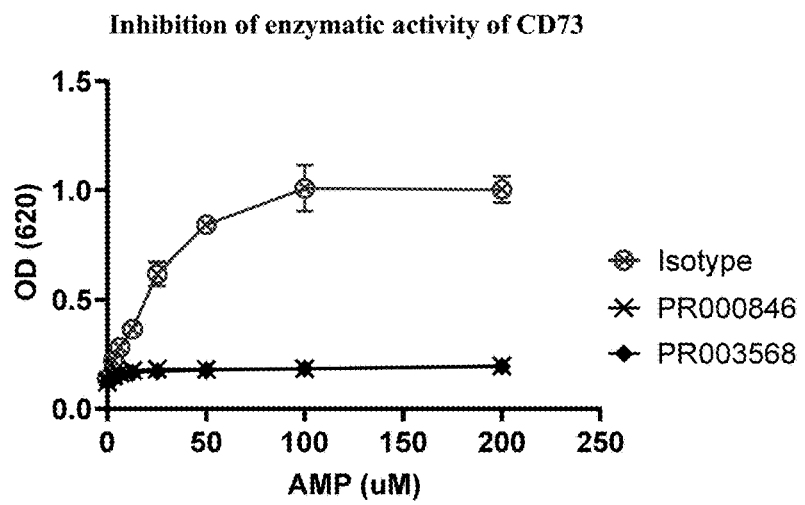
FIG. 13 shows the inhibition of the enzymatic activity of CD73 by the fusion protein PR003568 described herein.

As shown in FIG. 13, PR003568 had good activity in inhibiting the enzymatic activity of CD73, which was comparable to that of the parent monoclonal antibody PR000846.

Example 11. Inhibition of PD-1 Signaling Pathway by CD73×PD-1 Bispecific Antibody as Detected Using Reporter Gene Cell Line HEK293T (eBioscience) cells expressing PD-L1 and OS8 (CD3 single-chain antibody transmembrane protein) were plated on a 96-well plate at $1.25×10^4$ cells/well, 100 µL/well. The cells were incubated at 37° C. with 5% $CO_2$ overnight. The supernatant was removed, and a dilution of the test antigen-binding protein was added at 50 µL/well. The initial concentration was 100 nM, and 5-fold dilution was performed. hIgG1 was used as a control group. Jurkat reporter cells capable of constantly expressing PD-1 and NFAT-luciferase reporter genes (UPharm) were added at $5×10^4$ cells/well, 50 µL/well. The cells were incubated at 37° C. with 5% $CO_2$ for 6 h. ONE-Glo™ luciferase reagent (Promega, Cat#: E6110) was added. The cells were incubated at room temperature for 5 min, and the luminescence values were measured using a microplate reader.

Figure 14:
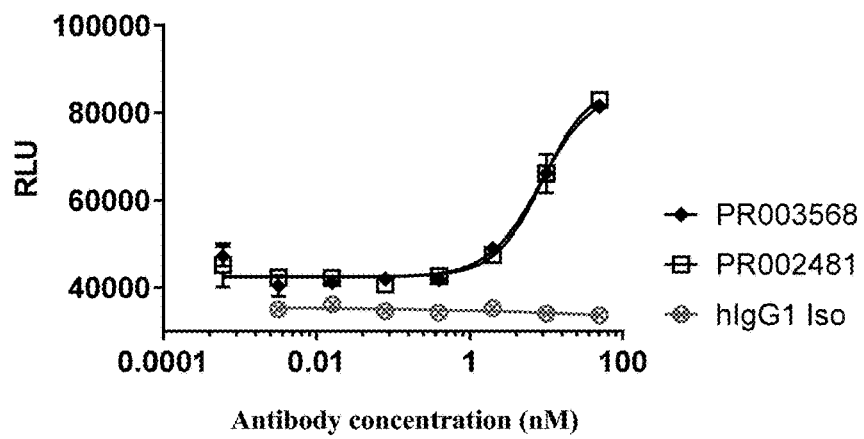
FIG. 14 shows the inhibition of the PD-1 signaling pathway by the fusion protein PR003568 described herein (as detected by using reporter gene cell line).

As shown in FIG. 14, PR003568 had good inhibitory effect on the PD-1 signaling pathway, and had comparable activity to that of the parent monoclonal antibody PR002481.

Example 12. Activation of T Cells by Bispecific Antibody in Mixed Lymphocyte Reaction Assay AllCells PBMC cells were purchased, monocytes cells were isolated, and recombinant human interleukin 4 (IL-4) (R&D, #204-GMP) and human GM-CSF (R&D, #215-GM/CF) were added. After 6 days of induction, immature human CD14+ dendritic cells (iDC cells) were obtained. 1 µg/mL lipopolysaccharide (LPS; Sigma, #L2630) was then added, and after 24 h of induction, mature dendritic cells (mDC cells) were obtained. T lymphocytes were isolated from PBMC cells of a second donor using a T cell isolation kit (StemCell, #17951). T lymphocytes and mDC cells were seeded in a 96-well plate (T lymphocytes at $1×10^5$ cells/well and mDC cells at $1×10^4$ cells/well) at a ratio of 10:1. The antigen-binding proteins and the negative and positive control antibodies were each added at 10 µg/mL, and 10-fold or corresponding-fold dilution was performed. The cells were incubated in an incubator at 37° C. with 5% $CO_2$ for 5 days. Supernatants on day 3 and on day 5 were collected and assayed for the secretion of IL-2 (ThermoFisher, #88-7025-88) and IFN-γ (ThermoFisher, #88-7316-88), respectively, using an ELISA kit.

Figure 15A:
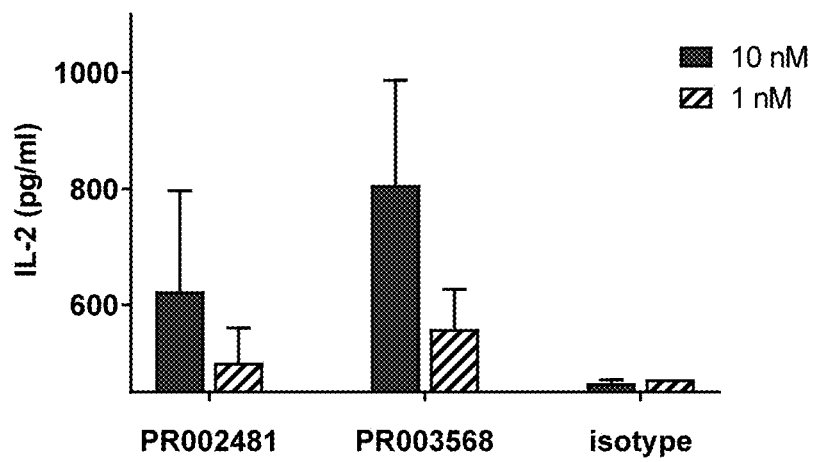
FIGS. 15A and 15B show the ability of the fusion proteins described herein to activate cytokine secretion from T cells (mixed lymphocyte reaction experiments).
Figure 15B:
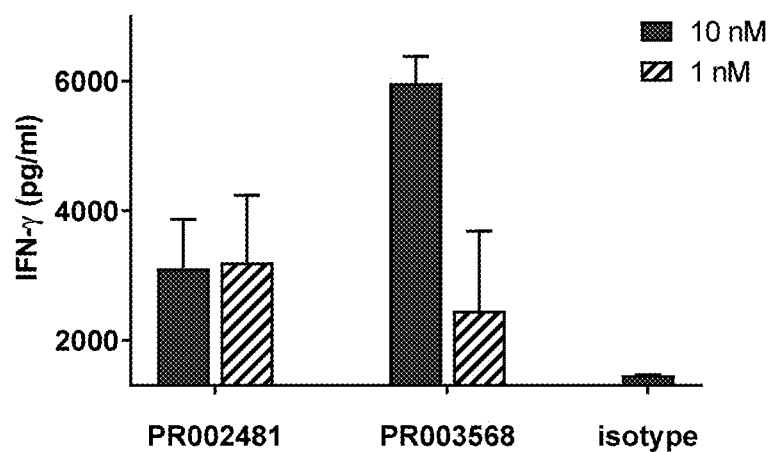

As shown in FIGS. 15A and 15B, the MLR activity of the CD73×PD-1 bispecific antibody PR003568 was superior to that of the PD-1 monoclonal antibody PR002481.

The invention claimed is:

1. An isolated antigen-binding protein, comprising an antibody heavy chain or a fragment thereof, wherein the antibody heavy chain or the fragment thereof comprises a heavy chain variable region (VH), the VH comprising an HCDR1, an HCDR2 and an HCDR3, wherein the HCDR1, HCDR2 and HCDR3 comprise the amino acid sequences as set forth in any one of the following groups:

(1) HCDR1:, SEQ ID NO: 18
HCDR2:, SEQ ID NO: 58
and
HCDR3:; SEQ ID NO: 100

(2) HCDR1:, SEQ ID NO: 34
HCDR2:, SEQ ID NO: 65
and
HCDR3:; SEQ ID NO: 111

(3) HCDR1:, SEQ ID NO: 35
HCDR2:, SEQ ID NO: 64
and
HCDR3:; SEQ ID NO: 111

(4) HCDR1:, SEQ ID NO: 37
HCDR2:, SEQ ID NO: 64
and
HCDR3:; SEQ ID NO: 111

(5) HCDR1:, SEQ ID NO: 38
HCDR2:, SEQ ID NO: 64
and
HCDR3:; SEQ ID NO: 111

(6) HCDR1:, SEQ ID NO: 25
HCDR2:, SEQ ID NO: 66
and
HCDR3:; SEQ ID NO: 108

(7) HCDR1:, SEQ ID NO: 25
HCDR2:, SEQ ID NO: 65
and
HCDR3:; SEQ ID NO: 108

(8) HCDR1:, SEQ ID NO: 25
HCDR2:, SEQ ID NO: 65
and
HCDR3:; SEQ ID NO: 111

(9) HCDR1:, SEQ ID NO: 18
HCDR2:, SEQ ID NO: 64
and
HCDR3:; SEQ ID NO: 108

(10) HCDR1:, SEQ ID NO: 18
HCDR2:, SEQ ID NO: 64
and
HCDR3:; SEQ ID NO: 111

(11) HCDR1:, SEQ ID NO: 36
HCDR2:, SEQ ID NO: 64
and
HCDR3:; SEQ ID NO: 111

(12) HCDR1:, SEQ ID NO: 36
HCDR2:, SEQ ID NO: 64
and
HCDR3:; SEQ ID NO: 112

(13) HCDR1:, SEQ ID NO: 28
HCDR2:, SEQ ID NO: 64
and
HCDR3:; SEQ ID NO: 111

(14) HCDR1:, SEQ ID NO: 18
HCDR2:, SEQ ID NO: 57
and
HCDR3:; SEQ ID NO: 100

(15) HCDR1:, SEQ ID NO: 18
HCDR2:, SEQ ID NO: 57
and

-continued

(16) HCDR1:, SEQ ID NO: 19
HCDR2:, SEQ ID NO: 57
and
HCDR3:; SEQ ID NO: 99

(17) HCDR1:, SEQ ID NO: 18
HCDR2:, SEQ ID NO: 57
and
HCDR3:; SEQ ID NO: 101

(18) HCDR1:, SEQ ID NO: 20
HCDR2:, SEQ ID NO: 60
and
HCDR3:; SEQ ID NO: 103

(19) HCDR1:, SEQ ID NO: 20
HCDR2:, SEQ ID NO: 59
and
HCDR3:; SEQ ID NO: 103

(20) HCDR1:, SEQ ID NO: 20
HCDR2:, SEQ ID NO: 61
and
HCDR3:; SEQ ID NO: 103

(21) HCDR1:, SEQ ID NO: 21
HCDR2:, SEQ ID NO: 60
and
HCDR3:; SEQ ID NO: 103

(22) HCDR1:, SEQ ID NO: 21
HCDR2:, SEQ ID NO: 59
and
HCDR3:; SEQ ID NO: 103

(23) HCDR1:, SEQ ID NO: 21
HCDR2:, SEQ ID NO: 61
and

-continued

HCDR3:; SEQ ID NO: 103

(24) HCDR1:, SEQ ID NO: 20
HCDR2:, SEQ ID NO: 58
and
HCDR3:; SEQ ID NO: 100

(25) HCDR1:, SEQ ID NO: 18
HCDR2:, SEQ ID NO: 58
and
HCDR3:; SEQ ID NO: 104

(26) HCDR1:, SEQ ID NO: 18
HCDR2:, SEQ ID NO: 58
and
HCDR3:; SEQ ID NO: 105

(27) HCDR1:, SEQ ID NO: 21
HCDR2:, SEQ ID NO: 58
and
HCDR3:; SEQ ID NO: 100

(28) HCDR1:, SEQ ID NO: 22
HCDR2:, SEQ ID NO: 58
and
HCDR3:; SEQ ID NO: 100

(29) HCDR1:, SEQ ID NO: 18
HCDR2:, SEQ ID NO: 58
and
HCDR3:; SEQ ID NO: 106

(30) HCDR1:, SEQ ID NO: 18
HCDR2:, SEQ ID NO: 58
and
HCDR3:; SEQ ID NO: 107

(31) HCDR1:, SEQ ID NO: 18
HCDR2:, SEQ ID NO: 58
and

-continued

(32) HCDR1:, SEQ ID NO: 18
HCDR2:, SEQ ID NO: 62
and
HCDR3:; SEQ ID NO: 100

(33) HCDR1:, SEQ ID NO: 18
HCDR2:, SEQ ID NO: 61
and
HCDR3:; SEQ ID NO: 100

(34) HCDR1:, SEQ ID NO: 18
HCDR2:, SEQ ID NO: 59
and
HCDR3:; SEQ ID NO: 100

(35) HCDR1:, SEQ ID NO: 18
HCDR2:, SEQ ID NO: 60
and
HCDR3:; SEQ ID NO: 100

(36) HCDR1:, SEQ ID NO: 18
HCDR2:, SEQ ID NO: 63
and
HCDR3:; SEQ ID NO: 100

(37) HCDR1:, SEQ ID NO: 23
HCDR2:, SEQ ID NO: 64
and
HCDR3:; SEQ ID NO: 108

(38) HCDR1:, SEQ ID NO: 24
HCDR2:, SEQ ID NO: 65
and
HCDR3:; SEQ ID NO: 108

(39) HCDR1:, SEQ ID NO: 26
HCDR2:, SEQ ID NO: 64
and

-continued

HCDR3:; SEQ ID NO: 108

(40) HCDR1:, SEQ ID NO: 25
HCDR2:, SEQ ID NO: 66
and
HCDR3:; SEQ ID NO: 108

(41) HCDR1:, SEQ ID NO: 25
HCDR2:, SEQ ID NO: 65
and
HCDR3:; SEQ ID NO: 108

(42) HCDR1:, SEQ ID NO: 26
HCDR2:, SEQ ID NO: 67
and
HCDR3:; SEQ ID NO: 109

(43) HCDR1:, SEQ ID NO: 27
HCDR2:, SEQ ID NO: 64
and
HCDR3:; SEQ ID NO: 110

(44) HCDR1:, SEQ ID NO: 18
HCDR2:, SEQ ID NO: 64
and
HCDR3:; SEQ ID NO: 108

(45) HCDR1:, SEQ ID NO: 28
HCDR2:, SEQ ID NO: 64
and
HCDR3:; SEQ ID NO: 111

(46) HCDR1:, SEQ ID NO: 18
HCDR2:, SEQ ID NO: 66
and
HCDR3:; SEQ ID NO: 111

(47) HCDR1:, SEQ ID NO: 23
HCDR2:, SEQ ID NO: 68
and

-continued

(48) HCDR1:, SEQ ID NO: 18
HCDR2:, SEQ ID NO: 64
and
HCDR3:. SEQ ID NO: 111

(49) HCDR1:, SEQ ID NO: 18
HCDR2:, SEQ ID NO: 66
and
HCDR3:; SEQ ID NO: 109

(50) HCDR1:, SEQ ID NO: 30
HCDR2:, SEQ ID NO: 64
and
HCDR3:; SEQ ID NO: 111

(51) HCDR1:, SEQ ID NO: 29
HCDR2:, SEQ ID NO: 66
and
HCDR3:; SEQ ID NO: 111

(52) HCDR1:, SEQ ID NO: 23
HCDR2:, SEQ ID NO: 68
and
HCDR3:; SEQ ID NO: 111

(53) HCDR1:, SEQ ID NO: 29
HCDR2:, SEQ ID NO: 65
and
HCDR3:; SEQ ID NO: 111

(54) HCDR1:, SEQ ID NO: 30
HCDR2:, SEQ ID NO: 64
and
HCDR3:; SEQ ID NO: 109

(55) HCDR1:, SEQ ID NO: 31
HCDR2:, SEQ ID NO: 64

-continued and
HCDR3:; SEQ ID NO: 111

(56) HCDR1:, SEQ ID NO: 23
HCDR2:, SEQ ID NO: 66
and
HCDR3:; SEQ ID NO: 111

(57) HCDR1:, SEQ ID NO: 23
HCDR2:, SEQ ID NO: 64
and
HCDR3:; SEQ ID NO: 111

(58) HCDR1:, SEQ ID NO: 32
HCDR2:, SEQ ID NO: 64
and
HCDR3:; SEQ ID NO: 109

(59) HCDR1:, SEQ ID NO: 23
HCDR2:, SEQ ID NO: 66
and
HCDR3:; SEQ ID NO: 109

(60) HCDR1:, SEQ ID NO: 33
HCDR2:, SEQ ID NO: 65
and
HCDR3: SEQ ID NO: 111.

2. The isolated antigen-binding protein according to claim 1, comprising an antibody or an antigen-binding fragment thereof.

3. The isolated antigen-binding protein according to claim 1, wherein the antigen-binding fragment comprises VHH, a heavy-chain antibody (HCAb), or dAb.

4. The isolated antigen-binding protein according to claim 1, wherein the antigen-binding fragment is a heavy-chain antibody (HCAb).

5. The isolated antigen-binding protein according to claim 1, wherein the antibody is selected from the group consisting of a monoclonal antibody, a chimeric antibody, a humanized antibody and a fully human antibody.

6. The isolated antigen-binding protein according to claim 1, wherein the VH comprises the amino acid sequence set forth in any one of SEQ ID NOs: 168, 223-224, 228-229, 196, 197, 200, 201, 202 and 222-230160-166, 169-222, 225-227 and 230.

7. The isolated antigen-binding protein according to claim 1, comprising the antibody heavy chain, wherein the antibody heavy chain comprises an amino acid sequence set forth in any one of SEQ ID NOs: 255, 313, 316, 321, 323, 264-312, 314-315, 317-320 and 322.

8. An isolated antigen-binding protein, comprising an antibody heavy chain, wherein the antibody heavy chain comprises the amino acid sequence set forth in SEQ ID NO: 255.

9. The isolated antigen-binding protein according to claim 1, wherein the isolated antigen-binding protein has one or more of the following properties:
   a) being capable of binding to human PD-1 with a KD value of $1 \times 10^8$ M or less;
   b) being capable of blocking the binding of PD-1 to PD-L1; b)
   c) being capable of blocking the binding of PD-1 to PD-L2; c)
   d) being capable of stimulating the secretion of IL-2 and/or IFN-γ in immune cells; d) and
   e) being capable of inhibiting tumor growth and/or tumor cell proliferation.

10. A fusion protein, comprising a first targeting moiety and a second targeting moiety, wherein the first targeting moiety comprises a PD-1 binding moiety, and the PD-1 binding moiety comprises the isolated antigen-binding protein according to claim 1.

11. The fusion protein according to claim 10, wherein the second targeting moiety comprises a CD73 binding moiety.

12. The fusion protein according to claim 11, wherein the CD73 binding moiety comprises an antibody heavy chain or a fragment thereof, wherein the antibody heavy chain or the fragment thereof comprises an HCDR1, an HCDR2 and an HCDR3, and the HCDR1, HCDR2 and HCDR3 comprise the amino acid sequences set forth in SEQ ID NO: 17, SEQ ID NO: 56 and SEQ ID NO: 98, respectively; the CD73 binding moiety comprises an antibody light chain or a fragment thereof, wherein the antibody light chain or the fragment thereof comprises an LCDR1, an LCDR2 and an LCDR3, and the LCDR1, LCDR2 and LCDR3 comprise the amino acid sequences set forth in SEQ ID NO: 123, SEQ ID NO: 130 and SEQ ID NO: 146, respectively.

13. An immunoconjugate, comprising the isolated antigen-binding protein according to claim 1.

14. One or more isolated nucleic acid molecules encoding the isolated antigen-binding protein according to claim 1.

15. A vector, comprising a nucleic acid molecule according to claim 14.

16. A pharmaceutical composition, comprising the isolated antigen-binding protein according to claim 1, and a pharmaceutically acceptable carrier.

17. A kit or an administration device, comprising the isolated antigen-binding protein according to claim 1.

18. A method for ameliorating or treating a PD-1-mediated disease or disorder, comprising administering to a subject in need thereof the isolated antigen-binding protein according to claim 1.

19. The method according to claim 18, wherein the isolated antigen-binding protein is administered to the subject in combination with one or more other tumor treatment methods.

20. The method according to claim 18, wherein the PD-1-mediated disease or disorder comprises a tumor, an autoimmune disease or inflammation.

21. The method according to claim 20, wherein the tumor comprises a solid tumor and/or a non-solid tumor.

22. The method according to claim 20,
   wherein the tumor is lung cancer, liver cancer, melanoma, urothelial cancer, head and neck squamous cell carcinomas, lymphoma, gastric cancer or esophageal cancer.

23. A method for increasing T cell activity in a subject, comprising administering to a subject in need thereof an effective amount of the isolated antigen-binding protein according to claim 1.

24. A method for treating a PD-1-mediated disease or disorder, comprising administering to a subject in need thereof the isolated antigen-binding protein according to claim 8.

* * * * *

SEQUENCE LISTING

<160> NUMBER OF SEQ ID NOS: 369

<210> SEQ ID NO 1
<211> LENGTH: 25
<212> TYPE: PRT
<213> ORGANISM: Artificial Sequence
<220> FEATURE:
<223> OTHER INFORMATION: PR000673|VH|HFWR1; PR000680|VH|HFWR1

<400> SEQUENCE: 1

Gln Val Gln Leu Val Glu Ser Gly Gly Gly Val Val Gln Pro Gly Arg
1               5                   10                  15

Ser Leu Arg Leu Ser Cys Ala Ala Ser
            20                  25

<210> SEQ ID NO 2
<211> LENGTH: 25
<212> TYPE: PRT
<213> ORGANISM: Artificial Sequence
<220> FEATURE:
<223> OTHER INFORMATION: PR000674|VH|HFWR1

<400> SEQUENCE: 2

Gln Val Gln Leu Val Glu Ser Gly Gly Gly Val Val Gln Pro Gly Lys
1               5                   10                  15

Ser Leu Arg Leu Ser Cys Thr Val Ser
            20                  25

<210> SEQ ID NO 3
<211> LENGTH: 25
<212> TYPE: PRT
<213> ORGANISM: Artificial Sequence
<220> FEATURE:
<223> OTHER INFORMATION: PR000675|VH|HFWR1

<400> SEQUENCE: 3

Glu Val Gln Leu Leu Glu Ser Gly Gly Gly Leu Val Gln Pro Gly Gly
1               5                   10                  15

Ser Leu Arg Leu Ser Cys Val Asp Ser
            20                  25

<210> SEQ ID NO 4
<211> LENGTH: 25
<212> TYPE: PRT
<213> ORGANISM: Artificial Sequence
<220> FEATURE:
<223> OTHER INFORMATION: PR000676|VH|HFWR1

<400> SEQUENCE: 4

Gln Ile Gln Leu Val Glu Ser Gly Gly Gly Val Val Gln Pro Gly Arg
1               5                   10                  15

Ser Leu Arg Leu Ser Cys Ala Ala Ser
            20                  25

<210> SEQ ID NO 5
<211> LENGTH: 25
<212> TYPE: PRT
<213> ORGANISM: Artificial Sequence
<220> FEATURE:
<223> OTHER INFORMATION: PR000677|VH|HFWR1

<400> SEQUENCE: 5

Gln Val Gln Leu Gln Gln Ser Gly Pro Gly Leu Val Lys Pro Ser Gln
1               5                   10                  15

```
Thr Leu Ser Leu Thr Cys Ala Ile Ser
            20                  25

<210> SEQ ID NO 6
<211> LENGTH: 25
<212> TYPE: PRT
<213> ORGANISM: Artificial Sequence
<220> FEATURE:
<223> OTHER INFORMATION: PR000678|VH|HFWR1

<400> SEQUENCE: 6

Gln Val Gln Leu Val Glu Ser Gly Gly Gly Val Val Gln Pro Gly Arg
1               5                   10                  15

Ser Leu Arg Leu Ser Cys Ala Val Ser
            20                  25

<210> SEQ ID NO 7
<211> LENGTH: 25
<212> TYPE: PRT
<213> ORGANISM: Artificial Sequence
<220> FEATURE:
<223> OTHER INFORMATION: PR000679|VH|HFWR1

<400> SEQUENCE: 7

Gln Val Gln Leu Val Gln Ser Gly Thr Glu Val Lys Lys Pro Gly Ser
1               5                   10                  15

Ser Val Lys Val Ser Cys Lys Ala Ser
            20                  25

<210> SEQ ID NO 8
<211> LENGTH: 25
<212> TYPE: PRT
<213> ORGANISM: Artificial Sequence
<220> FEATURE:
<223> OTHER INFORMATION: PR000846|VH|HFWR1

<400> SEQUENCE: 8

Gln Val Gln Leu Val Glu Ser Gly Gly Gly Val Ala Gln Pro Gly Arg
1               5                   10                  15

Ser Leu Ser Leu Ser Cys Ala Ala Ser
            20                  25

<210> SEQ ID NO 9
<211> LENGTH: 25
<212> TYPE: PRT
<213> ORGANISM: Artificial Sequence
<220> FEATURE:
<223> OTHER INFORMATION: PR002473|VH|HFWR1; PR002474|VH|HFWR1;
      PR002475|VH|HFWR1; PR002476|VH|HFWR1;
      PR002477|VH|HFWR1; PR002478|VH|HFWR1;
      PR002479|VH|HFWR1; PR002481|VH|HFWR1;
      PR005082|VH|HFWR1; PR005083|VH|HFWR1;
      PR005084|VH|HFWR1; PR005085|VH|HFWR1;
      PR005086|VH|HFWR1; PR005087|VH|HFWR1;
      PR005088|VH|HFWR1; PR005089|VH|HFWR1;
      PR005090|VH|HFWR1; PR005091|VH|HFWR1;
      PR005092|VH|HFWR1; PR005093|VH|HFWR1;
      PR005094|VH|HFWR1; PR005095|VH|HFWR1;
      PR005096|VH|HFWR1; PR005097|VH|HFWR1;
      PR005098|VH|HFWR1; PR005099|VH|HFWR1;
      PR005100|VH|HFWR1; PR005101|VH|HFWR1;
      PR005102|VH|HFWR1; PR005103|VH|HFWR1;
      PR005104|VH|HFWR1; PR005139|VH|HFWR1;
      PR005140|VH|HFWR1; PR005141|VH|HFWR1;
      PR005142|VH|HFWR1; PR005143|VH|HFWR1;
      PR005144|VH|HFWR1; PR005145|VH|HFWR1;
      PR005146|VH|HFWR1; PR005147|VH|HFWR1;
      PR005148|VH|HFWR1; PR005149|VH|HFWR1;
      PR005150|VH|HFWR1; PR005151|VH|HFWR1;
```

```
            PR005152|VH|HFWR1; PR005153|VH|HFWR1;
            PR005154|VH|HFWR1; PR005155|VH|HFWR1;
            PR005156|VH|HFWR1; PR005157|VH|HFWR1;
            PR005158|VH|HFWR1; PR005159|VH|HFWR1;
            PR005160|VH|HFWR1; PR005161|VH|HFWR1;
            PR005162|VH|HFWR1; PR005163|VH|HFWR1;
            PR005164|VH|HFWR1; PR005165|VH|HFWR1;
            PR005166|VH|HFWR1; PR005167|VH|HFWR1;
            PR005168|VH|HFWR1; PR005169|VH|HFWR1;
            PR005569|VH|HFWR1; PR005570|VH|HFWR1;
            PR005571|VH|HFWR1; PR005572|VH|HFWR1;
            PR005573|VH|HFWR1; PR005574|VH|HFWR1;
            PR005575|VH|HFWR1; PR005577|VH|HFWR1;
            PR005578|VH|HFWR1; PR005581|VH|HFWR1;
            PR005582|VH|HFWR1; PR005583|VH|HFWR1;
            PR005584|VH|HFWR1; PR005585|VH|HFWR1

<400> SEQUENCE: 9

Glu Val Gln Leu Val Glu Thr Gly Gly Gly Leu Ile Gln Pro Gly Gly
1               5                   10                  15

Ser Leu Arg Leu Ser Cys Ala Ala Ser
            20                  25

<210> SEQ ID NO 10
<211> LENGTH: 7
<212> TYPE: PRT
<213> ORGANISM: Artificial Sequence
<220> FEATURE:
<223> OTHER INFORMATION: HCAb VH CDR1 General Formula 2
<220> FEATURE:
<221> NAME/KEY: misc_feature
<222> LOCATION: (3)..(3)
<223> OTHER INFORMATION: Xaa = Asn or Thr
<220> FEATURE:
<221> NAME/KEY: misc_feature
<222> LOCATION: (5)..(5)
<223> OTHER INFORMATION: Xaa = Ala or Ser
<220> FEATURE:
<221> NAME/KEY: misc_feature
<222> LOCATION: (6)..(6)
<223> OTHER INFORMATION: Xaa = Phe or Ser
<220> FEATURE:
<221> NAME/KEY: misc_feature
<222> LOCATION: (7)..(7)
<223> OTHER INFORMATION: Xaa = Phe, His or Tyr

<400> SEQUENCE: 10

Gly Phe Xaa Val Xaa Xaa Xaa
1               5

<210> SEQ ID NO 11
<211> LENGTH: 7
<212> TYPE: PRT
<213> ORGANISM: Artificial Sequence
<220> FEATURE:
<223> OTHER INFORMATION: PR000673|VH|HCDR1; PR000680|VH|HCDR1

<400> SEQUENCE: 11

Gly Phe Ile Phe Ser Asn Tyr
1               5

<210> SEQ ID NO 12
<211> LENGTH: 7
<212> TYPE: PRT
<213> ORGANISM: Artificial Sequence
<220> FEATURE:
<223> OTHER INFORMATION: PR000674|VH|HCDR1; PR000678|VH|HCDR1

<400> SEQUENCE: 12

Gly Leu Thr Phe Ser Asp Asn
1               5
```

```
<210> SEQ ID NO 13
<211> LENGTH: 7
<212> TYPE: PRT
<213> ORGANISM: Artificial Sequence
<220> FEATURE:
<223> OTHER INFORMATION: PR000675|VH|HCDR1; PR002480|VH|HCDR1

<400> SEQUENCE: 13

Gly Phe Thr Phe Ser Ser Tyr
1               5

<210> SEQ ID NO 14
<211> LENGTH: 7
<212> TYPE: PRT
<213> ORGANISM: Artificial Sequence
<220> FEATURE:
<223> OTHER INFORMATION: PR000676|VH|HCDR1

<400> SEQUENCE: 14

Gly Phe Thr Leu Ser Ser Tyr
1               5

<210> SEQ ID NO 15
<211> LENGTH: 9
<212> TYPE: PRT
<213> ORGANISM: Artificial Sequence
<220> FEATURE:
<223> OTHER INFORMATION: PR000677|VH|HCDR1

<400> SEQUENCE: 15

Gly Asp Ser Val Ser Ser Asn Ser Ala
1               5

<210> SEQ ID NO 16
<211> LENGTH: 7
<212> TYPE: PRT
<213> ORGANISM: Artificial Sequence
<220> FEATURE:
<223> OTHER INFORMATION: PR000679|VH|HCDR1

<400> SEQUENCE: 16

Gly Gly Thr Phe Ser Ser Tyr
1               5

<210> SEQ ID NO 17
<211> LENGTH: 7
<212> TYPE: PRT
<213> ORGANISM: Artificial Sequence
<220> FEATURE:
<223> OTHER INFORMATION: PR000846|VH|HCDR1

<400> SEQUENCE: 17

Gly Phe Thr Phe Ser Asp Tyr
1               5

<210> SEQ ID NO 18
<211> LENGTH: 7
<212> TYPE: PRT
<213> ORGANISM: Artificial Sequence
<220> FEATURE:
<223> OTHER INFORMATION: PR002473|VH|HCDR1; PR002474|VH|HCDR1;
      PR002476|VH|HCDR1; PR002477|VH|HCDR1;
      PR002479|VH|HCDR1; PR002481|VH|HCDR1;
      PR005090|VH|HCDR1; PR005092|VH|HCDR1;
      PR005093|VH|HCDR1; PR005096|VH|HCDR1;
      PR005097|VH|HCDR1; PR005098|VH|HCDR1;
      PR005099|VH|HCDR1; PR005100|VH|HCDR1;
```

```
                PR005101|VH|HCDR1; PR005102|VH|HCDR1;
                PR005103|VH|HCDR1; PR005104|VH|HCDR1;
                PR005148|VH|HCDR1; PR005149|VH|HCDR1;
                PR005151|VH|HCDR1; PR005153|VH|HCDR1;
                PR005154|VH|HCDR1; PR005573|VH|HCDR1;
                PR005574|VH|HCDR1

<400> SEQUENCE: 18

Gly Phe Asn Val Ser Ser His
1               5

<210> SEQ ID NO 19
<211> LENGTH: 7
<212> TYPE: PRT
<213> ORGANISM: Artificial Sequence
<220> FEATURE:
<223> OTHER INFORMATION: PR002475|VH|HCDR1; PR002478|VH|HCDR1

<400> SEQUENCE: 19

Gly Phe Asn Val Ser Ser Asn
1               5

<210> SEQ ID NO 20
<211> LENGTH: 7
<212> TYPE: PRT
<213> ORGANISM: Artificial Sequence
<220> FEATURE:
<223> OTHER INFORMATION: PR005082|VH|HCDR1; PR005083|VH|HCDR1;
      PR005084|VH|HCDR1; PR005085|VH|HCDR1;
      PR005091|VH|HCDR1

<400> SEQUENCE: 20

Gly Phe Ala Val Asp Arg Tyr
1               5

<210> SEQ ID NO 21
<211> LENGTH: 7
<212> TYPE: PRT
<213> ORGANISM: Artificial Sequence
<220> FEATURE:
<223> OTHER INFORMATION: PR005086|VH|HCDR1; PR005087|VH|HCDR1;
      PR005088|VH|HCDR1; PR005089|VH|HCDR1;
      PR005094|VH|HCDR1

<400> SEQUENCE: 21

Gly Phe Ser Val Val Gly His
1               5

<210> SEQ ID NO 22
<211> LENGTH: 7
<212> TYPE: PRT
<213> ORGANISM: Artificial Sequence
<220> FEATURE:
<223> OTHER INFORMATION: PR005095|VH|HCDR1

<400> SEQUENCE: 22

Gly Phe Phe Val Arg Ser His
1               5

<210> SEQ ID NO 23
<211> LENGTH: 7
<212> TYPE: PRT
<213> ORGANISM: Artificial Sequence
<220> FEATURE:
<223> OTHER INFORMATION: PR005139|VH|HCDR1; PR005140|VH|HCDR1;
      PR005152|VH|HCDR1; PR005158|VH|HCDR1;
      PR005159|VH|HCDR1; PR005161|VH|HCDR1;
      PR005163|VH|HCDR1; PR005165|VH|HCDR1;
      PR005166|VH|HCDR1; PR005168|VH|HCDR1
```

```
<400> SEQUENCE: 23

Gly Phe Asn Val Arg Ser His
1               5

<210> SEQ ID NO 24
<211> LENGTH: 7
<212> TYPE: PRT
<213> ORGANISM: Artificial Sequence
<220> FEATURE:
<223> OTHER INFORMATION: PR005141|VH|HCDR1

<400> SEQUENCE: 24

Gly Phe Asn Val Ser Tyr Phe
1               5

<210> SEQ ID NO 25
<211> LENGTH: 7
<212> TYPE: PRT
<213> ORGANISM: Artificial Sequence
<220> FEATURE:
<223> OTHER INFORMATION: PR005142|VH|HCDR1; PR005144|VH|HCDR1;
      PR005145|VH|HCDR1; PR005569|VH|HCDR1; PR005570|VH|HCDR1;
      PR005571|VH|HCDR1

<400> SEQUENCE: 25

Gly Phe Asn Val Ser Phe Tyr
1               5

<210> SEQ ID NO 26
<211> LENGTH: 7
<212> TYPE: PRT
<213> ORGANISM: Artificial Sequence
<220> FEATURE:
<223> OTHER INFORMATION: PR005143|VH|HCDR1; PR005146|VH|HCDR1

<400> SEQUENCE: 26

Gly Phe Asn Val Ser Phe His
1               5

<210> SEQ ID NO 27
<211> LENGTH: 7
<212> TYPE: PRT
<213> ORGANISM: Artificial Sequence
<220> FEATURE:
<223> OTHER INFORMATION: PR005147|VH|HCDR1

<400> SEQUENCE: 27

Gly Phe Asn Val Ser Tyr Tyr
1               5

<210> SEQ ID NO 28
<211> LENGTH: 7
<212> TYPE: PRT
<213> ORGANISM: Artificial Sequence
<220> FEATURE:
<223> OTHER INFORMATION: PR005150|VH|HCDR1; PR005581|VH|HCDR1;
      PR005584|VH|HCDR1

<400> SEQUENCE: 28

Gly Phe Asn Val Ser Ser Phe
1               5

<210> SEQ ID NO 29
<211> LENGTH: 7
<212> TYPE: PRT
<213> ORGANISM: Artificial Sequence
```

```
<220> FEATURE:
<223> OTHER INFORMATION: PR005155|VH|HCDR1; PR005157|VH|HCDR1;
      PR005160|VH|HCDR1

<400> SEQUENCE: 29

Gly Phe Asn Val Arg Phe Tyr
1               5

<210> SEQ ID NO 30
<211> LENGTH: 7
<212> TYPE: PRT
<213> ORGANISM: Artificial Sequence
<220> FEATURE:
<223> OTHER INFORMATION: PR005156|VH|HCDR1; PR005162|VH|HCDR1

<400> SEQUENCE: 30

Gly Phe Asn Val Arg Phe His
1               5

<210> SEQ ID NO 31
<211> LENGTH: 7
<212> TYPE: PRT
<213> ORGANISM: Artificial Sequence
<220> FEATURE:
<223> OTHER INFORMATION: PR005164|VH|HCDR1

<400> SEQUENCE: 31

Gly Phe Asn Val Arg Ser Phe
1               5

<210> SEQ ID NO 32
<211> LENGTH: 7
<212> TYPE: PRT
<213> ORGANISM: Artificial Sequence
<220> FEATURE:
<223> OTHER INFORMATION: PR005167|VH|HCDR1

<400> SEQUENCE: 32

Gly Phe Asn Val Arg Tyr Tyr
1               5

<210> SEQ ID NO 33
<211> LENGTH: 7
<212> TYPE: PRT
<213> ORGANISM: Artificial Sequence
<220> FEATURE:
<223> OTHER INFORMATION: PR005169|VH|HCDR1

<400> SEQUENCE: 33

Gly Phe Asn Val Arg Tyr Phe
1               5

<210> SEQ ID NO 34
<211> LENGTH: 7
<212> TYPE: PRT
<213> ORGANISM: Artificial Sequence
<220> FEATURE:
<223> OTHER INFORMATION: PR005572|VH|HCDR1

<400> SEQUENCE: 34

Gly Phe Asn Val Ala Phe Tyr
1               5

<210> SEQ ID NO 35
<211> LENGTH: 7
<212> TYPE: PRT
<213> ORGANISM: Artificial Sequence
```

```
<220> FEATURE:
<223> OTHER INFORMATION: PR005575|VH|HCDR1

<400> SEQUENCE: 35

Gly Phe Asn Val Ala Ser His
1               5

<210> SEQ ID NO 36
<211> LENGTH: 7
<212> TYPE: PRT
<213> ORGANISM: Artificial Sequence
<220> FEATURE:
<223> OTHER INFORMATION: PR005577|VH|HCDR1; PR005578|VH|HCDR1

<400> SEQUENCE: 36

Gly Phe Asn Val Ala Ser Tyr
1               5

<210> SEQ ID NO 37
<211> LENGTH: 7
<212> TYPE: PRT
<213> ORGANISM: Artificial Sequence
<220> FEATURE:
<223> OTHER INFORMATION: PR005582|VH|HCDR1; PR005583|VH|HCDR1

<400> SEQUENCE: 37

Gly Phe Asn Val Ala Ser Phe
1               5

<210> SEQ ID NO 38
<211> LENGTH: 7
<212> TYPE: PRT
<213> ORGANISM: Artificial Sequence
<220> FEATURE:
<223> OTHER INFORMATION: PR005585|VH|HCDR1

<400> SEQUENCE: 38

Gly Phe Thr Val Ser Ser Phe
1               5

<210> SEQ ID NO 39
<211> LENGTH: 19
<212> TYPE: PRT
<213> ORGANISM: Artificial Sequence
<220> FEATURE:
<223> OTHER INFORMATION: PR000673|VH|HFWR2; PR000676|VH|HFWR2;
      PR000680|VH|HFWR2; PR002480|VH|HFWR2

<400> SEQUENCE: 39

Gly Met His Trp Val Arg Gln Ala Pro Gly Lys Gly Leu Glu Trp Val
1               5                   10                  15

Ala Val Ile

<210> SEQ ID NO 40
<211> LENGTH: 19
<212> TYPE: PRT
<213> ORGANISM: Artificial Sequence
<220> FEATURE:
<223> OTHER INFORMATION: PR000674|VH|HFWR2

<400> SEQUENCE: 40

Gly Met His Trp Val Arg Gln Ala Pro Gly Arg Gly Leu Glu Trp Met
1               5                   10                  15

Ser Val Ile
```

```
<210> SEQ ID NO 41
<211> LENGTH: 19
<212> TYPE: PRT
<213> ORGANISM: Artificial Sequence
<220> FEATURE:
<223> OTHER INFORMATION: PR000675|VH|HFWR2

<400> SEQUENCE: 41

Ala Met Thr Trp Val Arg Gln Ala Pro Gly Lys Gly Leu Glu Trp Val
1               5                   10                  15

Ser Gly Ile

<210> SEQ ID NO 42
<211> LENGTH: 19
<212> TYPE: PRT
<213> ORGANISM: Artificial Sequence
<220> FEATURE:
<223> OTHER INFORMATION: PR000677|VH|HFWR2

<400> SEQUENCE: 42

Ala Trp Asn Trp Ile Arg Gln Ser Pro Ser Arg Gly Leu Glu Trp Leu
1               5                   10                  15

Gly Arg Thr

<210> SEQ ID NO 43
<211> LENGTH: 19
<212> TYPE: PRT
<213> ORGANISM: Artificial Sequence
<220> FEATURE:
<223> OTHER INFORMATION: PR000678|VH|HFWR2

<400> SEQUENCE: 43

Gly Met His Trp Val Arg Gln Ala Pro Gly Arg Gly Leu Glu Trp Met
1               5                   10                  15

Ala Val Ile

<210> SEQ ID NO 44
<211> LENGTH: 19
<212> TYPE: PRT
<213> ORGANISM: Artificial Sequence
<220> FEATURE:
<223> OTHER INFORMATION: PR000679|VH|HFWR2

<400> SEQUENCE: 44

Ala Ile Ser Trp Val Arg Gln Ala Pro Gly Gln Gly Leu Glu Trp Met
1               5                   10                  15

Gly Gly Ile

<210> SEQ ID NO 45
<211> LENGTH: 19
<212> TYPE: PRT
<213> ORGANISM: Artificial Sequence
<220> FEATURE:
<223> OTHER INFORMATION: PR000846|VH|HFWR2

<400> SEQUENCE: 45

Gly Met His Trp Val Arg Gln Ala Pro Gly Lys Gly Leu Glu Trp Val
1               5                   10                  15

Ala Leu Ile

<210> SEQ ID NO 46
<211> LENGTH: 19
<212> TYPE: PRT
<213> ORGANISM: Artificial Sequence
```

```
<220> FEATURE:
<223> OTHER INFORMATION: PR002473|VH|HFWR2; PR002474|VH|HFWR2;
      PR002475|VH|HFWR2; PR002476|VH|HFWR2;
      PR002477|VH|HFWR2; PR002478|VH|HFWR2;
      PR002479|VH|HFWR2

<400> SEQUENCE: 46

Tyr Met Ser Trp Val Arg Gln Ala Pro Gly Lys Gly Leu Glu Trp Val
1               5                   10                  15

Ser Ile Ile

<210> SEQ ID NO 47
<211> LENGTH: 19
<212> TYPE: PRT
<213> ORGANISM: Artificial Sequence
<220> FEATURE:
<223> OTHER INFORMATION: PR002481|VH|HFWR2; PR005090|VH|HFWR2;
      PR005092|VH|HFWR2; PR005093|VH|HFWR2;
      PR005096|VH|HFWR2; PR005097|VH|HFWR2;
      PR005098|VH|HFWR2; PR005099|VH|HFWR2;
      PR005100|VH|HFWR2; PR005101|VH|HFWR2;
      PR005102|VH|HFWR2; PR005103|VH|HFWR2;
      PR005104|VH|HFWR2; PR005139|VH|HFWR2;
      PR005140|VH|HFWR2; PR005141|VH|HFWR2;
      PR005142|VH|HFWR2; PR005143|VH|HFWR2;
      PR005144|VH|HFWR2; PR005145|VH|HFWR2;
      PR005146|VH|HFWR2; PR005147|VH|HFWR2;
      PR005148|VH|HFWR2; PR005149|VH|HFWR2;
      PR005150|VH|HFWR2; PR005151|VH|HFWR2;
      PR005152|VH|HFWR2; PR005153|VH|HFWR2;
      PR005154|VH|HFWR2; PR005155|VH|HFWR2;
      PR005156|VH|HFWR2; PR005157|VH|HFWR2;
      PR005158|VH|HFWR2; PR005159|VH|HFWR2;
      PR005160|VH|HFWR2; PR005161|VH|HFWR2;
      PR005162|VH|HFWR2; PR005163|VH|HFWR2;
      PR005164|VH|HFWR2; PR005165|VH|HFWR2;
      PR005166|VH|HFWR2; PR005167|VH|HFWR2;
      PR005168|VH|HFWR2; PR005169|VH|HFWR2;
      PR005569|VH|HFWR2; PR005570|VH|HFWR2;
      PR005571|VH|HFWR2; PR005572|VH|HFWR2;
      PR005573|VH|HFWR2; PR005574|VH|HFWR2;
      PR005575|VH|HFWR2; PR005577|VH|HFWR2;
      PR005578|VH|HFWR2; PR005581|VH|HFWR2;
      PR005582|VH|HFWR2; PR005583|VH|HFWR2;
      PR005584|VH|HFWR2; PR005585|VH|HFWR2

<400> SEQUENCE: 47

Tyr Met Ser Trp Val Arg Gln Ala Pro Gly Lys Gly Arg Glu Trp Val
1               5                   10                  15

Ser Ile Ile

<210> SEQ ID NO 48
<211> LENGTH: 19
<212> TYPE: PRT
<213> ORGANISM: Artificial Sequence
<220> FEATURE:
<223> OTHER INFORMATION: PR005082|VH|HFWR2; PR005083|VH|HFWR2;
      PR005084|VH|HFWR2; PR005085|VH|HFWR2;
      PR005086|VH|HFWR2; PR005087|VH|HFWR2;
      PR005088|VH|HFWR2; PR005089|VH|HFWR2;
      PR005091|VH|HFWR2; PR005094|VH|HFWR2

<400> SEQUENCE: 48

Tyr Met Ser Trp Val Arg Gln Ala Pro Gly Lys Gly Gln Glu Trp Val
1               5                   10                  15

Ser Ile Ile

<210> SEQ ID NO 49
<211> LENGTH: 19
<212> TYPE: PRT
```

```
<213> ORGANISM: Artificial Sequence
<220> FEATURE:
<223> OTHER INFORMATION: PR005095|VH|HFWR2

<400> SEQUENCE: 49

Tyr Met Ala Trp Val Arg Gln Ala Pro Gly Lys Gly Gln Glu Trp Val
1               5                   10                  15

Ser Ile Ile

<210> SEQ ID NO 50
<211> LENGTH: 6
<212> TYPE: PRT
<213> ORGANISM: Artificial Sequence
<220> FEATURE:
<223> OTHER INFORMATION: PR000673|VH|HCDR2; PR000674|VH|HCDR2;
      PR000678|VH|HCDR2

<400> SEQUENCE: 50

Trp Tyr Asp Gly Ser Lys
1               5

<210> SEQ ID NO 51
<211> LENGTH: 6
<212> TYPE: PRT
<213> ORGANISM: Artificial Sequence
<220> FEATURE:
<223> OTHER INFORMATION: PR000675|VH|HCDR2

<400> SEQUENCE: 51

Ser Gly Ser Gly Tyr Ser
1               5

<210> SEQ ID NO 52
<211> LENGTH: 6
<212> TYPE: PRT
<213> ORGANISM: Artificial Sequence
<220> FEATURE:
<223> OTHER INFORMATION: PR000676|VH|HCDR2

<400> SEQUENCE: 52

Leu Ser Asp Gly Ser Asn
1               5

<210> SEQ ID NO 53
<211> LENGTH: 7
<212> TYPE: PRT
<213> ORGANISM: Artificial Sequence
<220> FEATURE:
<223> OTHER INFORMATION: PR000677|VH|HCDR2

<400> SEQUENCE: 53

Tyr Tyr Arg Ser Lys Trp Tyr
1               5

<210> SEQ ID NO 54
<211> LENGTH: 6
<212> TYPE: PRT
<213> ORGANISM: Artificial Sequence
<220> FEATURE:
<223> OTHER INFORMATION: PR000679|VH|HCDR2

<400> SEQUENCE: 54

Ile Pro Ile Phe Asp Thr
1               5

<210> SEQ ID NO 55
```

```
<211> LENGTH: 6
<212> TYPE: PRT
<213> ORGANISM: Artificial Sequence
<220> FEATURE:
<223> OTHER INFORMATION: PR000680|VH|HCDR2; PR002480|VH|HCDR2

<400> SEQUENCE: 55

Trp Tyr Asp Gly Ser Asn
1               5

<210> SEQ ID NO 56
<211> LENGTH: 6
<212> TYPE: PRT
<213> ORGANISM: Artificial Sequence
<220> FEATURE:
<223> OTHER INFORMATION: PR000846|VH|HCDR2

<400> SEQUENCE: 56

Trp Tyr Asp Ala Ser Phe
1               5

<210> SEQ ID NO 57
<211> LENGTH: 5
<212> TYPE: PRT
<213> ORGANISM: Artificial Sequence
<220> FEATURE:
<223> OTHER INFORMATION: PR002473|VH|HCDR2; PR002474|VH|HCDR2;
      PR002475|VH|HCDR2; PR002476|VH|HCDR2;
      PR002477|VH|HCDR2; PR002478|VH|HCDR2;
      PR002479|VH|HCDR2

<400> SEQUENCE: 57

His Ser Gly Gly Ser
1               5

<210> SEQ ID NO 58
<211> LENGTH: 5
<212> TYPE: PRT
<213> ORGANISM: Artificial Sequence
<220> FEATURE:
<223> OTHER INFORMATION: PR002481|VH|HCDR2; PR005090|VH|HCDR2;
      PR005091|VH|HCDR2; PR005092|VH|HCDR2;
      PR005093|VH|HCDR2; PR005094|VH|HCDR2;
      PR005095|VH|HCDR2; PR005096|VH|HCDR2;
      PR005097|VH|HCDR2; PR005098|VH|HCDR2

<400> SEQUENCE: 58

Asp Gly Gly Gly Ser
1               5

<210> SEQ ID NO 59
<211> LENGTH: 5
<212> TYPE: PRT
<213> ORGANISM: Artificial Sequence
<220> FEATURE:
<223> OTHER INFORMATION: PR005082|VH|HCDR2; PR005084|VH|HCDR2;
      PR005086|VH|HCDR2; PR005088|VH|HCDR2;
      PR005100|VH|HCDR2; PR005102|VH|HCDR2

<400> SEQUENCE: 59

Asp Arg Gly Gly Ser
1               5

<210> SEQ ID NO 60
<211> LENGTH: 5
<212> TYPE: PRT
<213> ORGANISM: Artificial Sequence
<220> FEATURE:
<223> OTHER INFORMATION: PR005083|VH|HCDR2; PR005087|VH|HCDR2;
```

```
                PR005103|VH|HCDR2

<400> SEQUENCE: 60

Asp Arg Gly Gly Gly
1               5

<210> SEQ ID NO 61
<211> LENGTH: 5
<212> TYPE: PRT
<213> ORGANISM: Artificial Sequence
<220> FEATURE:
<223> OTHER INFORMATION: PR005085|VH|HCDR2; PR005089|VH|HCDR2;
      PR005101|VH|HCDR2

<400> SEQUENCE: 61

Asp Lys Gly Gly Gly
1               5

<210> SEQ ID NO 62
<211> LENGTH: 5
<212> TYPE: PRT
<213> ORGANISM: Artificial Sequence
<220> FEATURE:
<223> OTHER INFORMATION: PR005099|VH|HCDR2

<400> SEQUENCE: 62

Asp Ser Ala Gly Ser
1               5

<210> SEQ ID NO 63
<211> LENGTH: 5
<212> TYPE: PRT
<213> ORGANISM: Artificial Sequence
<220> FEATURE:
<223> OTHER INFORMATION: PR005104|VH|HCDR2

<400> SEQUENCE: 63

Asp Ile Ser Gly Ser
1               5

<210> SEQ ID NO 64
<211> LENGTH: 5
<212> TYPE: PRT
<213> ORGANISM: Artificial Sequence
<220> FEATURE:
<223> OTHER INFORMATION: PR005139|VH|HCDR2; PR005140|VH|HCDR2;
      PR005143|VH|HCDR2; PR005147|VH|HCDR2;
      PR005148|VH|HCDR2; PR005149|VH|HCDR2;
      PR005150|VH|HCDR2; PR005153|VH|HCDR2;
      PR005156|VH|HCDR2; PR005158|VH|HCDR2;
      PR005161|VH|HCDR2; PR005162|VH|HCDR2;
      PR005163|VH|HCDR2; PR005164|VH|HCDR2;
      PR005166|VH|HCDR2; PR005167|VH|HCDR2;
      PR005573|VH|HCDR2; PR005574|VH|HCDR2;
      PR005575|VH|HCDR2; PR005577|VH|HCDR2;
      PR005578|VH|HCDR2; PR005581|VH|HCDR2;
      PR005582|VH|HCDR2; PR005583|VH|HCDR2;
      PR005584|VH|HCDR2; PR005585|VH|HCDR2

<400> SEQUENCE: 64

Asp Lys Ala Gly Ser
1               5

<210> SEQ ID NO 65
<211> LENGTH: 5
<212> TYPE: PRT
<213> ORGANISM: Artificial Sequence
<220> FEATURE:
<223> OTHER INFORMATION: PR005141|VH|HCDR2; PR005142|VH|HCDR2;
```

```
             PR005145|VH|HCDR2; PR005155|VH|HCDR2;
             PR005160|VH|HCDR2, PR005169|VH|HCDR2;
             PR005570|VH|HCDR2, PR005571|VH|HCDR2;
             PR005572|VH|HCDR2
```

<400> SEQUENCE: 65

```
Asp Lys Gly Gly Ser
1               5
```

<210> SEQ ID NO 66
<211> LENGTH: 5
<212> TYPE: PRT
<213> ORGANISM: Artificial Sequence
<220> FEATURE:
<223> OTHER INFORMATION: PR005144|VH|HCDR2; PR005151|VH|HCDR2;
      PR005154|VH|HCDR2; PR005157|VH|HCDR2;
      PR005165|VH|HCDR2; PR005168|VH|HCDR2;
      PR005569|VH|HCDR2

<400> SEQUENCE: 66

```
Asp Lys Ser Gly Ser
1               5
```

<210> SEQ ID NO 67
<211> LENGTH: 5
<212> TYPE: PRT
<213> ORGANISM: Artificial Sequence
<220> FEATURE:
<223> OTHER INFORMATION: PR005146|VH|HCDR2

<400> SEQUENCE: 67

```
Asp Gly Ala Gly Ser
1               5
```

<210> SEQ ID NO 68
<211> LENGTH: 5
<212> TYPE: PRT
<213> ORGANISM: Artificial Sequence
<220> FEATURE:
<223> OTHER INFORMATION: PR005152|VH|HCDR2; PR005159|VH|HCDR2

<400> SEQUENCE: 68

```
Asp Arg Ala Gly Ser
1               5
```

<210> SEQ ID NO 69
<211> LENGTH: 41
<212> TYPE: PRT
<213> ORGANISM: Artificial Sequence
<220> FEATURE:
<223> OTHER INFORMATION: PR000673|VH|HFWR3; PR000680|VH|HFWR3

<400> SEQUENCE: 69

```
Lys Tyr Tyr Gly Asp Ser Val Lys Gly Arg Phe Thr Ile Ser Arg Asp
1               5                   10                  15

Asn Ser Lys Asn Thr Leu Tyr Leu Gln Met Asn Ser Leu Arg Asp Glu
            20                  25                  30

Asp Thr Ala Val Tyr Phe Cys Ala Arg
        35                  40
```

<210> SEQ ID NO 70
<211> LENGTH: 41
<212> TYPE: PRT
<213> ORGANISM: Artificial Sequence
<220> FEATURE:
<223> OTHER INFORMATION: PR000674|VH|HFWR3

```
<400> SEQUENCE: 70

Lys Tyr Tyr Ala Asp Ser Val Lys Gly Arg Phe Thr Ile Ser Arg Asp
1               5                   10                  15

Asn Ser Lys Asn Thr Leu Tyr Leu Gln Met Asn Asn Met Arg Val Glu
            20                  25                  30

Asp Thr Ala Val Tyr Tyr Cys Ala Thr
        35                  40

<210> SEQ ID NO 71
<211> LENGTH: 41
<212> TYPE: PRT
<213> ORGANISM: Artificial Sequence
<220> FEATURE:
<223> OTHER INFORMATION: PR000675|VH|HFWR3

<400> SEQUENCE: 71

Thr Tyr Tyr Ala Asp Ser Val Lys Gly Arg Phe Thr Ile Ser Arg Asp
1               5                   10                  15

Asn Ser Lys Lys Thr Leu Tyr Leu Gln Met Asn Ser Leu Arg Ala Glu
            20                  25                  30

Asp Thr Ala Val Tyr Tyr Cys Ala Glu
        35                  40

<210> SEQ ID NO 72
<211> LENGTH: 41
<212> TYPE: PRT
<213> ORGANISM: Artificial Sequence
<220> FEATURE:
<223> OTHER INFORMATION: PR000676|VH|HFWR3

<400> SEQUENCE: 72

Lys Tyr Tyr Ala Asp Ser Val Lys Gly Arg Phe Thr Ile Ser Arg Asp
1               5                   10                  15

Asn Ser Lys Asn Thr Leu Tyr Leu Gln Met Asn Ser Leu Arg Ala Glu
            20                  25                  30

Asp Thr Ala Val Tyr Tyr Cys Ala Asp
        35                  40

<210> SEQ ID NO 73
<211> LENGTH: 41
<212> TYPE: PRT
<213> ORGANISM: Artificial Sequence
<220> FEATURE:
<223> OTHER INFORMATION: PR000677|VH|HFWR3

<400> SEQUENCE: 73

Ser Asp Tyr Gly Ile Ser Val Asn Ser Arg Ile Thr Val Asn Pro Asp
1               5                   10                  15

Thr Ser Lys Asn Leu Phe Ser Leu Gln Leu Asn Pro Val Thr Pro Glu
            20                  25                  30

Asp Thr Ala Val Tyr Tyr Cys Thr Arg
        35                  40

<210> SEQ ID NO 74
<211> LENGTH: 41
<212> TYPE: PRT
<213> ORGANISM: Artificial Sequence
<220> FEATURE:
<223> OTHER INFORMATION: PR000678|VH|HFWR3

<400> SEQUENCE: 74

Lys Tyr Tyr Gly Asp Ser Val Lys Gly Arg Phe Thr Ile Ser Arg Asp
```

```
1               5                   10                  15
Asn Ser Lys Asn Thr Leu Tyr Leu Gln Met Asn Ser Leu Arg Ala Glu
            20                  25                  30

Asp Thr Ala Val Tyr Tyr Cys Ala Thr
            35                  40
```

<210> SEQ ID NO 75
<211> LENGTH: 41
<212> TYPE: PRT
<213> ORGANISM: Artificial Sequence
<220> FEATURE:
<223> OTHER INFORMATION: PR000679|VH|HFWR3

<400> SEQUENCE: 75

```
Val Ser Ser Ala Gln Lys Phe Gln Gly Arg Val Thr Ile Thr Ala Asp
1               5                   10                  15

Lys Ser Thr Ser Thr Ala Tyr Met Glu Leu Phe Ser Leu Arg Ser Glu
            20                  25                  30

Asp Thr Ala Val Tyr Tyr Cys Ala Arg
            35                  40
```

<210> SEQ ID NO 76
<211> LENGTH: 41
<212> TYPE: PRT
<213> ORGANISM: Artificial Sequence
<220> FEATURE:
<223> OTHER INFORMATION: PR000846|VH|HFWR3

<400> SEQUENCE: 76

```
Glu Tyr Tyr Ala Asp Ser Val Lys Gly Arg Phe Ser Ile Ser Arg Asp
1               5                   10                  15

Asn Ser Lys Asn Thr Leu Tyr Leu Gln Met Asn Ser Leu Arg Ala Glu
            20                  25                  30

Asp Thr Ala Val Tyr Tyr Cys Val Arg
            35                  40
```

<210> SEQ ID NO 77
<211> LENGTH: 41
<212> TYPE: PRT
<213> ORGANISM: Artificial Sequence
<220> FEATURE:
<223> OTHER INFORMATION: PR002473|VH|HFWR3

<400> SEQUENCE: 77

```
Thr Tyr Tyr Ala Asp Ser Val Lys Gly Arg Phe Thr Ile Ser Arg Asp
1               5                   10                  15

Asn Ser Lys Asn Arg Leu Tyr Leu Gln Met Asn Ser Leu Ile Ala Glu
            20                  25                  30

Asp Thr Ala Val Tyr Tyr Cys Ala Arg
            35                  40
```

<210> SEQ ID NO 78
<211> LENGTH: 41
<212> TYPE: PRT
<213> ORGANISM: Artificial Sequence
<220> FEATURE:
<223> OTHER INFORMATION: PR002474|VH|HFWR3

<400> SEQUENCE: 78

```
Thr Tyr Tyr Ala Asp Ser Val Lys Gly Arg Phe Thr Ile Ser Arg Asp
1               5                   10                  15

Asn Ser Lys Asn Arg Leu Tyr Leu Gln Met Asn Ser Leu Arg Ala Asp
```

<210> SEQ ID NO 79
<211> LENGTH: 41
<212> TYPE: PRT
<213> ORGANISM: Artificial Sequence
<220> FEATURE:
<223> OTHER INFORMATION: PR002475|VH|HFWR3

<400> SEQUENCE: 79

Thr Tyr Tyr Ala Asp Ser Val Lys Gly Arg Phe Thr Ile Ser Arg Asp
1               5                   10                  15

Asn Ser Lys Asn Thr Leu Tyr Leu Gln Met Asn Ser Leu Arg Ala Glu
            20                  25                  30

Asp Thr Ala Val Tyr Tyr Cys Ala Arg
        35                  40

<210> SEQ ID NO 80
<211> LENGTH: 41
<212> TYPE: PRT
<213> ORGANISM: Artificial Sequence
<220> FEATURE:
<223> OTHER INFORMATION: PR002476|VH|HFWR3; PR002477|VH|HFWR3;
      PR002478|VH|HFWR3; PR002479|VH|HFWR3

<400> SEQUENCE: 80

Thr Tyr Tyr Ala Asp Ser Val Lys Gly Arg Phe Thr Ile Ser Arg Asp
1               5                   10                  15

Asn Ser Lys Asn Arg Leu Tyr Leu Gln Met Asn Ser Leu Arg Ala Glu
            20                  25                  30

Asp Thr Ala Val Tyr Tyr Cys Ala Arg
        35                  40

<210> SEQ ID NO 81
<211> LENGTH: 5
<212> TYPE: PRT
<213> ORGANISM: Artificial Sequence
<220> FEATURE:
<223> OTHER INFORMATION: HCAb VH CDR2 General Formula 2
<220> FEATURE:
<221> NAME/KEY: misc_feature
<222> LOCATION: (3)..(3)
<223> OTHER INFORMATION: Xaa = Ala, Gly or Ser

<400> SEQUENCE: 81

Asp Lys Xaa Gly Ser
1               5

<210> SEQ ID NO 82
<211> LENGTH: 41
<212> TYPE: PRT
<213> ORGANISM: Artificial Sequence
<220> FEATURE:
<223> OTHER INFORMATION: PR002481|VH|HFWR3; PR005082|VH|HFWR3;
      PR005083|VH|HFWR3; PR005085|VH|HFWR3;
      PR005086|VH|HFWR3; PR005087|VH|HFWR3;
      PR005089|VH|HFWR3; PR005090|VH|HFWR3;
      PR005091|VH|HFWR3; PR005092|VH|HFWR3;
      PR005093|VH|HFWR3; PR005094|VH|HFWR3;
      PR005095|VH|HFWR3; PR005096|VH|HFWR3;
      PR005097|VH|HFWR3; PR005098|VH|HFWR3;
      PR005099|VH|HFWR3; PR005101|VH|HFWR3;
      PR005102|VH|HFWR3; PR005103|VH|HFWR3;
      PR005104|VH|HFWR3; PR005571|VH|HFWR3;
      PR005572|VH|HFWR3; PR005583|VH|HFWR3;

PR005584|VH|HFWR3; PR005585|VH|HFWR3

<400> SEQUENCE: 82

Thr Tyr Tyr Ala Asp Ser Val Lys Gly Arg Phe Thr Ile Ser Arg Asp
1               5                   10                  15

Asn Ser Lys Asn Arg Leu Tyr Leu Gln Met Asn Ser Leu Arg Ala Glu
            20                  25                  30

Asp Thr Ala Met Tyr Tyr Cys Ala Arg
        35                  40

<210> SEQ ID NO 83
<211> LENGTH: 41
<212> TYPE: PRT
<213> ORGANISM: Artificial Sequence
<220> FEATURE:
<223> OTHER INFORMATION: PR005084|VH|HFWR3; PR005088|VH|HFWR3;
      PR005100|VH|HFWR3

<400> SEQUENCE: 83

Lys Tyr Tyr Ala Asp Ser Val Lys Gly Arg Phe Thr Ile Ser Arg Asp
1               5                   10                  15

Asn Ser Lys Asn Arg Leu Tyr Leu Gln Met Asn Ser Leu Arg Ala Glu
            20                  25                  30

Asp Thr Ala Met Tyr Tyr Cys Ala Arg
        35                  40

<210> SEQ ID NO 84
<211> LENGTH: 41
<212> TYPE: PRT
<213> ORGANISM: Artificial Sequence
<220> FEATURE:
<223> OTHER INFORMATION: PR005139|VH|HFWR3; PR005141|VH|HFWR3;
      PR005142|VH|HFWR3; PR005146|VH|HFWR3;
      PR005148|VH|HFWR3; PR005155|VH|HFWR3;
      PR005161|VH|HFWR3; PR005162|VH|HFWR3;
      PR005169|VH|HFWR3; PR005573|VH|HFWR3

<400> SEQUENCE: 84

Gly Tyr Tyr Ala Ala Ser Val Lys Gly Arg Phe Thr Ile Ser Arg Asp
1               5                   10                  15

Asn Ser Lys Asn Arg Leu Tyr Leu Gln Met Asn Ser Leu Arg Ala Glu
            20                  25                  30

Asp Thr Ala Met Tyr Tyr Cys Ala Arg
        35                  40

<210> SEQ ID NO 85
<211> LENGTH: 41
<212> TYPE: PRT
<213> ORGANISM: Artificial Sequence
<220> FEATURE:
<223> OTHER INFORMATION: PR005140|VH|HFWR3; PR005144|VH|HFWR3;
      PR005157|VH|HFWR3; PR005158|VH|HFWR3;
      PR005569|VH|HFWR3

<400> SEQUENCE: 85

Thr Tyr Tyr Ala Ala Ser Val Lys Gly Arg Phe Thr Ile Ser Arg Asp
1               5                   10                  15

Asn Ser Lys Asn Arg Leu Tyr Leu Gln Met Asn Ser Leu Arg Ala Glu
            20                  25                  30

Asp Thr Ala Met Tyr Tyr Cys Ala Arg
        35                  40

<210> SEQ ID NO 86

```
<211> LENGTH: 41
<212> TYPE: PRT
<213> ORGANISM: Artificial Sequence
<220> FEATURE:
<223> OTHER INFORMATION: PR005143|VH|HFWR3; PR005153|VH|HFWR3;
      PR005156|VH|HFWR3; PR005166|VH|HFWR3

<400> SEQUENCE: 86

Gly Tyr Tyr Gly Gly Ser Val Lys Gly Arg Phe Thr Ile Ser Arg Asp
1               5                   10                  15

Asn Ser Lys Asn Arg Leu Tyr Leu Gln Met Asn Ser Leu Arg Ala Glu
            20                  25                  30

Asp Thr Ala Met Tyr Tyr Cys Ala Arg
        35                  40

<210> SEQ ID NO 87
<211> LENGTH: 41
<212> TYPE: PRT
<213> ORGANISM: Artificial Sequence
<220> FEATURE:
<223> OTHER INFORMATION: PR005145|VH|HFWR3; PR005160|VH|HFWR3;
      PR005570|VH|HFWR3

<400> SEQUENCE: 87

Thr Tyr Tyr Gly Asp Ser Val Lys Gly Arg Phe Thr Ile Ser Arg Asp
1               5                   10                  15

Asn Ser Lys Asn Arg Leu Tyr Leu Gln Met Asn Ser Leu Arg Ala Glu
            20                  25                  30

Asp Thr Ala Met Tyr Tyr Cys Ala Arg
        35                  40

<210> SEQ ID NO 88
<211> LENGTH: 41
<212> TYPE: PRT
<213> ORGANISM: Artificial Sequence
<220> FEATURE:
<223> OTHER INFORMATION: PR005147|VH|HFWR3; PR005150|VH|HFWR3;
      PR005152|VH|HFWR3; PR005159|VH|HFWR3;
      PR005164|VH|HFWR3; PR005167|VH|HFWR3;
      PR005581|VH|HFWR3; PR005582|VH|HFWR3

<400> SEQUENCE: 88

Thr Tyr Tyr Gly Ala Ser Val Lys Gly Arg Phe Thr Ile Ser Arg Asp
1               5                   10                  15

Asn Ser Lys Asn Arg Leu Tyr Leu Gln Met Asn Ser Leu Arg Ala Glu
            20                  25                  30

Asp Thr Ala Met Tyr Tyr Cys Ala Arg
        35                  40

<210> SEQ ID NO 89
<211> LENGTH: 41
<212> TYPE: PRT
<213> ORGANISM: Artificial Sequence
<220> FEATURE:
<223> OTHER INFORMATION: PR005149|VH|HFWR3; PR005163|VH|HFWR3;
      PR005574|VH|HFWR3; PR005575|VH|HFWR3;
      PR005577|VH|HFWR3; PR005578|VH|HFWR3

<400> SEQUENCE: 89

Gly Tyr Tyr Ala Asp Ser Val Lys Gly Arg Phe Thr Ile Ser Arg Asp
1               5                   10                  15

Asn Ser Lys Asn Arg Leu Tyr Leu Gln Met Asn Ser Leu Arg Ala Glu
            20                  25                  30

Asp Thr Ala Met Tyr Tyr Cys Ala Arg
```

<210> SEQ ID NO 90
<211> LENGTH: 41
<212> TYPE: PRT
<213> ORGANISM: Artificial Sequence
<220> FEATURE:
<223> OTHER INFORMATION: PR005151|VH|HFWR3; PR005165|VH|HFWR3

<400> SEQUENCE: 90

Gly Tyr Tyr Gly Ala Ser Val Lys Gly Arg Phe Thr Ile Ser Arg Asp
1               5                   10                  15

Asn Ser Lys Asn Arg Leu Tyr Leu Gln Met Asn Ser Leu Arg Ala Glu
            20                  25                  30

Asp Thr Ala Met Tyr Tyr Cys Ala Arg
        35                  40

<210> SEQ ID NO 91
<211> LENGTH: 41
<212> TYPE: PRT
<213> ORGANISM: Artificial Sequence
<220> FEATURE:
<223> OTHER INFORMATION: PR005154|VH|HFWR3; PR005168|VH|HFWR3

<400> SEQUENCE: 91

Thr Tyr Tyr Gly Gly Ser Val Lys Gly Arg Phe Thr Ile Ser Arg Asp
1               5                   10                  15

Asn Ser Lys Asn Arg Leu Tyr Leu Gln Met Asn Ser Leu Arg Ala Glu
            20                  25                  30

Asp Thr Ala Met Tyr Tyr Cys Ala Arg
        35                  40

<210> SEQ ID NO 92
<211> LENGTH: 4
<212> TYPE: PRT
<213> ORGANISM: Artificial Sequence
<220> FEATURE:
<223> OTHER INFORMATION: PR000673|VH|HCDR3; PR000680|VH|HCDR3

<400> SEQUENCE: 92

Asn Asp Asp Tyr
1

<210> SEQ ID NO 93
<211> LENGTH: 4
<212> TYPE: PRT
<213> ORGANISM: Artificial Sequence
<220> FEATURE:
<223> OTHER INFORMATION: PR000674|VH|HCDR3; PR000678|VH|HCDR3

<400> SEQUENCE: 93

Asn Ser Asp Tyr
1

<210> SEQ ID NO 94
<211> LENGTH: 5
<212> TYPE: PRT
<213> ORGANISM: Artificial Sequence
<220> FEATURE:
<223> OTHER INFORMATION: PR000675|VH|HCDR3

<400> SEQUENCE: 94

Leu Ser Leu Asp Tyr
1               5

```
<210> SEQ ID NO 95
<211> LENGTH: 5
<212> TYPE: PRT
<213> ORGANISM: Artificial Sequence
<220> FEATURE:
<223> OTHER INFORMATION: PR000676|VH|HCDR3

<400> SEQUENCE: 95

Leu Gly Gly Asp Val
1               5

<210> SEQ ID NO 96
<211> LENGTH: 13
<212> TYPE: PRT
<213> ORGANISM: Artificial Sequence
<220> FEATURE:
<223> OTHER INFORMATION: PR000677|VH|HCDR3

<400> SEQUENCE: 96

Glu Thr His Tyr Tyr Gly Ser Gly Ser Tyr Leu Asp Tyr
1               5                   10

<210> SEQ ID NO 97
<211> LENGTH: 14
<212> TYPE: PRT
<213> ORGANISM: Artificial Sequence
<220> FEATURE:
<223> OTHER INFORMATION: PR000679|VH|HCDR3

<400> SEQUENCE: 97

Ser Pro Pro Tyr Ser Ser Asn Trp Tyr Gln Tyr Phe Gln His
1               5                   10

<210> SEQ ID NO 98
<211> LENGTH: 10
<212> TYPE: PRT
<213> ORGANISM: Artificial Sequence
<220> FEATURE:
<223> OTHER INFORMATION: PR000846|VH|HCDR3

<400> SEQUENCE: 98

Asp Ala Gln Trp Gly Ser Arg Leu Asp Tyr
1               5                   10

<210> SEQ ID NO 99
<211> LENGTH: 16
<212> TYPE: PRT
<213> ORGANISM: Artificial Sequence
<220> FEATURE:
<223> OTHER INFORMATION: PR002473|VH|HCDR3; PR002475|VH|HCDR3;
      PR002477|VH|HCDR3; PR002478|VH|HCDR3

<400> SEQUENCE: 99

Ala Ile Ala Val Ala Glu Lys Asn Gly Tyr Asn Tyr Pro Phe Asn Tyr
1               5                   10                  15

<210> SEQ ID NO 100
<211> LENGTH: 16
<212> TYPE: PRT
<213> ORGANISM: Artificial Sequence
<220> FEATURE:
<223> OTHER INFORMATION: PR002474|VH|HCDR3; PR002476|VH|HCDR3;
      PR002481|VH|HCDR3; PR005090|VH|HCDR3;
      PR005091|VH|HCDR3; PR005094|VH|HCDR3;
      PR005095|VH|HCDR3; PR005099|VH|HCDR3;
      PR005100|VH|HCDR3; PR005101|VH|HCDR3;
      PR005102|VH|HCDR3; PR005103|VH|HCDR3;
      PR005104|VH|HCDR3
```

```
<400> SEQUENCE: 100

Ala Thr Ala Val Ala Glu Lys Asn Gly Tyr Asn Tyr Pro Phe Asn Tyr
1               5                   10                  15

<210> SEQ ID NO 101
<211> LENGTH: 16
<212> TYPE: PRT
<213> ORGANISM: Artificial Sequence
<220> FEATURE:
<223> OTHER INFORMATION: PR002479|VH|HCDR3

<400> SEQUENCE: 101

Ala Thr Ala Val Ala Glu Glu Asn Gly Tyr Asn Tyr Pro Phe Asn Tyr
1               5                   10                  15

<210> SEQ ID NO 102
<211> LENGTH: 16
<212> TYPE: PRT
<213> ORGANISM: Artificial Sequence
<220> FEATURE:
<223> OTHER INFORMATION: HCAb VH CDR3 General Formula 2
<220> FEATURE:
<221> NAME/KEY: misc_feature
<222> LOCATION: (3)..(3)
<223> OTHER INFORMATION: Xaa = Ala or Glu
<220> FEATURE:
<221> NAME/KEY: misc_feature
<222> LOCATION: (8)..(8)
<223> OTHER INFORMATION: Xaa = Asn or Gln

<400> SEQUENCE: 102

Ala Thr Xaa Val Arg Glu Lys Xaa Gly Tyr Asn Tyr Pro Phe Asn Tyr
1               5                   10                  15

<210> SEQ ID NO 103
<211> LENGTH: 16
<212> TYPE: PRT
<213> ORGANISM: Artificial Sequence
<220> FEATURE:
<223> OTHER INFORMATION: PR005082|VH|HCDR3; PR005083|VH|HCDR3;
      PR005084|VH|HCDR3; PR005085|VH|HCDR3;
      PR005086|VH|HCDR3; PR005087|VH|HCDR3;
      PR005088|VH|HCDR3; PR005089|VH|HCDR3;
      PR005098|VH|HCDR3

<400> SEQUENCE: 103

Ala Thr Gln Val Arg Glu Lys Gly Gly Tyr Asn Tyr Pro Phe Asn Tyr
1               5                   10                  15

<210> SEQ ID NO 104
<211> LENGTH: 16
<212> TYPE: PRT
<213> ORGANISM: Artificial Sequence
<220> FEATURE:
<223> OTHER INFORMATION: PR005092|VH|HCDR3

<400> SEQUENCE: 104

Ala Thr Ala Val Ala Glu Lys Gly Gly Tyr Asn Tyr Pro Phe Asn Tyr
1               5                   10                  15

<210> SEQ ID NO 105
<211> LENGTH: 16
<212> TYPE: PRT
<213> ORGANISM: Artificial Sequence
<220> FEATURE:
<223> OTHER INFORMATION: PR005093|VH|HCDR3

<400> SEQUENCE: 105
```

Ala Thr Arg Val Arg Glu Ala Asn Gly Tyr Asn Tyr Pro Phe Asn Tyr
1               5                   10                  15

<210> SEQ ID NO 106
<211> LENGTH: 16
<212> TYPE: PRT
<213> ORGANISM: Artificial Sequence
<220> FEATURE:
<223> OTHER INFORMATION: PR005096|VH|HCDR3

<400> SEQUENCE: 106

Ala Thr Arg Val Pro Glu Lys Gly Gly Tyr Asn Tyr Pro Phe Asn Tyr
1               5                   10                  15

<210> SEQ ID NO 107
<211> LENGTH: 16
<212> TYPE: PRT
<213> ORGANISM: Artificial Sequence
<220> FEATURE:
<223> OTHER INFORMATION: PR005097|VH|HCDR3

<400> SEQUENCE: 107

Ala Thr Ala Val Arg Glu Lys Asn Gly Tyr Asn Tyr Pro Phe Asn Tyr
1               5                   10                  15

<210> SEQ ID NO 108
<211> LENGTH: 16
<212> TYPE: PRT
<213> ORGANISM: Artificial Sequence
<220> FEATURE:
<223> OTHER INFORMATION: PR005139|VH|HCDR3; PR005140|VH|HCDR3;
      PR005141|VH|HCDR3; PR005142|VH|HCDR3;
      PR005143|VH|HCDR3; PR005144|VH|HCDR3;
      PR005145|VH|HCDR3; PR005148|VH|HCDR3;
      PR005152|VH|HCDR3; PR005569|VH|HCDR3;
      PR005570|VH|HCDR3; PR005573|VH|HCDR3

<400> SEQUENCE: 108

Ala Thr Glu Val Arg Glu Lys Asn Gly Tyr Asn Tyr Pro Phe Asn Tyr
1               5                   10                  15

<210> SEQ ID NO 109
<211> LENGTH: 16
<212> TYPE: PRT
<213> ORGANISM: Artificial Sequence
<220> FEATURE:
<223> OTHER INFORMATION: PR005146|VH|HCDR3; PR005154|VH|HCDR3;
      PR005162|VH|HCDR3; PR005167|VH|HCDR3;
      PR005168|VH|HCDR3

<400> SEQUENCE: 109

Ala Thr Met Val Arg Glu Lys Gln Gly Tyr Asn Tyr Pro Phe Asn Tyr
1               5                   10                  15

<210> SEQ ID NO 110
<211> LENGTH: 16
<212> TYPE: PRT
<213> ORGANISM: Artificial Sequence
<220> FEATURE:
<223> OTHER INFORMATION: PR005147|VH|HCDR3

<400> SEQUENCE: 110

Ala Thr Met Val Arg Glu Lys Asn Gly Tyr Asn Tyr Pro Phe Asn Tyr
1               5                   10                  15

<210> SEQ ID NO 111
<211> LENGTH: 16

```
<212> TYPE: PRT
<213> ORGANISM: Artificial Sequence
<220> FEATURE:
<223> OTHER INFORMATION: PR005149|VH|HCDR3; PR005150|VH|HCDR3;
      PR005151|VH|HCDR3; PR005153|VH|HCDR3;
      PR005155|VH|HCDR3; PR005156|VH|HCDR3;
      PR005157|VH|HCDR3; PR005158|VH|HCDR3;
      PR005159|VH|HCDR3; PR005160|VH|HCDR3;
      PR005161|VH|HCDR3; PR005163|VH|HCDR3;
      PR005164|VH|HCDR3; PR005165|VH|HCDR3;
      PR005166|VH|HCDR3; PR005169|VH|HCDR3;
      PR005571|VH|HCDR3; PR005572|VH|HCDR3;
      PR005574|VH|HCDR3; PR005575|VH|HCDR3;
      PR005577|VH|HCDR3; PR005581|VH|HCDR3;
      PR005582|VH|HCDR3; PR005583|VH|HCDR3;
      PR005584|VH|HCDR3; PR005585|VH|HCDR3

<400> SEQUENCE: 111

Ala Thr Glu Val Arg Glu Lys Gln Gly Tyr Asn Tyr Pro Phe Asn Tyr
1               5                   10                  15

<210> SEQ ID NO 112
<211> LENGTH: 16
<212> TYPE: PRT
<213> ORGANISM: Artificial Sequence
<220> FEATURE:
<223> OTHER INFORMATION: PR005578|VH|HCDR3

<400> SEQUENCE: 112

Ala Thr Ala Val Arg Glu Lys Gln Gly Tyr Asn Tyr Pro Phe Asn Tyr
1               5                   10                  15

<210> SEQ ID NO 113
<211> LENGTH: 11
<212> TYPE: PRT
<213> ORGANISM: Artificial Sequence
<220> FEATURE:
<223> OTHER INFORMATION: PR000673|VH|HFWR4; PR000674|VH|HFWR4;
      PR000675|VH|HFWR4; PR000678|VH|HFWR4;
      PR000679|VH|HFWR4; PR000680|VH|HFWR4;
      PR000846|VH|HFWR4; PR002473|VH|HFWR4;
      PR002474|VH|HFWR4; PR002475|VH|HFWR4;
      PR002476|VH|HFWR4; PR002477|VH|HFWR4;
      PR002478|VH|HFWR4; PR002479|VH|HFWR4;
      PR002480|VH|HFWR4; PR002481|VH|HFWR4;
      PR005082|VH|HFWR4; PR005083|VH|HFWR4;
      PR005084|VH|HFWR4; PR005085|VH|HFWR4;
      PR005086|VH|HFWR4; PR005087|VH|HFWR4;
      PR005088|VH|HFWR4; PR005089|VH|HFWR4;
      PR005090|VH|HFWR4; PR005091|VH|HFWR4;
      PR005092|VH|HFWR4; PR005093|VH|HFWR4;
      PR005094|VH|HFWR4; PR005095|VH|HFWR4;
      PR005096|VH|HFWR4; PR005097|VH|HFWR4;
      PR005098|VH|HFWR4; PR005099|VH|HFWR4;
      PR005100|VH|HFWR4; PR005101|VH|HFWR4;
      PR005102|VH|HFWR4; PR005103|VH|HFWR4;
      PR005104|VH|HFWR4; PR005139|VH|HFWR4;
      PR005140|VH|HFWR4; PR005141|VH|HFWR4;
      PR005142|VH|HFWR4; PR005143|VH|HFWR4;
      PR005144|VH|HFWR4; PR005145|VH|HFWR4;
      PR005146|VH|HFWR4; PR005147|VH|HFWR4;
      PR005148|VH|HFWR4; PR005149|VH|HFWR4;
      PR005150|VH|HFWR4; PR005151|VH|HFWR4;
      PR005152|VH|HFWR4; PR005153|VH|HFWR4;
      PR005154|VH|HFWR4; PR005155|VH|HFWR4;
      PR005156|VH|HFWR4; PR005157|VH|HFWR4;
      PR005158|VH|HFWR4; PR005159|VH|HFWR4;
      PR005160|VH|HFWR4; PR005161|VH|HFWR4;
      PR005162|VH|HFWR4; PR005163|VH|HFWR4;
      PR005164|VH|HFWR4; PR005165|VH|HFWR4;
      PR005166|VH|HFWR4; PR005167|VH|HFWR4;
      PR005168|VH|HFWR4; PR005169|VH|HFWR4;
      PR005569|VH|HFWR4; PR005570|VH|HFWR4;
      PR005571|VH|HFWR4; PR005572|VH|HFWR4;
      PR005573|VH|HFWR4; PR005574|VH|HFWR4;
```

PR005575|VH|HFWR4; PR005577|VH|HFWR4;
PR005578|VH|HFWR4; PR005581|VH|HFWR4;
PR005582|VH|HFWR4; PR005583|VH|HFWR4;
PR005584|VH|HFWR4; PR005585|VH|HFWR4

<400> SEQUENCE: 113

Trp Gly Gln Gly Thr Leu Val Thr Val Ser Ser
1               5                   10

<210> SEQ ID NO 114
<211> LENGTH: 11
<212> TYPE: PRT
<213> ORGANISM: Artificial Sequence
<220> FEATURE:
<223> OTHER INFORMATION: PR000676|VH|HFWR4

<400> SEQUENCE: 114

Trp Gly Gln Gly Thr Thr Val Thr Val Ser Ser
1               5                   10

<210> SEQ ID NO 115
<211> LENGTH: 11
<212> TYPE: PRT
<213> ORGANISM: Artificial Sequence
<220> FEATURE:
<223> OTHER INFORMATION: PR000677|VH|HFWR4

<400> SEQUENCE: 115

Trp Ser Gln Gly Thr Leu Val Thr Val Ser Ser
1               5                   10

<210> SEQ ID NO 116
<211> LENGTH: 23
<212> TYPE: PRT
<213> ORGANISM: Artificial Sequence
<220> FEATURE:
<223> OTHER INFORMATION: PR000673|VL|LFWR1; PR000680|VL|LFWR1

<400> SEQUENCE: 116

Glu Ile Val Leu Thr Gln Ser Pro Ala Thr Leu Ser Phe Ser Pro Gly
1               5                   10                  15

Glu Arg Ala Thr Leu Ser Cys
            20

<210> SEQ ID NO 117
<211> LENGTH: 23
<212> TYPE: PRT
<213> ORGANISM: Artificial Sequence
<220> FEATURE:
<223> OTHER INFORMATION: PR000674|VL|LFWR1; PR000675|VL|LFWR1;
    PR000676|VL|LFWR1; PR000678|VL|LFWR1

<400> SEQUENCE: 117

Glu Ile Val Leu Thr Gln Ser Pro Ala Thr Leu Ser Leu Ser Pro Gly
1               5                   10                  15

Glu Arg Ala Thr Leu Ser Cys
            20

<210> SEQ ID NO 118
<211> LENGTH: 23
<212> TYPE: PRT
<213> ORGANISM: Artificial Sequence
<220> FEATURE:
<223> OTHER INFORMATION: PR000677|VL|LFWR1

<400> SEQUENCE: 118

```
Glu Ile Val Met Thr Gln Ser Pro Ala Thr Leu Ser Val Ser Pro Gly
1               5                   10                  15

Glu Arg Ala Thr Leu Ser Cys
            20

<210> SEQ ID NO 119
<211> LENGTH: 23
<212> TYPE: PRT
<213> ORGANISM: Artificial Sequence
<220> FEATURE:
<223> OTHER INFORMATION: PR000679|VL|LFWR1

<400> SEQUENCE: 119

Asp Ile Gln Met Thr Gln Ser Pro Ser Thr Leu Ser Ala Ser Val Gly
1               5                   10                  15

Asp Arg Val Thr Ile Thr Cys
            20

<210> SEQ ID NO 120
<211> LENGTH: 23
<212> TYPE: PRT
<213> ORGANISM: Artificial Sequence
<220> FEATURE:
<223> OTHER INFORMATION: PR000846|VL|LFWR1

<400> SEQUENCE: 120

Lys Ile Val Met Thr Gln Ser Pro Ala Thr Leu Ser Leu Ser Pro Gly
1               5                   10                  15

Glu Arg Ala Thr Leu Ser Cys
            20

<210> SEQ ID NO 121
<211> LENGTH: 11
<212> TYPE: PRT
<213> ORGANISM: Artificial Sequence
<220> FEATURE:
<223> OTHER INFORMATION: PR000673|VL|LCDR1; PR000680|VL|LCDR1

<400> SEQUENCE: 121

Arg Ala Ser Gln Ser Val Ser Ser Asp Leu Ala
1               5                   10

<210> SEQ ID NO 122
<211> LENGTH: 11
<212> TYPE: PRT
<213> ORGANISM: Artificial Sequence
<220> FEATURE:
<223> OTHER INFORMATION: PR000674|VL|LCDR1; PR000676|VL|LCDR1;
      PR000678|VL|LCDR1

<400> SEQUENCE: 122

Arg Ala Ser Gln Ser Val Ser Ser Tyr Leu Ala
1               5                   10

<210> SEQ ID NO 123
<211> LENGTH: 11
<212> TYPE: PRT
<213> ORGANISM: Artificial Sequence
<220> FEATURE:
<223> OTHER INFORMATION: PR000675|VL|LCDR1; PR000846|VL|LCDR1

<400> SEQUENCE: 123

Arg Ala Ser Gln Ser Val Ser Arg Tyr Leu Ala
1               5                   10
```

```
<210> SEQ ID NO 124
<211> LENGTH: 11
<212> TYPE: PRT
<213> ORGANISM: Artificial Sequence
<220> FEATURE:
<223> OTHER INFORMATION: PR000677|VL|LCDR1

<400> SEQUENCE: 124

Arg Ala Ser Gln Ser Val Ser Ser Ser Leu Ala
1               5                   10

<210> SEQ ID NO 125
<211> LENGTH: 11
<212> TYPE: PRT
<213> ORGANISM: Artificial Sequence
<220> FEATURE:
<223> OTHER INFORMATION: PR000679|VL|LCDR1

<400> SEQUENCE: 125

Arg Ala Ser Gln Thr Ile Ser Ile Trp Leu Ala
1               5                   10

<210> SEQ ID NO 126
<211> LENGTH: 15
<212> TYPE: PRT
<213> ORGANISM: Artificial Sequence
<220> FEATURE:
<223> OTHER INFORMATION: PR000673|VL|LFWR2; PR000680|VL|LFWR2

<400> SEQUENCE: 126

Trp Tyr Gln Gln Lys Pro Gly Gln Ala Pro Ser Leu Leu Ile Tyr
1               5                   10                  15

<210> SEQ ID NO 127
<211> LENGTH: 15
<212> TYPE: PRT
<213> ORGANISM: Artificial Sequence
<220> FEATURE:
<223> OTHER INFORMATION: PR000674|VL|LFWR2; PR000676|VL|LFWR2;
      PR000677|VL|LFWR2; PR000678|VL|LFWR2; PR000846|VL|LFWR2

<400> SEQUENCE: 127

Trp Tyr Gln Gln Lys Pro Gly Gln Ala Pro Arg Leu Leu Ile Tyr
1               5                   10                  15

<210> SEQ ID NO 128
<211> LENGTH: 15
<212> TYPE: PRT
<213> ORGANISM: Artificial Sequence
<220> FEATURE:
<223> OTHER INFORMATION: PR000675|VL|LFWR2

<400> SEQUENCE: 128

Trp Tyr Gln Gln Lys Pro Gly Gln Ala Pro Arg Leu Leu Met His
1               5                   10                  15

<210> SEQ ID NO 129
<211> LENGTH: 15
<212> TYPE: PRT
<213> ORGANISM: Artificial Sequence
<220> FEATURE:
<223> OTHER INFORMATION: PR000679|VL|LFWR2

<400> SEQUENCE: 129

Trp Tyr Gln Gln Lys Pro Gly Lys Ala Pro Lys Leu Leu Ile Tyr
1               5                   10                  15
```

```
<210> SEQ ID NO 130
<211> LENGTH: 7
<212> TYPE: PRT
<213> ORGANISM: Artificial Sequence
<220> FEATURE:
<223> OTHER INFORMATION: PR000673|VL|LCDR2; PR000680|VL|LCDR2;
      PR000846|VL|LCDR2

<400> SEQUENCE: 130

Asp Ala Ser Asn Arg Ala Thr
1               5

<210> SEQ ID NO 131
<211> LENGTH: 7
<212> TYPE: PRT
<213> ORGANISM: Artificial Sequence
<220> FEATURE:
<223> OTHER INFORMATION: PR000674|VL|LCDR2; PR000678|VL|LCDR2

<400> SEQUENCE: 131

Asp Thr Ser Lys Arg Ala Thr
1               5

<210> SEQ ID NO 132
<211> LENGTH: 7
<212> TYPE: PRT
<213> ORGANISM: Artificial Sequence
<220> FEATURE:
<223> OTHER INFORMATION: PR000675|VL|LCDR2

<400> SEQUENCE: 132

Asp Ala Ala Asn Arg Ala Thr
1               5

<210> SEQ ID NO 133
<211> LENGTH: 7
<212> TYPE: PRT
<213> ORGANISM: Artificial Sequence
<220> FEATURE:
<223> OTHER INFORMATION: PR000676|VL|LCDR2

<400> SEQUENCE: 133

Asp Ala Ser Thr Arg Ala Thr
1               5

<210> SEQ ID NO 134
<211> LENGTH: 7
<212> TYPE: PRT
<213> ORGANISM: Artificial Sequence
<220> FEATURE:
<223> OTHER INFORMATION: PR000677|VL|LCDR2

<400> SEQUENCE: 134

Gly Ala Ser Thr Arg Ala Thr
1               5

<210> SEQ ID NO 135
<211> LENGTH: 7
<212> TYPE: PRT
<213> ORGANISM: Artificial Sequence
<220> FEATURE:
<223> OTHER INFORMATION: PR000679|VL|LCDR2

<400> SEQUENCE: 135

Lys Ala Ser Ser Leu Glu Ser
1               5
```

```
<210> SEQ ID NO 136
<211> LENGTH: 32
<212> TYPE: PRT
<213> ORGANISM: Artificial Sequence
<220> FEATURE:
<223> OTHER INFORMATION: PR000673|VL|LFWR3; PR000674|VL|LFWR3;
      PR000676|VL|LFWR3; PR000678|VL|LFWR3;
      PR000680|VL|LFWR3; PR000846|VL|LFWR3

<400> SEQUENCE: 136

Gly Ile Pro Ala Arg Phe Ser Gly Ser Gly Ser Gly Thr Asp Phe Thr
1               5                   10                  15

Leu Thr Ile Ser Ser Leu Glu Pro Glu Asp Phe Ala Val Tyr Tyr Cys
            20                  25                  30

<210> SEQ ID NO 137
<211> LENGTH: 32
<212> TYPE: PRT
<213> ORGANISM: Artificial Sequence
<220> FEATURE:
<223> OTHER INFORMATION: PR000675|VL|LFWR3

<400> SEQUENCE: 137

Gly Leu Pro Ala Arg Phe Asn Gly Ser Gly Ser Gly Thr Asp Phe Thr
1               5                   10                  15

Leu Thr Ile Ser Ser Leu Glu Pro Glu Asp Phe Ala Val Tyr Tyr Cys
            20                  25                  30

<210> SEQ ID NO 138
<211> LENGTH: 32
<212> TYPE: PRT
<213> ORGANISM: Artificial Sequence
<220> FEATURE:
<223> OTHER INFORMATION: PR000677|VL|LFWR3

<400> SEQUENCE: 138

Gly Ile Pro Ala Arg Phe Ser Gly Ser Gly Ser Gly Thr Glu Phe Thr
1               5                   10                  15

Leu Thr Ile Ser Ser Leu Gln Ser Glu Asp Phe Ala Val Tyr Tyr Cys
            20                  25                  30

<210> SEQ ID NO 139
<211> LENGTH: 32
<212> TYPE: PRT
<213> ORGANISM: Artificial Sequence
<220> FEATURE:
<223> OTHER INFORMATION: PR000679|VL|LFWR3

<400> SEQUENCE: 139

Gly Val Pro Ser Arg Phe Ser Gly Ser Gly Ser Gly Thr Glu Phe Thr
1               5                   10                  15

Leu Thr Ile Ser Ser Leu Gln Pro Asp Asp Phe Ala Thr Tyr Tyr Cys
            20                  25                  30

<210> SEQ ID NO 140
<211> LENGTH: 9
<212> TYPE: PRT
<213> ORGANISM: Artificial Sequence
<220> FEATURE:
<223> OTHER INFORMATION: PR000673|VL|LCDR3; PR000680|VL|LCDR3

<400> SEQUENCE: 140

His Gln Arg Asn Asn Trp Pro Leu Thr
1               5
```

```
<210> SEQ ID NO 141
<211> LENGTH: 9
<212> TYPE: PRT
<213> ORGANISM: Artificial Sequence
<220> FEATURE:
<223> OTHER INFORMATION: PR000674|VL|LCDR3; PR000678|VL|LCDR3

<400> SEQUENCE: 141

Gln Gln His Asn Asn Trp Ile Phe Thr
1               5

<210> SEQ ID NO 142
<211> LENGTH: 9
<212> TYPE: PRT
<213> ORGANISM: Artificial Sequence
<220> FEATURE:
<223> OTHER INFORMATION: PR000675|VL|LCDR3

<400> SEQUENCE: 142

Gln Gln Arg Asn Asn Trp Pro Leu Thr
1               5

<210> SEQ ID NO 143
<211> LENGTH: 9
<212> TYPE: PRT
<213> ORGANISM: Artificial Sequence
<220> FEATURE:
<223> OTHER INFORMATION: PR000676|VL|LCDR3

<400> SEQUENCE: 143

Gln Gln Arg Ser Asn Trp Pro Leu Thr
1               5

<210> SEQ ID NO 144
<211> LENGTH: 9
<212> TYPE: PRT
<213> ORGANISM: Artificial Sequence
<220> FEATURE:
<223> OTHER INFORMATION: PR000677|VL|LCDR3

<400> SEQUENCE: 144

Gln Gln Tyr Asn Tyr Trp Pro Ile Thr
1               5

<210> SEQ ID NO 145
<211> LENGTH: 8
<212> TYPE: PRT
<213> ORGANISM: Artificial Sequence
<220> FEATURE:
<223> OTHER INFORMATION: PR000679|VL|LCDR3

<400> SEQUENCE: 145

Gln Gln Phe Asn Ser Tyr Trp Thr
1               5

<210> SEQ ID NO 146
<211> LENGTH: 9
<212> TYPE: PRT
<213> ORGANISM: Artificial Sequence
<220> FEATURE:
<223> OTHER INFORMATION: PR000846|VL|LCDR3

<400> SEQUENCE: 146

Gln Gln Arg Ser Asn Trp Ile Phe Thr
1               5

<210> SEQ ID NO 147
```

```
<211> LENGTH: 10
<212> TYPE: PRT
<213> ORGANISM: Artificial Sequence
<220> FEATURE:
<223> OTHER INFORMATION: PR000673|VL|LFWR4; PR000675|VL|LFWR4;
      PR000676|VL|LFWR4; PR000680|VL|LFWR4

<400> SEQUENCE: 147

Phe Gly Gly Gly Thr Lys Val Glu Ile Lys
1               5                   10

<210> SEQ ID NO 148
<211> LENGTH: 10
<212> TYPE: PRT
<213> ORGANISM: Artificial Sequence
<220> FEATURE:
<223> OTHER INFORMATION: PR000674|VL|LFWR4; PR000678|VL|LFWR4;
      PR000846|VL|LFWR4

<400> SEQUENCE: 148

Phe Gly Pro Gly Thr Lys Val Asp Ile Lys
1               5                   10

<210> SEQ ID NO 149
<211> LENGTH: 10
<212> TYPE: PRT
<213> ORGANISM: Artificial Sequence
<220> FEATURE:
<223> OTHER INFORMATION: PR000677|VL|LFWR4

<400> SEQUENCE: 149

Phe Gly Gln Gly Thr Arg Leu Glu Ile Lys
1               5                   10

<210> SEQ ID NO 150
<211> LENGTH: 10
<212> TYPE: PRT
<213> ORGANISM: Artificial Sequence
<220> FEATURE:
<223> OTHER INFORMATION: PR000679|VL|LFWR4

<400> SEQUENCE: 150

Phe Gly Gln Gly Thr Lys Val Glu Ile Lys
1               5                   10

<210> SEQ ID NO 151
<211> LENGTH: 113
<212> TYPE: PRT
<213> ORGANISM: Artificial Sequence
<220> FEATURE:
<223> OTHER INFORMATION: PR000673|VH|VH

<400> SEQUENCE: 151

Gln Val Gln Leu Val Glu Ser Gly Gly Gly Val Val Gln Pro Gly Arg
1               5                   10                  15

Ser Leu Arg Leu Ser Cys Ala Ala Ser Gly Phe Ile Phe Ser Asn Tyr
            20                  25                  30

Gly Met His Trp Val Arg Gln Ala Pro Gly Lys Gly Leu Glu Trp Val
        35                  40                  45

Ala Val Ile Trp Tyr Asp Gly Ser Lys Lys Tyr Tyr Gly Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Asp Glu Asp Thr Ala Val Tyr Phe Cys
                85                  90                  95
```

Ala Arg Asn Asp Asp Tyr Trp Gly Gln Gly Thr Leu Val Thr Val Ser
            100                 105                 110

Ser

<210> SEQ ID NO 152
<211> LENGTH: 113
<212> TYPE: PRT
<213> ORGANISM: Artificial Sequence
<220> FEATURE:
<223> OTHER INFORMATION: PR000674|VH|VH

<400> SEQUENCE: 152

Gln Val Gln Leu Val Glu Ser Gly Gly Gly Val Val Gln Pro Gly Lys
1               5                   10                  15

Ser Leu Arg Leu Ser Cys Thr Val Ser Gly Leu Thr Phe Ser Asp Asn
            20                  25                  30

Gly Met His Trp Val Arg Gln Ala Pro Gly Arg Gly Leu Glu Trp Met
        35                  40                  45

Ser Val Ile Trp Tyr Asp Gly Ser Lys Lys Tyr Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Asn Met Arg Val Glu Asp Thr Ala Val Tyr Tyr Cys
                85                  90                  95

Ala Thr Asn Ser Asp Tyr Trp Gly Gln Gly Thr Leu Val Thr Val Ser
            100                 105                 110

Ser

<210> SEQ ID NO 153
<211> LENGTH: 114
<212> TYPE: PRT
<213> ORGANISM: Artificial Sequence
<220> FEATURE:
<223> OTHER INFORMATION: PR000675|VH|VH

<400> SEQUENCE: 153

Glu Val Gln Leu Leu Glu Ser Gly Gly Gly Leu Val Gln Pro Gly Gly
1               5                   10                  15

Ser Leu Arg Leu Ser Cys Val Asp Ser Gly Phe Thr Phe Ser Ser Tyr
            20                  25                  30

Ala Met Thr Trp Val Arg Gln Ala Pro Gly Lys Gly Leu Glu Trp Val
        35                  40                  45

Ser Gly Ile Ser Gly Ser Gly Tyr Ser Thr Tyr Tyr Ala Asp Ser Val
    50                  55                  60

Lys Gly Arg Phe Thr Ile Ser Arg Asp Asn Ser Lys Lys Thr Leu Tyr
65                  70                  75                  80

Leu Gln Met Asn Ser Leu Arg Ala Glu Asp Thr Ala Val Tyr Tyr Cys
                85                  90                  95

Ala Glu Leu Ser Leu Asp Tyr Trp Gly Gln Gly Thr Leu Val Thr Val
            100                 105                 110

Ser Ser

<210> SEQ ID NO 154
<211> LENGTH: 114
<212> TYPE: PRT
<213> ORGANISM: Artificial Sequence
<220> FEATURE:
<223> OTHER INFORMATION: PR000676|VH|VH -continued

<400> SEQUENCE: 154

Gln Ile Gln Leu Val Glu Ser Gly Gly Val Val Gln Pro Gly Arg
1               5                   10                  15

Ser Leu Arg Leu Ser Cys Ala Ala Ser Gly Phe Thr Leu Ser Ser Tyr
            20                  25                  30

Gly Met His Trp Val Arg Gln Ala Pro Gly Lys Gly Leu Glu Trp Val
        35                  40                  45

Ala Val Ile Leu Ser Asp Gly Ser Asn Lys Tyr Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Asp Leu Gly Gly Asp Val Trp Gly Gln Gly Thr Thr Val Thr Val
            100                 105                 110

Ser Ser

<210> SEQ ID NO 155
<211> LENGTH: 125
<212> TYPE: PRT
<213> ORGANISM: Artificial Sequence
<220> FEATURE:
<223> OTHER INFORMATION: PR000677|VH|VH

<400> SEQUENCE: 155

Gln Val Gln Leu Gln Gln Ser Gly Pro Gly Leu Val Lys Pro Ser Gln
1               5                   10                  15

Thr Leu Ser Leu Thr Cys Ala Ile Ser Gly Asp Ser Val Ser Ser Asn
            20                  25                  30

Ser Ala Ala Trp Asn Trp Ile Arg Gln Ser Pro Ser Arg Gly Leu Glu
        35                  40                  45

Trp Leu Gly Arg Thr Tyr Tyr Arg Ser Lys Trp Tyr Ser Asp Tyr Gly
    50                  55                  60

Ile Ser Val Asn Ser Arg Ile Thr Val Asn Pro Asp Thr Ser Lys Asn
65                  70                  75                  80

Leu Phe Ser Leu Gln Leu Asn Pro Val Thr Pro Glu Asp Thr Ala Val
                85                  90                  95

Tyr Tyr Cys Thr Arg Glu Thr His Tyr Tyr Gly Ser Gly Ser Tyr Leu
            100                 105                 110

Asp Tyr Trp Ser Gln Gly Thr Leu Val Thr Val Ser Ser
        115                 120                 125

<210> SEQ ID NO 156
<211> LENGTH: 113
<212> TYPE: PRT
<213> ORGANISM: Artificial Sequence
<220> FEATURE:
<223> OTHER INFORMATION: PR000678|VH|VH

<400> SEQUENCE: 156

Gln Val Gln Leu Val Glu Ser Gly Gly Gly Val Val Gln Pro Gly Arg
1               5                   10                  15

Ser Leu Arg Leu Ser Cys Ala Val Ser Gly Leu Thr Phe Ser Asp Asn
            20                  25                  30

Gly Met His Trp Val Arg Gln Ala Pro Gly Arg Gly Leu Glu Trp Met
        35                  40                  45

```
Ala Val Ile Trp Tyr Asp Gly Ser Lys Lys Tyr Tyr Gly Asp Ser Val
     50                  55                  60

Lys Gly Arg Phe Thr Ile Ser Arg Asp Asn Ser Lys Asn Thr Leu Tyr
 65                  70                  75                  80

Leu Gln Met Asn Ser Leu Arg Ala Glu Asp Thr Ala Val Tyr Tyr Cys
                 85                  90                  95

Ala Thr Asn Ser Asp Tyr Trp Gly Gln Gly Thr Leu Val Thr Val Ser
             100                 105                 110

Ser

<210> SEQ ID NO 157
<211> LENGTH: 123
<212> TYPE: PRT
<213> ORGANISM: Artificial Sequence
<220> FEATURE:
<223> OTHER INFORMATION: PR000679|VH|VH

<400> SEQUENCE: 157

Gln Val Gln Leu Val Gln Ser Gly Thr Glu Val Lys Lys Pro Gly Ser
  1               5                  10                  15

Ser Val Lys Val Ser Cys Lys Ala Ser Gly Gly Thr Phe Ser Ser Tyr
                 20                  25                  30

Ala Ile Ser Trp Val Arg Gln Ala Pro Gly Gln Gly Leu Glu Trp Met
             35                  40                  45

Gly Gly Ile Ile Pro Ile Phe Asp Thr Val Ser Ser Ala Gln Lys Phe
         50                  55                  60

Gln Gly Arg Val Thr Ile Thr Ala Asp Lys Ser Thr Ser Thr Ala Tyr
 65                  70                  75                  80

Met Glu Leu Phe Ser Leu Arg Ser Glu Asp Thr Ala Val Tyr Tyr Cys
                 85                  90                  95

Ala Arg Ser Pro Pro Tyr Ser Ser Asn Trp Tyr Gln Tyr Phe Gln His
             100                 105                 110

Trp Gly Gln Gly Thr Leu Val Thr Val Ser Ser
         115                 120

<210> SEQ ID NO 158
<211> LENGTH: 113
<212> TYPE: PRT
<213> ORGANISM: Artificial Sequence
<220> FEATURE:
<223> OTHER INFORMATION: PR000680|VH|VH

<400> SEQUENCE: 158

Gln Val Gln Leu Val Glu Ser Gly Gly Gly Val Val Gln Pro Gly Arg
  1               5                  10                  15

Ser Leu Arg Leu Ser Cys Ala Ala Ser Gly Phe Ile Phe Ser Asn Tyr
                 20                  25                  30

Gly Met His Trp Val Arg Gln Ala Pro Gly Lys Gly Leu Glu Trp Val
             35                  40                  45

Ala Val Ile Trp Tyr Asp Gly Ser Asn Lys Tyr Tyr Gly Asp Ser Val
         50                  55                  60

Lys Gly Arg Phe Thr Ile Ser Arg Asp Asn Ser Lys Asn Thr Leu Tyr
 65                  70                  75                  80

Leu Gln Met Asn Ser Leu Arg Asp Glu Asp Thr Ala Val Tyr Phe Cys
                 85                  90                  95

Ala Arg Asn Asp Asp Tyr Trp Gly Gln Gly Thr Leu Val Thr Val Ser
             100                 105                 110
```

Ser

<210> SEQ ID NO 159
<211> LENGTH: 119
<212> TYPE: PRT
<213> ORGANISM: Artificial Sequence
<220> FEATURE:
<223> OTHER INFORMATION: PR000846|VH|VH

<400> SEQUENCE: 159

Gln Val Gln Leu Val Glu Ser Gly Gly Gly Val Ala Gln Pro Gly Arg
1               5                   10                  15

Ser Leu Ser Leu Ser Cys Ala Ala Ser Gly Phe Thr Phe Ser Asp Tyr
            20                  25                  30

Gly Met His Trp Val Arg Gln Ala Pro Gly Lys Gly Leu Glu Trp Val
        35                  40                  45

Ala Leu Ile Trp Tyr Asp Ala Ser Phe Glu Tyr Tyr Ala Asp Ser Val
    50                  55                  60

Lys Gly Arg Phe Ser Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Val Arg Asp Ala Gln Trp Gly Ser Arg Leu Asp Tyr Trp Gly Gln Gly
            100                 105                 110

Thr Leu Val Thr Val Ser Ser
        115

<210> SEQ ID NO 160
<211> LENGTH: 124
<212> TYPE: PRT
<213> ORGANISM: Artificial Sequence
<220> FEATURE:
<223> OTHER INFORMATION: PR002473|VH|VH

<400> SEQUENCE: 160

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Ser Ser His
            20                  25                  30

Tyr Met Ser Trp Val Arg Gln Ala Pro Gly Lys Gly Leu Glu Trp Val
        35                  40                  45

Ser Ile Ile His Ser Gly Gly Ser Thr Tyr Tyr Ala Asp Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Ile Ala Glu Asp Thr Ala Val Tyr Tyr Cys Ala
                85                  90                  95

Arg Ala Ile Ala Val Ala Glu Lys Asn Gly Tyr Asn Tyr Pro Phe Asn
            100                 105                 110

Tyr Trp Gly Gln Gly Thr Leu Val Thr Val Ser Ser
        115                 120

<210> SEQ ID NO 161
<211> LENGTH: 124
<212> TYPE: PRT
<213> ORGANISM: Artificial Sequence
<220> FEATURE:
<223> OTHER INFORMATION: PR002474|VH|VH

<400> SEQUENCE: 161

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Ser Ser His
            20                  25                  30

Tyr Met Ser Trp Val Arg Gln Ala Pro Gly Lys Gly Leu Glu Trp Val
        35                  40                  45

Ser Ile Ile His Ser Gly Gly Ser Thr Tyr Tyr Ala Asp Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Asp Thr Ala Val Tyr Tyr Cys Ala
                85                  90                  95

Arg Ala Thr Ala Val Ala Glu Lys Asn Gly Tyr Asn Tyr Pro Phe Asn
            100                 105                 110

Tyr Trp Gly Gln Gly Thr Leu Val Thr Val Ser Ser
        115                 120

<210> SEQ ID NO 162
<211> LENGTH: 124
<212> TYPE: PRT
<213> ORGANISM: Artificial Sequence
<220> FEATURE:
<223> OTHER INFORMATION: PR002475|VH|VH

<400> SEQUENCE: 162

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Ser Ser Asn
            20                  25                  30

Tyr Met Ser Trp Val Arg Gln Ala Pro Gly Lys Gly Leu Glu Trp Val
        35                  40                  45

Ser Ile Ile His Ser Gly Gly Ser Thr Tyr Tyr Ala Asp Ser Val Lys
    50                  55                  60

Gly Arg Phe Thr Ile Ser Arg Asp Asn Ser Lys Asn Thr Leu Tyr Leu
65                  70                  75                  80

Gln Met Asn Ser Leu Arg Ala Glu Asp Thr Ala Val Tyr Tyr Cys Ala
                85                  90                  95

Arg Ala Ile Ala Val Ala Glu Lys Asn Gly Tyr Asn Tyr Pro Phe Asn
            100                 105                 110

Tyr Trp Gly Gln Gly Thr Leu Val Thr Val Ser Ser
        115                 120

<210> SEQ ID NO 163
<211> LENGTH: 124
<212> TYPE: PRT
<213> ORGANISM: Artificial Sequence
<220> FEATURE:
<223> OTHER INFORMATION: PR002476|VH|VH

<400> SEQUENCE: 163

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Ser Ser His
            20                  25                  30

Tyr Met Ser Trp Val Arg Gln Ala Pro Gly Lys Gly Leu Glu Trp Val
        35                  40                  45

Ser Ile Ile His Ser Gly Gly Ser Thr Tyr Tyr Ala Asp Ser Val Lys

```
                   50                  55                  60
Gly Arg Phe Thr Ile Ser Arg Asp Asn Ser Lys Asn Arg Leu Tyr Leu
 65                  70                  75                  80

Gln Met Asn Ser Leu Arg Ala Glu Asp Thr Ala Val Tyr Tyr Cys Ala
                 85                  90                  95

Arg Ala Thr Ala Val Ala Glu Lys Asn Gly Tyr Asn Tyr Pro Phe Asn
                100                 105                 110

Tyr Trp Gly Gln Gly Thr Leu Val Thr Val Ser Ser
            115                 120

<210> SEQ ID NO 164
<211> LENGTH: 124
<212> TYPE: PRT
<213> ORGANISM: Artificial Sequence
<220> FEATURE:
<223> OTHER INFORMATION: PR002477|VH|VH

<400> SEQUENCE: 164

Glu Val Gln Leu Val Glu Thr Gly Gly Gly Leu Ile Gln Pro Gly Gly
 1               5                  10                  15

Ser Leu Arg Leu Ser Cys Ala Ala Ser Gly Phe Asn Val Ser Ser His
                20                  25                  30

Tyr Met Ser Trp Val Arg Gln Ala Pro Gly Lys Gly Leu Glu Trp Val
            35                  40                  45

Ser Ile Ile His Ser Gly Gly Ser Thr Tyr Tyr Ala Asp Ser Val Lys
 50                  55                  60

Gly Arg Phe Thr Ile Ser Arg Asp Asn Ser Lys Asn Arg Leu Tyr Leu
 65                  70                  75                  80

Gln Met Asn Ser Leu Arg Ala Glu Asp Thr Ala Val Tyr Tyr Cys Ala
                 85                  90                  95

Arg Ala Ile Ala Val Ala Glu Lys Asn Gly Tyr Asn Tyr Pro Phe Asn
                100                 105                 110

Tyr Trp Gly Gln Gly Thr Leu Val Thr Val Ser Ser
            115                 120

<210> SEQ ID NO 165
<211> LENGTH: 124
<212> TYPE: PRT
<213> ORGANISM: Artificial Sequence
<220> FEATURE:
<223> OTHER INFORMATION: PR002478|VH|VH

<400> SEQUENCE: 165

Glu Val Gln Leu Val Glu Thr Gly Gly Gly Leu Ile Gln Pro Gly Gly
 1               5                  10                  15

Ser Leu Arg Leu Ser Cys Ala Ala Ser Gly Phe Asn Val Ser Ser Asn
                20                  25                  30

Tyr Met Ser Trp Val Arg Gln Ala Pro Gly Lys Gly Leu Glu Trp Val
            35                  40                  45

Ser Ile Ile His Ser Gly Gly Ser Thr Tyr Tyr Ala Asp Ser Val Lys
 50                  55                  60

Gly Arg Phe Thr Ile Ser Arg Asp Asn Ser Lys Asn Arg Leu Tyr Leu
 65                  70                  75                  80

Gln Met Asn Ser Leu Arg Ala Glu Asp Thr Ala Val Tyr Tyr Cys Ala
                 85                  90                  95

Arg Ala Ile Ala Val Ala Glu Lys Asn Gly Tyr Asn Tyr Pro Phe Asn
                100                 105                 110
```

```
Tyr Trp Gly Gln Gly Thr Leu Val Thr Val Ser Ser
        115                 120
```

<210> SEQ ID NO 166
<211> LENGTH: 124
<212> TYPE: PRT
<213> ORGANISM: Artificial Sequence
<220> FEATURE:
<223> OTHER INFORMATION: PR002479|VH|VH

<400> SEQUENCE: 166

```
Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Ser Ser His
            20                  25                  30

Tyr Met Ser Trp Val Arg Gln Ala Pro Gly Lys Gly Leu Glu Trp Val
        35                  40                  45

Ser Ile Ile His Ser Gly Gly Ser Thr Tyr Tyr Ala Asp Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Val Tyr Tyr Cys Ala
                85                  90                  95

Arg Ala Thr Ala Val Ala Glu Glu Asn Gly Tyr Asn Tyr Pro Phe Asn
            100                 105                 110

Tyr Trp Gly Gln Gly Thr Leu Val Thr Val Ser Ser
        115                 120
```

<210> SEQ ID NO 167
<211> LENGTH: 124
<212> TYPE: PRT
<213> ORGANISM: Artificial Sequence
<220> FEATURE:
<223> OTHER INFORMATION: HCAb VH General Formula 2
<220> FEATURE:
<221> NAME/KEY: misc_feature
<222> LOCATION: (28)..(28)
<223> OTHER INFORMATION: Xaa = Asn or Thr
<220> FEATURE:
<221> NAME/KEY: misc_feature
<222> LOCATION: (30)..(30)
<223> OTHER INFORMATION: Xaa = Ala or Ser
<220> FEATURE:
<221> NAME/KEY: misc_feature
<222> LOCATION: (31)..(31)
<223> OTHER INFORMATION: Xaa = Phe or Ser
<220> FEATURE:
<221> NAME/KEY: misc_feature
<222> LOCATION: (32)..(32)
<223> OTHER INFORMATION: Xaa = Phe, His or Tyr
<220> FEATURE:
<221> NAME/KEY: misc_feature
<222> LOCATION: (54)..(54)
<223> OTHER INFORMATION: Xaa = Ala, Gly or Ser
<220> FEATURE:
<221> NAME/KEY: misc_feature
<222> LOCATION: (57)..(57)
<223> OTHER INFORMATION: Xaa = Gly or Thr
<220> FEATURE:
<221> NAME/KEY: misc_feature
<222> LOCATION: (60)..(60)
<223> OTHER INFORMATION: Xaa = Ala or Gly
<220> FEATURE:
<221> NAME/KEY: misc_feature
<222> LOCATION: (61)..(61)
<223> OTHER INFORMATION: Xaa = Ala or Asp
<220> FEATURE:
<221> NAME/KEY: misc_feature
<222> LOCATION: (100)..(100)

-continued

<223> OTHER INFORMATION: Xaa = Ala or Glu
<220> FEATURE:
<221> NAME/KEY: misc_feature
<222> LOCATION: (105)..(105)
<223> OTHER INFORMATION: Xaa = Asn or Gln

<400> SEQUENCE: 167

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Xaa Val Xaa Xaa Xaa
            20                  25                  30

Tyr Met Ser Trp Val Arg Gln Ala Pro Gly Lys Gly Arg Glu Trp Val
        35                  40                  45

Ser Ile Ile Asp Lys Xaa Gly Ser Xaa Tyr Tyr Xaa Xaa Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Xaa Val Arg Glu Lys Xaa Gly Tyr Asn Tyr Pro Phe Asn
            100                 105                 110

Tyr Trp Gly Gln Gly Thr Leu Val Thr Val Ser Ser
        115                 120

<210> SEQ ID NO 168
<211> LENGTH: 124
<212> TYPE: PRT
<213> ORGANISM: Artificial Sequence
<220> FEATURE:
<223> OTHER INFORMATION: PR002481|VH|VH; PR005090|VH|VH

<400> SEQUENCE: 168

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Ser Ser His
            20                  25                  30

Tyr Met Ser Trp Val Arg Gln Ala Pro Gly Lys Gly Arg Glu Trp Val
        35                  40                  45

Ser Ile Ile Asp Gly Gly Gly Ser Thr Tyr Tyr Ala Asp Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Ala Val Ala Glu Lys Asn Gly Tyr Asn Tyr Pro Phe Asn
            100                 105                 110

Tyr Trp Gly Gln Gly Thr Leu Val Thr Val Ser Ser
        115                 120

<210> SEQ ID NO 169
<211> LENGTH: 124
<212> TYPE: PRT
<213> ORGANISM: Artificial Sequence
<220> FEATURE:
<223> OTHER INFORMATION: PR005082|VH|VH

<400> SEQUENCE: 169

Glu Val Gln Leu Val Glu Thr Gly Gly Gly Leu Ile Gln Pro Gly Gly
1               5                   10                  15

-continued

Ser Leu Arg Leu Ser Cys Ala Ala Ser Gly Phe Ala Val Asp Arg Tyr
            20                  25                  30

Tyr Met Ser Trp Val Arg Gln Ala Pro Gly Lys Gly Gln Glu Trp Val
        35                  40                  45

Ser Ile Ile Asp Arg Gly Gly Ser Thr Tyr Tyr Ala Asp Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Gln Val Arg Glu Lys Gly Gly Tyr Asn Tyr Pro Phe Asn
            100                 105                 110

Tyr Trp Gly Gln Gly Thr Leu Val Thr Val Ser Ser
        115                 120

<210> SEQ ID NO 170
<211> LENGTH: 124
<212> TYPE: PRT
<213> ORGANISM: Artificial Sequence
<220> FEATURE:
<223> OTHER INFORMATION: PR005083|VH|VH

<400> SEQUENCE: 170

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Ala Val Asp Arg Tyr
            20                  25                  30

Tyr Met Ser Trp Val Arg Gln Ala Pro Gly Lys Gly Gln Glu Trp Val
        35                  40                  45

Ser Ile Ile Asp Arg Gly Gly Thr Tyr Tyr Ala Asp Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Gln Val Arg Glu Lys Gly Gly Tyr Asn Tyr Pro Phe Asn
            100                 105                 110

Tyr Trp Gly Gln Gly Thr Leu Val Thr Val Ser Ser
        115                 120

<210> SEQ ID NO 171
<211> LENGTH: 124
<212> TYPE: PRT
<213> ORGANISM: Artificial Sequence
<220> FEATURE:
<223> OTHER INFORMATION: PR005084|VH|VH

<400> SEQUENCE: 171

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Ala Val Asp Arg Tyr
            20                  25                  30

Tyr Met Ser Trp Val Arg Gln Ala Pro Gly Lys Gly Gln Glu Trp Val
        35                  40                  45

Ser Ile Ile Asp Arg Gly Gly Ser Lys Tyr Tyr Ala Asp Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Gln Val Arg Glu Lys Gly Gly Tyr Asn Tyr Pro Phe Asn
            100                 105                 110

Tyr Trp Gly Gln Gly Thr Leu Val Thr Val Ser Ser
        115                 120

<210> SEQ ID NO 172
<211> LENGTH: 124
<212> TYPE: PRT
<213> ORGANISM: Artificial Sequence
<220> FEATURE:
<223> OTHER INFORMATION: PR005085|VH|VH

<400> SEQUENCE: 172

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Ala Val Asp Arg Tyr
            20                  25                  30

Tyr Met Ser Trp Val Arg Gln Ala Pro Gly Lys Gly Gln Glu Trp Val
        35                  40                  45

Ser Ile Ile Asp Lys Gly Gly Thr Tyr Tyr Ala Asp Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Gln Val Arg Glu Lys Gly Gly Tyr Asn Tyr Pro Phe Asn
            100                 105                 110

Tyr Trp Gly Gln Gly Thr Leu Val Thr Val Ser Ser
        115                 120

<210> SEQ ID NO 173
<211> LENGTH: 124
<212> TYPE: PRT
<213> ORGANISM: Artificial Sequence
<220> FEATURE:
<223> OTHER INFORMATION: PR005086|VH|VH

<400> SEQUENCE: 173

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Ser Val Gly His
            20                  25                  30

Tyr Met Ser Trp Val Arg Gln Ala Pro Gly Lys Gly Gln Glu Trp Val
        35                  40                  45

Ser Ile Ile Asp Arg Gly Gly Ser Thr Tyr Tyr Ala Asp Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Gln Val Arg Glu Lys Gly Gly Tyr Asn Tyr Pro Phe Asn
            100                 105                 110

Tyr Trp Gly Gln Gly Thr Leu Val Thr Val Ser Ser
        115                 120

<210> SEQ ID NO 174
<211> LENGTH: 124
<212> TYPE: PRT
<213> ORGANISM: Artificial Sequence
<220> FEATURE:
<223> OTHER INFORMATION: PR005087|VH|VH

<400> SEQUENCE: 174

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Ser Val Val Gly His
            20                  25                  30

Tyr Met Ser Trp Val Arg Gln Ala Pro Gly Lys Gly Gln Glu Trp Val
        35                  40                  45

Ser Ile Ile Asp Arg Gly Gly Thr Tyr Tyr Ala Asp Ser Val Lys
50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Gln Val Arg Glu Lys Gly Gly Tyr Asn Tyr Pro Phe Asn
            100                 105                 110

Tyr Trp Gly Gln Gly Thr Leu Val Thr Val Ser Ser
        115                 120

<210> SEQ ID NO 175
<211> LENGTH: 124
<212> TYPE: PRT
<213> ORGANISM: Artificial Sequence
<220> FEATURE:
<223> OTHER INFORMATION: PR005088|VH|VH

<400> SEQUENCE: 175

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Ser Val Val Gly His
            20                  25                  30

Tyr Met Ser Trp Val Arg Gln Ala Pro Gly Lys Gly Gln Glu Trp Val
        35                  40                  45

Ser Ile Ile Asp Arg Gly Gly Ser Lys Tyr Tyr Ala Asp Ser Val Lys
50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Gln Val Arg Glu Lys Gly Gly Tyr Asn Tyr Pro Phe Asn
            100                 105                 110

Tyr Trp Gly Gln Gly Thr Leu Val Thr Val Ser Ser
        115                 120

<210> SEQ ID NO 176
<211> LENGTH: 124
<212> TYPE: PRT
<213> ORGANISM: Artificial Sequence
<220> FEATURE:
<223> OTHER INFORMATION: PR005089|VH|VH

<400> SEQUENCE: 176

Glu Val Gln Leu Val Glu Thr Gly Gly Gly Leu Ile Gln Pro Gly Gly
1               5                   10                  15

```
Ser Leu Arg Leu Ser Cys Ala Ala Ser Gly Phe Ser Val Val Gly His
            20                  25                  30

Tyr Met Ser Trp Val Arg Gln Ala Pro Gly Lys Gly Gln Glu Trp Val
            35                  40                  45

Ser Ile Ile Asp Lys Gly Gly Thr Tyr Tyr Ala Asp Ser Val Lys
 50                  55                  60

Gly Arg Phe Thr Ile Ser Arg Asp Asn Ser Lys Asn Arg Leu Tyr Leu
 65                  70                  75                  80

Gln Met Asn Ser Leu Arg Ala Glu Asp Thr Ala Met Tyr Tyr Cys Ala
                85                  90                  95

Arg Ala Thr Gln Val Arg Glu Lys Gly Gly Tyr Asn Tyr Pro Phe Asn
                100                 105                 110

Tyr Trp Gly Gln Gly Thr Leu Val Thr Val Ser Ser
            115                 120
```

<210> SEQ ID NO 177
<211> LENGTH: 124
<212> TYPE: PRT
<213> ORGANISM: Artificial Sequence
<220> FEATURE:
<223> OTHER INFORMATION: PR005091|VH|VH

<400> SEQUENCE: 177

```
Glu Val Gln Leu Val Glu Thr Gly Gly Gly Leu Ile Gln Pro Gly Gly
 1               5                   10                  15

Ser Leu Arg Leu Ser Cys Ala Ala Ser Gly Phe Ala Val Asp Arg Tyr
            20                  25                  30

Tyr Met Ser Trp Val Arg Gln Ala Pro Gly Lys Gly Gln Glu Trp Val
            35                  40                  45

Ser Ile Ile Asp Gly Gly Gly Ser Thr Tyr Tyr Ala Asp Ser Val Lys
 50                  55                  60

Gly Arg Phe Thr Ile Ser Arg Asp Asn Ser Lys Asn Arg Leu Tyr Leu
 65                  70                  75                  80

Gln Met Asn Ser Leu Arg Ala Glu Asp Thr Ala Met Tyr Tyr Cys Ala
                85                  90                  95

Arg Ala Thr Ala Val Ala Glu Lys Asn Gly Tyr Asn Tyr Pro Phe Asn
                100                 105                 110

Tyr Trp Gly Gln Gly Thr Leu Val Thr Val Ser Ser
            115                 120
```

<210> SEQ ID NO 178
<211> LENGTH: 124
<212> TYPE: PRT
<213> ORGANISM: Artificial Sequence
<220> FEATURE:
<223> OTHER INFORMATION: PR005092|VH|VH

<400> SEQUENCE: 178

```
Glu Val Gln Leu Val Glu Thr Gly Gly Gly Leu Ile Gln Pro Gly Gly
 1               5                   10                  15

Ser Leu Arg Leu Ser Cys Ala Ala Ser Gly Phe Asn Val Ser Ser His
            20                  25                  30

Tyr Met Ser Trp Val Arg Gln Ala Pro Gly Lys Gly Arg Glu Trp Val
            35                  40                  45

Ser Ile Ile Asp Gly Gly Gly Ser Thr Tyr Tyr Ala Asp Ser Val Lys
 50                  55                  60

Gly Arg Phe Thr Ile Ser Arg Asp Asn Ser Lys Asn Arg Leu Tyr Leu
```

```
                65                  70                  75                  80
Gln Met Asn Ser Leu Arg Ala Glu Asp Thr Ala Met Tyr Tyr Cys Ala
                    85                  90                  95

Arg Ala Thr Ala Val Ala Glu Lys Gly Gly Tyr Asn Tyr Pro Phe Asn
                100                 105                 110

Tyr Trp Gly Gln Gly Thr Leu Val Thr Val Ser Ser
            115                 120

<210> SEQ ID NO 179
<211> LENGTH: 124
<212> TYPE: PRT
<213> ORGANISM: Artificial Sequence
<220> FEATURE:
<223> OTHER INFORMATION: PR005093|VH|VH

<400> SEQUENCE: 179

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Ser Ser His
                20                  25                  30

Tyr Met Ser Trp Val Arg Gln Ala Pro Gly Lys Gly Arg Glu Trp Val
            35                  40                  45

Ser Ile Ile Asp Gly Gly Ser Thr Tyr Tyr Ala Asp Ser Val Lys
        50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                    85                  90                  95

Arg Ala Thr Arg Val Arg Glu Ala Asn Gly Tyr Asn Tyr Pro Phe Asn
                100                 105                 110

Tyr Trp Gly Gln Gly Thr Leu Val Thr Val Ser Ser
            115                 120

<210> SEQ ID NO 180
<211> LENGTH: 124
<212> TYPE: PRT
<213> ORGANISM: Artificial Sequence
<220> FEATURE:
<223> OTHER INFORMATION: PR005094|VH|VH

<400> SEQUENCE: 180

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Ser Val Val Gly His
                20                  25                  30

Tyr Met Ser Trp Val Arg Gln Ala Pro Gly Lys Gly Gln Glu Trp Val
            35                  40                  45

Ser Ile Ile Asp Gly Gly Gly Ser Thr Tyr Tyr Ala Asp Ser Val Lys
        50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                    85                  90                  95

Arg Ala Thr Ala Val Ala Glu Lys Asn Gly Tyr Asn Tyr Pro Phe Asn
                100                 105                 110

Tyr Trp Gly Gln Gly Thr Leu Val Thr Val Ser Ser
            115                 120
```

<210> SEQ ID NO 181
<211> LENGTH: 124
<212> TYPE: PRT
<213> ORGANISM: Artificial Sequence
<220> FEATURE:
<223> OTHER INFORMATION: PR005095|VH|VH

<400> SEQUENCE: 181

```
Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Phe Val Arg Ser His
            20                  25                  30

Tyr Met Ala Trp Val Arg Gln Ala Pro Gly Lys Gly Leu Glu Trp Val
        35                  40                  45

Ser Ile Ile Asp Gly Gly Gly Ser Thr Tyr Tyr Ala Asp Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Ala Val Ala Glu Lys Asn Gly Tyr Asn Tyr Pro Phe Asn
            100                 105                 110

Tyr Trp Gly Gln Gly Thr Leu Val Thr Val Ser Ser
        115                 120
```

<210> SEQ ID NO 182
<211> LENGTH: 124
<212> TYPE: PRT
<213> ORGANISM: Artificial Sequence
<220> FEATURE:
<223> OTHER INFORMATION: PR005096|VH|VH

<400> SEQUENCE: 182

```
Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Ser Ser His
            20                  25                  30

Tyr Met Ser Trp Val Arg Gln Ala Pro Gly Lys Gly Arg Glu Trp Val
        35                  40                  45

Ser Ile Ile Asp Gly Gly Gly Ser Thr Tyr Tyr Ala Asp Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Arg Val Pro Glu Lys Gly Gly Tyr Asn Tyr Pro Phe Asn
            100                 105                 110

Tyr Trp Gly Gln Gly Thr Leu Val Thr Val Ser Ser
        115                 120
```

<210> SEQ ID NO 183
<211> LENGTH: 124
<212> TYPE: PRT
<213> ORGANISM: Artificial Sequence
<220> FEATURE:
<223> OTHER INFORMATION: PR005097|VH|VH

<400> SEQUENCE: 183

```
Glu Val Gln Leu Val Glu Thr Gly Gly Gly Leu Ile Gln Pro Gly Gly
```

```
                1               5                      10                      15
             Ser Leu Arg Leu Ser Cys Ala Ala Ser Gly Phe Asn Val Ser Ser His
                            20                      25                      30

Tyr Met Ser Trp Val Arg Gln Ala Pro Gly Lys Gly Arg Glu Trp Val
                            35                      40                      45

Ser Ile Ile Asp Gly Gly Ser Thr Tyr Tyr Ala Asp Ser Val Lys
                        50                      55                      60

Gly Arg Phe Thr Ile Ser Arg Asp Asn Ser Lys Asn Arg Leu Tyr Leu
             65                      70                      75                      80

Gln Met Asn Ser Leu Arg Ala Glu Asp Thr Ala Met Tyr Tyr Cys Ala
                            85                      90                      95

Arg Ala Thr Ala Val Arg Glu Lys Asn Gly Tyr Asn Tyr Pro Phe Asn
                            100                     105                     110

Tyr Trp Gly Gln Gly Thr Leu Val Thr Val Ser Ser
                            115                     120

<210> SEQ ID NO 184
<211> LENGTH: 124
<212> TYPE: PRT
<213> ORGANISM: Artificial Sequence
<220> FEATURE:
<223> OTHER INFORMATION: PR005098|VH|VH

<400> SEQUENCE: 184

Glu Val Gln Leu Val Glu Thr Gly Gly Gly Leu Ile Gln Pro Gly Gly
1               5                      10                      15

Ser Leu Arg Leu Ser Cys Ala Ala Ser Gly Phe Asn Val Ser Ser His
                20                      25                      30

Tyr Met Ser Trp Val Arg Gln Ala Pro Gly Lys Gly Arg Glu Trp Val
                35                      40                      45

Ser Ile Ile Asp Gly Gly Ser Thr Tyr Tyr Ala Asp Ser Val Lys
            50                      55                      60

Gly Arg Phe Thr Ile Ser Arg Asp Asn Ser Lys Asn Arg Leu Tyr Leu
65                      70                      75                      80

Gln Met Asn Ser Leu Arg Ala Glu Asp Thr Ala Met Tyr Tyr Cys Ala
                85                      90                      95

Arg Ala Thr Gln Val Arg Glu Lys Gly Gly Tyr Asn Tyr Pro Phe Asn
                100                     105                     110

Tyr Trp Gly Gln Gly Thr Leu Val Thr Val Ser Ser
                115                     120

<210> SEQ ID NO 185
<211> LENGTH: 124
<212> TYPE: PRT
<213> ORGANISM: Artificial Sequence
<220> FEATURE:
<223> OTHER INFORMATION: PR005099|VH|VH

<400> SEQUENCE: 185

Glu Val Gln Leu Val Glu Thr Gly Gly Gly Leu Ile Gln Pro Gly Gly
1               5                      10                      15

Ser Leu Arg Leu Ser Cys Ala Ala Ser Gly Phe Asn Val Ser Ser His
                20                      25                      30

Tyr Met Ser Trp Val Arg Gln Ala Pro Gly Lys Gly Arg Glu Trp Val
                35                      40                      45

Ser Ile Ile Asp Ser Ala Gly Ser Thr Tyr Tyr Ala Asp Ser Val Lys
            50                      55                      60
```

```
Gly Arg Phe Thr Ile Ser Arg Asp Asn Ser Lys Asn Arg Leu Tyr Leu
 65                  70                  75                  80

Gln Met Asn Ser Leu Arg Ala Glu Asp Thr Ala Met Tyr Tyr Cys Ala
                 85                  90                  95

Arg Ala Thr Ala Val Ala Glu Lys Asn Gly Tyr Asn Tyr Pro Phe Asn
            100                 105                 110

Tyr Trp Gly Gln Gly Thr Leu Val Thr Val Ser Ser
        115                 120
```

<210> SEQ ID NO 186
<211> LENGTH: 124
<212> TYPE: PRT
<213> ORGANISM: Artificial Sequence
<220> FEATURE:
<223> OTHER INFORMATION: PR005100|VH|VH

<400> SEQUENCE: 186

```
Glu Val Gln Leu Val Glu Thr Gly Gly Gly Leu Ile Gln Pro Gly Gly
 1               5                  10                  15

Ser Leu Arg Leu Ser Cys Ala Ala Ser Gly Phe Asn Val Ser Ser His
             20                  25                  30

Tyr Met Ser Trp Val Arg Gln Ala Pro Gly Lys Gly Arg Glu Trp Val
         35                  40                  45

Ser Ile Ile Asp Arg Gly Gly Ser Lys Tyr Tyr Ala Asp Ser Val Lys
     50                  55                  60

Gly Arg Phe Thr Ile Ser Arg Asp Asn Ser Lys Asn Arg Leu Tyr Leu
 65                  70                  75                  80

Gln Met Asn Ser Leu Arg Ala Glu Asp Thr Ala Met Tyr Tyr Cys Ala
                 85                  90                  95

Arg Ala Thr Ala Val Ala Glu Lys Asn Gly Tyr Asn Tyr Pro Phe Asn
            100                 105                 110

Tyr Trp Gly Gln Gly Thr Leu Val Thr Val Ser Ser
        115                 120
```

<210> SEQ ID NO 187
<211> LENGTH: 124
<212> TYPE: PRT
<213> ORGANISM: Artificial Sequence
<220> FEATURE:
<223> OTHER INFORMATION: PR005101|VH|VH

<400> SEQUENCE: 187

```
Glu Val Gln Leu Val Glu Thr Gly Gly Gly Leu Ile Gln Pro Gly Gly
 1               5                  10                  15

Ser Leu Arg Leu Ser Cys Ala Ala Ser Gly Phe Asn Val Ser Ser His
             20                  25                  30

Tyr Met Ser Trp Val Arg Gln Ala Pro Gly Lys Gly Arg Glu Trp Val
         35                  40                  45

Ser Ile Ile Asp Lys Gly Gly Gly Thr Tyr Tyr Ala Asp Ser Val Lys
     50                  55                  60

Gly Arg Phe Thr Ile Ser Arg Asp Asn Ser Lys Asn Arg Leu Tyr Leu
 65                  70                  75                  80

Gln Met Asn Ser Leu Arg Ala Glu Asp Thr Ala Met Tyr Tyr Cys Ala
                 85                  90                  95

Arg Ala Thr Ala Val Ala Glu Lys Asn Gly Tyr Asn Tyr Pro Phe Asn
            100                 105                 110

Tyr Trp Gly Gln Gly Thr Leu Val Thr Val Ser Ser
        115                 120
```

<210> SEQ ID NO 188
<211> LENGTH: 124
<212> TYPE: PRT
<213> ORGANISM: Artificial Sequence
<220> FEATURE:
<223> OTHER INFORMATION: PR005102|VH|VH

<400> SEQUENCE: 188

```
Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Ser Ser His
            20                  25                  30

Tyr Met Ser Trp Val Arg Gln Ala Pro Gly Lys Gly Arg Glu Trp Val
        35                  40                  45

Ser Ile Ile Asp Arg Gly Gly Ser Thr Tyr Tyr Ala Asp Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Ala Val Ala Glu Lys Asn Gly Tyr Asn Tyr Pro Phe Asn
            100                 105                 110

Tyr Trp Gly Gln Gly Thr Leu Val Thr Val Ser Ser
        115                 120
```

<210> SEQ ID NO 189
<211> LENGTH: 124
<212> TYPE: PRT
<213> ORGANISM: Artificial Sequence
<220> FEATURE:
<223> OTHER INFORMATION: PR005103|VH|VH

<400> SEQUENCE: 189

```
Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Ser Ser His
            20                  25                  30

Tyr Met Ser Trp Val Arg Gln Ala Pro Gly Lys Gly Arg Glu Trp Val
        35                  40                  45

Ser Ile Ile Asp Arg Gly Gly Gly Thr Tyr Tyr Ala Asp Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Ala Val Ala Glu Lys Asn Gly Tyr Asn Tyr Pro Phe Asn
            100                 105                 110

Tyr Trp Gly Gln Gly Thr Leu Val Thr Val Ser Ser
        115                 120
```

<210> SEQ ID NO 190
<211> LENGTH: 124
<212> TYPE: PRT
<213> ORGANISM: Artificial Sequence
<220> FEATURE:
<223> OTHER INFORMATION: PR005104|VH|VH

<400> SEQUENCE: 190

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Ser Ser His
            20                  25                  30

Tyr Met Ser Trp Val Arg Gln Ala Pro Gly Lys Gly Arg Glu Trp Val
        35                  40                  45

Ser Ile Ile Asp Ile Ser Gly Ser Thr Tyr Tyr Ala Asp Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Ala Val Ala Glu Lys Asn Gly Tyr Asn Tyr Pro Phe Asn
            100                 105                 110

Tyr Trp Gly Gln Gly Thr Leu Val Thr Val Ser Ser
        115                 120

<210> SEQ ID NO 191
<211> LENGTH: 124
<212> TYPE: PRT
<213> ORGANISM: Artificial Sequence
<220> FEATURE:
<223> OTHER INFORMATION: PR005139|VH|VH

<400> SEQUENCE: 191

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Arg Ser His
            20                  25                  30

Tyr Met Ser Trp Val Arg Gln Ala Pro Gly Lys Gly Arg Glu Trp Val
        35                  40                  45

Ser Ile Ile Asp Lys Ala Gly Ser Gly Tyr Tyr Ala Ala Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Glu Val Arg Glu Lys Asn Gly Tyr Asn Tyr Pro Phe Asn
            100                 105                 110

Tyr Trp Gly Gln Gly Thr Leu Val Thr Val Ser Ser
        115                 120

<210> SEQ ID NO 192
<211> LENGTH: 124
<212> TYPE: PRT
<213> ORGANISM: Artificial Sequence
<220> FEATURE:
<223> OTHER INFORMATION: PR005140|VH|VH

<400> SEQUENCE: 192

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Arg Ser His
            20                  25                  30

Tyr Met Ser Trp Val Arg Gln Ala Pro Gly Lys Gly Arg Glu Trp Val
        35                  40                  45

Ser Ile Ile Asp Lys Ala Gly Ser Thr Tyr Tyr Ala Ala Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Glu Val Arg Glu Lys Asn Gly Tyr Asn Tyr Pro Phe Asn
            100                 105                 110

Tyr Trp Gly Gln Gly Thr Leu Val Thr Val Ser Ser
        115                 120

<210> SEQ ID NO 193
<211> LENGTH: 124
<212> TYPE: PRT
<213> ORGANISM: Artificial Sequence
<220> FEATURE:
<223> OTHER INFORMATION: PR005141|VH|VH

<400> SEQUENCE: 193

Glu Val Gln Leu Val Glu Thr Gly Gly Leu Ile Gln Pro Gly Gly
1               5                   10                  15

Ser Leu Arg Leu Ser Cys Ala Ala Ser Gly Phe Asn Val Ser Tyr Phe
                20                  25                  30

Tyr Met Ser Trp Val Arg Gln Ala Pro Gly Lys Gly Arg Glu Trp Val
            35                  40                  45

Ser Ile Ile Asp Lys Gly Gly Ser Gly Tyr Tyr Ala Ala Ser Val Lys
50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Glu Val Arg Glu Lys Asn Gly Tyr Asn Tyr Pro Phe Asn
            100                 105                 110

Tyr Trp Gly Gln Gly Thr Leu Val Thr Val Ser Ser
        115                 120

<210> SEQ ID NO 194
<211> LENGTH: 124
<212> TYPE: PRT
<213> ORGANISM: Artificial Sequence
<220> FEATURE:
<223> OTHER INFORMATION: PR005142|VH|VH

<400> SEQUENCE: 194

Glu Val Gln Leu Val Glu Thr Gly Gly Leu Ile Gln Pro Gly Gly
1               5                   10                  15

Ser Leu Arg Leu Ser Cys Ala Ala Ser Gly Phe Asn Val Ser Phe Tyr
                20                  25                  30

Tyr Met Ser Trp Val Arg Gln Ala Pro Gly Lys Gly Arg Glu Trp Val
            35                  40                  45

Ser Ile Ile Asp Lys Gly Gly Ser Gly Tyr Tyr Ala Ala Ser Val Lys
50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Glu Val Arg Glu Lys Asn Gly Tyr Asn Tyr Pro Phe Asn
            100                 105                 110

Tyr Trp Gly Gln Gly Thr Leu Val Thr Val Ser Ser 115                 120

<210> SEQ ID NO 195
<211> LENGTH: 124
<212> TYPE: PRT
<213> ORGANISM: Artificial Sequence
<220> FEATURE:
<223> OTHER INFORMATION: PR005143|VH|VH

<400> SEQUENCE: 195

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Ser Phe His
            20                  25                  30

Tyr Met Ser Trp Val Arg Gln Ala Pro Gly Lys Gly Arg Glu Trp Val
        35                  40                  45

Ser Ile Ile Asp Lys Ala Gly Ser Tyr Tyr Gly Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
            85                  90                  95

Arg Ala Thr Glu Val Arg Glu Lys Asn Gly Tyr Asn Tyr Pro Phe Asn
            100                 105                 110

Tyr Trp Gly Gln Gly Thr Leu Val Thr Val Ser Ser
            115                 120

<210> SEQ ID NO 196
<211> LENGTH: 124
<212> TYPE: PRT
<213> ORGANISM: Artificial Sequence
<220> FEATURE:
<223> OTHER INFORMATION: PR005144|VH|VH; PR005569|VH|VH

<400> SEQUENCE: 196

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Ser Phe Tyr
            20                  25                  30

Tyr Met Ser Trp Val Arg Gln Ala Pro Gly Lys Gly Arg Glu Trp Val
        35                  40                  45

Ser Ile Ile Asp Lys Ser Gly Ser Thr Tyr Tyr Ala Ala Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
            85                  90                  95

Arg Ala Thr Glu Val Arg Glu Lys Asn Gly Tyr Asn Tyr Pro Phe Asn
            100                 105                 110

Tyr Trp Gly Gln Gly Thr Leu Val Thr Val Ser Ser
            115                 120

<210> SEQ ID NO 197
<211> LENGTH: 124
<212> TYPE: PRT
<213> ORGANISM: Artificial Sequence
<220> FEATURE:
<223> OTHER INFORMATION: PR005145|VH|VH; PR005570|VH|VH

<400> SEQUENCE: 197

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Ser Phe Tyr
            20                  25                  30

Tyr Met Ser Trp Val Arg Gln Ala Pro Gly Lys Gly Arg Glu Trp Val
        35                  40                  45

Ser Ile Ile Asp Lys Gly Gly Ser Thr Tyr Tyr Gly Asp Ser Val Lys
    50                  55                  60

Gly Arg Phe Thr Ile Ser Arg Asp Asn Ser Lys Asn Arg Leu Tyr Leu
65              70                  75                  80

Gln Met Asn Ser Leu Arg Ala Glu Asp Thr Ala Met Tyr Tyr Cys Ala
            85                  90                  95

Arg Ala Thr Glu Val Arg Glu Lys Asn Gly Tyr Asn Tyr Pro Phe Asn
            100                 105                 110

Tyr Trp Gly Gln Gly Thr Leu Val Thr Val Ser Ser
        115                 120

<210> SEQ ID NO 198
<211> LENGTH: 124
<212> TYPE: PRT
<213> ORGANISM: Artificial Sequence
<220> FEATURE:
<223> OTHER INFORMATION: PR005146|VH|VH

<400> SEQUENCE: 198

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Ser Phe His
            20                  25                  30

Tyr Met Ser Trp Val Arg Gln Ala Pro Gly Lys Gly Arg Glu Trp Val
        35                  40                  45

Ser Ile Ile Asp Gly Ala Gly Ser Gly Tyr Tyr Ala Ala Ser Val Lys
    50                  55                  60

Gly Arg Phe Thr Ile Ser Arg Asp Asn Ser Lys Asn Arg Leu Tyr Leu
65              70                  75                  80

Gln Met Asn Ser Leu Arg Ala Glu Asp Thr Ala Met Tyr Tyr Cys Ala
            85                  90                  95

Arg Ala Thr Met Val Arg Glu Lys Gln Gly Tyr Asn Tyr Pro Phe Asn
            100                 105                 110

Tyr Trp Gly Gln Gly Thr Leu Val Thr Val Ser Ser
        115                 120

<210> SEQ ID NO 199
<211> LENGTH: 124
<212> TYPE: PRT
<213> ORGANISM: Artificial Sequence
<220> FEATURE:
<223> OTHER INFORMATION: PR005147|VH|VH

<400> SEQUENCE: 199

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Ser Tyr Tyr
            20                  25                  30

Tyr Met Ser Trp Val Arg Gln Ala Pro Gly Lys Gly Arg Glu Trp Val
        35                  40                  45

Ser Ile Ile Asp Lys Ala Gly Ser Thr Tyr Tyr Gly Ala Ser Val Lys

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Met Val Arg Glu Lys Asn Gly Tyr Asn Tyr Pro Phe Asn
            100                 105                 110

Tyr Trp Gly Gln Gly Thr Leu Val Thr Val Ser Ser
        115                 120

<210> SEQ ID NO 200
<211> LENGTH: 124
<212> TYPE: PRT
<213> ORGANISM: Artificial Sequence
<220> FEATURE:
<223> OTHER INFORMATION: PR005148|VH|VH; PR005573|VH|VH

<400> SEQUENCE: 200

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Ser Ser His
            20                  25                  30

Tyr Met Ser Trp Val Arg Gln Ala Pro Gly Lys Gly Arg Glu Trp Val
        35                  40                  45

Ser Ile Ile Asp Lys Ala Gly Ser Gly Tyr Tyr Ala Ala Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Glu Val Arg Glu Lys Asn Gly Tyr Asn Tyr Pro Phe Asn
            100                 105                 110

Tyr Trp Gly Gln Gly Thr Leu Val Thr Val Ser Ser
        115                 120

<210> SEQ ID NO 201
<211> LENGTH: 124
<212> TYPE: PRT
<213> ORGANISM: Artificial Sequence
<220> FEATURE:
<223> OTHER INFORMATION: PR005149|VH|VH; PR005574|VH|VH

<400> SEQUENCE: 201

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Ser Ser His
            20                  25                  30

Tyr Met Ser Trp Val Arg Gln Ala Pro Gly Lys Gly Arg Glu Trp Val
        35                  40                  45

Ser Ile Ile Asp Lys Ala Gly Ser Gly Tyr Tyr Ala Asp Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Glu Val Arg Glu Lys Gln Gly Tyr Asn Tyr Pro Phe Asn
            100                 105                 110

-continued

```
Tyr Trp Gly Gln Gly Thr Leu Val Thr Val Ser Ser
        115                 120

<210> SEQ ID NO 202
<211> LENGTH: 124
<212> TYPE: PRT
<213> ORGANISM: Artificial Sequence
<220> FEATURE:
<223> OTHER INFORMATION: PR005150|VH|VH; PR005581|VH|VH

<400> SEQUENCE: 202

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Ser Ser Phe
            20                  25                  30

Tyr Met Ser Trp Val Arg Gln Ala Pro Gly Lys Gly Arg Glu Trp Val
        35                  40                  45

Ser Ile Ile Asp Lys Ala Gly Ser Thr Tyr Tyr Gly Ala Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Glu Val Arg Glu Lys Gln Gly Tyr Asn Tyr Pro Phe Asn
            100                 105                 110

Tyr Trp Gly Gln Gly Thr Leu Val Thr Val Ser Ser
        115                 120

<210> SEQ ID NO 203
<211> LENGTH: 124
<212> TYPE: PRT
<213> ORGANISM: Artificial Sequence
<220> FEATURE:
<223> OTHER INFORMATION: PR005151|VH|VH

<400> SEQUENCE: 203

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Ser Ser His
            20                  25                  30

Tyr Met Ser Trp Val Arg Gln Ala Pro Gly Lys Gly Arg Glu Trp Val
        35                  40                  45

Ser Ile Ile Asp Lys Ser Gly Ser Gly Tyr Tyr Gly Ala Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Glu Val Arg Glu Lys Gln Gly Tyr Asn Tyr Pro Phe Asn
            100                 105                 110

Tyr Trp Gly Gln Gly Thr Leu Val Thr Val Ser Ser
        115                 120

<210> SEQ ID NO 204
<211> LENGTH: 124
<212> TYPE: PRT
<213> ORGANISM: Artificial Sequence
<220> FEATURE:
<223> OTHER INFORMATION: PR005152|VH|VH
```

-continued

```
<400> SEQUENCE: 204

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Arg Ser His
            20                  25                  30

Tyr Met Ser Trp Val Arg Gln Ala Pro Gly Lys Gly Arg Glu Trp Val
        35                  40                  45

Ser Ile Ile Asp Arg Ala Gly Ser Thr Tyr Tyr Gly Ala Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Glu Val Arg Glu Lys Asn Gly Tyr Asn Tyr Pro Phe Asn
            100                 105                 110

Tyr Trp Gly Gln Gly Thr Leu Val Thr Val Ser Ser
        115                 120

<210> SEQ ID NO 205
<211> LENGTH: 124
<212> TYPE: PRT
<213> ORGANISM: Artificial Sequence
<220> FEATURE:
<223> OTHER INFORMATION: PR005153|VH|VH

<400> SEQUENCE: 205

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Ser Ser His
            20                  25                  30

Tyr Met Ser Trp Val Arg Gln Ala Pro Gly Lys Gly Arg Glu Trp Val
        35                  40                  45

Ser Ile Ile Asp Lys Ala Gly Ser Gly Tyr Tyr Gly Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Glu Val Arg Glu Lys Gln Gly Tyr Asn Tyr Pro Phe Asn
            100                 105                 110

Tyr Trp Gly Gln Gly Thr Leu Val Thr Val Ser Ser
        115                 120

<210> SEQ ID NO 206
<211> LENGTH: 124
<212> TYPE: PRT
<213> ORGANISM: Artificial Sequence
<220> FEATURE:
<223> OTHER INFORMATION: PR005154|VH|VH

<400> SEQUENCE: 206

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Ser Ser His
            20                  25                  30

Tyr Met Ser Trp Val Arg Gln Ala Pro Gly Lys Gly Arg Glu Trp Val
        35                  40                  45
```

-continued

```
Ser Ile Ile Asp Lys Ser Gly Ser Thr Tyr Tyr Gly Gly Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Met Val Arg Glu Lys Gln Gly Tyr Asn Tyr Pro Phe Asn
            100                 105                 110

Tyr Trp Gly Gln Gly Thr Leu Val Thr Val Ser Ser
        115                 120

<210> SEQ ID NO 207
<211> LENGTH: 124
<212> TYPE: PRT
<213> ORGANISM: Artificial Sequence
<220> FEATURE:
<223> OTHER INFORMATION: PR005155|VH|VH

<400> SEQUENCE: 207

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Arg Phe Tyr
            20                  25                  30

Tyr Met Ser Trp Val Arg Gln Ala Pro Gly Lys Gly Arg Glu Trp Val
        35                  40                  45

Ser Ile Ile Asp Lys Gly Gly Ser Gly Tyr Tyr Ala Ala Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Glu Val Arg Glu Lys Gln Gly Tyr Asn Tyr Pro Phe Asn
            100                 105                 110

Tyr Trp Gly Gln Gly Thr Leu Val Thr Val Ser Ser
        115                 120

<210> SEQ ID NO 208
<211> LENGTH: 124
<212> TYPE: PRT
<213> ORGANISM: Artificial Sequence
<220> FEATURE:
<223> OTHER INFORMATION: PR005156|VH|VH

<400> SEQUENCE: 208

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Arg Phe His
            20                  25                  30

Tyr Met Ser Trp Val Arg Gln Ala Pro Gly Lys Gly Arg Glu Trp Val
        35                  40                  45

Ser Ile Ile Asp Lys Ala Gly Ser Gly Tyr Tyr Gly Gly Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Glu Val Arg Glu Lys Gln Gly Tyr Asn Tyr Pro Phe Asn
            100                 105                 110
```

Tyr Trp Gly Gln Gly Thr Leu Val Thr Val Ser Ser
        115                 120

<210> SEQ ID NO 209
<211> LENGTH: 124
<212> TYPE: PRT
<213> ORGANISM: Artificial Sequence
<220> FEATURE:
<223> OTHER INFORMATION: PR005157|VH|VH

<400> SEQUENCE: 209

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Arg Phe Tyr
            20                  25                  30

Tyr Met Ser Trp Val Arg Gln Ala Pro Gly Lys Gly Arg Glu Trp Val
        35                  40                  45

Ser Ile Ile Asp Lys Ser Gly Ser Thr Tyr Tyr Ala Ala Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Glu Val Arg Glu Lys Gln Gly Tyr Asn Tyr Pro Phe Asn
            100                 105                 110

Tyr Trp Gly Gln Gly Thr Leu Val Thr Val Ser Ser
        115                 120

<210> SEQ ID NO 210
<211> LENGTH: 124
<212> TYPE: PRT
<213> ORGANISM: Artificial Sequence
<220> FEATURE:
<223> OTHER INFORMATION: PR005158|VH|VH

<400> SEQUENCE: 210

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Arg Ser His
            20                  25                  30

Tyr Met Ser Trp Val Arg Gln Ala Pro Gly Lys Gly Arg Glu Trp Val
        35                  40                  45

Ser Ile Ile Asp Lys Ala Gly Ser Thr Tyr Tyr Ala Ala Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Glu Val Arg Glu Lys Gln Gly Tyr Asn Tyr Pro Phe Asn
            100                 105                 110

Tyr Trp Gly Gln Gly Thr Leu Val Thr Val Ser Ser
        115                 120

<210> SEQ ID NO 211
<211> LENGTH: 124
<212> TYPE: PRT
<213> ORGANISM: Artificial Sequence
<220> FEATURE:
<223> OTHER INFORMATION: PR005159|VH|VH

<400> SEQUENCE: 211

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Arg Ser His
            20                  25                  30

Tyr Met Ser Trp Val Arg Gln Ala Pro Gly Lys Gly Arg Glu Trp Val
        35                  40                  45

Ser Ile Ile Asp Arg Ala Gly Ser Thr Tyr Tyr Gly Ala Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Glu Val Arg Glu Lys Gln Gly Tyr Asn Tyr Pro Phe Asn
            100                 105                 110

Tyr Trp Gly Gln Gly Thr Leu Val Thr Val Ser Ser
        115                 120

<210> SEQ ID NO 212
<211> LENGTH: 124
<212> TYPE: PRT
<213> ORGANISM: Artificial Sequence
<220> FEATURE:
<223> OTHER INFORMATION: PR005160|VH|VH

<400> SEQUENCE: 212

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Arg Phe Tyr
            20                  25                  30

Tyr Met Ser Trp Val Arg Gln Ala Pro Gly Lys Gly Arg Glu Trp Val
        35                  40                  45

Ser Ile Ile Asp Lys Gly Gly Ser Thr Tyr Tyr Gly Asp Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Glu Val Arg Glu Lys Gln Gly Tyr Asn Tyr Pro Phe Asn
            100                 105                 110

Tyr Trp Gly Gln Gly Thr Leu Val Thr Val Ser Ser
        115                 120

<210> SEQ ID NO 213
<211> LENGTH: 124
<212> TYPE: PRT
<213> ORGANISM: Artificial Sequence
<220> FEATURE:
<223> OTHER INFORMATION: PR005161|VH|VH

<400> SEQUENCE: 213

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Arg Ser His
            20                  25                  30

Tyr Met Ser Trp Val Arg Gln Ala Pro Gly Lys Gly Arg Glu Trp Val
        35                  40                  45

```
Ser Ile Ile Asp Lys Ala Gly Ser Gly Tyr Tyr Ala Ala Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Glu Val Arg Glu Lys Gln Gly Tyr Asn Tyr Pro Phe Asn
                100                 105                 110

Tyr Trp Gly Gln Gly Thr Leu Val Thr Val Ser Ser
            115                 120

<210> SEQ ID NO 214
<211> LENGTH: 124
<212> TYPE: PRT
<213> ORGANISM: Artificial Sequence
<220> FEATURE:
<223> OTHER INFORMATION: PR005162|VH|VH

<400> SEQUENCE: 214

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Arg Phe His
                20                  25                  30

Tyr Met Ser Trp Val Arg Gln Ala Pro Gly Lys Gly Arg Glu Trp Val
            35                  40                  45

Ser Ile Ile Asp Lys Ala Gly Ser Gly Tyr Tyr Ala Ala Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Met Val Arg Glu Lys Gln Gly Tyr Asn Tyr Pro Phe Asn
                100                 105                 110

Tyr Trp Gly Gln Gly Thr Leu Val Thr Val Ser Ser
            115                 120

<210> SEQ ID NO 215
<211> LENGTH: 124
<212> TYPE: PRT
<213> ORGANISM: Artificial Sequence
<220> FEATURE:
<223> OTHER INFORMATION: PR005163|VH|VH

<400> SEQUENCE: 215

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Arg Ser His
                20                  25                  30

Tyr Met Ser Trp Val Arg Gln Ala Pro Gly Lys Gly Arg Glu Trp Val
            35                  40                  45

Ser Ile Ile Asp Lys Ala Gly Ser Gly Tyr Tyr Ala Asp Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Glu Val Arg Glu Lys Gln Gly Tyr Asn Tyr Pro Phe Asn
```

```
                100                 105                 110
Tyr Trp Gly Gln Gly Thr Leu Val Thr Val Ser Ser
        115                 120

<210> SEQ ID NO 216
<211> LENGTH: 124
<212> TYPE: PRT
<213> ORGANISM: Artificial Sequence
<220> FEATURE:
<223> OTHER INFORMATION: PR005164|VH|VH

<400> SEQUENCE: 216

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Arg Ser Phe
            20                  25                  30

Tyr Met Ser Trp Val Arg Gln Ala Pro Gly Lys Gly Arg Glu Trp Val
        35                  40                  45

Ser Ile Ile Asp Lys Ala Gly Ser Thr Tyr Tyr Gly Ala Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Glu Val Arg Glu Lys Gln Gly Tyr Asn Tyr Pro Phe Asn
            100                 105                 110

Tyr Trp Gly Gln Gly Thr Leu Val Thr Val Ser Ser
        115                 120

<210> SEQ ID NO 217
<211> LENGTH: 124
<212> TYPE: PRT
<213> ORGANISM: Artificial Sequence
<220> FEATURE:
<223> OTHER INFORMATION: PR005165|VH|VH

<400> SEQUENCE: 217

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Arg Ser His
            20                  25                  30

Tyr Met Ser Trp Val Arg Gln Ala Pro Gly Lys Gly Arg Glu Trp Val
        35                  40                  45

Ser Ile Ile Asp Lys Ser Gly Ser Gly Tyr Tyr Gly Ala Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Glu Val Arg Glu Lys Gln Gly Tyr Asn Tyr Pro Phe Asn
            100                 105                 110

Tyr Trp Gly Gln Gly Thr Leu Val Thr Val Ser Ser
        115                 120

<210> SEQ ID NO 218
<211> LENGTH: 124
<212> TYPE: PRT
<213> ORGANISM: Artificial Sequence
<220> FEATURE:
```

<223> OTHER INFORMATION: PR005166|VH|VH

<400> SEQUENCE: 218

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Arg Ser His
            20                  25                  30

Tyr Met Ser Trp Val Arg Gln Ala Pro Gly Lys Gly Arg Glu Trp Val
        35                  40                  45

Ser Ile Ile Asp Lys Ala Gly Ser Gly Tyr Tyr Gly Gly Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Glu Val Arg Glu Lys Gly Tyr Asn Tyr Pro Phe Asn
            100                 105                 110

Tyr Trp Gly Gln Gly Thr Leu Val Thr Val Ser Ser
        115                 120

<210> SEQ ID NO 219
<211> LENGTH: 124
<212> TYPE: PRT
<213> ORGANISM: Artificial Sequence
<220> FEATURE:
<223> OTHER INFORMATION: PR005167|VH|VH

<400> SEQUENCE: 219

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Arg Tyr Tyr
            20                  25                  30

Tyr Met Ser Trp Val Arg Gln Ala Pro Gly Lys Gly Arg Glu Trp Val
        35                  40                  45

Ser Ile Ile Asp Lys Ala Gly Ser Thr Tyr Tyr Gly Ala Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Met Val Arg Glu Lys Gly Tyr Asn Tyr Pro Phe Asn
            100                 105                 110

Tyr Trp Gly Gln Gly Thr Leu Val Thr Val Ser Ser
        115                 120

<210> SEQ ID NO 220
<211> LENGTH: 124
<212> TYPE: PRT
<213> ORGANISM: Artificial Sequence
<220> FEATURE:
<223> OTHER INFORMATION: PR005168|VH|VH

<400> SEQUENCE: 220

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Arg Ser His
            20                  25                  30

Tyr Met Ser Trp Val Arg Gln Ala Pro Gly Lys Gly Arg Glu Trp Val

```
                35                  40                  45

Ser Ile Ile Asp Lys Ser Gly Ser Thr Tyr Tyr Gly Gly Ser Val Lys
        50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Met Val Arg Glu Lys Gln Gly Tyr Asn Tyr Pro Phe Asn
            100                 105                 110

Tyr Trp Gly Gln Gly Thr Leu Val Thr Val Ser Ser
            115                 120

<210> SEQ ID NO 221
<211> LENGTH: 124
<212> TYPE: PRT
<213> ORGANISM: Artificial Sequence
<220> FEATURE:
<223> OTHER INFORMATION: PR005169|VH|VH

<400> SEQUENCE: 221

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Arg Tyr Phe
                20                  25                  30

Tyr Met Ser Trp Val Arg Gln Ala Pro Gly Lys Gly Arg Glu Trp Val
            35                  40                  45

Ser Ile Ile Asp Lys Gly Gly Ser Gly Tyr Tyr Ala Ala Ser Val Lys
        50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Glu Val Arg Glu Lys Gln Gly Tyr Asn Tyr Pro Phe Asn
            100                 105                 110

Tyr Trp Gly Gln Gly Thr Leu Val Thr Val Ser Ser
            115                 120

<210> SEQ ID NO 222
<211> LENGTH: 124
<212> TYPE: PRT
<213> ORGANISM: Artificial Sequence
<220> FEATURE:
<223> OTHER INFORMATION: PR005571|VH|VH

<400> SEQUENCE: 222

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Ser Phe Tyr
                20                  25                  30

Tyr Met Ser Trp Val Arg Gln Ala Pro Gly Lys Gly Arg Glu Trp Val
            35                  40                  45

Ser Ile Ile Asp Lys Gly Gly Ser Thr Tyr Tyr Ala Asp Ser Val Lys
        50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95
```

Arg Ala Thr Glu Val Arg Glu Lys Gln Gly Tyr Asn Tyr Pro Phe Asn
            100                 105                 110

Tyr Trp Gly Gln Gly Thr Leu Val Thr Val Ser Ser
            115                 120

<210> SEQ ID NO 223
<211> LENGTH: 124
<212> TYPE: PRT
<213> ORGANISM: Artificial Sequence
<220> FEATURE:
<223> OTHER INFORMATION: PR005572|VH|VH

<400> SEQUENCE: 223

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Ala Phe Tyr
            20                  25                  30

Tyr Met Ser Trp Val Arg Gln Ala Pro Gly Lys Gly Arg Glu Trp Val
            35                  40                  45

Ser Ile Ile Asp Lys Gly Gly Ser Thr Tyr Tyr Ala Asp Ser Val Lys
        50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Glu Val Arg Glu Lys Gln Gly Tyr Asn Tyr Pro Phe Asn
            100                 105                 110

Tyr Trp Gly Gln Gly Thr Leu Val Thr Val Ser Ser
            115                 120

<210> SEQ ID NO 224
<211> LENGTH: 124
<212> TYPE: PRT
<213> ORGANISM: Artificial Sequence
<220> FEATURE:
<223> OTHER INFORMATION: PR005575|VH|VH

<400> SEQUENCE: 224

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Ala Ser His
            20                  25                  30

Tyr Met Ser Trp Val Arg Gln Ala Pro Gly Lys Gly Arg Glu Trp Val
            35                  40                  45

Ser Ile Ile Asp Lys Ala Gly Ser Gly Tyr Tyr Ala Asp Ser Val Lys
        50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Glu Val Arg Glu Lys Gln Gly Tyr Asn Tyr Pro Phe Asn
            100                 105                 110

Tyr Trp Gly Gln Gly Thr Leu Val Thr Val Ser Ser
            115                 120

<210> SEQ ID NO 225
<211> LENGTH: 124
<212> TYPE: PRT
<213> ORGANISM: Artificial Sequence

<220> FEATURE:
<223> OTHER INFORMATION: PR005577|VH|VH

<400> SEQUENCE: 225

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Ala Ser Tyr
            20                  25                  30

Tyr Met Ser Trp Val Arg Gln Ala Pro Gly Lys Gly Arg Glu Trp Val
        35                  40                  45

Ser Ile Ile Asp Lys Ala Gly Ser Gly Tyr Tyr Ala Asp Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Glu Val Arg Glu Lys Gln Gly Tyr Asn Tyr Pro Phe Asn
            100                 105                 110

Tyr Trp Gly Gln Gly Thr Leu Val Thr Val Ser Ser
        115                 120

<210> SEQ ID NO 226
<211> LENGTH: 124
<212> TYPE: PRT
<213> ORGANISM: Artificial Sequence
<220> FEATURE:
<223> OTHER INFORMATION: PR005578|VH|VH

<400> SEQUENCE: 226

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Ala Ser Tyr
            20                  25                  30

Tyr Met Ser Trp Val Arg Gln Ala Pro Gly Lys Gly Arg Glu Trp Val
        35                  40                  45

Ser Ile Ile Asp Lys Ala Gly Ser Gly Tyr Tyr Ala Asp Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Ala Val Arg Glu Lys Gln Gly Tyr Asn Tyr Pro Phe Asn
            100                 105                 110

Tyr Trp Gly Gln Gly Thr Leu Val Thr Val Ser Ser
        115                 120

<210> SEQ ID NO 227
<211> LENGTH: 124
<212> TYPE: PRT
<213> ORGANISM: Artificial Sequence
<220> FEATURE:
<223> OTHER INFORMATION: PR005582|VH|VH

<400> SEQUENCE: 227

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Ala Ser Phe
            20                  25                  30

Tyr Met Ser Trp Val Arg Gln Ala Pro Gly Lys Gly Arg Glu Trp Val
            35                  40                  45

Ser Ile Ile Asp Lys Ala Gly Ser Thr Tyr Tyr Gly Ala Ser Val Lys
 50                  55                  60

Gly Arg Phe Thr Ile Ser Arg Asp Asn Ser Lys Asn Arg Leu Tyr Leu
 65                  70                  75                  80

Gln Met Asn Ser Leu Arg Ala Glu Asp Thr Ala Met Tyr Tyr Cys Ala
            85                  90                  95

Arg Ala Thr Glu Val Arg Glu Lys Gln Gly Tyr Asn Tyr Pro Phe Asn
            100                 105                 110

Tyr Trp Gly Gln Gly Thr Leu Val Thr Val Ser Ser
            115                 120

<210> SEQ ID NO 228
<211> LENGTH: 124
<212> TYPE: PRT
<213> ORGANISM: Artificial Sequence
<220> FEATURE:
<223> OTHER INFORMATION: PR005583|VH|VH

<400> SEQUENCE: 228

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Ala Ser Phe
            20                  25                  30

Tyr Met Ser Trp Val Arg Gln Ala Pro Gly Lys Gly Arg Glu Trp Val
            35                  40                  45

Ser Ile Ile Asp Lys Ala Gly Ser Thr Tyr Tyr Ala Asp Ser Val Lys
 50                  55                  60

Gly Arg Phe Thr Ile Ser Arg Asp Asn Ser Lys Asn Arg Leu Tyr Leu
 65                  70                  75                  80

Gln Met Asn Ser Leu Arg Ala Glu Asp Thr Ala Met Tyr Tyr Cys Ala
            85                  90                  95

Arg Ala Thr Glu Val Arg Glu Lys Gln Gly Tyr Asn Tyr Pro Phe Asn
            100                 105                 110

Tyr Trp Gly Gln Gly Thr Leu Val Thr Val Ser Ser
            115                 120

<210> SEQ ID NO 229
<211> LENGTH: 124
<212> TYPE: PRT
<213> ORGANISM: Artificial Sequence
<220> FEATURE:
<223> OTHER INFORMATION: PR005584|VH|VH

<400> SEQUENCE: 229

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Ser Ser Phe
            20                  25                  30

Tyr Met Ser Trp Val Arg Gln Ala Pro Gly Lys Gly Arg Glu Trp Val
            35                  40                  45

Ser Ile Ile Asp Lys Ala Gly Ser Thr Tyr Tyr Ala Asp Ser Val Lys
 50                  55                  60

Gly Arg Phe Thr Ile Ser Arg Asp Asn Ser Lys Asn Arg Leu Tyr Leu
 65                  70                  75                  80

Gln Met Asn Ser Leu Arg Ala Glu Asp Thr Ala Met Tyr Tyr Cys Ala
            85                  90                  95

```
Arg Ala Thr Glu Val Arg Glu Lys Gln Gly Tyr Asn Tyr Pro Phe Asn
            100                 105                 110

Tyr Trp Gly Gln Gly Thr Leu Val Thr Val Ser Ser
        115                 120
```

<210> SEQ ID NO 230
<211> LENGTH: 124
<212> TYPE: PRT
<213> ORGANISM: Artificial Sequence
<220> FEATURE:
<223> OTHER INFORMATION: PR005585|VH|VH

<400> SEQUENCE: 230

```
Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Thr Val Ser Ser Phe
            20                  25                  30

Tyr Met Ser Trp Val Arg Gln Ala Pro Gly Lys Gly Arg Glu Trp Val
        35                  40                  45

Ser Ile Ile Asp Lys Ala Gly Ser Thr Tyr Tyr Ala Asp Ser Val Lys
50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
            85                  90                  95

Arg Ala Thr Glu Val Arg Glu Lys Gln Gly Tyr Asn Tyr Pro Phe Asn
            100                 105                 110

Tyr Trp Gly Gln Gly Thr Leu Val Thr Val Ser Ser
        115                 120
```

<210> SEQ ID NO 231
<211> LENGTH: 107
<212> TYPE: PRT
<213> ORGANISM: Artificial Sequence
<220> FEATURE:
<223> OTHER INFORMATION: PR000673|VL|VL; PR000680|VL|VL

<400> SEQUENCE: 231

```
Glu Ile Val Leu Thr Gln Ser Pro Ala Thr Leu Ser Phe Ser Pro Gly
1               5                   10                  15

Glu Arg Ala Thr Leu Ser Cys Arg Ala Ser Gln Ser Val Ser Ser Asp
            20                  25                  30

Leu Ala Trp Tyr Gln Gln Lys Pro Gly Gln Ala Pro Ser Leu Leu Ile
        35                  40                  45

Tyr Asp Ala Ser Asn Arg Ala Thr Gly Ile Pro Ala Arg Phe Ser Gly
50                  55                  60

Ser Gly Ser Gly Thr Asp Phe Thr Leu Thr Ile Ser Ser Leu Glu Pro
65                  70                  75                  80

Glu Asp Phe Ala Val Tyr Tyr Cys His Gln Arg Asn Asn Trp Pro Leu
            85                  90                  95

Thr Phe Gly Gly Gly Thr Lys Val Glu Ile Lys
        100                 105
```

<210> SEQ ID NO 232
<211> LENGTH: 107
<212> TYPE: PRT
<213> ORGANISM: Artificial Sequence
<220> FEATURE:
<223> OTHER INFORMATION: PR000674|VL|VL; PR000678|VL|VL

<400> SEQUENCE: 232

Glu Ile Val Leu Thr Gln Ser Pro Ala Thr Leu Ser Leu Ser Pro Gly
1               5                   10                  15

Glu Arg Ala Thr Leu Ser Cys Arg Ala Ser Gln Ser Val Ser Ser Tyr
            20                  25                  30

Leu Ala Trp Tyr Gln Gln Lys Pro Gly Gln Ala Pro Arg Leu Leu Ile
        35                  40                  45

Tyr Asp Thr Ser Lys Arg Ala Thr Gly Ile Pro Ala Arg Phe Ser Gly
    50                  55                  60

Ser Gly Ser Gly Thr Asp Phe Thr Leu Thr Ile Ser Ser Leu Glu Pro
65                  70                  75                  80

Glu Asp Phe Ala Val Tyr Tyr Cys Gln Gln His Asn Asn Trp Ile Phe
                85                  90                  95

Thr Phe Gly Pro Gly Thr Lys Val Asp Ile Lys
            100                 105

<210> SEQ ID NO 233
<211> LENGTH: 107
<212> TYPE: PRT
<213> ORGANISM: Artificial Sequence
<220> FEATURE:
<223> OTHER INFORMATION: PR000675|VL|VL

<400> SEQUENCE: 233

Glu Ile Val Leu Thr Gln Ser Pro Ala Thr Leu Ser Leu Ser Pro Gly
1               5                   10                  15

Glu Arg Ala Thr Leu Ser Cys Arg Ala Ser Gln Ser Val Ser Arg Tyr
            20                  25                  30

Leu Ala Trp Tyr Gln Gln Lys Pro Gly Gln Ala Pro Arg Leu Leu Met
        35                  40                  45

His Asp Ala Ala Asn Arg Ala Thr Gly Leu Pro Ala Arg Phe Asn Gly
    50                  55                  60

Ser Gly Ser Gly Thr Asp Phe Thr Leu Thr Ile Ser Ser Leu Glu Pro
65                  70                  75                  80

Glu Asp Phe Ala Val Tyr Tyr Cys Gln Gln Arg Asn Asn Trp Pro Leu
                85                  90                  95

Thr Phe Gly Gly Gly Thr Lys Val Glu Ile Lys
            100                 105

<210> SEQ ID NO 234
<211> LENGTH: 107
<212> TYPE: PRT
<213> ORGANISM: Artificial Sequence
<220> FEATURE:
<223> OTHER INFORMATION: PR000676|VL|VL

<400> SEQUENCE: 234

Glu Ile Val Leu Thr Gln Ser Pro Ala Thr Leu Ser Leu Ser Pro Gly
1               5                   10                  15

Glu Arg Ala Thr Leu Ser Cys Arg Ala Ser Gln Ser Val Ser Ser Tyr
            20                  25                  30

Leu Ala Trp Tyr Gln Gln Lys Pro Gly Gln Ala Pro Arg Leu Leu Ile
        35                  40                  45

Tyr Asp Ala Ser Thr Arg Ala Thr Gly Ile Pro Ala Arg Phe Ser Gly
    50                  55                  60

Ser Gly Ser Gly Thr Asp Phe Thr Leu Thr Ile Ser Ser Leu Glu Pro
65                  70                  75                  80

```
Glu Asp Phe Ala Val Tyr Tyr Cys Gln Gln Arg Ser Asn Trp Pro Leu
                85                  90                  95

Thr Phe Gly Gly Gly Thr Lys Val Glu Ile Lys
            100                 105

<210> SEQ ID NO 235
<211> LENGTH: 107
<212> TYPE: PRT
<213> ORGANISM: Artificial Sequence
<220> FEATURE:
<223> OTHER INFORMATION: PR000677|VL|VL

<400> SEQUENCE: 235

Glu Ile Val Met Thr Gln Ser Pro Ala Thr Leu Ser Val Ser Pro Gly
1               5                   10                  15

Glu Arg Ala Thr Leu Ser Cys Arg Ala Ser Gln Ser Val Ser Ser Ser
            20                  25                  30

Leu Ala Trp Tyr Gln Gln Lys Pro Gly Gln Ala Pro Arg Leu Leu Ile
        35                  40                  45

Tyr Gly Ala Ser Thr Arg Ala Thr Gly Ile Pro Ala Arg Phe Ser Gly
    50                  55                  60

Ser Gly Ser Gly Thr Glu Phe Thr Leu Thr Ile Ser Ser Leu Gln Ser
65                  70                  75                  80

Glu Asp Phe Ala Val Tyr Tyr Cys Gln Gln Tyr Asn Tyr Trp Pro Ile
                85                  90                  95

Thr Phe Gly Gln Gly Thr Arg Leu Glu Ile Lys
            100                 105

<210> SEQ ID NO 236
<211> LENGTH: 106
<212> TYPE: PRT
<213> ORGANISM: Artificial Sequence
<220> FEATURE:
<223> OTHER INFORMATION: PR000679|VL|VL

<400> SEQUENCE: 236

Asp Ile Gln Met Thr Gln Ser Pro Ser Thr Leu Ser Ala Ser Val Gly
1               5                   10                  15

Asp Arg Val Thr Ile Thr Cys Arg Ala Ser Gln Thr Ile Ser Ile Trp
            20                  25                  30

Leu Ala Trp Tyr Gln Gln Lys Pro Gly Lys Ala Pro Lys Leu Leu Ile
        35                  40                  45

Tyr Lys Ala Ser Ser Leu Glu Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Asp Asp Phe Ala Thr Tyr Tyr Cys Gln Gln Phe Asn Ser Tyr Trp Thr
                85                  90                  95

Phe Gly Gln Gly Thr Lys Val Glu Ile Lys
            100                 105

<210> SEQ ID NO 237
<211> LENGTH: 107
<212> TYPE: PRT
<213> ORGANISM: Artificial Sequence
<220> FEATURE:
<223> OTHER INFORMATION: PR000846|VL|VL

<400> SEQUENCE: 237
```

```
Lys Ile Val Met Thr Gln Ser Pro Ala Thr Leu Ser Leu Ser Pro Gly
1               5                   10                  15

Glu Arg Ala Thr Leu Ser Cys Arg Ala Ser Gln Ser Val Ser Arg Tyr
            20                  25                  30

Leu Ala Trp Tyr Gln Gln Lys Pro Gly Gln Ala Pro Arg Leu Leu Ile
            35                  40                  45

Tyr Asp Ala Ser Asn Arg Ala Thr Gly Ile Pro Ala Arg Phe Ser Gly
    50                  55                  60

Ser Gly Ser Gly Thr Asp Phe Thr Leu Thr Ile Ser Ser Leu Glu Pro
65                  70                  75                  80

Glu Asp Phe Ala Val Tyr Tyr Cys Gln Gln Arg Ser Asn Trp Ile Phe
            85                  90                  95

Thr Phe Gly Pro Gly Thr Lys Val Asp Ile Lys
            100                 105

<210> SEQ ID NO 238
<211> LENGTH: 440
<212> TYPE: PRT
<213> ORGANISM: Artificial Sequence
<220> FEATURE:
<223> OTHER INFORMATION: PR000673|Chain|HC

<400> SEQUENCE: 238

Gln Val Gln Leu Val Glu Ser Gly Gly Val Val Gln Pro Gly Arg
1               5                   10                  15

Ser Leu Arg Leu Ser Cys Ala Ala Ser Gly Phe Ile Phe Ser Asn Tyr
            20                  25                  30

Gly Met His Trp Val Arg Gln Ala Pro Gly Lys Gly Leu Glu Trp Val
            35                  40                  45

Ala Val Ile Trp Tyr Asp Gly Ser Lys Lys Tyr Tyr Gly Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Asp Glu Asp Thr Ala Val Tyr Phe Cys
            85                  90                  95

Ala Arg Asn Asp Asp Tyr Trp Gly Gln Gly Thr Leu Val Thr Val Ser
            100                 105                 110

Ser Ala Ser Thr Lys Gly Pro Ser Val Phe Pro Leu Ala Pro Cys Ser
            115                 120                 125

Arg Ser Thr Ser Glu Ser Thr Ala Ala Leu Gly Cys Leu Val Lys Asp
            130                 135                 140

Tyr Phe Pro Glu Pro Val Thr Val Ser Trp Asn Ser Gly Ala Leu Thr
145                 150                 155                 160

Ser Gly Val His Thr Phe Pro Ala Val Leu Gln Ser Ser Gly Leu Tyr
            165                 170                 175

Ser Leu Ser Ser Val Val Thr Val Pro Ser Ser Ser Leu Gly Thr Lys
            180                 185                 190

Thr Tyr Thr Cys Asn Val Asp His Lys Pro Ser Asn Thr Lys Val Asp
            195                 200                 205

Lys Arg Val Glu Ser Lys Tyr Gly Pro Pro Cys Pro Pro Cys Pro Ala
            210                 215                 220

Pro Glu Phe Leu Gly Gly Pro Ser Val Phe Leu Phe Pro Pro Lys Pro
225                 230                 235                 240

Lys Asp Thr Leu Met Ile Ser Arg Thr Pro Glu Val Thr Cys Val Val
            245                 250                 255
```

-continued

```
Val Asp Val Ser Gln Glu Asp Pro Glu Val Gln Phe Asn Trp Tyr Val
            260                 265                 270

Asp Gly Val Glu Val His Asn Ala Lys Thr Lys Pro Arg Glu Glu Gln
        275                 280                 285

Phe Asn Ser Thr Tyr Arg Val Val Ser Val Leu Thr Val Leu His Gln
    290                 295                 300

Asp Trp Leu Asn Gly Lys Glu Tyr Lys Cys Lys Val Ser Asn Lys Gly
305                 310                 315                 320

Leu Pro Ser Ser Ile Glu Lys Thr Ile Ser Lys Ala Lys Gly Gln Pro
                325                 330                 335

Arg Glu Pro Gln Val Tyr Thr Leu Pro Pro Ser Gln Glu Glu Met Thr
            340                 345                 350

Lys Asn Gln Val Ser Leu Thr Cys Leu Val Lys Gly Phe Tyr Pro Ser
        355                 360                 365

Asp Ile Ala Val Glu Trp Glu Ser Asn Gly Gln Pro Glu Asn Asn Tyr
    370                 375                 380

Lys Thr Thr Pro Pro Val Leu Asp Ser Asp Gly Ser Phe Phe Leu Tyr
385                 390                 395                 400

Ser Arg Leu Thr Val Asp Lys Ser Arg Trp Gln Glu Gly Asn Val Phe
                405                 410                 415

Ser Cys Ser Val Met His Glu Ala Leu His Asn His Tyr Thr Gln Lys
            420                 425                 430

Ser Leu Ser Leu Ser Leu Gly Lys
        435                 440

<210> SEQ ID NO 239
<211> LENGTH: 440
<212> TYPE: PRT
<213> ORGANISM: Artificial Sequence
<220> FEATURE:
<223> OTHER INFORMATION: PR000674|Chain|HC

<400> SEQUENCE: 239

Gln Val Gln Leu Val Glu Ser Gly Gly Gly Val Val Gln Pro Gly Lys
1               5                   10                  15

Ser Leu Arg Leu Ser Cys Thr Val Ser Gly Leu Thr Phe Ser Asp Asn
            20                  25                  30

Gly Met His Trp Val Arg Gln Ala Pro Gly Arg Gly Leu Glu Trp Met
        35                  40                  45

Ser Val Ile Trp Tyr Asp Gly Ser Lys Lys Tyr Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Asn Met Arg Val Glu Asp Thr Ala Val Tyr Tyr Cys
                85                  90                  95

Ala Thr Asn Ser Asp Tyr Trp Gly Gln Gly Thr Leu Val Thr Val Ser
            100                 105                 110

Ser Ala Ser Thr Lys Gly Pro Ser Val Phe Pro Leu Ala Pro Cys Ser
        115                 120                 125

Arg Ser Thr Ser Glu Ser Thr Ala Ala Leu Gly Cys Leu Val Lys Asp
    130                 135                 140

Tyr Phe Pro Glu Pro Val Thr Val Ser Trp Asn Ser Gly Ala Leu Thr
145                 150                 155                 160

Ser Gly Val His Thr Phe Pro Ala Val Leu Gln Ser Ser Gly Leu Tyr
                165                 170                 175
```

Ser Leu Ser Ser Val Thr Val Pro Ser Ser Leu Gly Thr Lys
                180                 185                 190

Thr Tyr Thr Cys Asn Val Asp His Lys Pro Ser Asn Thr Lys Val Asp
            195                 200                 205

Lys Arg Val Glu Ser Lys Tyr Gly Pro Pro Cys Pro Pro Cys Pro Ala
210                 215                 220

Pro Glu Phe Leu Gly Gly Pro Ser Val Phe Leu Phe Pro Pro Lys Pro
225                 230                 235                 240

Lys Asp Thr Leu Met Ile Ser Arg Thr Pro Glu Val Thr Cys Val Val
            245                 250                 255

Val Asp Val Ser Gln Glu Asp Pro Glu Val Gln Phe Asn Trp Tyr Val
            260                 265                 270

Asp Gly Val Glu Val His Asn Ala Lys Thr Lys Pro Arg Glu Glu Gln
275                 280                 285

Phe Asn Ser Thr Tyr Arg Val Val Ser Val Leu Thr Val Leu His Gln
            290                 295                 300

Asp Trp Leu Asn Gly Lys Glu Tyr Lys Cys Lys Val Ser Asn Lys Gly
305                 310                 315                 320

Leu Pro Ser Ser Ile Glu Lys Thr Ile Ser Lys Ala Lys Gly Gln Pro
                325                 330                 335

Arg Glu Pro Gln Val Tyr Thr Leu Pro Pro Ser Gln Glu Glu Met Thr
            340                 345                 350

Lys Asn Gln Val Ser Leu Thr Cys Leu Val Lys Gly Phe Tyr Pro Ser
            355                 360                 365

Asp Ile Ala Val Glu Trp Glu Ser Asn Gly Gln Pro Glu Asn Asn Tyr
370                 375                 380

Lys Thr Thr Pro Pro Val Leu Asp Ser Asp Gly Ser Phe Phe Leu Tyr
385                 390                 395                 400

Ser Arg Leu Thr Val Asp Lys Ser Arg Trp Gln Gln Gly Asn Val Phe
                405                 410                 415

Ser Cys Ser Val Met His Glu Ala Leu His Asn His Tyr Thr Gln Lys
            420                 425                 430

Ser Leu Ser Leu Ser Leu Gly Lys
        435                 440

<210> SEQ ID NO 240
<211> LENGTH: 441
<212> TYPE: PRT
<213> ORGANISM: Artificial Sequence
<220> FEATURE:
<223> OTHER INFORMATION: PR000675|Chain|HC

<400> SEQUENCE: 240

Glu Val Gln Leu Leu Glu Ser Gly Gly Gly Leu Val Gln Pro Gly Gly
1               5                   10                  15

Ser Leu Arg Leu Ser Cys Val Asp Ser Gly Phe Thr Phe Ser Ser Tyr
            20                  25                  30

Ala Met Thr Trp Val Arg Gln Ala Pro Gly Lys Gly Leu Glu Trp Val
        35                  40                  45

Ser Gly Ile Ser Gly Ser Gly Tyr Ser Thr Tyr Tyr Ala Asp Ser Val
50                  55                  60

Lys Gly Arg Phe Thr Ile Ser Arg Asp Asn Ser Lys Lys Thr Leu Tyr
65                  70                  75                  80

Leu Gln Met Asn Ser Leu Arg Ala Glu Asp Thr Ala Val Tyr Tyr Cys
                85                  90                  95

Ala Glu Leu Ser Leu Asp Tyr Trp Gly Gln Gly Thr Leu Val Thr Val
            100                 105                 110

Ser Ser Ala Ser Thr Lys Gly Pro Ser Val Phe Pro Leu Ala Pro Cys
        115                 120                 125

Ser Arg Ser Thr Ser Glu Ser Thr Ala Ala Leu Gly Cys Leu Val Lys
    130                 135                 140

Asp Tyr Phe Pro Glu Pro Val Thr Val Ser Trp Asn Ser Gly Ala Leu
145                 150                 155                 160

Thr Ser Gly Val His Thr Phe Pro Ala Val Leu Gln Ser Ser Gly Leu
                165                 170                 175

Tyr Ser Leu Ser Ser Val Val Thr Val Pro Ser Ser Ser Leu Gly Thr
            180                 185                 190

Lys Thr Tyr Thr Cys Asn Val Asp His Lys Pro Ser Asn Thr Lys Val
        195                 200                 205

Asp Lys Arg Val Glu Ser Lys Tyr Gly Pro Pro Cys Pro Pro Cys Pro
    210                 215                 220

Ala Pro Glu Phe Leu Gly Gly Pro Ser Val Phe Leu Phe Pro Pro Lys
225                 230                 235                 240

Pro Lys Asp Thr Leu Met Ile Ser Arg Thr Pro Glu Val Thr Cys Val
                245                 250                 255

Val Val Asp Val Ser Gln Glu Asp Pro Glu Val Gln Phe Asn Trp Tyr
            260                 265                 270

Val Asp Gly Val Glu Val His Asn Ala Lys Thr Lys Pro Arg Glu Glu
        275                 280                 285

Gln Phe Asn Ser Thr Tyr Arg Val Val Ser Val Leu Thr Val Leu His
    290                 295                 300

Gln Asp Trp Leu Asn Gly Lys Glu Tyr Lys Cys Lys Val Ser Asn Lys
305                 310                 315                 320

Gly Leu Pro Ser Ser Ile Glu Lys Thr Ile Ser Lys Ala Lys Gly Gln
                325                 330                 335

Pro Arg Glu Pro Gln Val Tyr Thr Leu Pro Pro Ser Gln Glu Glu Met
            340                 345                 350

Thr Lys Asn Gln Val Ser Leu Thr Cys Leu Val Lys Gly Phe Tyr Pro
        355                 360                 365

Ser Asp Ile Ala Val Glu Trp Glu Ser Asn Gly Gln Pro Glu Asn Asn
    370                 375                 380

Tyr Lys Thr Thr Pro Pro Val Leu Asp Ser Asp Gly Ser Phe Phe Leu
385                 390                 395                 400

Tyr Ser Arg Leu Thr Val Asp Lys Ser Arg Trp Gln Glu Gly Asn Val
                405                 410                 415

Phe Ser Cys Ser Val Met His Glu Ala Leu His Asn His Tyr Thr Gln
            420                 425                 430

Lys Ser Leu Ser Leu Ser Leu Gly Lys
        435                 440

<210> SEQ ID NO 241
<211> LENGTH: 441
<212> TYPE: PRT
<213> ORGANISM: Artificial Sequence
<220> FEATURE:
<223> OTHER INFORMATION: PR000676|Chain|HC

<400> SEQUENCE: 241

Gln Ile Gln Leu Val Glu Ser Gly Gly Gly Val Val Gln Pro Gly Arg
1               5                   10                  15

-continued

```
Ser Leu Arg Leu Ser Cys Ala Ala Ser Gly Phe Thr Leu Ser Ser Tyr
         20                  25                  30
Gly Met His Trp Val Arg Gln Ala Pro Gly Lys Gly Leu Glu Trp Val
         35                  40                  45
Ala Val Ile Leu Ser Asp Gly Ser Asn Lys Tyr Tyr Ala Asp Ser Val
 50                  55                  60
Lys Gly Arg Phe Thr Ile Ser Arg Asp Asn Ser Lys Asn Thr Leu Tyr
 65                  70                  75                  80
Leu Gln Met Asn Ser Leu Arg Ala Glu Asp Thr Ala Val Tyr Tyr Cys
                 85                  90                  95
Ala Asp Leu Gly Gly Asp Val Trp Gly Gln Gly Thr Thr Val Thr Val
             100                 105                 110
Ser Ser Ala Ser Thr Lys Gly Pro Ser Val Phe Pro Leu Ala Pro Cys
             115                 120                 125
Ser Arg Ser Thr Ser Glu Ser Thr Ala Ala Leu Gly Cys Leu Val Lys
             130                 135                 140
Asp Tyr Phe Pro Glu Pro Val Thr Val Ser Trp Asn Ser Gly Ala Leu
145                 150                 155                 160
Thr Ser Gly Val His Thr Phe Pro Ala Val Leu Gln Ser Ser Gly Leu
                165                 170                 175
Tyr Ser Leu Ser Ser Val Val Thr Val Pro Ser Ser Ser Leu Gly Thr
             180                 185                 190
Lys Thr Tyr Thr Cys Asn Val Asp His Lys Pro Ser Asn Thr Lys Val
             195                 200                 205
Asp Lys Arg Val Glu Ser Lys Tyr Gly Pro Pro Cys Pro Pro Cys Pro
 210                 215                 220
Ala Pro Glu Phe Leu Gly Gly Pro Ser Val Phe Leu Phe Pro Pro Lys
225                 230                 235                 240
Pro Lys Asp Thr Leu Met Ile Ser Arg Thr Pro Glu Val Thr Cys Val
                245                 250                 255
Val Val Asp Val Ser Gln Glu Asp Pro Glu Val Gln Phe Asn Trp Tyr
             260                 265                 270
Val Asp Gly Val Glu Val His Asn Ala Lys Thr Lys Pro Arg Glu Glu
             275                 280                 285
Gln Phe Asn Ser Thr Tyr Arg Val Val Ser Val Leu Thr Val Leu His
 290                 295                 300
Gln Asp Trp Leu Asn Gly Lys Glu Tyr Lys Cys Lys Val Ser Asn Lys
305                 310                 315                 320
Gly Leu Pro Ser Ser Ile Glu Lys Thr Ile Ser Lys Ala Lys Gly Gln
                325                 330                 335
Pro Arg Glu Pro Gln Val Tyr Thr Leu Pro Pro Ser Gln Glu Glu Met
             340                 345                 350
Thr Lys Asn Gln Val Ser Leu Thr Cys Leu Val Lys Gly Phe Tyr Pro
             355                 360                 365
Ser Asp Ile Ala Val Glu Trp Glu Ser Asn Gly Gln Pro Glu Asn Asn
 370                 375                 380
Tyr Lys Thr Thr Pro Pro Val Leu Asp Ser Asp Gly Ser Phe Phe Leu
385                 390                 395                 400
Tyr Ser Arg Leu Thr Val Asp Lys Ser Arg Trp Gln Glu Gly Asn Val
                405                 410                 415
Phe Ser Cys Ser Val Met His Glu Ala Leu His Asn His Tyr Thr Gln
             420                 425                 430
Lys Ser Leu Ser Leu Ser Leu Gly Lys
```

-continued

```
                435                 440

<210> SEQ ID NO 242
<211> LENGTH: 452
<212> TYPE: PRT
<213> ORGANISM: Artificial Sequence
<220> FEATURE:
<223> OTHER INFORMATION: PR000677|Chain|HC

<400> SEQUENCE: 242

Gln Val Gln Leu Gln Gln Ser Gly Pro Gly Leu Val Lys Pro Ser Gln
1               5                   10                  15

Thr Leu Ser Leu Thr Cys Ala Ile Ser Gly Asp Ser Val Ser Ser Asn
            20                  25                  30

Ser Ala Ala Trp Asn Trp Ile Arg Gln Ser Pro Ser Arg Gly Leu Glu
        35                  40                  45

Trp Leu Gly Arg Thr Tyr Tyr Arg Ser Lys Trp Tyr Ser Asp Tyr Gly
    50                  55                  60

Ile Ser Val Asn Ser Arg Ile Thr Val Asn Pro Asp Thr Ser Lys Asn
65                  70                  75                  80

Leu Phe Ser Leu Gln Leu Asn Pro Val Thr Pro Glu Asp Thr Ala Val
                85                  90                  95

Tyr Tyr Cys Thr Arg Glu Thr His Tyr Tyr Gly Ser Gly Ser Tyr Leu
            100                 105                 110

Asp Tyr Trp Ser Gln Gly Thr Leu Val Thr Val Ser Ser Ala Ser Thr
        115                 120                 125

Lys Gly Pro Ser Val Phe Pro Leu Ala Pro Cys Ser Arg Ser Thr Ser
    130                 135                 140

Glu Ser Thr Ala Ala Leu Gly Cys Leu Val Lys Asp Tyr Phe Pro Glu
145                 150                 155                 160

Pro Val Thr Val Ser Trp Asn Ser Gly Ala Leu Thr Ser Gly Val His
                165                 170                 175

Thr Phe Pro Ala Val Leu Gln Ser Ser Gly Leu Tyr Ser Leu Ser Ser
            180                 185                 190

Val Val Thr Val Pro Ser Ser Ser Leu Gly Thr Lys Thr Tyr Thr Cys
        195                 200                 205

Asn Val Asp His Lys Pro Ser Asn Thr Lys Val Asp Lys Arg Val Glu
    210                 215                 220

Ser Lys Tyr Gly Pro Pro Cys Pro Pro Cys Pro Ala Pro Glu Phe Leu
225                 230                 235                 240

Gly Gly Pro Ser Val Phe Leu Phe Pro Pro Lys Pro Lys Asp Thr Leu
                245                 250                 255

Met Ile Ser Arg Thr Pro Glu Val Thr Cys Val Val Val Asp Val Ser
            260                 265                 270

Gln Glu Asp Pro Glu Val Gln Phe Asn Trp Tyr Val Asp Gly Val Glu
        275                 280                 285

Val His Asn Ala Lys Thr Lys Pro Arg Glu Glu Gln Phe Asn Ser Thr
    290                 295                 300

Tyr Arg Val Val Ser Val Leu Thr Val Leu His Gln Asp Trp Leu Asn
305                 310                 315                 320

Gly Lys Glu Tyr Lys Cys Lys Val Ser Asn Lys Gly Leu Pro Ser Ser
                325                 330                 335

Ile Glu Lys Thr Ile Ser Lys Ala Lys Gly Gln Pro Arg Glu Pro Gln
            340                 345                 350

Val Tyr Thr Leu Pro Pro Ser Gln Glu Glu Met Thr Lys Asn Gln Val
```

```
            355                 360                 365
Ser Leu Thr Cys Leu Val Lys Gly Phe Tyr Pro Ser Asp Ile Ala Val
370                 375                 380

Glu Trp Glu Ser Asn Gly Gln Pro Glu Asn Asn Tyr Lys Thr Thr Pro
385                 390                 395                 400

Pro Val Leu Asp Ser Asp Gly Ser Phe Phe Leu Tyr Ser Arg Leu Thr
                405                 410                 415

Val Asp Lys Ser Arg Trp Gln Glu Gly Asn Val Phe Ser Cys Ser Val
                420                 425                 430

Met His Glu Ala Leu His Asn His Tyr Thr Gln Lys Ser Leu Ser Leu
                435                 440                 445

Ser Leu Gly Lys
                450

<210> SEQ ID NO 243
<211> LENGTH: 440
<212> TYPE: PRT
<213> ORGANISM: Artificial Sequence
<220> FEATURE:
<223> OTHER INFORMATION: PR000678|Chain|HC

<400> SEQUENCE: 243

Gln Val Gln Leu Val Glu Ser Gly Gly Gly Val Val Gln Pro Gly Arg
1               5                   10                  15

Ser Leu Arg Leu Ser Cys Ala Val Ser Gly Leu Thr Phe Ser Asp Asn
                20                  25                  30

Gly Met His Trp Val Arg Gln Ala Pro Gly Arg Gly Leu Glu Trp Met
            35                  40                  45

Ala Val Ile Trp Tyr Asp Gly Ser Lys Lys Tyr Tyr Gly Asp Ser Val
        50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Thr Asn Ser Asp Tyr Trp Gly Gln Gly Thr Leu Val Thr Val Ser
                100                 105                 110

Ser Ala Ser Thr Lys Gly Pro Ser Val Phe Pro Leu Ala Pro Cys Ser
            115                 120                 125

Arg Ser Thr Ser Glu Ser Thr Ala Ala Leu Gly Cys Leu Val Lys Asp
        130                 135                 140

Tyr Phe Pro Glu Pro Val Thr Val Ser Trp Asn Ser Gly Ala Leu Thr
145                 150                 155                 160

Ser Gly Val His Thr Phe Pro Ala Val Leu Gln Ser Ser Gly Leu Tyr
                165                 170                 175

Ser Leu Ser Ser Val Val Thr Val Pro Ser Ser Ser Leu Gly Thr Lys
                180                 185                 190

Thr Tyr Thr Cys Asn Val Asp His Lys Pro Ser Asn Thr Lys Val Asp
            195                 200                 205

Lys Arg Val Glu Ser Lys Tyr Gly Pro Pro Cys Pro Pro Cys Pro Ala
        210                 215                 220

Pro Glu Phe Leu Gly Gly Pro Ser Val Phe Leu Phe Pro Pro Lys Pro
225                 230                 235                 240

Lys Asp Thr Leu Met Ile Ser Arg Thr Pro Glu Val Thr Cys Val Val
                245                 250                 255

Val Asp Val Ser Gln Glu Asp Pro Glu Val Gln Phe Asn Trp Tyr Val
```

```
                260              265              270
Asp Gly Val Glu Val His Asn Ala Lys Thr Lys Pro Arg Glu Glu Gln
            275              280              285
Phe Asn Ser Thr Tyr Arg Val Ser Val Leu Thr Val Leu His Gln
        290              295              300
Asp Trp Leu Asn Gly Lys Glu Tyr Lys Cys Lys Val Ser Asn Lys Gly
305             310              315              320
Leu Pro Ser Ser Ile Glu Lys Thr Ile Ser Lys Ala Lys Gly Gln Pro
            325              330              335
Arg Glu Pro Gln Val Tyr Thr Leu Pro Pro Ser Gln Glu Glu Met Thr
        340              345              350
Lys Asn Gln Val Ser Leu Thr Cys Leu Val Lys Gly Phe Tyr Pro Ser
            355              360              365
Asp Ile Ala Val Glu Trp Glu Ser Asn Gly Gln Pro Glu Asn Asn Tyr
        370              375              380
Lys Thr Thr Pro Pro Val Leu Asp Ser Asp Gly Ser Phe Phe Leu Tyr
385             390              395              400
Ser Arg Leu Thr Val Asp Lys Ser Arg Trp Gln Glu Gly Asn Val Phe
            405              410              415
Ser Cys Ser Val Met His Glu Ala Leu His Asn His Tyr Thr Gln Lys
            420              425              430
Ser Leu Ser Leu Ser Leu Gly Lys
        435              440

<210> SEQ ID NO 244
<211> LENGTH: 450
<212> TYPE: PRT
<213> ORGANISM: Artificial Sequence
<220> FEATURE:
<223> OTHER INFORMATION: PR000679|Chain|HC

<400> SEQUENCE: 244

Gln Val Gln Leu Val Gln Ser Gly Thr Glu Val Lys Lys Pro Gly Ser
1               5                10               15
Ser Val Lys Val Ser Cys Lys Ala Ser Gly Gly Thr Phe Ser Ser Tyr
            20               25               30
Ala Ile Ser Trp Val Arg Gln Ala Pro Gly Gln Gly Leu Glu Trp Met
        35               40               45
Gly Gly Ile Ile Pro Ile Phe Asp Thr Val Ser Ser Ala Gln Lys Phe
    50               55               60
Gln Gly Arg Val Thr Ile Thr Ala Asp Lys Ser Thr Ser Thr Ala Tyr
65               70               75               80
Met Glu Leu Phe Ser Leu Arg Ser Glu Asp Thr Ala Val Tyr Tyr Cys
            85               90               95
Ala Arg Ser Pro Pro Tyr Ser Ser Asn Trp Tyr Gln Tyr Phe Gln His
            100              105              110
Trp Gly Gln Gly Thr Leu Val Thr Val Ser Ser Ala Ser Thr Lys Gly
        115              120              125
Pro Ser Val Phe Pro Leu Ala Pro Cys Ser Arg Ser Thr Ser Glu Ser
    130              135              140
Thr Ala Ala Leu Gly Cys Leu Val Lys Asp Tyr Phe Pro Glu Pro Val
145             150              155              160
Thr Val Ser Trp Asn Ser Gly Ala Leu Thr Ser Gly Val His Thr Phe
            165              170              175
Pro Ala Val Leu Gln Ser Ser Gly Leu Tyr Ser Leu Ser Ser Val Val
```

```
                180             185             190
Thr Val Pro Ser Ser Leu Gly Thr Lys Thr Tyr Thr Cys Asn Val
            195                 200             205
Asp His Lys Pro Ser Asn Thr Lys Val Asp Lys Arg Val Glu Ser Lys
        210                 215                 220
Tyr Gly Pro Pro Cys Pro Cys Pro Ala Pro Glu Phe Leu Gly Gly
225                 230                 235                 240
Pro Ser Val Phe Leu Phe Pro Pro Lys Pro Lys Asp Thr Leu Met Ile
            245                 250                 255
Ser Arg Thr Pro Glu Val Thr Cys Val Val Val Asp Val Ser Gln Glu
        260                 265                 270
Asp Pro Glu Val Gln Phe Asn Trp Tyr Val Asp Gly Val Glu Val His
        275                 280                 285
Asn Ala Lys Thr Lys Pro Arg Glu Glu Gln Phe Asn Ser Thr Tyr Arg
        290                 295                 300
Val Val Ser Val Leu Thr Val Leu His Gln Asp Trp Leu Asn Gly Lys
305                 310                 315                 320
Glu Tyr Lys Cys Lys Val Ser Asn Lys Gly Leu Pro Ser Ser Ile Glu
            325                 330                 335
Lys Thr Ile Ser Lys Ala Lys Gly Gln Pro Arg Glu Pro Gln Val Tyr
            340                 345                 350
Thr Leu Pro Pro Ser Gln Glu Glu Met Thr Lys Asn Gln Val Ser Leu
        355                 360                 365
Thr Cys Leu Val Lys Gly Phe Tyr Pro Ser Asp Ile Ala Val Glu Trp
    370                 375                 380
Glu Ser Asn Gly Gln Pro Glu Asn Asn Tyr Lys Thr Thr Pro Pro Val
385                 390                 395                 400
Leu Asp Ser Asp Gly Ser Phe Phe Leu Tyr Ser Arg Leu Thr Val Asp
                405                 410                 415
Lys Ser Arg Trp Gln Glu Gly Asn Val Phe Ser Cys Ser Val Met His
            420                 425                 430
Glu Ala Leu His Asn His Tyr Thr Gln Lys Ser Leu Ser Leu Ser Leu
            435                 440                 445
Gly Lys
    450

<210> SEQ ID NO 245
<211> LENGTH: 440
<212> TYPE: PRT
<213> ORGANISM: Artificial Sequence
<220> FEATURE:
<223> OTHER INFORMATION: PR000680|Chain|HC

<400> SEQUENCE: 245

Gln Val Gln Leu Val Glu Ser Gly Gly Gly Val Val Gln Pro Gly Arg
1               5                   10                  15
Ser Leu Arg Leu Ser Cys Ala Ala Ser Gly Phe Ile Phe Ser Asn Tyr
            20                  25                  30
Gly Met His Trp Val Arg Gln Ala Pro Gly Lys Gly Leu Glu Trp Val
        35                  40                  45
Ala Val Ile Trp Tyr Asp Gly Ser Asn Lys Tyr Tyr Gly Asp Ser Val
    50                  55                  60
Lys Gly Arg Phe Thr Ile Ser Arg Asp Asn Ser Lys Asn Thr Leu Tyr
65                  70                  75                  80
Leu Gln Met Asn Ser Leu Arg Asp Glu Asp Thr Ala Val Tyr Phe Cys
```

85                  90                  95
Ala Arg Asn Asp Asp Tyr Trp Gly Gln Gly Thr Leu Val Thr Val Ser
                100                 105                 110

Ser Ala Ser Thr Lys Gly Pro Ser Val Phe Pro Leu Ala Pro Cys Ser
                115                 120                 125

Arg Ser Thr Ser Glu Ser Thr Ala Ala Leu Gly Cys Leu Val Lys Asp
            130                 135                 140

Tyr Phe Pro Glu Pro Val Thr Val Ser Trp Asn Ser Gly Ala Leu Thr
145                 150                 155                 160

Ser Gly Val His Thr Phe Pro Ala Val Leu Gln Ser Ser Gly Leu Tyr
                165                 170                 175

Ser Leu Ser Ser Val Val Thr Val Pro Ser Ser Ser Leu Gly Thr Lys
                180                 185                 190

Thr Tyr Thr Cys Asn Val Asp His Lys Pro Ser Asn Thr Lys Val Asp
                195                 200                 205

Lys Arg Val Glu Ser Lys Tyr Gly Pro Pro Cys Pro Pro Cys Pro Ala
            210                 215                 220

Pro Glu Phe Leu Gly Gly Pro Ser Val Phe Leu Phe Pro Pro Lys Pro
225                 230                 235                 240

Lys Asp Thr Leu Met Ile Ser Arg Thr Pro Glu Val Thr Cys Val Val
                245                 250                 255

Val Asp Val Ser Gln Glu Asp Pro Glu Val Gln Phe Asn Trp Tyr Val
                260                 265                 270

Asp Gly Val Glu Val His Asn Ala Lys Thr Lys Pro Arg Glu Glu Gln
            275                 280                 285

Phe Asn Ser Thr Tyr Arg Val Val Ser Val Leu Thr Val Leu His Gln
290                 295                 300

Asp Trp Leu Asn Gly Lys Glu Tyr Lys Cys Lys Val Ser Asn Lys Gly
305                 310                 315                 320

Leu Pro Ser Ser Ile Glu Lys Thr Ile Ser Lys Ala Lys Gly Gln Pro
                325                 330                 335

Arg Glu Pro Gln Val Tyr Thr Leu Pro Pro Ser Gln Glu Glu Met Thr
            340                 345                 350

Lys Asn Gln Val Ser Leu Thr Cys Leu Val Lys Gly Phe Tyr Pro Ser
            355                 360                 365

Asp Ile Ala Val Glu Trp Glu Ser Asn Gly Gln Pro Glu Asn Asn Tyr
            370                 375                 380

Lys Thr Thr Pro Pro Val Leu Asp Ser Asp Gly Ser Phe Phe Leu Tyr
385                 390                 395                 400

Ser Arg Leu Thr Val Asp Lys Ser Arg Trp Gln Glu Gly Asn Val Phe
                405                 410                 415

Ser Cys Ser Val Met His Glu Ala Leu His Asn His Tyr Thr Gln Lys
                420                 425                 430

Ser Leu Ser Leu Ser Leu Gly Lys
            435                 440

<210> SEQ ID NO 246
<211> LENGTH: 449
<212> TYPE: PRT
<213> ORGANISM: Artificial Sequence
<220> FEATURE:
<223> OTHER INFORMATION: PR000846|Chain|HC

<400> SEQUENCE: 246

Gln Val Gln Leu Val Glu Ser Gly Gly Gly Val Ala Gln Pro Gly Arg

```
  1               5                   10                  15
Ser Leu Ser Leu Ser Cys Ala Ala Ser Gly Phe Thr Phe Ser Asp Tyr
            20                  25                  30

Gly Met His Trp Val Arg Gln Ala Pro Gly Lys Gly Leu Glu Trp Val
            35                  40                  45

Ala Leu Ile Trp Tyr Asp Ala Ser Phe Glu Tyr Tyr Ala Asp Ser Val
            50                  55                  60

Lys Gly Arg Phe Ser Ile Ser Arg Asp Asn Ser Lys Asn Thr Leu Tyr
65                      70                  75                  80

Leu Gln Met Asn Ser Leu Arg Ala Glu Asp Thr Ala Val Tyr Tyr Cys
                    85                  90                  95

Val Arg Asp Ala Gln Trp Gly Ser Arg Leu Asp Tyr Trp Gly Gln Gly
                100                 105                 110

Thr Leu Val Thr Val Ser Ser Ala Ser Thr Lys Gly Pro Ser Val Phe
                115                 120                 125

Pro Leu Ala Pro Ser Ser Lys Ser Thr Ser Gly Gly Thr Ala Ala Leu
            130                 135                 140

Gly Cys Leu Val Lys Asp Tyr Phe Pro Glu Pro Val Thr Val Ser Trp
145                 150                 155                 160

Asn Ser Gly Ala Leu Thr Ser Gly Val His Thr Phe Pro Ala Val Leu
                    165                 170                 175

Gln Ser Ser Gly Leu Tyr Ser Leu Ser Ser Val Val Thr Val Pro Ser
                180                 185                 190

Ser Ser Leu Gly Thr Gln Thr Tyr Ile Cys Asn Val Asn His Lys Pro
            195                 200                 205

Ser Asn Thr Lys Val Asp Lys Lys Val Glu Pro Lys Ser Cys Asp Lys
210                 215                 220

Thr His Thr Cys Pro Pro Cys Pro Ala Pro Glu Ala Ala Gly Gly Pro
225                 230                 235                 240

Ser Val Phe Leu Phe Pro Pro Lys Pro Lys Asp Thr Leu Met Ile Ser
                245                 250                 255

Arg Thr Pro Glu Val Thr Cys Val Val Val Asp Val Ser His Glu Asp
                260                 265                 270

Pro Glu Val Lys Phe Asn Trp Tyr Val Asp Gly Val Glu Val His Asn
            275                 280                 285

Ala Lys Thr Lys Pro Arg Glu Glu Gln Tyr Asn Ser Thr Tyr Arg Val
            290                 295                 300

Val Ser Val Leu Thr Val Leu His Gln Asp Trp Leu Asn Gly Lys Glu
305                 310                 315                 320

Tyr Lys Cys Lys Val Ser Asn Lys Ala Leu Pro Ala Pro Ile Glu Lys
                325                 330                 335

Thr Ile Ser Lys Ala Lys Gly Gln Pro Arg Glu Pro Gln Val Tyr Thr
            340                 345                 350

Leu Pro Pro Ser Arg Glu Glu Met Thr Lys Asn Gln Val Ser Leu Thr
            355                 360                 365

Cys Leu Val Lys Gly Phe Tyr Pro Ser Asp Ile Ala Val Glu Trp Glu
370                 375                 380

Ser Asn Gly Gln Pro Glu Asn Asn Tyr Lys Thr Thr Pro Pro Val Leu
385                 390                 395                 400

Asp Ser Asp Gly Ser Phe Phe Leu Tyr Ser Lys Leu Thr Val Asp Lys
                405                 410                 415

Ser Arg Trp Gln Gln Gly Asn Val Phe Ser Cys Ser Val Met His Glu
            420                 425                 430
```

Ala Leu His Asn His Tyr Thr Gln Lys Ser Leu Ser Leu Ser Pro Gly
            435                 440                 445

Lys

<210> SEQ ID NO 247
<211> LENGTH: 356
<212> TYPE: PRT
<213> ORGANISM: Artificial Sequence
<220> FEATURE:
<223> OTHER INFORMATION: PR002473|Chain|HC

<400> SEQUENCE: 247

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Ser Ser His
            20                  25                  30

Tyr Met Ser Trp Val Arg Gln Ala Pro Gly Lys Gly Leu Glu Trp Val
        35                  40                  45

Ser Ile Ile His Ser Gly Gly Ser Thr Tyr Tyr Ala Asp Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Ile Ala Glu Asp Thr Ala Val Tyr Tyr Cys Ala
                85                  90                  95

Arg Ala Ile Ala Val Ala Glu Lys Asn Gly Tyr Asn Tyr Pro Phe Asn
            100                 105                 110

Tyr Trp Gly Gln Gly Thr Leu Val Thr Val Ser Ser Glu Pro Lys Ser
        115                 120                 125

Cys Asp Lys Thr His Thr Cys Pro Pro Cys Pro Ala Pro Glu Leu Leu
    130                 135                 140

Gly Gly Pro Ser Val Phe Leu Phe Pro Pro Lys Pro Lys Asp Thr Leu
145                 150                 155                 160

Met Ile Ser Arg Thr Pro Glu Val Thr Cys Val Val Val Asp Val Ser
                165                 170                 175

His Glu Asp Pro Glu Val Lys Phe Asn Trp Tyr Val Asp Gly Val Glu
            180                 185                 190

Val His Asn Ala Lys Thr Lys Pro Arg Glu Glu Gln Tyr Asn Ser Thr
        195                 200                 205

Tyr Arg Val Val Ser Val Leu Thr Val Leu His Gln Asp Trp Leu Asn
    210                 215                 220

Gly Lys Glu Tyr Lys Cys Lys Val Ser Asn Lys Ala Leu Pro Ala Pro
225                 230                 235                 240

Ile Glu Lys Thr Ile Ser Lys Ala Lys Gly Gln Pro Arg Glu Pro Gln
                245                 250                 255

Val Tyr Thr Leu Pro Pro Ser Arg Glu Glu Met Thr Lys Asn Gln Val
            260                 265                 270

Ser Leu Thr Cys Leu Val Lys Gly Phe Tyr Pro Ser Asp Ile Ala Val
        275                 280                 285

Glu Trp Glu Ser Asn Gly Gln Pro Glu Asn Asn Tyr Lys Thr Thr Pro
    290                 295                 300

Pro Val Leu Asp Ser Asp Gly Ser Phe Phe Leu Tyr Ser Lys Leu Thr
305                 310                 315                 320

Val Asp Lys Ser Arg Trp Gln Gln Gly Asn Val Phe Ser Cys Ser Val
                325                 330                 335

Met His Glu Ala Leu His Asn His Tyr Thr Gln Lys Ser Leu Ser Leu
            340                 345                 350

Ser Pro Gly Lys
        355

<210> SEQ ID NO 248
<211> LENGTH: 356
<212> TYPE: PRT
<213> ORGANISM: Artificial Sequence
<220> FEATURE:
<223> OTHER INFORMATION: PR002474|Chain|HC

<400> SEQUENCE: 248

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Ser Ser His
            20                  25                  30

Tyr Met Ser Trp Val Arg Gln Ala Pro Gly Lys Gly Leu Glu Trp Val
        35                  40                  45

Ser Ile Ile His Ser Gly Gly Ser Thr Tyr Tyr Ala Asp Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Asp Asp Thr Ala Val Tyr Tyr Cys Ala
                85                  90                  95

Arg Ala Thr Ala Val Ala Glu Lys Asn Gly Tyr Asn Tyr Pro Phe Asn
            100                 105                 110

Tyr Trp Gly Gln Gly Thr Leu Val Thr Val Ser Ser Glu Pro Lys Ser
        115                 120                 125

Cys Asp Lys Thr His Thr Cys Pro Pro Cys Pro Ala Pro Glu Leu Leu
    130                 135                 140

Gly Gly Pro Ser Val Phe Leu Phe Pro Pro Lys Pro Lys Asp Thr Leu
145                 150                 155                 160

Met Ile Ser Arg Thr Pro Glu Val Thr Cys Val Val Val Asp Val Ser
                165                 170                 175

His Glu Asp Pro Glu Val Lys Phe Asn Trp Tyr Val Asp Gly Val Glu
            180                 185                 190

Val His Asn Ala Lys Thr Lys Pro Arg Glu Glu Gln Tyr Asn Ser Thr
        195                 200                 205

Tyr Arg Val Val Ser Val Leu Thr Val Leu His Gln Asp Trp Leu Asn
    210                 215                 220

Gly Lys Glu Tyr Lys Cys Lys Val Ser Asn Lys Ala Leu Pro Ala Pro
225                 230                 235                 240

Ile Glu Lys Thr Ile Ser Lys Ala Lys Gly Gln Pro Arg Glu Pro Gln
                245                 250                 255

Val Tyr Thr Leu Pro Pro Ser Arg Glu Glu Met Thr Lys Asn Gln Val
            260                 265                 270

Ser Leu Thr Cys Leu Val Lys Gly Phe Tyr Pro Ser Asp Ile Ala Val
        275                 280                 285

Glu Trp Glu Ser Asn Gly Gln Pro Glu Asn Asn Tyr Lys Thr Thr Pro
    290                 295                 300

Pro Val Leu Asp Ser Asp Gly Ser Phe Phe Leu Tyr Ser Lys Leu Thr
305                 310                 315                 320

Val Asp Lys Ser Arg Trp Gln Gln Gly Asn Val Phe Ser Cys Ser Val
                325                 330                 335

```
Met His Glu Ala Leu His Asn His Tyr Thr Gln Lys Ser Leu Ser Leu
            340                 345                 350

Ser Pro Gly Lys
        355
```

<210> SEQ ID NO 249
<211> LENGTH: 356
<212> TYPE: PRT
<213> ORGANISM: Artificial Sequence
<220> FEATURE:
<223> OTHER INFORMATION: PR002475|Chain|HC

<400> SEQUENCE: 249

```
Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Ser Ser Asn
            20                  25                  30

Tyr Met Ser Trp Val Arg Gln Ala Pro Gly Lys Gly Leu Glu Trp Val
        35                  40                  45

Ser Ile Ile His Ser Gly Gly Ser Thr Tyr Tyr Ala Asp Ser Val Lys
    50                  55                  60

Gly Arg Phe Thr Ile Ser Arg Asp Asn Ser Lys Asn Thr Leu Tyr Leu
65                  70                  75                  80

Gln Met Asn Ser Leu Arg Ala Glu Asp Thr Ala Val Tyr Tyr Cys Ala
                85                  90                  95

Arg Ala Ile Ala Val Ala Glu Lys Asn Gly Tyr Asn Tyr Pro Phe Asn
            100                 105                 110

Tyr Trp Gly Gln Gly Thr Leu Val Thr Val Ser Ser Glu Pro Lys Ser
        115                 120                 125

Cys Asp Lys Thr His Thr Cys Pro Pro Cys Pro Ala Pro Glu Leu Leu
    130                 135                 140

Gly Gly Pro Ser Val Phe Leu Phe Pro Pro Lys Pro Lys Asp Thr Leu
145                 150                 155                 160

Met Ile Ser Arg Thr Pro Glu Val Thr Cys Val Val Val Asp Val Ser
                165                 170                 175

His Glu Asp Pro Glu Val Lys Phe Asn Trp Tyr Val Asp Gly Val Glu
            180                 185                 190

Val His Asn Ala Lys Thr Lys Pro Arg Glu Glu Gln Tyr Asn Ser Thr
        195                 200                 205

Tyr Arg Val Val Ser Val Leu Thr Val Leu His Gln Asp Trp Leu Asn
    210                 215                 220

Gly Lys Glu Tyr Lys Cys Lys Val Ser Asn Lys Ala Leu Pro Ala Pro
225                 230                 235                 240

Ile Glu Lys Thr Ile Ser Lys Ala Lys Gly Gln Pro Arg Glu Pro Gln
                245                 250                 255

Val Tyr Thr Leu Pro Pro Ser Arg Glu Glu Met Thr Lys Asn Gln Val
            260                 265                 270

Ser Leu Thr Cys Leu Val Lys Gly Phe Tyr Pro Ser Asp Ile Ala Val
        275                 280                 285

Glu Trp Glu Ser Asn Gly Gln Pro Glu Asn Asn Tyr Lys Thr Thr Pro
    290                 295                 300

Pro Val Leu Asp Ser Asp Gly Ser Phe Phe Leu Tyr Ser Lys Leu Thr
305                 310                 315                 320

Val Asp Lys Ser Arg Trp Gln Gln Gly Asn Val Phe Ser Cys Ser Val
                325                 330                 335
```

Met His Glu Ala Leu His Asn His Tyr Thr Gln Lys Ser Leu Ser Leu
                340                 345                 350

Ser Pro Gly Lys
        355

<210> SEQ ID NO 250
<211> LENGTH: 356
<212> TYPE: PRT
<213> ORGANISM: Artificial Sequence
<220> FEATURE:
<223> OTHER INFORMATION: PR002476|Chain|HC

<400> SEQUENCE: 250

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Ser Ser His
            20                  25                  30

Tyr Met Ser Trp Val Arg Gln Ala Pro Gly Lys Gly Leu Glu Trp Val
        35                  40                  45

Ser Ile Ile His Ser Gly Gly Ser Thr Tyr Tyr Ala Asp Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Val Tyr Tyr Cys Ala
                85                  90                  95

Arg Ala Thr Ala Val Ala Glu Lys Asn Gly Tyr Asn Tyr Pro Phe Asn
            100                 105                 110

Tyr Trp Gly Gln Gly Thr Leu Val Thr Val Ser Ser Glu Pro Lys Ser
        115                 120                 125

Cys Asp Lys Thr His Thr Cys Pro Pro Cys Pro Ala Pro Glu Leu Leu
    130                 135                 140

Gly Gly Pro Ser Val Phe Leu Phe Pro Pro Lys Pro Lys Asp Thr Leu
145                 150                 155                 160

Met Ile Ser Arg Thr Pro Glu Val Thr Cys Val Val Val Asp Val Ser
                165                 170                 175

His Glu Asp Pro Glu Val Lys Phe Asn Trp Tyr Val Asp Gly Val Glu
            180                 185                 190

Val His Asn Ala Lys Thr Lys Pro Arg Glu Glu Gln Tyr Asn Ser Thr
        195                 200                 205

Tyr Arg Val Val Ser Val Leu Thr Val Leu His Gln Asp Trp Leu Asn
    210                 215                 220

Gly Lys Glu Tyr Lys Cys Lys Val Ser Asn Lys Ala Leu Pro Ala Pro
225                 230                 235                 240

Ile Glu Lys Thr Ile Ser Lys Ala Lys Gly Gln Pro Arg Glu Pro Gln
                245                 250                 255

Val Tyr Thr Leu Pro Pro Ser Arg Glu Glu Met Thr Lys Asn Gln Val
            260                 265                 270

Ser Leu Thr Cys Leu Val Lys Gly Phe Tyr Pro Ser Asp Ile Ala Val
        275                 280                 285

Glu Trp Glu Ser Asn Gly Gln Pro Glu Asn Asn Tyr Lys Thr Thr Pro
    290                 295                 300

Pro Val Leu Asp Ser Asp Gly Ser Phe Phe Leu Tyr Ser Lys Leu Thr
305                 310                 315                 320

Val Asp Lys Ser Arg Trp Gln Gln Gly Asn Val Phe Ser Cys Ser Val
                325                 330                 335

Met His Glu Ala Leu His Asn His Tyr Thr Gln Lys Ser Leu Ser Leu
            340                 345                 350

Ser Pro Gly Lys
        355

<210> SEQ ID NO 251
<211> LENGTH: 356
<212> TYPE: PRT
<213> ORGANISM: Artificial Sequence
<220> FEATURE:
<223> OTHER INFORMATION: PR002477|Chain|HC

<400> SEQUENCE: 251

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Ser Ser His
            20                  25                  30

Tyr Met Ser Trp Val Arg Gln Ala Pro Gly Lys Gly Leu Glu Trp Val
        35                  40                  45

Ser Ile Ile His Ser Gly Gly Ser Thr Tyr Tyr Ala Asp Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Val Tyr Tyr Cys Ala
                85                  90                  95

Arg Ala Ile Ala Val Ala Glu Lys Asn Gly Tyr Asn Tyr Pro Phe Asn
            100                 105                 110

Tyr Trp Gly Gln Gly Thr Leu Val Thr Val Ser Ser Pro Lys Ser
        115                 120                 125

Cys Asp Lys Thr His Thr Cys Pro Pro Cys Pro Ala Pro Glu Leu Leu
    130                 135                 140

Gly Gly Pro Ser Val Phe Leu Phe Pro Pro Lys Pro Lys Asp Thr Leu
145                 150                 155                 160

Met Ile Ser Arg Thr Pro Glu Val Thr Cys Val Val Val Asp Val Ser
                165                 170                 175

His Glu Asp Pro Glu Val Lys Phe Asn Trp Tyr Val Asp Gly Val Glu
            180                 185                 190

Val His Asn Ala Lys Thr Lys Pro Arg Glu Glu Gln Tyr Asn Ser Thr
        195                 200                 205

Tyr Arg Val Val Ser Val Leu Thr Val Leu His Gln Asp Trp Leu Asn
    210                 215                 220

Gly Lys Glu Tyr Lys Cys Lys Val Ser Asn Lys Ala Leu Pro Ala Pro
225                 230                 235                 240

Ile Glu Lys Thr Ile Ser Lys Ala Lys Gly Gln Pro Arg Glu Pro Gln
                245                 250                 255

Val Tyr Thr Leu Pro Pro Ser Arg Glu Glu Met Thr Lys Asn Gln Val
            260                 265                 270

Ser Leu Thr Cys Leu Val Lys Gly Phe Tyr Pro Ser Asp Ile Ala Val
        275                 280                 285

Glu Trp Glu Ser Asn Gly Gln Pro Glu Asn Asn Tyr Lys Thr Thr Pro
    290                 295                 300

Pro Val Leu Asp Ser Asp Gly Ser Phe Phe Leu Tyr Ser Lys Leu Thr
305                 310                 315                 320

Val Asp Lys Ser Arg Trp Gln Gln Gly Asn Val Phe Ser Cys Ser Val
                325                 330                 335

```
Met His Glu Ala Leu His Asn His Tyr Thr Gln Lys Ser Leu Ser Leu
                340                 345                 350

Ser Pro Gly Lys
        355

<210> SEQ ID NO 252
<211> LENGTH: 356
<212> TYPE: PRT
<213> ORGANISM: Artificial Sequence
<220> FEATURE:
<223> OTHER INFORMATION: PR002478|Chain|HC

<400> SEQUENCE: 252

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Ser Ser Asn
            20                  25                  30

Tyr Met Ser Trp Val Arg Gln Ala Pro Gly Lys Gly Leu Glu Trp Val
        35                  40                  45

Ser Ile Ile His Ser Gly Gly Ser Thr Tyr Tyr Ala Asp Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Val Tyr Tyr Cys Ala
                85                  90                  95

Arg Ala Ile Ala Val Ala Glu Lys Asn Gly Tyr Asn Tyr Pro Phe Asn
            100                 105                 110

Tyr Trp Gly Gln Gly Thr Leu Val Thr Val Ser Ser Glu Pro Lys Ser
        115                 120                 125

Cys Asp Lys Thr His Thr Cys Pro Pro Cys Pro Ala Pro Glu Leu Leu
    130                 135                 140

Gly Gly Pro Ser Val Phe Leu Phe Pro Pro Lys Pro Lys Asp Thr Leu
145                 150                 155                 160

Met Ile Ser Arg Thr Pro Glu Val Thr Cys Val Val Val Asp Val Ser
                165                 170                 175

His Glu Asp Pro Glu Val Lys Phe Asn Trp Tyr Val Asp Gly Val Glu
            180                 185                 190

Val His Asn Ala Lys Thr Lys Pro Arg Glu Glu Gln Tyr Asn Ser Thr
        195                 200                 205

Tyr Arg Val Val Ser Val Leu Thr Val Leu His Gln Asp Trp Leu Asn
    210                 215                 220

Gly Lys Glu Tyr Lys Cys Lys Val Ser Asn Lys Ala Leu Pro Ala Pro
225                 230                 235                 240

Ile Glu Lys Thr Ile Ser Lys Ala Lys Gly Gln Pro Arg Glu Pro Gln
                245                 250                 255

Val Tyr Thr Leu Pro Pro Ser Arg Glu Glu Met Thr Lys Asn Gln Val
            260                 265                 270

Ser Leu Thr Cys Leu Val Lys Gly Phe Tyr Pro Ser Asp Ile Ala Val
        275                 280                 285

Glu Trp Glu Ser Asn Gly Gln Pro Glu Asn Asn Tyr Lys Thr Thr Pro
    290                 295                 300

Pro Val Leu Asp Ser Asp Gly Ser Phe Phe Leu Tyr Ser Lys Leu Thr
305                 310                 315                 320

Val Asp Lys Ser Arg Trp Gln Gln Gly Asn Val Phe Ser Cys Ser Val
                325                 330                 335
```

Met His Glu Ala Leu His Asn His Tyr Thr Gln Lys Ser Leu Ser Leu
                340                 345                 350

Ser Pro Gly Lys
        355

<210> SEQ ID NO 253
<211> LENGTH: 356
<212> TYPE: PRT
<213> ORGANISM: Artificial Sequence
<220> FEATURE:
<223> OTHER INFORMATION: PR002479|Chain|HC

<400> SEQUENCE: 253

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Ser Ser His
            20                  25                  30

Tyr Met Ser Trp Val Arg Gln Ala Pro Gly Lys Gly Leu Glu Trp Val
        35                  40                  45

Ser Ile Ile His Ser Gly Gly Ser Thr Tyr Tyr Ala Asp Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Val Tyr Tyr Cys Ala
                85                  90                  95

Arg Ala Thr Ala Val Ala Glu Glu Asn Gly Tyr Asn Tyr Pro Phe Asn
            100                 105                 110

Tyr Trp Gly Gln Gly Thr Leu Val Thr Val Ser Ser Glu Pro Lys Ser
        115                 120                 125

Cys Asp Lys Thr His Thr Cys Pro Pro Cys Pro Ala Pro Glu Leu Leu
    130                 135                 140

Gly Gly Pro Ser Val Phe Leu Phe Pro Pro Lys Pro Lys Asp Thr Leu
145                 150                 155                 160

Met Ile Ser Arg Thr Pro Glu Val Thr Cys Val Val Val Asp Val Ser
                165                 170                 175

His Glu Asp Pro Glu Val Lys Phe Asn Trp Tyr Val Asp Gly Val Glu
            180                 185                 190

Val His Asn Ala Lys Thr Lys Pro Arg Glu Glu Gln Tyr Asn Ser Thr
        195                 200                 205

Tyr Arg Val Val Ser Val Leu Thr Val Leu His Gln Asp Trp Leu Asn
    210                 215                 220

Gly Lys Glu Tyr Lys Cys Lys Val Ser Asn Lys Ala Leu Pro Ala Pro
225                 230                 235                 240

Ile Glu Lys Thr Ile Ser Lys Ala Lys Gly Gln Pro Arg Glu Pro Gln
                245                 250                 255

Val Tyr Thr Leu Pro Pro Ser Arg Glu Glu Met Thr Lys Asn Gln Val
            260                 265                 270

Ser Leu Thr Cys Leu Val Lys Gly Phe Tyr Pro Ser Asp Ile Ala Val
        275                 280                 285

Glu Trp Glu Ser Asn Gly Gln Pro Glu Asn Asn Tyr Lys Thr Thr Pro
    290                 295                 300

Pro Val Leu Asp Ser Asp Gly Ser Phe Phe Leu Tyr Ser Lys Leu Thr
305                 310                 315                 320

Val Asp Lys Ser Arg Trp Gln Gln Gly Asn Val Phe Ser Cys Ser Val
                325                 330                 335

Met His Glu Ala Leu His Asn His Tyr Thr Gln Lys Ser Leu Ser Leu
                340                 345                 350

Ser Pro Gly Lys
        355

<210> SEQ ID NO 254
<211> LENGTH: 124
<212> TYPE: PRT
<213> ORGANISM: Artificial Sequence
<220> FEATURE:
<223> OTHER INFORMATION: HCAb VH general formula 1
<220> FEATURE:
<221> NAME/KEY: misc_feature
<222> LOCATION: (28)..(28)
<223> OTHER INFORMATION: Xaa = Ala, Phe, Asn or Ser
<220> FEATURE:
<221> NAME/KEY: misc_feature
<222> LOCATION: (30)..(30)
<223> OTHER INFORMATION: Xaa = Asp, Arg, Ser or Val
<220> FEATURE:
<221> NAME/KEY: misc_feature
<222> LOCATION: (31)..(31)
<223> OTHER INFORMATION: Xaa = Phe, Gly, Arg, Ser or Tyr
<220> FEATURE:
<221> NAME/KEY: misc_feature
<222> LOCATION: (32)..(32)
<223> OTHER INFORMATION: Xaa = Phe, His, Asn or Tyr
<220> FEATURE:
<221> NAME/KEY: misc_feature
<222> LOCATION: (35)..(35)
<223> OTHER INFORMATION: Xaa = Ala or Ser
<220> FEATURE:
<221> NAME/KEY: misc_feature
<222> LOCATION: (45)..(45)
<223> OTHER INFORMATION: Xaa = Leu, Gln or Arg
<220> FEATURE:
<221> NAME/KEY: misc_feature
<222> LOCATION: (52)..(52)
<223> OTHER INFORMATION: Xaa = Asp or His
<220> FEATURE:
<221> NAME/KEY: misc_feature
<222> LOCATION: (53)..(53)
<223> OTHER INFORMATION: Xaa = Gly, Ile, Lys, Arg or Ser
<220> FEATURE:
<221> NAME/KEY: misc_feature
<222> LOCATION: (54)..(54)
<223> OTHER INFORMATION: Xaa = Ala, Gly or Ser
<220> FEATURE:
<221> NAME/KEY: misc_feature
<222> LOCATION: (56)..(56)
<223> OTHER INFORMATION: Xaa = Gly or Ser
<220> FEATURE:
<221> NAME/KEY: misc_feature
<222> LOCATION: (57)..(57)
<223> OTHER INFORMATION: Xaa = Gly, Lys or Thr
<220> FEATURE:
<221> NAME/KEY: misc_feature
<222> LOCATION: (60)..(60)
<223> OTHER INFORMATION: Xaa = Ala or Gly
<220> FEATURE:
<221> NAME/KEY: misc_feature
<222> LOCATION: (61)..(61)
<223> OTHER INFORMATION: Xaa = Ala, Asp or Gly
<220> FEATURE:
<221> NAME/KEY: misc_feature
<222> LOCATION: (77)..(77)
<223> OTHER INFORMATION: Xaa = Arg or Thr
<220> FEATURE:
<221> NAME/KEY: misc_feature
<222> LOCATION: (86)..(86)
<223> OTHER INFORMATION: Xaa = Ile or Arg
<220> FEATURE:
<221> NAME/KEY: misc_feature
<222> LOCATION: (88)..(88)
<223> OTHER INFORMATION: Xaa = Asp or Glu
<220> FEATURE:
<221> NAME/KEY: misc_feature

```
<222> LOCATION: (92)..(92)
<223> OTHER INFORMATION: Xaa = Met or Val
<220> FEATURE:
<221> NAME/KEY: misc_feature
<222> LOCATION: (99)..(99)
<223> OTHER INFORMATION: Xaa = Ile or Thr
<220> FEATURE:
<221> NAME/KEY: misc_feature
<222> LOCATION: (100)..(100)
<223> OTHER INFORMATION: Xaa = Ala, Glu, Met, Gln or Arg
<220> FEATURE:
<221> NAME/KEY: misc_feature
<222> LOCATION: (102)..(102)
<223> OTHER INFORMATION: Xaa = Ala, Pro or Arg
<220> FEATURE:
<221> NAME/KEY: misc_feature
<222> LOCATION: (104)..(104)
<223> OTHER INFORMATION: Xaa = Ala, Glu or Lys
<220> FEATURE:
<221> NAME/KEY: misc_feature
<222> LOCATION: (105)..(105)
<223> OTHER INFORMATION: Xaa = Gly, Asn or Gln

<400> SEQUENCE: 254

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Xaa Val Xaa Xaa Xaa
            20                  25                  30

Tyr Met Xaa Trp Val Arg Gln Ala Pro Gly Lys Gly Xaa Glu Trp Val
        35                  40                  45

Ser Ile Ile Xaa Xaa Xaa Gly Xaa Xaa Tyr Tyr Xaa Xaa Ser Val Lys
    50                  55                  60

Gly Arg Phe Thr Ile Ser Arg Asp Asn Ser Lys Asn Xaa Leu Tyr Leu
65                  70                  75                  80

Gln Met Asn Ser Leu Xaa Ala Xaa Asp Thr Ala Xaa Tyr Tyr Cys Ala
                85                  90                  95

Arg Ala Xaa Xaa Val Xaa Glu Xaa Xaa Gly Tyr Asn Tyr Pro Phe Asn
            100                 105                 110

Tyr Trp Gly Gln Gly Thr Leu Val Thr Val Ser Ser
        115                 120

<210> SEQ ID NO 255
<211> LENGTH: 356
<212> TYPE: PRT
<213> ORGANISM: Artificial Sequence
<220> FEATURE:
<223> OTHER INFORMATION: PR002481|Chain|HC

<400> SEQUENCE: 255

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Ser Ser His
            20                  25                  30

Tyr Met Ser Trp Val Arg Gln Ala Pro Gly Lys Gly Arg Glu Trp Val
        35                  40                  45

Ser Ile Ile Asp Gly Gly Ser Thr Tyr Tyr Ala Asp Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Ala Val Ala Glu Lys Asn Gly Tyr Asn Tyr Pro Phe Asn
            100                 105                 110
```

Tyr Trp Gly Gln Gly Thr Leu Val Thr Val Ser Ser Glu Pro Lys Ser
            115                 120                 125

Cys Asp Lys Thr His Thr Cys Pro Pro Cys Pro Ala Pro Glu Leu Leu
        130                 135                 140

Gly Gly Pro Ser Val Phe Leu Phe Pro Pro Lys Pro Lys Asp Thr Leu
145                 150                 155                 160

Met Ile Ser Arg Thr Pro Glu Val Thr Cys Val Val Val Asp Val Ser
                165                 170                 175

His Glu Asp Pro Glu Val Lys Phe Asn Trp Tyr Val Asp Gly Val Glu
            180                 185                 190

Val His Asn Ala Lys Thr Lys Pro Arg Glu Glu Gln Tyr Asn Ser Thr
        195                 200                 205

Tyr Arg Val Val Ser Val Leu Thr Val Leu His Gln Asp Trp Leu Asn
    210                 215                 220

Gly Lys Glu Tyr Lys Cys Lys Val Ser Asn Lys Ala Leu Pro Ala Pro
225                 230                 235                 240

Ile Glu Lys Thr Ile Ser Lys Ala Lys Gly Gln Pro Arg Glu Pro Gln
                245                 250                 255

Val Tyr Thr Leu Pro Pro Ser Arg Glu Glu Met Thr Lys Asn Gln Val
            260                 265                 270

Ser Leu Thr Cys Leu Val Lys Gly Phe Tyr Pro Ser Asp Ile Ala Val
        275                 280                 285

Glu Trp Glu Ser Asn Gly Gln Pro Glu Asn Asn Tyr Lys Thr Thr Pro
    290                 295                 300

Pro Val Leu Asp Ser Asp Gly Ser Phe Phe Leu Tyr Ser Lys Leu Thr
305                 310                 315                 320

Val Asp Lys Ser Arg Trp Gln Gln Gly Asn Val Phe Ser Cys Ser Val
                325                 330                 335

Met His Glu Ala Leu His Asn His Tyr Thr Gln Lys Ser Leu Ser Leu
            340                 345                 350

Ser Pro Gly Lys
        355

<210> SEQ ID NO 256
<211> LENGTH: 150
<212> TYPE: PRT
<213> ORGANISM: Artificial Sequence
<220> FEATURE:
<223> OTHER INFORMATION: PR005082|Chain|HC

<400> SEQUENCE: 256

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Ala Val Asp Arg Tyr
            20                  25                  30

Tyr Met Ser Trp Val Arg Gln Ala Pro Gly Lys Gly Gln Glu Trp Val
        35                  40                  45

Ser Ile Ile Asp Arg Gly Gly Ser Thr Tyr Tyr Ala Asp Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Gln Val Arg Glu Lys Gly Gly Tyr Asn Tyr Pro Phe Asn
            100                 105                 110

Tyr Trp Gly Gln Gly Thr Leu Val Thr Val Ser Ser Thr Ser Gly His
        115                 120                 125

Arg Gly Gln Gly Gly Ser Asp Tyr Lys Asp Asp Asp Lys Ala Ser
    130                 135                 140

His His His His His His
145             150

<210> SEQ ID NO 257
<211> LENGTH: 150
<212> TYPE: PRT
<213> ORGANISM: Artificial Sequence
<220> FEATURE:
<223> OTHER INFORMATION: PR005083|Chain|HC

<400> SEQUENCE: 257

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Ala Val Asp Arg Tyr
            20                  25                  30

Tyr Met Ser Trp Val Arg Gln Ala Pro Gly Lys Gly Gln Glu Trp Val
        35                  40                  45

Ser Ile Ile Asp Arg Gly Gly Gly Thr Tyr Tyr Ala Asp Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Gln Val Arg Glu Lys Gly Gly Tyr Asn Tyr Pro Phe Asn
            100                 105                 110

Tyr Trp Gly Gln Gly Thr Leu Val Thr Val Ser Ser Thr Ser Gly His
        115                 120                 125

Arg Gly Gln Gly Gly Ser Asp Tyr Lys Asp Asp Asp Lys Ala Ser
    130                 135                 140

His His His His His His
145             150

<210> SEQ ID NO 258
<211> LENGTH: 150
<212> TYPE: PRT
<213> ORGANISM: Artificial Sequence
<220> FEATURE:
<223> OTHER INFORMATION: PR005084|Chain|HC

<400> SEQUENCE: 258

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Ala Val Asp Arg Tyr
            20                  25                  30

Tyr Met Ser Trp Val Arg Gln Ala Pro Gly Lys Gly Gln Glu Trp Val
        35                  40                  45

Ser Ile Ile Asp Arg Gly Gly Ser Lys Tyr Tyr Ala Asp Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Gln Val Arg Glu Lys Gly Gly Tyr Asn Tyr Pro Phe Asn

```
                    100                 105                 110
Tyr Trp Gly Gln Gly Thr Leu Val Thr Val Ser Ser Thr Gly His
            115                 120                 125

Arg Gly Gln Gly Gly Ser Asp Tyr Lys Asp Asp Asp Lys Ala Ser
        130                 135                 140

His His His His His His
145                 150

<210> SEQ ID NO 259
<211> LENGTH: 150
<212> TYPE: PRT
<213> ORGANISM: Artificial Sequence
<220> FEATURE:
<223> OTHER INFORMATION: PR005085|Chain|HC

<400> SEQUENCE: 259

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Ala Val Asp Arg Tyr
            20                  25                  30

Tyr Met Ser Trp Val Arg Gln Ala Pro Gly Lys Gly Gln Glu Trp Val
        35                  40                  45

Ser Ile Ile Asp Lys Gly Gly Thr Tyr Tyr Ala Asp Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Gln Val Arg Glu Lys Gly Gly Tyr Asn Tyr Pro Phe Asn
            100                 105                 110

Tyr Trp Gly Gln Gly Thr Leu Val Thr Val Ser Ser Thr Gly His
        115                 120                 125

Arg Gly Gln Gly Gly Ser Asp Tyr Lys Asp Asp Asp Lys Ala Ser
    130                 135                 140

His His His His His His
145                 150

<210> SEQ ID NO 260
<211> LENGTH: 150
<212> TYPE: PRT
<213> ORGANISM: Artificial Sequence
<220> FEATURE:
<223> OTHER INFORMATION: PR005086|Chain|HC

<400> SEQUENCE: 260

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Ser Val Val Gly His
            20                  25                  30

Tyr Met Ser Trp Val Arg Gln Ala Pro Gly Lys Gly Gln Glu Trp Val
        35                  40                  45

Ser Ile Ile Asp Arg Gly Gly Ser Thr Tyr Tyr Ala Asp Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95
```

```
Arg Ala Thr Gln Val Arg Glu Lys Gly Gly Tyr Asn Tyr Pro Phe Asn
            100                 105                 110

Tyr Trp Gly Gln Gly Thr Leu Val Thr Val Ser Ser Thr Ser Gly His
        115                 120                 125

Arg Gly Gln Gly Gly Ser Asp Tyr Lys Asp Asp Asp Lys Ala Ser
    130                 135                 140

His His His His His His
145                 150

<210> SEQ ID NO 261
<211> LENGTH: 150
<212> TYPE: PRT
<213> ORGANISM: Artificial Sequence
<220> FEATURE:
<223> OTHER INFORMATION: PR005087|Chain|HC

<400> SEQUENCE: 261

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Ser Val Val Gly His
            20                  25                  30

Tyr Met Ser Trp Val Arg Gln Ala Pro Gly Lys Gly Gln Glu Trp Val
        35                  40                  45

Ser Ile Ile Asp Arg Gly Gly Thr Tyr Tyr Ala Asp Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Gln Val Arg Glu Lys Gly Gly Tyr Asn Tyr Pro Phe Asn
            100                 105                 110

Tyr Trp Gly Gln Gly Thr Leu Val Thr Val Ser Ser Thr Ser Gly His
        115                 120                 125

Arg Gly Gln Gly Gly Ser Asp Tyr Lys Asp Asp Asp Lys Ala Ser
    130                 135                 140

His His His His His His
145                 150

<210> SEQ ID NO 262
<211> LENGTH: 150
<212> TYPE: PRT
<213> ORGANISM: Artificial Sequence
<220> FEATURE:
<223> OTHER INFORMATION: PR005088|Chain|HC

<400> SEQUENCE: 262

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Ser Val Val Gly His
            20                  25                  30

Tyr Met Ser Trp Val Arg Gln Ala Pro Gly Lys Gly Gln Glu Trp Val
        35                  40                  45

Ser Ile Ile Asp Arg Gly Gly Ser Lys Tyr Tyr Ala Asp Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95
```

```
Arg Ala Thr Gln Val Arg Glu Lys Gly Gly Tyr Asn Tyr Pro Phe Asn
            100                 105                 110
Tyr Trp Gly Gln Gly Thr Leu Val Thr Val Ser Ser Thr Ser Gly His
        115                 120                 125
Arg Gly Gln Gly Gly Ser Asp Tyr Lys Asp Asp Asp Asp Lys Ala Ser
    130                 135                 140
His His His His His His
145                 150

<210> SEQ ID NO 263
<211> LENGTH: 150
<212> TYPE: PRT
<213> ORGANISM: Artificial Sequence
<220> FEATURE:
<223> OTHER INFORMATION: PR005089|Chain|HC

<400> SEQUENCE: 263

Glu Val Gln Leu Val Glu Thr Gly Gly Gly Leu Ile Gln Pro Gly Gly
1               5                   10                  15
Ser Leu Arg Leu Ser Cys Ala Ala Ser Gly Phe Ser Val Val Gly His
            20                  25                  30
Tyr Met Ser Trp Val Arg Gln Ala Pro Gly Lys Gly Gln Glu Trp Val
        35                  40                  45
Ser Ile Ile Asp Lys Gly Gly Thr Tyr Tyr Ala Asp Ser Val Lys
    50                  55                  60
Gly Arg Phe Thr Ile Ser Arg Asp Asn Ser Lys Asn Arg Leu Tyr Leu
65                  70                  75                  80
Gln Met Asn Ser Leu Arg Ala Glu Asp Thr Ala Met Tyr Tyr Cys Ala
                85                  90                  95
Arg Ala Thr Gln Val Arg Glu Lys Gly Gly Tyr Asn Tyr Pro Phe Asn
            100                 105                 110
Tyr Trp Gly Gln Gly Thr Leu Val Thr Val Ser Ser Thr Ser Gly His
        115                 120                 125
Arg Gly Gln Gly Gly Ser Asp Tyr Lys Asp Asp Asp Asp Lys Ala Ser
    130                 135                 140
His His His His His His
145                 150

<210> SEQ ID NO 264
<211> LENGTH: 150
<212> TYPE: PRT
<213> ORGANISM: Artificial Sequence
<220> FEATURE:
<223> OTHER INFORMATION: PR005090|Chain|HC

<400> SEQUENCE: 264

Glu Val Gln Leu Val Glu Thr Gly Gly Gly Leu Ile Gln Pro Gly Gly
1               5                   10                  15
Ser Leu Arg Leu Ser Cys Ala Ala Ser Gly Phe Asn Val Ser Ser His
            20                  25                  30
Tyr Met Ser Trp Val Arg Gln Ala Pro Gly Lys Gly Arg Glu Trp Val
        35                  40                  45
Ser Ile Ile Asp Gly Gly Gly Ser Thr Tyr Tyr Ala Asp Ser Val Lys
    50                  55                  60
Gly Arg Phe Thr Ile Ser Arg Asp Asn Ser Lys Asn Arg Leu Tyr Leu
65                  70                  75                  80
Gln Met Asn Ser Leu Arg Ala Glu Asp Thr Ala Met Tyr Tyr Cys Ala
```

```
                85                  90                  95
Arg Ala Thr Ala Val Ala Glu Lys Asn Gly Tyr Asn Tyr Pro Phe Asn
            100                 105                 110
Tyr Trp Gly Gln Gly Thr Leu Val Thr Val Ser Ser Thr Ser Gly His
        115                 120                 125
Arg Gly Gln Gly Gly Ser Asp Tyr Lys Asp Asp Asp Asp Lys Ala Ser
    130                 135                 140
His His His His His His
145                 150

<210> SEQ ID NO 265
<211> LENGTH: 150
<212> TYPE: PRT
<213> ORGANISM: Artificial Sequence
<220> FEATURE:
<223> OTHER INFORMATION: PR005091|Chain|HC

<400> SEQUENCE: 265

Glu Val Gln Leu Val Glu Thr Gly Gly Gly Leu Ile Gln Pro Gly Gly
1               5                   10                  15
Ser Leu Arg Leu Ser Cys Ala Ala Ser Gly Phe Ala Val Asp Arg Tyr
            20                  25                  30
Tyr Met Ser Trp Val Arg Gln Ala Pro Gly Lys Gly Gln Glu Trp Val
        35                  40                  45
Ser Ile Ile Asp Gly Gly Gly Ser Thr Tyr Tyr Ala Asp Ser Val Lys
    50                  55                  60
Gly Arg Phe Thr Ile Ser Arg Asp Asn Ser Lys Asn Arg Leu Tyr Leu
65                  70                  75                  80
Gln Met Asn Ser Leu Arg Ala Glu Asp Thr Ala Met Tyr Tyr Cys Ala
                85                  90                  95
Arg Ala Thr Ala Val Ala Glu Lys Asn Gly Tyr Asn Tyr Pro Phe Asn
            100                 105                 110
Tyr Trp Gly Gln Gly Thr Leu Val Thr Val Ser Ser Thr Ser Gly His
        115                 120                 125
Arg Gly Gln Gly Gly Ser Asp Tyr Lys Asp Asp Asp Asp Lys Ala Ser
    130                 135                 140
His His His His His His
145                 150

<210> SEQ ID NO 266
<211> LENGTH: 150
<212> TYPE: PRT
<213> ORGANISM: Artificial Sequence
<220> FEATURE:
<223> OTHER INFORMATION: PR005092|Chain|HC

<400> SEQUENCE: 266

Glu Val Gln Leu Val Glu Thr Gly Gly Gly Leu Ile Gln Pro Gly Gly
1               5                   10                  15
Ser Leu Arg Leu Ser Cys Ala Ala Ser Gly Phe Asn Val Ser Ser His
            20                  25                  30
Tyr Met Ser Trp Val Arg Gln Ala Pro Gly Lys Gly Arg Glu Trp Val
        35                  40                  45
Ser Ile Ile Asp Gly Gly Gly Ser Thr Tyr Tyr Ala Asp Ser Val Lys
    50                  55                  60
Gly Arg Phe Thr Ile Ser Arg Asp Asn Ser Lys Asn Arg Leu Tyr Leu
65                  70                  75                  80
```

Gln Met Asn Ser Leu Arg Ala Glu Asp Thr Ala Met Tyr Tyr Cys Ala
            85                  90                  95

Arg Ala Thr Ala Val Ala Glu Lys Gly Gly Tyr Asn Tyr Pro Phe Asn
        100                 105                 110

Tyr Trp Gly Gln Gly Thr Leu Val Thr Val Ser Ser Thr Ser Gly His
        115                 120                 125

Arg Gly Gln Gly Gly Ser Asp Tyr Lys Asp Asp Asp Lys Ala Ser
    130                 135                 140

His His His His His His
145                 150

<210> SEQ ID NO 267
<211> LENGTH: 150
<212> TYPE: PRT
<213> ORGANISM: Artificial Sequence
<220> FEATURE:
<223> OTHER INFORMATION: PR005093|Chain|HC

<400> SEQUENCE: 267

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Ser Ser His
            20                  25                  30

Tyr Met Ser Trp Val Arg Gln Ala Pro Gly Lys Gly Arg Glu Trp Val
        35                  40                  45

Ser Ile Ile Asp Gly Gly Ser Thr Tyr Tyr Ala Asp Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
            85                  90                  95

Arg Ala Thr Arg Val Arg Glu Ala Asn Gly Tyr Asn Tyr Pro Phe Asn
        100                 105                 110

Tyr Trp Gly Gln Gly Thr Leu Val Thr Val Ser Ser Thr Ser Gly His
        115                 120                 125

Arg Gly Gln Gly Gly Ser Asp Tyr Lys Asp Asp Asp Lys Ala Ser
    130                 135                 140

His His His His His His
145                 150

<210> SEQ ID NO 268
<211> LENGTH: 150
<212> TYPE: PRT
<213> ORGANISM: Artificial Sequence
<220> FEATURE:
<223> OTHER INFORMATION: PR005094|Chain|HC

<400> SEQUENCE: 268

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Ser Val Val Gly His
            20                  25                  30

Tyr Met Ser Trp Val Arg Gln Ala Pro Gly Lys Gly Gln Glu Trp Val
        35                  40                  45

Ser Ile Ile Asp Gly Gly Ser Thr Tyr Tyr Ala Asp Ser Val Lys
    50                  55                  60

Gly Arg Phe Thr Ile Ser Arg Asp Asn Ser Lys Asn Arg Leu Tyr Leu
65                  70                  75                  80

```
Gln Met Asn Ser Leu Arg Ala Glu Asp Thr Ala Met Tyr Tyr Cys Ala
                85                  90                  95

Arg Ala Thr Ala Val Ala Glu Lys Asn Gly Tyr Asn Tyr Pro Phe Asn
            100                 105                 110

Tyr Trp Gly Gln Gly Thr Leu Val Thr Val Ser Ser Thr Ser Gly His
        115                 120                 125

Arg Gly Gln Gly Gly Ser Asp Tyr Lys Asp Asp Asp Lys Ala Ser
    130                 135                 140

His His His His His His
145                 150

<210> SEQ ID NO 269
<211> LENGTH: 150
<212> TYPE: PRT
<213> ORGANISM: Artificial Sequence
<220> FEATURE:
<223> OTHER INFORMATION: PR005095|Chain|HC

<400> SEQUENCE: 269

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Val Arg Ser His
            20                  25                  30

Tyr Met Ala Trp Val Arg Gln Ala Pro Gly Lys Gly Gln Glu Trp Val
        35                  40                  45

Ser Ile Ile Asp Gly Gly Ser Thr Tyr Tyr Ala Asp Ser Val Lys
50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Ala Val Ala Glu Lys Asn Gly Tyr Asn Tyr Pro Phe Asn
            100                 105                 110

Tyr Trp Gly Gln Gly Thr Leu Val Thr Val Ser Ser Thr Ser Gly His
        115                 120                 125

Arg Gly Gln Gly Gly Ser Asp Tyr Lys Asp Asp Asp Lys Ala Ser
    130                 135                 140

His His His His His His
145                 150

<210> SEQ ID NO 270
<211> LENGTH: 150
<212> TYPE: PRT
<213> ORGANISM: Artificial Sequence
<220> FEATURE:
<223> OTHER INFORMATION: PR005096|Chain|HC

<400> SEQUENCE: 270

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Ser Ser His
            20                  25                  30

Tyr Met Ser Trp Val Arg Gln Ala Pro Gly Lys Gly Arg Glu Trp Val
        35                  40                  45

Ser Ile Ile Asp Gly Gly Ser Thr Tyr Tyr Ala Asp Ser Val Lys
50                  55                  60

Gly Arg Phe Thr Ile Ser Arg Asp Asn Ser Lys Asn Arg Leu Tyr Leu
```

|   |   |   |   | 65 |   |   |   |   | 70 |   |   |   |   | 75 |   |   |   |   | 80 |

Gln Met Asn Ser Leu Arg Ala Glu Asp Thr Ala Met Tyr Tyr Cys Ala
                85                  90                  95

Arg Ala Thr Arg Val Pro Glu Lys Gly Gly Tyr Asn Tyr Pro Phe Asn
                100                 105                 110

Tyr Trp Gly Gln Gly Thr Leu Val Thr Val Ser Ser Thr Ser Gly His
            115                 120                 125

Arg Gly Gln Gly Gly Ser Asp Tyr Lys Asp Asp Asp Lys Ala Ser
    130                 135                 140

His His His His His His
145             150

<210> SEQ ID NO 271
<211> LENGTH: 150
<212> TYPE: PRT
<213> ORGANISM: Artificial Sequence
<220> FEATURE:
<223> OTHER INFORMATION: PR005097|Chain|HC

<400> SEQUENCE: 271

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Ser Ser His
                20                  25                  30

Tyr Met Ser Trp Val Arg Gln Ala Pro Gly Lys Gly Arg Glu Trp Val
            35                  40                  45

Ser Ile Ile Asp Gly Gly Gly Ser Thr Tyr Tyr Ala Asp Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Ala Val Arg Glu Lys Asn Gly Tyr Asn Tyr Pro Phe Asn
                100                 105                 110

Tyr Trp Gly Gln Gly Thr Leu Val Thr Val Ser Ser Thr Ser Gly His
            115                 120                 125

Arg Gly Gln Gly Gly Ser Asp Tyr Lys Asp Asp Asp Lys Ala Ser
    130                 135                 140

His His His His His His
145             150

<210> SEQ ID NO 272
<211> LENGTH: 150
<212> TYPE: PRT
<213> ORGANISM: Artificial Sequence
<220> FEATURE:
<223> OTHER INFORMATION: PR005098|Chain|HC

<400> SEQUENCE: 272

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Ser Ser His
                20                  25                  30

Tyr Met Ser Trp Val Arg Gln Ala Pro Gly Lys Gly Arg Glu Trp Val
            35                  40                  45

Ser Ile Ile Asp Gly Gly Gly Ser Thr Tyr Tyr Ala Asp Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Gln Val Arg Glu Lys Gly Gly Tyr Asn Tyr Pro Phe Asn
            100                 105                 110

Tyr Trp Gly Gln Gly Thr Leu Val Thr Val Ser Ser Thr Gly His
        115                 120                 125

Arg Gly Gln Gly Gly Ser Asp Tyr Lys Asp Asp Asp Lys Ala Ser
    130                 135                 140

His His His His His His
145                 150

<210> SEQ ID NO 273
<211> LENGTH: 150
<212> TYPE: PRT
<213> ORGANISM: Artificial Sequence
<220> FEATURE:
<223> OTHER INFORMATION: PR005099|Chain|HC

<400> SEQUENCE: 273

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Ser Ser His
            20                  25                  30

Tyr Met Ser Trp Val Arg Gln Ala Pro Gly Lys Gly Arg Glu Trp Val
        35                  40                  45

Ser Ile Ile Asp Ser Ala Gly Ser Thr Tyr Tyr Ala Asp Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Ala Val Ala Glu Lys Asn Gly Tyr Asn Tyr Pro Phe Asn
            100                 105                 110

Tyr Trp Gly Gln Gly Thr Leu Val Thr Val Ser Ser Thr Gly His
        115                 120                 125

Arg Gly Gln Gly Gly Ser Asp Tyr Lys Asp Asp Asp Lys Ala Ser
    130                 135                 140

His His His His His His
145                 150

<210> SEQ ID NO 274
<211> LENGTH: 150
<212> TYPE: PRT
<213> ORGANISM: Artificial Sequence
<220> FEATURE:
<223> OTHER INFORMATION: PR005100|Chain|HC

<400> SEQUENCE: 274

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Ser Ser His
            20                  25                  30

Tyr Met Ser Trp Val Arg Gln Ala Pro Gly Lys Gly Arg Glu Trp Val
        35                  40                  45

Ser Ile Ile Asp Arg Gly Gly Ser Lys Tyr Tyr Ala Asp Ser Val Lys
    50                  55                  60

```
Gly Arg Phe Thr Ile Ser Arg Asp Asn Ser Lys Asn Arg Leu Tyr Leu
 65                  70                  75                  80

Gln Met Asn Ser Leu Arg Ala Glu Asp Thr Ala Met Tyr Tyr Cys Ala
                 85                  90                  95

Arg Ala Thr Ala Val Ala Glu Lys Asn Gly Tyr Asn Tyr Pro Phe Asn
            100                 105                 110

Tyr Trp Gly Gln Gly Thr Leu Val Thr Val Ser Ser Thr Ser Gly His
        115                 120                 125

Arg Gly Gln Gly Gly Ser Asp Tyr Lys Asp Asp Asp Lys Ala Ser
    130                 135                 140

His His His His His His
145                 150

<210> SEQ ID NO 275
<211> LENGTH: 150
<212> TYPE: PRT
<213> ORGANISM: Artificial Sequence
<220> FEATURE:
<223> OTHER INFORMATION: PR005101|Chain|HC

<400> SEQUENCE: 275

Glu Val Gln Leu Val Glu Thr Gly Gly Gly Leu Ile Gln Pro Gly Gly
 1               5                  10                  15

Ser Leu Arg Leu Ser Cys Ala Ala Ser Gly Phe Asn Val Ser Ser His
            20                  25                  30

Tyr Met Ser Trp Val Arg Gln Ala Pro Gly Lys Gly Arg Glu Trp Val
        35                  40                  45

Ser Ile Ile Asp Lys Gly Gly Thr Tyr Tyr Ala Asp Ser Val Lys
 50                  55                  60

Gly Arg Phe Thr Ile Ser Arg Asp Asn Ser Lys Asn Arg Leu Tyr Leu
 65                  70                  75                  80

Gln Met Asn Ser Leu Arg Ala Glu Asp Thr Ala Met Tyr Tyr Cys Ala
                 85                  90                  95

Arg Ala Thr Ala Val Ala Glu Lys Asn Gly Tyr Asn Tyr Pro Phe Asn
            100                 105                 110

Tyr Trp Gly Gln Gly Thr Leu Val Thr Val Ser Ser Thr Ser Gly His
        115                 120                 125

Arg Gly Gln Gly Gly Ser Asp Tyr Lys Asp Asp Asp Lys Ala Ser
    130                 135                 140

His His His His His His
145                 150

<210> SEQ ID NO 276
<211> LENGTH: 150
<212> TYPE: PRT
<213> ORGANISM: Artificial Sequence
<220> FEATURE:
<223> OTHER INFORMATION: PR005102|Chain|HC

<400> SEQUENCE: 276

Glu Val Gln Leu Val Glu Thr Gly Gly Gly Leu Ile Gln Pro Gly Gly
 1               5                  10                  15

Ser Leu Arg Leu Ser Cys Ala Ala Ser Gly Phe Asn Val Ser Ser His
            20                  25                  30

Tyr Met Ser Trp Val Arg Gln Ala Pro Gly Lys Gly Arg Glu Trp Val
        35                  40                  45

Ser Ile Ile Asp Arg Gly Gly Ser Thr Tyr Tyr Ala Asp Ser Val Lys
```

-continued

```
                 50                  55                  60
Gly Arg Phe Thr Ile Ser Arg Asp Asn Ser Lys Asn Arg Leu Tyr Leu
 65                  70                  75                  80

Gln Met Asn Ser Leu Arg Ala Glu Asp Thr Ala Met Tyr Tyr Cys Ala
                 85                  90                  95

Arg Ala Thr Ala Val Ala Glu Lys Asn Gly Tyr Asn Tyr Pro Phe Asn
                100                 105                 110

Tyr Trp Gly Gln Gly Thr Leu Val Thr Val Ser Ser Thr Ser Gly His
                115                 120                 125

Arg Gly Gln Gly Gly Ser Asp Tyr Lys Asp Asp Asp Lys Ala Ser
                130                 135                 140

His His His His His His
145                 150

<210> SEQ ID NO 277
<211> LENGTH: 150
<212> TYPE: PRT
<213> ORGANISM: Artificial Sequence
<220> FEATURE:
<223> OTHER INFORMATION: PR005103|Chain|HC

<400> SEQUENCE: 277

Glu Val Gln Leu Val Glu Thr Gly Gly Gly Leu Ile Gln Pro Gly Gly
  1               5                  10                  15

Ser Leu Arg Leu Ser Cys Ala Ala Ser Gly Phe Asn Val Ser Ser His
                 20                  25                  30

Tyr Met Ser Trp Val Arg Gln Ala Pro Gly Lys Gly Arg Glu Trp Val
                 35                  40                  45

Ser Ile Ile Asp Arg Gly Gly Thr Tyr Tyr Ala Asp Ser Val Lys
                 50                  55                  60

Gly Arg Phe Thr Ile Ser Arg Asp Asn Ser Lys Asn Arg Leu Tyr Leu
 65                  70                  75                  80

Gln Met Asn Ser Leu Arg Ala Glu Asp Thr Ala Met Tyr Tyr Cys Ala
                 85                  90                  95

Arg Ala Thr Ala Val Ala Glu Lys Asn Gly Tyr Asn Tyr Pro Phe Asn
                100                 105                 110

Tyr Trp Gly Gln Gly Thr Leu Val Thr Val Ser Ser Thr Ser Gly His
                115                 120                 125

Arg Gly Gln Gly Gly Ser Asp Tyr Lys Asp Asp Asp Lys Ala Ser
                130                 135                 140

His His His His His His
145                 150

<210> SEQ ID NO 278
<211> LENGTH: 150
<212> TYPE: PRT
<213> ORGANISM: Artificial Sequence
<220> FEATURE:
<223> OTHER INFORMATION: PR005104|Chain|HC

<400> SEQUENCE: 278

Glu Val Gln Leu Val Glu Thr Gly Gly Gly Leu Ile Gln Pro Gly Gly
  1               5                  10                  15

Ser Leu Arg Leu Ser Cys Ala Ala Ser Gly Phe Asn Val Ser Ser His
                 20                  25                  30

Tyr Met Ser Trp Val Arg Gln Ala Pro Gly Lys Gly Arg Glu Trp Val
                 35                  40                  45
```

Ser Ile Ile Asp Ile Ser Gly Ser Thr Tyr Tyr Ala Asp Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Ala Val Ala Glu Lys Asn Gly Tyr Asn Tyr Pro Phe Asn
            100                 105                 110

Tyr Trp Gly Gln Gly Thr Leu Val Thr Val Ser Ser Thr Ser Gly His
            115                 120                 125

Arg Gly Gln Gly Gly Ser Asp Tyr Lys Asp Asp Asp Lys Ala Ser
        130                 135                 140

His His His His His His
145                 150

<210> SEQ ID NO 279
<211> LENGTH: 150
<212> TYPE: PRT
<213> ORGANISM: Artificial Sequence
<220> FEATURE:
<223> OTHER INFORMATION: PR005139|Chain|HC

<400> SEQUENCE: 279

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Arg Ser His
                20                  25                  30

Tyr Met Ser Trp Val Arg Gln Ala Pro Gly Lys Gly Arg Glu Trp Val
            35                  40                  45

Ser Ile Ile Asp Lys Ala Gly Ser Gly Tyr Tyr Ala Ala Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Glu Val Arg Glu Lys Asn Gly Tyr Asn Tyr Pro Phe Asn
            100                 105                 110

Tyr Trp Gly Gln Gly Thr Leu Val Thr Val Ser Ser Thr Ser Gly His
            115                 120                 125

Arg Gly Gln Gly Gly Ser Asp Tyr Lys Asp Asp Asp Lys Ala Ser
        130                 135                 140

His His His His His His
145                 150

<210> SEQ ID NO 280
<211> LENGTH: 150
<212> TYPE: PRT
<213> ORGANISM: Artificial Sequence
<220> FEATURE:
<223> OTHER INFORMATION: PR005140|Chain|HC

<400> SEQUENCE: 280

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Arg Ser His
                20                  25                  30

Tyr Met Ser Trp Val Arg Gln Ala Pro Gly Lys Gly Arg Glu Trp Val
            35                  40                  45

```
Ser Ile Ile Asp Lys Ala Gly Ser Thr Tyr Tyr Ala Ala Ser Val Lys
        50                  55                  60

Gly Arg Phe Thr Ile Ser Arg Asp Asn Ser Lys Asn Arg Leu Tyr Leu
 65                  70                  75                  80

Gln Met Asn Ser Leu Arg Ala Glu Asp Thr Ala Met Tyr Tyr Cys Ala
                85                  90                  95

Arg Ala Thr Glu Val Arg Glu Lys Asn Gly Tyr Asn Tyr Pro Phe Asn
                100                 105                 110

Tyr Trp Gly Gln Gly Thr Leu Val Thr Val Ser Ser Thr Ser Gly His
            115                 120                 125

Arg Gly Gln Gly Gly Ser Asp Tyr Lys Asp Asp Asp Lys Ala Ser
        130                 135                 140

His His His His His His
145                 150

<210> SEQ ID NO 281
<211> LENGTH: 150
<212> TYPE: PRT
<213> ORGANISM: Artificial Sequence
<220> FEATURE:
<223> OTHER INFORMATION: PR005141|Chain|HC

<400> SEQUENCE: 281

Glu Val Gln Leu Val Glu Thr Gly Gly Gly Leu Ile Gln Pro Gly Gly
 1               5                  10                  15

Ser Leu Arg Leu Ser Cys Ala Ala Ser Gly Phe Asn Val Ser Tyr Phe
            20                  25                  30

Tyr Met Ser Trp Val Arg Gln Ala Pro Gly Lys Gly Arg Glu Trp Val
        35                  40                  45

Ser Ile Ile Asp Lys Gly Gly Ser Gly Tyr Tyr Ala Ala Ser Val Lys
        50                  55                  60

Gly Arg Phe Thr Ile Ser Arg Asp Asn Ser Lys Asn Arg Leu Tyr Leu
 65                  70                  75                  80

Gln Met Asn Ser Leu Arg Ala Glu Asp Thr Ala Met Tyr Tyr Cys Ala
                85                  90                  95

Arg Ala Thr Glu Val Arg Glu Lys Asn Gly Tyr Asn Tyr Pro Phe Asn
                100                 105                 110

Tyr Trp Gly Gln Gly Thr Leu Val Thr Val Ser Ser Thr Ser Gly His
            115                 120                 125

Arg Gly Gln Gly Gly Ser Asp Tyr Lys Asp Asp Asp Lys Ala Ser
        130                 135                 140

His His His His His His
145                 150

<210> SEQ ID NO 282
<211> LENGTH: 150
<212> TYPE: PRT
<213> ORGANISM: Artificial Sequence
<220> FEATURE:
<223> OTHER INFORMATION: PR005142|Chain|HC

<400> SEQUENCE: 282

Glu Val Gln Leu Val Glu Thr Gly Gly Gly Leu Ile Gln Pro Gly Gly
 1               5                  10                  15

Ser Leu Arg Leu Ser Cys Ala Ala Ser Gly Phe Asn Val Ser Phe Tyr
            20                  25                  30

Tyr Met Ser Trp Val Arg Gln Ala Pro Gly Lys Gly Arg Glu Trp Val
```

-continued

```
                35                  40                  45
Ser Ile Ile Asp Lys Gly Gly Ser Gly Tyr Tyr Ala Ala Ser Val Lys
 50                  55                  60

Gly Arg Phe Thr Ile Ser Arg Asp Asn Ser Lys Asn Arg Leu Tyr Leu
 65                  70                  75                  80

Gln Met Asn Ser Leu Arg Ala Glu Asp Thr Ala Met Tyr Tyr Cys Ala
                 85                  90                  95

Arg Ala Thr Glu Val Arg Glu Lys Asn Gly Tyr Asn Tyr Pro Phe Asn
                100                 105                 110

Tyr Trp Gly Gln Gly Thr Leu Val Thr Val Ser Ser Thr Ser Gly His
            115                 120                 125

Arg Gly Gln Gly Gly Ser Asp Tyr Lys Asp Asp Asp Lys Ala Ser
        130                 135                 140

His His His His His His
145                 150

<210> SEQ ID NO 283
<211> LENGTH: 150
<212> TYPE: PRT
<213> ORGANISM: Artificial Sequence
<220> FEATURE:
<223> OTHER INFORMATION: PR005143|Chain|HC

<400> SEQUENCE: 283

Glu Val Gln Leu Val Glu Thr Gly Gly Gly Leu Ile Gln Pro Gly Gly
 1               5                  10                  15

Ser Leu Arg Leu Ser Cys Ala Ala Ser Gly Phe Asn Val Ser Phe His
                20                  25                  30

Tyr Met Ser Trp Val Arg Gln Ala Pro Gly Lys Gly Arg Glu Trp Val
            35                  40                  45

Ser Ile Ile Asp Lys Ala Gly Ser Gly Tyr Tyr Gly Gly Ser Val Lys
 50                  55                  60

Gly Arg Phe Thr Ile Ser Arg Asp Asn Ser Lys Asn Arg Leu Tyr Leu
 65                  70                  75                  80

Gln Met Asn Ser Leu Arg Ala Glu Asp Thr Ala Met Tyr Tyr Cys Ala
                 85                  90                  95

Arg Ala Thr Glu Val Arg Glu Lys Asn Gly Tyr Asn Tyr Pro Phe Asn
                100                 105                 110

Tyr Trp Gly Gln Gly Thr Leu Val Thr Val Ser Ser Thr Ser Gly His
            115                 120                 125

Arg Gly Gln Gly Gly Ser Asp Tyr Lys Asp Asp Asp Lys Ala Ser
        130                 135                 140

His His His His His His
145                 150

<210> SEQ ID NO 284
<211> LENGTH: 150
<212> TYPE: PRT
<213> ORGANISM: Artificial Sequence
<220> FEATURE:
<223> OTHER INFORMATION: PR005144|Chain|HC

<400> SEQUENCE: 284

Glu Val Gln Leu Val Glu Thr Gly Gly Gly Leu Ile Gln Pro Gly Gly
 1               5                  10                  15

Ser Leu Arg Leu Ser Cys Ala Ala Ser Gly Phe Asn Val Ser Phe Tyr
                20                  25                  30
```

```
Tyr Met Ser Trp Val Arg Gln Ala Pro Gly Lys Gly Arg Glu Trp Val
            35                  40                  45

Ser Ile Ile Asp Lys Ser Gly Ser Thr Tyr Tyr Ala Ala Ser Val Lys
 50                  55                  60

Gly Arg Phe Thr Ile Ser Arg Asp Asn Ser Lys Asn Arg Leu Tyr Leu
 65                  70                  75                  80

Gln Met Asn Ser Leu Arg Ala Glu Asp Thr Ala Met Tyr Tyr Cys Ala
                85                  90                  95

Arg Ala Thr Glu Val Arg Glu Lys Asn Gly Tyr Asn Tyr Pro Phe Asn
                100                 105                 110

Tyr Trp Gly Gln Gly Thr Leu Val Thr Val Ser Ser Thr Ser Gly His
            115                 120                 125

Arg Gly Gln Gly Gly Ser Asp Tyr Lys Asp Asp Asp Lys Ala Ser
            130                 135                 140

His His His His His His
145                 150
```

<210> SEQ ID NO 285
<211> LENGTH: 150
<212> TYPE: PRT
<213> ORGANISM: Artificial Sequence
<220> FEATURE:
<223> OTHER INFORMATION: PR005145|Chain|HC

<400> SEQUENCE: 285

```
Glu Val Gln Leu Val Glu Thr Gly Gly Gly Leu Ile Gln Pro Gly Gly
 1                   5                  10                  15

Ser Leu Arg Leu Ser Cys Ala Ala Ser Gly Phe Asn Val Ser Phe Tyr
                20                  25                  30

Tyr Met Ser Trp Val Arg Gln Ala Pro Gly Lys Gly Arg Glu Trp Val
            35                  40                  45

Ser Ile Ile Asp Lys Gly Gly Ser Thr Tyr Tyr Gly Asp Ser Val Lys
 50                  55                  60

Gly Arg Phe Thr Ile Ser Arg Asp Asn Ser Lys Asn Arg Leu Tyr Leu
 65                  70                  75                  80

Gln Met Asn Ser Leu Arg Ala Glu Asp Thr Ala Met Tyr Tyr Cys Ala
                85                  90                  95

Arg Ala Thr Glu Val Arg Glu Lys Asn Gly Tyr Asn Tyr Pro Phe Asn
                100                 105                 110

Tyr Trp Gly Gln Gly Thr Leu Val Thr Val Ser Ser Thr Ser Gly His
            115                 120                 125

Arg Gly Gln Gly Gly Ser Asp Tyr Lys Asp Asp Asp Lys Ala Ser
            130                 135                 140

His His His His His His
145                 150
```

<210> SEQ ID NO 286
<211> LENGTH: 150
<212> TYPE: PRT
<213> ORGANISM: Artificial Sequence
<220> FEATURE:
<223> OTHER INFORMATION: PR005146|Chain|HC

<400> SEQUENCE: 286

```
Glu Val Gln Leu Val Glu Thr Gly Gly Gly Leu Ile Gln Pro Gly Gly
 1                   5                  10                  15

Ser Leu Arg Leu Ser Cys Ala Ala Ser Gly Phe Asn Val Ser Phe His
                20                  25                  30
```

```
Tyr Met Ser Trp Val Arg Gln Ala Pro Gly Lys Gly Arg Glu Trp Val
            35                  40                  45

Ser Ile Ile Asp Gly Ala Gly Ser Gly Tyr Tyr Ala Ala Ser Val Lys
 50                  55                  60

Gly Arg Phe Thr Ile Ser Arg Asp Asn Ser Lys Asn Arg Leu Tyr Leu
 65                  70                  75                  80

Gln Met Asn Ser Leu Arg Ala Glu Asp Thr Ala Met Tyr Tyr Cys Ala
                 85                  90                  95

Arg Ala Thr Met Val Arg Glu Lys Gln Gly Tyr Asn Tyr Pro Phe Asn
                100                 105                 110

Tyr Trp Gly Gln Gly Thr Leu Val Thr Val Ser Ser Thr Ser Gly His
            115                 120                 125

Arg Gly Gln Gly Gly Ser Asp Tyr Lys Asp Asp Asp Asp Lys Ala Ser
            130                 135                 140

His His His His His His
145                 150

<210> SEQ ID NO 287
<211> LENGTH: 150
<212> TYPE: PRT
<213> ORGANISM: Artificial Sequence
<220> FEATURE:
<223> OTHER INFORMATION: PR005147|Chain|HC

<400> SEQUENCE: 287

Glu Val Gln Leu Val Glu Thr Gly Gly Gly Leu Ile Gln Pro Gly Gly
1                5                  10                  15

Ser Leu Arg Leu Ser Cys Ala Ala Ser Gly Phe Asn Val Ser Tyr Tyr
            20                  25                  30

Tyr Met Ser Trp Val Arg Gln Ala Pro Gly Lys Gly Arg Glu Trp Val
            35                  40                  45

Ser Ile Ile Asp Lys Ala Gly Ser Thr Tyr Tyr Gly Ala Ser Val Lys
 50                  55                  60

Gly Arg Phe Thr Ile Ser Arg Asp Asn Ser Lys Asn Arg Leu Tyr Leu
 65                  70                  75                  80

Gln Met Asn Ser Leu Arg Ala Glu Asp Thr Ala Met Tyr Tyr Cys Ala
                 85                  90                  95

Arg Ala Thr Met Val Arg Glu Lys Asn Gly Tyr Asn Tyr Pro Phe Asn
                100                 105                 110

Tyr Trp Gly Gln Gly Thr Leu Val Thr Val Ser Ser Thr Ser Gly His
            115                 120                 125

Arg Gly Gln Gly Gly Ser Asp Tyr Lys Asp Asp Asp Asp Lys Ala Ser
            130                 135                 140

His His His His His His
145                 150

<210> SEQ ID NO 288
<211> LENGTH: 150
<212> TYPE: PRT
<213> ORGANISM: Artificial Sequence
<220> FEATURE:
<223> OTHER INFORMATION: PR005148|Chain|HC

<400> SEQUENCE: 288

Glu Val Gln Leu Val Glu Thr Gly Gly Gly Leu Ile Gln Pro Gly Gly
1                5                  10                  15

Ser Leu Arg Leu Ser Cys Ala Ala Ser Gly Phe Asn Val Ser Ser His
```

-continued

```
                20                  25                  30
Tyr Met Ser Trp Val Arg Gln Ala Pro Gly Lys Gly Arg Glu Trp Val
            35                  40                  45

Ser Ile Ile Asp Lys Ala Gly Ser Gly Tyr Tyr Ala Ala Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Glu Val Arg Glu Lys Asn Gly Tyr Asn Tyr Pro Phe Asn
            100                 105                 110

Tyr Trp Gly Gln Gly Thr Leu Val Thr Val Ser Ser Thr Ser Gly His
            115                 120                 125

Arg Gly Gln Gly Gly Ser Asp Tyr Lys Asp Asp Asp Lys Ala Ser
            130                 135                 140

His His His His His His
145                 150
```

<210> SEQ ID NO 289
<211> LENGTH: 150
<212> TYPE: PRT
<213> ORGANISM: Artificial Sequence
<220> FEATURE:
<223> OTHER INFORMATION: PR005149|Chain|HC

<400> SEQUENCE: 289

```
Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Ser Ser His
            20                  25                  30

Tyr Met Ser Trp Val Arg Gln Ala Pro Gly Lys Gly Arg Glu Trp Val
            35                  40                  45

Ser Ile Ile Asp Lys Ala Gly Ser Gly Tyr Tyr Ala Asp Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Glu Val Arg Glu Lys Gln Gly Tyr Asn Tyr Pro Phe Asn
            100                 105                 110

Tyr Trp Gly Gln Gly Thr Leu Val Thr Val Ser Ser Thr Ser Gly His
            115                 120                 125

Arg Gly Gln Gly Gly Ser Asp Tyr Lys Asp Asp Asp Lys Ala Ser
            130                 135                 140

His His His His His His
145                 150
```

<210> SEQ ID NO 290
<211> LENGTH: 150
<212> TYPE: PRT
<213> ORGANISM: Artificial Sequence
<220> FEATURE:
<223> OTHER INFORMATION: PR005150|Chain|HC

<400> SEQUENCE: 290

```
Glu Val Gln Leu Val Glu Thr Gly Gly Gly Leu Ile Gln Pro Gly Gly
1               5                   10                  15
```

Ser Leu Arg Leu Ser Cys Ala Ala Ser Gly Phe Asn Val Ser Ser Phe
            20                  25                  30

Tyr Met Ser Trp Val Arg Gln Ala Pro Gly Lys Gly Arg Glu Trp Val
        35                  40                  45

Ser Ile Ile Asp Lys Ala Gly Ser Thr Tyr Tyr Gly Ala Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Glu Val Arg Glu Lys Gln Gly Tyr Asn Tyr Pro Phe Asn
            100                 105                 110

Tyr Trp Gly Gln Gly Thr Leu Val Thr Val Ser Ser Thr Ser Gly His
        115                 120                 125

Arg Gly Gln Gly Gly Ser Asp Tyr Lys Asp Asp Asp Asp Lys Ala Ser
    130                 135                 140

His His His His His His
145                 150

<210> SEQ ID NO 291
<211> LENGTH: 150
<212> TYPE: PRT
<213> ORGANISM: Artificial Sequence
<220> FEATURE:
<223> OTHER INFORMATION: PR005151|Chain|HC

<400> SEQUENCE: 291

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Ser Ser His
            20                  25                  30

Tyr Met Ser Trp Val Arg Gln Ala Pro Gly Lys Gly Arg Glu Trp Val
        35                  40                  45

Ser Ile Ile Asp Lys Ser Gly Ser Gly Tyr Tyr Gly Ala Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Glu Val Arg Glu Lys Gln Gly Tyr Asn Tyr Pro Phe Asn
            100                 105                 110

Tyr Trp Gly Gln Gly Thr Leu Val Thr Val Ser Ser Thr Ser Gly His
        115                 120                 125

Arg Gly Gln Gly Gly Ser Asp Tyr Lys Asp Asp Asp Asp Lys Ala Ser
    130                 135                 140

His His His His His His
145                 150

<210> SEQ ID NO 292
<211> LENGTH: 150
<212> TYPE: PRT
<213> ORGANISM: Artificial Sequence
<220> FEATURE:
<223> OTHER INFORMATION: PR005152|Chain|HC

<400> SEQUENCE: 292

Glu Val Gln Leu Val Glu Thr Gly Gly Gly Leu Ile Gln Pro Gly Gly
1               5                   10                  15

```
Ser Leu Arg Leu Ser Cys Ala Ala Ser Gly Phe Asn Val Arg Ser His
            20                  25                  30

Tyr Met Ser Trp Val Arg Gln Ala Pro Gly Lys Gly Arg Glu Trp Val
        35                  40                  45

Ser Ile Ile Asp Arg Ala Gly Ser Thr Tyr Tyr Gly Ala Ser Val Lys
50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Glu Val Arg Glu Lys Asn Gly Tyr Asn Tyr Pro Phe Asn
            100                 105                 110

Tyr Trp Gly Gln Gly Thr Leu Val Thr Val Ser Ser Thr Ser Gly His
        115                 120                 125

Arg Gly Gln Gly Gly Ser Asp Tyr Lys Asp Asp Asp Lys Ala Ser
        130                 135                 140

His His His His His His
145                 150

<210> SEQ ID NO 293
<211> LENGTH: 150
<212> TYPE: PRT
<213> ORGANISM: Artificial Sequence
<220> FEATURE:
<223> OTHER INFORMATION: PR005153|Chain|HC

<400> SEQUENCE: 293

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Ser Ser His
            20                  25                  30

Tyr Met Ser Trp Val Arg Gln Ala Pro Gly Lys Gly Arg Glu Trp Val
        35                  40                  45

Ser Ile Ile Asp Lys Ala Gly Ser Gly Tyr Tyr Gly Ser Val Lys
50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Glu Val Arg Glu Lys Gly Gly Tyr Asn Tyr Pro Phe Asn
            100                 105                 110

Tyr Trp Gly Gln Gly Thr Leu Val Thr Val Ser Ser Thr Ser Gly His
        115                 120                 125

Arg Gly Gln Gly Gly Ser Asp Tyr Lys Asp Asp Asp Lys Ala Ser
        130                 135                 140

His His His His His His
145                 150

<210> SEQ ID NO 294
<211> LENGTH: 150
<212> TYPE: PRT
<213> ORGANISM: Artificial Sequence
<220> FEATURE:
<223> OTHER INFORMATION: PR005154|Chain|HC

<400> SEQUENCE: 294

Glu Val Gln Leu Val Glu Thr Gly Gly Gly Leu Ile Gln Pro Gly Gly
```

```
                1               5                  10                 15
              Ser Leu Arg Leu Ser Cys Ala Ala Ser Gly Phe Asn Val Ser Ser His
                           20                  25                 30

Tyr Met Ser Trp Val Arg Gln Ala Pro Gly Lys Gly Arg Glu Trp Val
                           35                  40                 45

Ser Ile Ile Asp Lys Ser Gly Ser Thr Tyr Tyr Gly Ser Val Lys
                       50                  55                  60

Gly Arg Phe Thr Ile Ser Arg Asp Asn Ser Lys Asn Arg Leu Tyr Leu
               65                  70                  75                  80

Gln Met Asn Ser Leu Arg Ala Glu Asp Thr Ala Met Tyr Tyr Cys Ala
                           85                  90                  95

Arg Ala Thr Met Val Arg Glu Lys Gln Gly Tyr Asn Tyr Pro Phe Asn
                          100                 105                 110

Tyr Trp Gly Gln Gly Thr Leu Val Thr Val Ser Ser Thr Ser Gly His
                          115                 120                 125

Arg Gly Gln Gly Gly Ser Asp Tyr Lys Asp Asp Asp Lys Ala Ser
                      130                 135                 140

His His His His His His
              145                 150

<210> SEQ ID NO 295
<211> LENGTH: 150
<212> TYPE: PRT
<213> ORGANISM: Artificial Sequence
<220> FEATURE:
<223> OTHER INFORMATION: PR005155|Chain|HC

<400> SEQUENCE: 295

Glu Val Gln Leu Val Glu Thr Gly Gly Gly Leu Ile Gln Pro Gly Gly
               1               5                  10                 15

Ser Leu Arg Leu Ser Cys Ala Ala Ser Gly Phe Asn Val Arg Phe Tyr
                           20                  25                 30

Tyr Met Ser Trp Val Arg Gln Ala Pro Gly Lys Gly Arg Glu Trp Val
                           35                  40                 45

Ser Ile Ile Asp Lys Gly Gly Ser Gly Tyr Tyr Ala Ala Ser Val Lys
                       50                  55                  60

Gly Arg Phe Thr Ile Ser Arg Asp Asn Ser Lys Asn Arg Leu Tyr Leu
               65                  70                  75                  80

Gln Met Asn Ser Leu Arg Ala Glu Asp Thr Ala Met Tyr Tyr Cys Ala
                           85                  90                  95

Arg Ala Thr Glu Val Arg Glu Lys Gln Gly Tyr Asn Tyr Pro Phe Asn
                          100                 105                 110

Tyr Trp Gly Gln Gly Thr Leu Val Thr Val Ser Ser Thr Ser Gly His
                          115                 120                 125

Arg Gly Gln Gly Gly Ser Asp Tyr Lys Asp Asp Asp Lys Ala Ser
                      130                 135                 140

His His His His His His
              145                 150

<210> SEQ ID NO 296
<211> LENGTH: 150
<212> TYPE: PRT
<213> ORGANISM: Artificial Sequence
<220> FEATURE:
<223> OTHER INFORMATION: PR005156|Chain|HC

<400> SEQUENCE: 296
```

```
Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Arg Phe His
            20                  25                  30

Tyr Met Ser Trp Val Arg Gln Ala Pro Gly Lys Gly Arg Glu Trp Val
            35                  40                  45

Ser Ile Ile Asp Lys Ala Gly Ser Gly Tyr Tyr Gly Gly Ser Val Lys
50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
            85                  90                  95

Arg Ala Thr Glu Val Arg Glu Lys Gln Gly Tyr Asn Tyr Pro Phe Asn
            100                 105                 110

Tyr Trp Gly Gln Gly Thr Leu Val Thr Val Ser Ser Thr Ser Gly His
            115                 120                 125

Arg Gly Gln Gly Gly Ser Asp Tyr Lys Asp Asp Asp Lys Ala Ser
            130                 135                 140

His His His His His His
145                 150
```

<210> SEQ ID NO 297
<211> LENGTH: 150
<212> TYPE: PRT
<213> ORGANISM: Artificial Sequence
<220> FEATURE:
<223> OTHER INFORMATION: PR005157|Chain|HC

<400> SEQUENCE: 297

```
Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Arg Phe Tyr
            20                  25                  30

Tyr Met Ser Trp Val Arg Gln Ala Pro Gly Lys Gly Arg Glu Trp Val
            35                  40                  45

Ser Ile Ile Asp Lys Ser Gly Ser Thr Tyr Tyr Ala Ala Ser Val Lys
50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
            85                  90                  95

Arg Ala Thr Glu Val Arg Glu Lys Gln Gly Tyr Asn Tyr Pro Phe Asn
            100                 105                 110

Tyr Trp Gly Gln Gly Thr Leu Val Thr Val Ser Ser Thr Ser Gly His
            115                 120                 125

Arg Gly Gln Gly Gly Ser Asp Tyr Lys Asp Asp Asp Lys Ala Ser
            130                 135                 140

His His His His His His
145                 150
```

<210> SEQ ID NO 298
<211> LENGTH: 150
<212> TYPE: PRT
<213> ORGANISM: Artificial Sequence
<220> FEATURE:
<223> OTHER INFORMATION: PR005158|Chain|HC

<400> SEQUENCE: 298

```
Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Arg Ser His
            20                  25                  30

Tyr Met Ser Trp Val Arg Gln Ala Pro Gly Lys Gly Arg Glu Trp Val
        35                  40                  45

Ser Ile Ile Asp Lys Ala Gly Ser Thr Tyr Tyr Ala Ala Ser Val Lys
    50                  55                  60

Gly Arg Phe Thr Ile Ser Arg Asp Asn Ser Lys Asn Arg Leu Tyr Leu
65              70                  75                  80

Gln Met Asn Ser Leu Arg Ala Glu Asp Thr Ala Met Tyr Tyr Cys Ala
                85                  90                  95

Arg Ala Thr Glu Val Arg Glu Lys Gln Gly Tyr Asn Tyr Pro Phe Asn
            100                 105                 110

Tyr Trp Gly Gln Gly Thr Leu Val Thr Val Ser Ser Thr Ser Gly His
        115                 120                 125

Arg Gly Gln Gly Gly Ser Asp Tyr Lys Asp Asp Asp Lys Ala Ser
    130                 135                 140

His His His His His His
145                 150
```

<210> SEQ ID NO 299
<211> LENGTH: 150
<212> TYPE: PRT
<213> ORGANISM: Artificial Sequence
<220> FEATURE:
<223> OTHER INFORMATION: PR005159|Chain|HC

<400> SEQUENCE: 299

```
Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Arg Ser His
            20                  25                  30

Tyr Met Ser Trp Val Arg Gln Ala Pro Gly Lys Gly Arg Glu Trp Val
        35                  40                  45

Ser Ile Ile Asp Arg Ala Gly Ser Thr Tyr Tyr Gly Ala Ser Val Lys
    50                  55                  60

Gly Arg Phe Thr Ile Ser Arg Asp Asn Ser Lys Asn Arg Leu Tyr Leu
65              70                  75                  80

Gln Met Asn Ser Leu Arg Ala Glu Asp Thr Ala Met Tyr Tyr Cys Ala
                85                  90                  95

Arg Ala Thr Glu Val Arg Glu Lys Gln Gly Tyr Asn Tyr Pro Phe Asn
            100                 105                 110

Tyr Trp Gly Gln Gly Thr Leu Val Thr Val Ser Ser Thr Ser Gly His
        115                 120                 125

Arg Gly Gln Gly Gly Ser Asp Tyr Lys Asp Asp Asp Lys Ala Ser
    130                 135                 140

His His His His His His
145                 150
```

<210> SEQ ID NO 300
<211> LENGTH: 150
<212> TYPE: PRT
<213> ORGANISM: Artificial Sequence
<220> FEATURE:
<223> OTHER INFORMATION: PR005160|Chain|HC -continued

<400> SEQUENCE: 300

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Arg Phe Tyr
            20                  25                  30

Tyr Met Ser Trp Val Arg Gln Ala Pro Gly Lys Gly Arg Glu Trp Val
        35                  40                  45

Ser Ile Ile Asp Lys Gly Gly Ser Thr Tyr Tyr Gly Asp Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
            85                  90                  95

Arg Ala Thr Glu Val Arg Glu Lys Gln Gly Tyr Asn Tyr Pro Phe Asn
        100                 105                 110

Tyr Trp Gly Gln Gly Thr Leu Val Thr Val Ser Ser Thr Ser Gly His
        115                 120                 125

Arg Gly Gln Gly Gly Ser Asp Tyr Lys Asp Asp Asp Lys Ala Ser
    130                 135                 140

His His His His His His
145                 150

<210> SEQ ID NO 301
<211> LENGTH: 150
<212> TYPE: PRT
<213> ORGANISM: Artificial Sequence
<220> FEATURE:
<223> OTHER INFORMATION: PR005161|Chain|HC

<400> SEQUENCE: 301

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Arg Ser His
            20                  25                  30

Tyr Met Ser Trp Val Arg Gln Ala Pro Gly Lys Gly Arg Glu Trp Val
        35                  40                  45

Ser Ile Ile Asp Lys Ala Gly Ser Gly Tyr Tyr Ala Ala Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
            85                  90                  95

Arg Ala Thr Glu Val Arg Glu Lys Gln Gly Tyr Asn Tyr Pro Phe Asn
        100                 105                 110

Tyr Trp Gly Gln Gly Thr Leu Val Thr Val Ser Ser Thr Ser Gly His
        115                 120                 125

Arg Gly Gln Gly Gly Ser Asp Tyr Lys Asp Asp Asp Lys Ala Ser
    130                 135                 140

His His His His His His
145                 150

<210> SEQ ID NO 302
<211> LENGTH: 150
<212> TYPE: PRT
<213> ORGANISM: Artificial Sequence
<220> FEATURE:
<223> OTHER INFORMATION: PR005162|Chain|HC

<400> SEQUENCE: 302

| Glu | Val | Gln | Leu | Val | Glu | Thr | Gly | Gly | Gly | Leu | Ile | Gln | Pro | Gly | Gly |
|---|---|---|---|---|---|---|---|---|---|---|---|---|---|---|---|
| 1 | | | | 5 | | | | | 10 | | | | | 15 | |

Ser Leu Arg Leu Ser Cys Ala Ala Ser Gly Phe Asn Val Arg Phe His
           20              25              30

Tyr Met Ser Trp Val Arg Gln Ala Pro Gly Lys Gly Arg Glu Trp Val
      35              40              45

Ser Ile Ile Asp Lys Ala Gly Ser Gly Tyr Tyr Ala Ala Ser Val Lys
50                55              60

Gly Arg Phe Thr Ile Ser Arg Asp Asn Ser Lys Asn Arg Leu Tyr Leu
65                70              75              80

Gln Met Asn Ser Leu Arg Ala Glu Asp Thr Ala Met Tyr Tyr Cys Ala
           85              90              95

Arg Ala Thr Met Val Arg Glu Lys Gln Gly Tyr Asn Tyr Pro Phe Asn
           100            105           110

Tyr Trp Gly Gln Gly Thr Leu Val Thr Val Ser Ser Thr Ser Gly His
      115              120           125

Arg Gly Gln Gly Gly Ser Asp Tyr Lys Asp Asp Asp Lys Ala Ser
130               135              140

His His His His His His
145               150

<210> SEQ ID NO 303
<211> LENGTH: 150
<212> TYPE: PRT
<213> ORGANISM: Artificial Sequence
<220> FEATURE:
<223> OTHER INFORMATION: PR005163|Chain|HC

<400> SEQUENCE: 303

Glu Val Gln Leu Val Glu Thr Gly Gly Gly Leu Ile Gln Pro Gly Gly
1                5                10            15

Ser Leu Arg Leu Ser Cys Ala Ala Ser Gly Phe Asn Val Arg Ser His
           20              25              30

Tyr Met Ser Trp Val Arg Gln Ala Pro Gly Lys Gly Arg Glu Trp Val
      35              40              45

Ser Ile Ile Asp Lys Ala Gly Ser Gly Tyr Tyr Ala Asp Ser Val Lys
50                55              60

Gly Arg Phe Thr Ile Ser Arg Asp Asn Ser Lys Asn Arg Leu Tyr Leu
65                70              75              80

Gln Met Asn Ser Leu Arg Ala Glu Asp Thr Ala Met Tyr Tyr Cys Ala
           85              90              95

Arg Ala Thr Glu Val Arg Glu Lys Gln Gly Tyr Asn Tyr Pro Phe Asn
           100            105           110

Tyr Trp Gly Gln Gly Thr Leu Val Thr Val Ser Ser Thr Ser Gly His
      115              120           125

Arg Gly Gln Gly Gly Ser Asp Tyr Lys Asp Asp Asp Lys Ala Ser
130               135              140

His His His His His His
145               150

<210> SEQ ID NO 304
<211> LENGTH: 150
<212> TYPE: PRT
<213> ORGANISM: Artificial Sequence
<220> FEATURE:

<223> OTHER INFORMATION: PR005164|Chain|HC

<400> SEQUENCE: 304

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Arg Ser Phe
            20                  25                  30

Tyr Met Ser Trp Val Arg Gln Ala Pro Gly Lys Gly Arg Glu Trp Val
        35                  40                  45

Ser Ile Ile Asp Lys Ala Gly Ser Thr Tyr Tyr Gly Ala Ser Val Lys
50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
            85                  90                  95

Arg Ala Thr Glu Val Arg Glu Lys Gln Gly Tyr Asn Tyr Pro Phe Asn
            100                 105                 110

Tyr Trp Gly Gln Gly Thr Leu Val Thr Val Ser Ser Thr Ser Gly His
        115                 120                 125

Arg Gly Gln Gly Gly Ser Asp Tyr Lys Asp Asp Asp Lys Ala Ser
    130                 135                 140

His His His His His His
145                 150

<210> SEQ ID NO 305
<211> LENGTH: 150
<212> TYPE: PRT
<213> ORGANISM: Artificial Sequence
<220> FEATURE:
<223> OTHER INFORMATION: PR005165|Chain|HC

<400> SEQUENCE: 305

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Arg Ser His
            20                  25                  30

Tyr Met Ser Trp Val Arg Gln Ala Pro Gly Lys Gly Arg Glu Trp Val
        35                  40                  45

Ser Ile Ile Asp Lys Ser Gly Ser Tyr Tyr Gly Ala Ser Val Lys
50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
            85                  90                  95

Arg Ala Thr Glu Val Arg Glu Lys Gln Gly Tyr Asn Tyr Pro Phe Asn
            100                 105                 110

Tyr Trp Gly Gln Gly Thr Leu Val Thr Val Ser Ser Thr Ser Gly His
        115                 120                 125

Arg Gly Gln Gly Gly Ser Asp Tyr Lys Asp Asp Asp Lys Ala Ser
    130                 135                 140

His His His His His His
145                 150

<210> SEQ ID NO 306
<211> LENGTH: 150
<212> TYPE: PRT
<213> ORGANISM: Artificial Sequence
<220> FEATURE:
<223> OTHER INFORMATION: PR005166|Chain|HC

<400> SEQUENCE: 306

```
Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Arg Ser His
            20                  25                  30

Tyr Met Ser Trp Val Arg Gln Ala Pro Gly Lys Gly Arg Glu Trp Val
        35                  40                  45

Ser Ile Ile Asp Lys Ala Gly Ser Gly Tyr Tyr Gly Gly Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Glu Val Arg Glu Lys Gln Gly Tyr Asn Tyr Pro Phe Asn
            100                 105                 110

Tyr Trp Gly Gln Gly Thr Leu Val Thr Val Ser Ser Thr Ser Gly His
        115                 120                 125

Arg Gly Gln Gly Gly Ser Asp Tyr Lys Asp Asp Asp Lys Ala Ser
    130                 135                 140

His His His His His His
145                 150
```

<210> SEQ ID NO 307
<211> LENGTH: 150
<212> TYPE: PRT
<213> ORGANISM: Artificial Sequence
<220> FEATURE:
<223> OTHER INFORMATION: PR005167|Chain|HC

<400> SEQUENCE: 307

```
Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Arg Tyr Tyr
            20                  25                  30

Tyr Met Ser Trp Val Arg Gln Ala Pro Gly Lys Gly Arg Glu Trp Val
        35                  40                  45

Ser Ile Ile Asp Lys Ala Gly Ser Thr Tyr Tyr Gly Ala Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Met Val Arg Glu Lys Gln Gly Tyr Asn Tyr Pro Phe Asn
            100                 105                 110

Tyr Trp Gly Gln Gly Thr Leu Val Thr Val Ser Ser Thr Ser Gly His
        115                 120                 125

Arg Gly Gln Gly Gly Ser Asp Tyr Lys Asp Asp Asp Lys Ala Ser
    130                 135                 140

His His His His His His
145                 150
```

<210> SEQ ID NO 308
<211> LENGTH: 150
<212> TYPE: PRT

<213> ORGANISM: Artificial Sequence
<220> FEATURE:
<223> OTHER INFORMATION: PR005168|Chain|HC

<400> SEQUENCE: 308

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Arg Ser His
            20                  25                  30

Tyr Met Ser Trp Val Arg Gln Ala Pro Gly Lys Gly Arg Glu Trp Val
        35                  40                  45

Ser Ile Ile Asp Lys Ser Gly Ser Thr Tyr Tyr Gly Gly Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Met Val Arg Glu Lys Gln Gly Tyr Asn Tyr Pro Phe Asn
            100                 105                 110

Tyr Trp Gly Gln Gly Thr Leu Val Thr Val Ser Ser Thr Ser Gly His
        115                 120                 125

Arg Gly Gln Gly Gly Ser Asp Tyr Lys Asp Asp Asp Lys Ala Ser
    130                 135                 140

His His His His His His
145                 150

<210> SEQ ID NO 309
<211> LENGTH: 150
<212> TYPE: PRT
<213> ORGANISM: Artificial Sequence
<220> FEATURE:
<223> OTHER INFORMATION: PR005169|Chain|HC

<400> SEQUENCE: 309

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Arg Tyr Phe
            20                  25                  30

Tyr Met Ser Trp Val Arg Gln Ala Pro Gly Lys Gly Arg Glu Trp Val
        35                  40                  45

Ser Ile Ile Asp Lys Gly Gly Ser Gly Tyr Tyr Ala Ala Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Glu Val Arg Glu Lys Gln Gly Tyr Asn Tyr Pro Phe Asn
            100                 105                 110

Tyr Trp Gly Gln Gly Thr Leu Val Thr Val Ser Ser Thr Ser Gly His
        115                 120                 125

Arg Gly Gln Gly Gly Ser Asp Tyr Lys Asp Asp Asp Lys Ala Ser
    130                 135                 140

His His His His His His
145                 150

<210> SEQ ID NO 310
<211> LENGTH: 356

<212> TYPE: PRT
<213> ORGANISM: Artificial Sequence
<220> FEATURE:
<223> OTHER INFORMATION: PR005569|Chain|HC

<400> SEQUENCE: 310

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Ser Phe Tyr
            20                  25                  30

Tyr Met Ser Trp Val Arg Gln Ala Pro Gly Lys Gly Arg Glu Trp Val
        35                  40                  45

Ser Ile Ile Asp Lys Ser Gly Ser Thr Tyr Tyr Ala Ala Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Glu Val Arg Glu Lys Asn Gly Tyr Asn Tyr Pro Phe Asn
            100                 105                 110

Tyr Trp Gly Gln Gly Thr Leu Val Thr Val Ser Ser Glu Pro Lys Ser
        115                 120                 125

Cys Asp Lys Thr His Thr Cys Pro Pro Cys Pro Ala Pro Glu Leu Leu
    130                 135                 140

Gly Gly Pro Ser Val Phe Leu Phe Pro Pro Lys Pro Lys Asp Thr Leu
145                 150                 155                 160

Met Ile Ser Arg Thr Pro Glu Val Thr Cys Val Val Val Asp Val Ser
                165                 170                 175

His Glu Asp Pro Glu Val Lys Phe Asn Trp Tyr Val Asp Gly Val Glu
            180                 185                 190

Val His Asn Ala Lys Thr Lys Pro Arg Glu Glu Gln Tyr Asn Ser Thr
        195                 200                 205

Tyr Arg Val Val Ser Val Leu Thr Val Leu His Gln Asp Trp Leu Asn
    210                 215                 220

Gly Lys Glu Tyr Lys Cys Lys Val Ser Asn Lys Ala Leu Pro Ala Pro
225                 230                 235                 240

Ile Glu Lys Thr Ile Ser Lys Ala Lys Gly Gln Pro Arg Glu Pro Gln
                245                 250                 255

Val Tyr Thr Leu Pro Pro Ser Arg Glu Glu Met Thr Lys Asn Gln Val
            260                 265                 270

Ser Leu Thr Cys Leu Val Lys Gly Phe Tyr Pro Ser Asp Ile Ala Val
        275                 280                 285

Glu Trp Glu Ser Asn Gly Gln Pro Glu Asn Asn Tyr Lys Thr Thr Pro
    290                 295                 300

Pro Val Leu Asp Ser Asp Gly Ser Phe Phe Leu Tyr Ser Lys Leu Thr
305                 310                 315                 320

Val Asp Lys Ser Arg Trp Gln Gln Gly Asn Val Phe Ser Cys Ser Val
                325                 330                 335

Met His Glu Ala Leu His Asn His Tyr Thr Gln Lys Ser Leu Ser Leu
            340                 345                 350

Ser Pro Gly Lys
        355

<210> SEQ ID NO 311
<211> LENGTH: 356

```
<212> TYPE: PRT
<213> ORGANISM: Artificial Sequence
<220> FEATURE:
<223> OTHER INFORMATION: PR005570|Chain|HC

<400> SEQUENCE: 311

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Ser Phe Tyr
            20                  25                  30

Tyr Met Ser Trp Val Arg Gln Ala Pro Gly Lys Gly Arg Glu Trp Val
        35                  40                  45

Ser Ile Ile Asp Lys Gly Gly Ser Thr Tyr Tyr Gly Asp Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Glu Val Arg Glu Lys Asn Gly Tyr Asn Tyr Pro Phe Asn
            100                 105                 110

Tyr Trp Gly Gln Gly Thr Leu Val Thr Val Ser Ser Glu Pro Lys Ser
        115                 120                 125

Cys Asp Lys Thr His Thr Cys Pro Pro Cys Pro Ala Pro Glu Leu Leu
    130                 135                 140

Gly Gly Pro Ser Val Phe Leu Phe Pro Pro Lys Pro Lys Asp Thr Leu
145                 150                 155                 160

Met Ile Ser Arg Thr Pro Glu Val Thr Cys Val Val Val Asp Val Ser
                165                 170                 175

His Glu Asp Pro Glu Val Lys Phe Asn Trp Tyr Val Asp Gly Val Glu
            180                 185                 190

Val His Asn Ala Lys Thr Lys Pro Arg Glu Glu Gln Tyr Asn Ser Thr
        195                 200                 205

Tyr Arg Val Val Ser Val Leu Thr Val Leu His Gln Asp Trp Leu Asn
    210                 215                 220

Gly Lys Glu Tyr Lys Cys Lys Val Ser Asn Lys Ala Leu Pro Ala Pro
225                 230                 235                 240

Ile Glu Lys Thr Ile Ser Lys Ala Lys Gly Gln Pro Arg Glu Pro Gln
                245                 250                 255

Val Tyr Thr Leu Pro Pro Ser Arg Glu Glu Met Thr Lys Asn Gln Val
            260                 265                 270

Ser Leu Thr Cys Leu Val Lys Gly Phe Tyr Pro Ser Asp Ile Ala Val
        275                 280                 285

Glu Trp Glu Ser Asn Gly Gln Pro Glu Asn Asn Tyr Lys Thr Thr Pro
    290                 295                 300

Pro Val Leu Asp Ser Asp Gly Ser Phe Phe Leu Tyr Ser Lys Leu Thr
305                 310                 315                 320

Val Asp Lys Ser Arg Trp Gln Gln Gly Asn Val Phe Ser Cys Ser Val
                325                 330                 335

Met His Glu Ala Leu His Asn His Tyr Thr Gln Lys Ser Leu Ser Leu
            340                 345                 350

Ser Pro Gly Lys
        355

<210> SEQ ID NO 312
<211> LENGTH: 356
```

<212> TYPE: PRT
<213> ORGANISM: Artificial Sequence
<220> FEATURE:
<223> OTHER INFORMATION: PR005571|Chain|HC

<400> SEQUENCE: 312

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Ser Phe Tyr
            20                  25                  30

Tyr Met Ser Trp Val Arg Gln Ala Pro Gly Lys Gly Arg Glu Trp Val
        35                  40                  45

Ser Ile Ile Asp Lys Gly Gly Ser Thr Tyr Tyr Ala Asp Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Glu Val Arg Glu Lys Gln Gly Tyr Asn Tyr Pro Phe Asn
            100                 105                 110

Tyr Trp Gly Gln Gly Thr Leu Val Thr Val Ser Ser Glu Pro Lys Ser
        115                 120                 125

Cys Asp Lys Thr His Thr Cys Pro Pro Cys Pro Ala Pro Glu Leu Leu
    130                 135                 140

Gly Gly Pro Ser Val Phe Leu Phe Pro Pro Lys Pro Lys Asp Thr Leu
145                 150                 155                 160

Met Ile Ser Arg Thr Pro Glu Val Thr Cys Val Val Val Asp Val Ser
                165                 170                 175

His Glu Asp Pro Glu Val Lys Phe Asn Trp Tyr Val Asp Gly Val Glu
            180                 185                 190

Val His Asn Ala Lys Thr Lys Pro Arg Glu Glu Gln Tyr Asn Ser Thr
        195                 200                 205

Tyr Arg Val Val Ser Val Leu Thr Val Leu His Gln Asp Trp Leu Asn
    210                 215                 220

Gly Lys Glu Tyr Lys Cys Lys Val Ser Asn Lys Ala Leu Pro Ala Pro
225                 230                 235                 240

Ile Glu Lys Thr Ile Ser Lys Ala Lys Gly Gln Pro Arg Glu Pro Gln
                245                 250                 255

Val Tyr Thr Leu Pro Pro Ser Arg Glu Glu Met Thr Lys Asn Gln Val
            260                 265                 270

Ser Leu Thr Cys Leu Val Lys Gly Phe Tyr Pro Ser Asp Ile Ala Val
        275                 280                 285

Glu Trp Glu Ser Asn Gly Gln Pro Glu Asn Asn Tyr Lys Thr Thr Pro
    290                 295                 300

Pro Val Leu Asp Ser Asp Gly Ser Phe Phe Leu Tyr Ser Lys Leu Thr
305                 310                 315                 320

Val Asp Lys Ser Arg Trp Gln Gln Gly Asn Val Phe Ser Cys Ser Val
                325                 330                 335

Met His Glu Ala Leu His Asn His Tyr Thr Gln Lys Ser Leu Ser Leu
            340                 345                 350

Ser Pro Gly Lys
            355

<210> SEQ ID NO 313
<211> LENGTH: 356

```
<212> TYPE: PRT
<213> ORGANISM: Artificial Sequence
<220> FEATURE:
<223> OTHER INFORMATION: PR005572|Chain|HC

<400> SEQUENCE: 313

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Ala Phe Tyr
            20                  25                  30

Tyr Met Ser Trp Val Arg Gln Ala Pro Gly Lys Gly Arg Glu Trp Val
        35                  40                  45

Ser Ile Ile Asp Lys Gly Gly Ser Thr Tyr Tyr Ala Asp Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Glu Val Arg Glu Lys Gln Gly Tyr Asn Tyr Pro Phe Asn
            100                 105                 110

Tyr Trp Gly Gln Gly Thr Leu Val Thr Val Ser Ser Glu Pro Lys Ser
        115                 120                 125

Cys Asp Lys Thr His Thr Cys Pro Pro Cys Pro Ala Pro Glu Leu Leu
    130                 135                 140

Gly Gly Pro Ser Val Phe Leu Phe Pro Pro Lys Pro Lys Asp Thr Leu
145                 150                 155                 160

Met Ile Ser Arg Thr Pro Glu Val Thr Cys Val Val Val Asp Val Ser
                165                 170                 175

His Glu Asp Pro Glu Val Lys Phe Asn Trp Tyr Val Asp Gly Val Glu
            180                 185                 190

Val His Asn Ala Lys Thr Lys Pro Arg Glu Glu Gln Tyr Asn Ser Thr
        195                 200                 205

Tyr Arg Val Val Ser Val Leu Thr Val Leu His Gln Asp Trp Leu Asn
    210                 215                 220

Gly Lys Glu Tyr Lys Cys Lys Val Ser Asn Lys Ala Leu Pro Ala Pro
225                 230                 235                 240

Ile Glu Lys Thr Ile Ser Lys Ala Lys Gly Gln Pro Arg Glu Pro Gln
                245                 250                 255

Val Tyr Thr Leu Pro Pro Ser Arg Glu Glu Met Thr Lys Asn Gln Val
            260                 265                 270

Ser Leu Thr Cys Leu Val Lys Gly Phe Tyr Pro Ser Asp Ile Ala Val
        275                 280                 285

Glu Trp Glu Ser Asn Gly Gln Pro Glu Asn Asn Tyr Lys Thr Thr Pro
    290                 295                 300

Pro Val Leu Asp Ser Asp Gly Ser Phe Phe Leu Tyr Ser Lys Leu Thr
305                 310                 315                 320

Val Asp Lys Ser Arg Trp Gln Gln Gly Asn Val Phe Ser Cys Ser Val
                325                 330                 335

Met His Glu Ala Leu His Asn His Tyr Thr Gln Lys Ser Leu Ser Leu
            340                 345                 350

Ser Pro Gly Lys
        355

<210> SEQ ID NO 314
<211> LENGTH: 356
```

```
<212> TYPE: PRT
<213> ORGANISM: Artificial Sequence
<220> FEATURE:
<223> OTHER INFORMATION: PR005573|Chain|HC

<400> SEQUENCE: 314
```

| | | | | | | | | | | | | | | | |
|---|---|---|---|---|---|---|---|---|---|---|---|---|---|---|---|
| Glu | Val | Gln | Leu | Val | Glu | Thr | Gly | Gly | Gly | Leu | Ile | Gln | Pro | Gly | Gly |
| 1 | | | | 5 | | | | | 10 | | | | | 15 | |
| Ser | Leu | Arg | Leu | Ser | Cys | Ala | Ala | Ser | Gly | Phe | Asn | Val | Ser | Ser | His |
| | | | 20 | | | | | 25 | | | | | 30 | | |
| Tyr | Met | Ser | Trp | Val | Arg | Gln | Ala | Pro | Gly | Lys | Gly | Arg | Glu | Trp | Val |
| | | | 35 | | | | | 40 | | | | | 45 | | |
| Ser | Ile | Ile | Asp | Lys | Ala | Gly | Ser | Gly | Tyr | Tyr | Ala | Ala | Ser | Val | Lys |
| 50 | | | | | | 55 | | | | | 60 | | | | |
| Gly | Arg | Phe | Thr | Ile | Ser | Arg | Asp | Asn | Ser | Lys | Asn | Arg | Leu | Tyr | Leu |
| 65 | | | | | 70 | | | | | 75 | | | | | 80 |
| Gln | Met | Asn | Ser | Leu | Arg | Ala | Glu | Asp | Thr | Ala | Met | Tyr | Tyr | Cys | Ala |
| | | | | 85 | | | | | 90 | | | | | 95 | |
| Arg | Ala | Thr | Glu | Val | Arg | Glu | Lys | Asn | Gly | Tyr | Asn | Tyr | Pro | Phe | Asn |
| | | | 100 | | | | | 105 | | | | | 110 | | |
| Tyr | Trp | Gly | Gln | Gly | Thr | Leu | Val | Thr | Val | Ser | Ser | Glu | Pro | Lys | Ser |
| | | | 115 | | | | | 120 | | | | | 125 | | |
| Cys | Asp | Lys | Thr | His | Thr | Cys | Pro | Pro | Cys | Pro | Ala | Pro | Glu | Leu | Leu |
| | 130 | | | | | 135 | | | | | 140 | | | | |
| Gly | Gly | Pro | Ser | Val | Phe | Leu | Phe | Pro | Pro | Lys | Pro | Lys | Asp | Thr | Leu |
| 145 | | | | | 150 | | | | | 155 | | | | | 160 |
| Met | Ile | Ser | Arg | Thr | Pro | Glu | Val | Thr | Cys | Val | Val | Val | Asp | Val | Ser |
| | | | | 165 | | | | | 170 | | | | | 175 | |
| His | Glu | Asp | Pro | Glu | Val | Lys | Phe | Asn | Trp | Tyr | Val | Asp | Gly | Val | Glu |
| | | | 180 | | | | | 185 | | | | | 190 | | |
| Val | His | Asn | Ala | Lys | Thr | Lys | Pro | Arg | Glu | Glu | Gln | Tyr | Asn | Ser | Thr |
| | | 195 | | | | | 200 | | | | | 205 | | | |
| Tyr | Arg | Val | Val | Ser | Val | Leu | Thr | Val | Leu | His | Gln | Asp | Trp | Leu | Asn |
| | 210 | | | | | 215 | | | | | 220 | | | | |
| Gly | Lys | Glu | Tyr | Lys | Cys | Lys | Val | Ser | Asn | Lys | Ala | Leu | Pro | Ala | Pro |
| 225 | | | | | 230 | | | | | 235 | | | | | 240 |
| Ile | Glu | Lys | Thr | Ile | Ser | Lys | Ala | Lys | Gly | Gln | Pro | Arg | Glu | Pro | Gln |
| | | | | 245 | | | | | 250 | | | | | 255 | |
| Val | Tyr | Thr | Leu | Pro | Pro | Ser | Arg | Glu | Glu | Met | Thr | Lys | Asn | Gln | Val |
| | | | 260 | | | | | 265 | | | | | 270 | | |
| Ser | Leu | Thr | Cys | Leu | Val | Lys | Gly | Phe | Tyr | Pro | Ser | Asp | Ile | Ala | Val |
| | | 275 | | | | | 280 | | | | | 285 | | | |
| Glu | Trp | Glu | Ser | Asn | Gly | Gln | Pro | Glu | Asn | Asn | Tyr | Lys | Thr | Thr | Pro |
| | 290 | | | | | 295 | | | | | 300 | | | | |
| Pro | Val | Leu | Asp | Ser | Asp | Gly | Ser | Phe | Phe | Leu | Tyr | Ser | Lys | Leu | Thr |
| 305 | | | | | 310 | | | | | 315 | | | | | 320 |
| Val | Asp | Lys | Ser | Arg | Trp | Gln | Gln | Gly | Asn | Val | Phe | Ser | Cys | Ser | Val |
| | | | | 325 | | | | | 330 | | | | | 335 | |
| Met | His | Glu | Ala | Leu | His | Asn | His | Tyr | Thr | Gln | Lys | Ser | Leu | Ser | Leu |
| | | | 340 | | | | | 345 | | | | | 350 | | |
| Ser | Pro | Gly | Lys | | | | | | | | | | | | |
| | | | 355 | | | | | | | | | | | | |

```
<210> SEQ ID NO 315
<211> LENGTH: 356
```

```
<212> TYPE: PRT
<213> ORGANISM: Artificial Sequence
<220> FEATURE:
<223> OTHER INFORMATION: PR005574|Chain|HC

<400> SEQUENCE: 315

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Ser Ser His
            20                  25                  30

Tyr Met Ser Trp Val Arg Gln Ala Pro Gly Lys Gly Arg Glu Trp Val
        35                  40                  45

Ser Ile Ile Asp Lys Ala Gly Ser Gly Tyr Tyr Ala Asp Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Glu Val Arg Glu Lys Gln Gly Tyr Asn Tyr Pro Phe Asn
            100                 105                 110

Tyr Trp Gly Gln Gly Thr Leu Val Thr Val Ser Ser Glu Pro Lys Ser
        115                 120                 125

Cys Asp Lys Thr His Thr Cys Pro Pro Cys Pro Ala Pro Glu Leu Leu
    130                 135                 140

Gly Gly Pro Ser Val Phe Leu Phe Pro Pro Lys Pro Lys Asp Thr Leu
145                 150                 155                 160

Met Ile Ser Arg Thr Pro Glu Val Thr Cys Val Val Val Asp Val Ser
                165                 170                 175

His Glu Asp Pro Glu Val Lys Phe Asn Trp Tyr Val Asp Gly Val Glu
            180                 185                 190

Val His Asn Ala Lys Thr Lys Pro Arg Glu Glu Gln Tyr Asn Ser Thr
        195                 200                 205

Tyr Arg Val Val Ser Val Leu Thr Val Leu His Gln Asp Trp Leu Asn
    210                 215                 220

Gly Lys Glu Tyr Lys Cys Lys Val Ser Asn Lys Ala Leu Pro Ala Pro
225                 230                 235                 240

Ile Glu Lys Thr Ile Ser Lys Ala Lys Gly Gln Pro Arg Glu Pro Gln
                245                 250                 255

Val Tyr Thr Leu Pro Pro Ser Arg Glu Glu Met Thr Lys Asn Gln Val
            260                 265                 270

Ser Leu Thr Cys Leu Val Lys Gly Phe Tyr Pro Ser Asp Ile Ala Val
        275                 280                 285

Glu Trp Glu Ser Asn Gly Gln Pro Glu Asn Asn Tyr Lys Thr Thr Pro
    290                 295                 300

Pro Val Leu Asp Ser Asp Gly Ser Phe Phe Leu Tyr Ser Lys Leu Thr
305                 310                 315                 320

Val Asp Lys Ser Arg Trp Gln Gln Gly Asn Val Phe Ser Cys Ser Val
                325                 330                 335

Met His Glu Ala Leu His Asn His Tyr Thr Gln Lys Ser Leu Ser Leu
            340                 345                 350

Ser Pro Gly Lys
            355

<210> SEQ ID NO 316
<211> LENGTH: 356
```

```
<212> TYPE: PRT
<213> ORGANISM: Artificial Sequence
<220> FEATURE:
<223> OTHER INFORMATION: PR005575|Chain|HC

<400> SEQUENCE: 316

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Ala Ser His
            20                  25                  30

Tyr Met Ser Trp Val Arg Gln Ala Pro Gly Lys Gly Arg Glu Trp Val
        35                  40                  45

Ser Ile Ile Asp Lys Ala Gly Ser Gly Tyr Tyr Ala Asp Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Glu Val Arg Glu Lys Gln Gly Tyr Asn Tyr Pro Phe Asn
            100                 105                 110

Tyr Trp Gly Gln Gly Thr Leu Val Thr Val Ser Ser Glu Pro Lys Ser
        115                 120                 125

Cys Asp Lys Thr His Thr Cys Pro Pro Cys Pro Ala Pro Glu Leu Leu
    130                 135                 140

Gly Gly Pro Ser Val Phe Leu Phe Pro Pro Lys Pro Lys Asp Thr Leu
145                 150                 155                 160

Met Ile Ser Arg Thr Pro Glu Val Thr Cys Val Val Val Asp Val Ser
                165                 170                 175

His Glu Asp Pro Glu Val Lys Phe Asn Trp Tyr Val Asp Gly Val Glu
            180                 185                 190

Val His Asn Ala Lys Thr Lys Pro Arg Glu Glu Gln Tyr Asn Ser Thr
        195                 200                 205

Tyr Arg Val Val Ser Val Leu Thr Val Leu His Gln Asp Trp Leu Asn
    210                 215                 220

Gly Lys Glu Tyr Lys Cys Lys Val Ser Asn Lys Ala Leu Pro Ala Pro
225                 230                 235                 240

Ile Glu Lys Thr Ile Ser Lys Ala Lys Gly Gln Pro Arg Glu Pro Gln
                245                 250                 255

Val Tyr Thr Leu Pro Pro Ser Arg Glu Glu Met Thr Lys Asn Gln Val
            260                 265                 270

Ser Leu Thr Cys Leu Val Lys Gly Phe Tyr Pro Ser Asp Ile Ala Val
        275                 280                 285

Glu Trp Glu Ser Asn Gly Gln Pro Glu Asn Asn Tyr Lys Thr Thr Pro
    290                 295                 300

Pro Val Leu Asp Ser Asp Gly Ser Phe Phe Leu Tyr Ser Lys Leu Thr
305                 310                 315                 320

Val Asp Lys Ser Arg Trp Gln Gln Gly Asn Val Phe Ser Cys Ser Val
                325                 330                 335

Met His Glu Ala Leu His Asn His Tyr Thr Gln Lys Ser Leu Ser Leu
            340                 345                 350

Ser Pro Gly Lys
        355

<210> SEQ ID NO 317
<211> LENGTH: 356
```

```
<212> TYPE: PRT
<213> ORGANISM: Artificial Sequence
<220> FEATURE:
<223> OTHER INFORMATION: PR005577|Chain|HC

<400> SEQUENCE: 317

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Ala Ser Tyr
            20                  25                  30

Tyr Met Ser Trp Val Arg Gln Ala Pro Gly Lys Gly Arg Glu Trp Val
        35                  40                  45

Ser Ile Ile Asp Lys Ala Gly Ser Gly Tyr Tyr Ala Asp Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Glu Val Arg Glu Lys Gln Gly Tyr Asn Tyr Pro Phe Asn
            100                 105                 110

Tyr Trp Gly Gln Gly Thr Leu Val Thr Val Ser Ser Glu Pro Lys Ser
        115                 120                 125

Cys Asp Lys Thr His Thr Cys Pro Pro Cys Pro Ala Pro Glu Leu Leu
    130                 135                 140

Gly Gly Pro Ser Val Phe Leu Phe Pro Pro Lys Pro Lys Asp Thr Leu
145                 150                 155                 160

Met Ile Ser Arg Thr Pro Glu Val Thr Cys Val Val Val Asp Val Ser
                165                 170                 175

His Glu Asp Pro Glu Val Lys Phe Asn Trp Tyr Val Asp Gly Val Glu
            180                 185                 190

Val His Asn Ala Lys Thr Lys Pro Arg Glu Glu Gln Tyr Asn Ser Thr
        195                 200                 205

Tyr Arg Val Val Ser Val Leu Thr Val Leu His Gln Asp Trp Leu Asn
    210                 215                 220

Gly Lys Glu Tyr Lys Cys Lys Val Ser Asn Lys Ala Leu Pro Ala Pro
225                 230                 235                 240

Ile Glu Lys Thr Ile Ser Lys Ala Lys Gly Gln Pro Arg Glu Pro Gln
                245                 250                 255

Val Tyr Thr Leu Pro Pro Ser Arg Glu Glu Met Thr Lys Asn Gln Val
            260                 265                 270

Ser Leu Thr Cys Leu Val Lys Gly Phe Tyr Pro Ser Asp Ile Ala Val
        275                 280                 285

Glu Trp Glu Ser Asn Gly Gln Pro Glu Asn Asn Tyr Lys Thr Thr Pro
    290                 295                 300

Pro Val Leu Asp Ser Asp Gly Ser Phe Phe Leu Tyr Ser Lys Leu Thr
305                 310                 315                 320

Val Asp Lys Ser Arg Trp Gln Gln Gly Asn Val Phe Ser Cys Ser Val
                325                 330                 335

Met His Glu Ala Leu His Asn His Tyr Thr Gln Lys Ser Leu Ser Leu
            340                 345                 350

Ser Pro Gly Lys
            355

<210> SEQ ID NO 318
<211> LENGTH: 356
```

```
<212> TYPE: PRT
<213> ORGANISM: Artificial Sequence
<220> FEATURE:
<223> OTHER INFORMATION: PR005578|Chain|HC

<400> SEQUENCE: 318

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Ala Ser Tyr
            20                  25                  30

Tyr Met Ser Trp Val Arg Gln Ala Pro Gly Lys Gly Arg Glu Trp Val
        35                  40                  45

Ser Ile Ile Asp Lys Ala Gly Ser Gly Tyr Tyr Ala Asp Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
            85                  90                  95

Arg Ala Thr Ala Val Arg Glu Lys Gln Gly Tyr Asn Tyr Pro Phe Asn
        100                 105                 110

Tyr Trp Gly Gln Gly Thr Leu Val Thr Val Ser Ser Glu Pro Lys Ser
    115                 120                 125

Cys Asp Lys Thr His Thr Cys Pro Pro Cys Pro Ala Pro Glu Leu Leu
130                 135                 140

Gly Gly Pro Ser Val Phe Leu Phe Pro Pro Lys Pro Lys Asp Thr Leu
145                 150                 155                 160

Met Ile Ser Arg Thr Pro Glu Val Thr Cys Val Val Val Asp Val Ser
            165                 170                 175

His Glu Asp Pro Glu Val Lys Phe Asn Trp Tyr Val Asp Gly Val Glu
        180                 185                 190

Val His Asn Ala Lys Thr Lys Pro Arg Glu Glu Gln Tyr Asn Ser Thr
    195                 200                 205

Tyr Arg Val Val Ser Val Leu Thr Val Leu His Gln Asp Trp Leu Asn
210                 215                 220

Gly Lys Glu Tyr Lys Cys Lys Val Ser Asn Lys Ala Leu Pro Ala Pro
225                 230                 235                 240

Ile Glu Lys Thr Ile Ser Lys Ala Lys Gly Gln Pro Arg Glu Pro Gln
            245                 250                 255

Val Tyr Thr Leu Pro Pro Ser Arg Glu Glu Met Thr Lys Asn Gln Val
        260                 265                 270

Ser Leu Thr Cys Leu Val Lys Gly Phe Tyr Pro Ser Asp Ile Ala Val
    275                 280                 285

Glu Trp Glu Ser Asn Gly Gln Pro Glu Asn Asn Tyr Lys Thr Thr Pro
290                 295                 300

Pro Val Leu Asp Ser Asp Gly Ser Phe Phe Leu Tyr Ser Lys Leu Thr
305                 310                 315                 320

Val Asp Lys Ser Arg Trp Gln Gln Gly Asn Val Phe Ser Cys Ser Val
            325                 330                 335

Met His Glu Ala Leu His Asn His Tyr Thr Gln Lys Ser Leu Ser Leu
        340                 345                 350

Ser Pro Gly Lys
    355

<210> SEQ ID NO 319
<211> LENGTH: 356
```

```
<212> TYPE: PRT
<213> ORGANISM: Artificial Sequence
<220> FEATURE:
<223> OTHER INFORMATION: PR005581|Chain|HC

<400> SEQUENCE: 319

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Ser Ser Phe
            20                  25                  30

Tyr Met Ser Trp Val Arg Gln Ala Pro Gly Lys Gly Arg Glu Trp Val
        35                  40                  45

Ser Ile Ile Asp Lys Ala Gly Ser Thr Tyr Tyr Gly Ala Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Glu Val Arg Glu Lys Gln Gly Tyr Asn Tyr Pro Phe Asn
            100                 105                 110

Tyr Trp Gly Gln Gly Thr Leu Val Thr Val Ser Ser Glu Pro Lys Ser
        115                 120                 125

Cys Asp Lys Thr His Thr Cys Pro Pro Cys Pro Ala Pro Glu Leu Leu
    130                 135                 140

Gly Gly Pro Ser Val Phe Leu Phe Pro Pro Lys Pro Lys Asp Thr Leu
145                 150                 155                 160

Met Ile Ser Arg Thr Pro Glu Val Thr Cys Val Val Val Asp Val Ser
                165                 170                 175

His Glu Asp Pro Glu Val Lys Phe Asn Trp Tyr Val Asp Gly Val Glu
            180                 185                 190

Val His Asn Ala Lys Thr Lys Pro Arg Glu Glu Gln Tyr Asn Ser Thr
        195                 200                 205

Tyr Arg Val Val Ser Val Leu Thr Val Leu His Gln Asp Trp Leu Asn
    210                 215                 220

Gly Lys Glu Tyr Lys Cys Lys Val Ser Asn Lys Ala Leu Pro Ala Pro
225                 230                 235                 240

Ile Glu Lys Thr Ile Ser Lys Ala Lys Gly Gln Pro Arg Glu Pro Gln
                245                 250                 255

Val Tyr Thr Leu Pro Pro Ser Arg Glu Glu Met Thr Lys Asn Gln Val
            260                 265                 270

Ser Leu Thr Cys Leu Val Lys Gly Phe Tyr Pro Ser Asp Ile Ala Val
        275                 280                 285

Glu Trp Glu Ser Asn Gly Gln Pro Glu Asn Asn Tyr Lys Thr Thr Pro
    290                 295                 300

Pro Val Leu Asp Ser Asp Gly Ser Phe Phe Leu Tyr Ser Lys Leu Thr
305                 310                 315                 320

Val Asp Lys Ser Arg Trp Gln Gln Gly Asn Val Phe Ser Cys Ser Val
                325                 330                 335

Met His Glu Ala Leu His Asn His Tyr Thr Gln Lys Ser Leu Ser Leu
            340                 345                 350

Ser Pro Gly Lys
            355

<210> SEQ ID NO 320
<211> LENGTH: 356
```

```
<212> TYPE: PRT
<213> ORGANISM: Artificial Sequence
<220> FEATURE:
<223> OTHER INFORMATION: PR005582|Chain|HC

<400> SEQUENCE: 320

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Ala Ser Phe
            20                  25                  30

Tyr Met Ser Trp Val Arg Gln Ala Pro Gly Lys Gly Arg Glu Trp Val
        35                  40                  45

Ser Ile Ile Asp Lys Ala Gly Ser Thr Tyr Tyr Gly Ala Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
            85                  90                  95

Arg Ala Thr Glu Val Arg Glu Lys Gln Gly Tyr Asn Tyr Pro Phe Asn
        100                 105                 110

Tyr Trp Gly Gln Gly Thr Leu Val Thr Val Ser Ser Glu Pro Lys Ser
    115                 120                 125

Cys Asp Lys Thr His Thr Cys Pro Pro Cys Pro Ala Pro Glu Leu Leu
130                 135                 140

Gly Gly Pro Ser Val Phe Leu Phe Pro Pro Lys Pro Lys Asp Thr Leu
145                 150                 155                 160

Met Ile Ser Arg Thr Pro Glu Val Thr Cys Val Val Val Asp Val Ser
            165                 170                 175

His Glu Asp Pro Glu Val Lys Phe Asn Trp Tyr Val Asp Gly Val Glu
        180                 185                 190

Val His Asn Ala Lys Thr Lys Pro Arg Glu Glu Gln Tyr Asn Ser Thr
    195                 200                 205

Tyr Arg Val Val Ser Val Leu Thr Val Leu His Gln Asp Trp Leu Asn
210                 215                 220

Gly Lys Glu Tyr Lys Cys Lys Val Ser Asn Lys Ala Leu Pro Ala Pro
225                 230                 235                 240

Ile Glu Lys Thr Ile Ser Lys Ala Lys Gly Gln Pro Arg Glu Pro Gln
            245                 250                 255

Val Tyr Thr Leu Pro Pro Ser Arg Glu Glu Met Thr Lys Asn Gln Val
        260                 265                 270

Ser Leu Thr Cys Leu Val Lys Gly Phe Tyr Pro Ser Asp Ile Ala Val
    275                 280                 285

Glu Trp Glu Ser Asn Gly Gln Pro Glu Asn Asn Tyr Lys Thr Thr Pro
290                 295                 300

Pro Val Leu Asp Ser Asp Gly Ser Phe Phe Leu Tyr Ser Lys Leu Thr
305                 310                 315                 320

Val Asp Lys Ser Arg Trp Gln Gln Gly Asn Val Phe Ser Cys Ser Val
            325                 330                 335

Met His Glu Ala Leu His Asn His Tyr Thr Gln Lys Ser Leu Ser Leu
        340                 345                 350

Ser Pro Gly Lys
    355

<210> SEQ ID NO 321
<211> LENGTH: 356
```

```
<212> TYPE: PRT
<213> ORGANISM: Artificial Sequence
<220> FEATURE:
<223> OTHER INFORMATION: PR005583|Chain|HC

<400> SEQUENCE: 321

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Ala Ser Phe
            20                  25                  30

Tyr Met Ser Trp Val Arg Gln Ala Pro Gly Lys Gly Arg Glu Trp Val
        35                  40                  45

Ser Ile Ile Asp Lys Ala Gly Ser Thr Tyr Tyr Ala Asp Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Glu Val Arg Glu Lys Gln Gly Tyr Asn Tyr Pro Phe Asn
            100                 105                 110

Tyr Trp Gly Gln Gly Thr Leu Val Thr Val Ser Ser Glu Pro Lys Ser
        115                 120                 125

Cys Asp Lys Thr His Thr Cys Pro Pro Cys Pro Ala Pro Glu Leu Leu
    130                 135                 140

Gly Gly Pro Ser Val Phe Leu Phe Pro Pro Lys Pro Lys Asp Thr Leu
145                 150                 155                 160

Met Ile Ser Arg Thr Pro Glu Val Thr Cys Val Val Val Asp Val Ser
                165                 170                 175

His Glu Asp Pro Glu Val Lys Phe Asn Trp Tyr Val Asp Gly Val Glu
            180                 185                 190

Val His Asn Ala Lys Thr Lys Pro Arg Glu Glu Gln Tyr Asn Ser Thr
        195                 200                 205

Tyr Arg Val Val Ser Val Leu Thr Val Leu His Gln Asp Trp Leu Asn
    210                 215                 220

Gly Lys Glu Tyr Lys Cys Lys Val Ser Asn Lys Ala Leu Pro Ala Pro
225                 230                 235                 240

Ile Glu Lys Thr Ile Ser Lys Ala Lys Gly Gln Pro Arg Glu Pro Gln
                245                 250                 255

Val Tyr Thr Leu Pro Pro Ser Arg Glu Glu Met Thr Lys Asn Gln Val
            260                 265                 270

Ser Leu Thr Cys Leu Val Lys Gly Phe Tyr Pro Ser Asp Ile Ala Val
        275                 280                 285

Glu Trp Glu Ser Asn Gly Gln Pro Glu Asn Asn Tyr Lys Thr Thr Pro
    290                 295                 300

Pro Val Leu Asp Ser Asp Gly Ser Phe Phe Leu Tyr Ser Lys Leu Thr
305                 310                 315                 320

Val Asp Lys Ser Arg Trp Gln Gln Gly Asn Val Phe Ser Cys Ser Val
                325                 330                 335

Met His Glu Ala Leu His Asn His Tyr Thr Gln Lys Ser Leu Ser Leu
            340                 345                 350

Ser Pro Gly Lys
        355

<210> SEQ ID NO 322
<211> LENGTH: 356
```

<212> TYPE: PRT
<213> ORGANISM: Artificial Sequence
<220> FEATURE:
<223> OTHER INFORMATION: PR005584|Chain|HC

<400> SEQUENCE: 322

```
Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Ser Ser Phe
            20                  25                  30

Tyr Met Ser Trp Val Arg Gln Ala Pro Gly Lys Gly Arg Glu Trp Val
        35                  40                  45

Ser Ile Ile Asp Lys Ala Gly Ser Thr Tyr Tyr Ala Asp Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Glu Val Arg Glu Lys Gln Gly Tyr Asn Tyr Pro Phe Asn
            100                 105                 110

Tyr Trp Gly Gln Gly Thr Leu Val Thr Val Ser Ser Glu Pro Lys Ser
        115                 120                 125

Cys Asp Lys Thr His Thr Cys Pro Pro Cys Pro Ala Pro Glu Leu Leu
    130                 135                 140

Gly Gly Pro Ser Val Phe Leu Phe Pro Pro Lys Pro Lys Asp Thr Leu
145                 150                 155                 160

Met Ile Ser Arg Thr Pro Glu Val Thr Cys Val Val Val Asp Val Ser
                165                 170                 175

His Glu Asp Pro Glu Val Lys Phe Asn Trp Tyr Val Asp Gly Val Glu
            180                 185                 190

Val His Asn Ala Lys Thr Lys Pro Arg Glu Glu Gln Tyr Asn Ser Thr
        195                 200                 205

Tyr Arg Val Val Ser Val Leu Thr Val Leu His Gln Asp Trp Leu Asn
    210                 215                 220

Gly Lys Glu Tyr Lys Cys Lys Val Ser Asn Lys Ala Leu Pro Ala Pro
225                 230                 235                 240

Ile Glu Lys Thr Ile Ser Lys Ala Lys Gly Gln Pro Arg Glu Pro Gln
                245                 250                 255

Val Tyr Thr Leu Pro Pro Ser Arg Glu Glu Met Thr Lys Asn Gln Val
            260                 265                 270

Ser Leu Thr Cys Leu Val Lys Gly Phe Tyr Pro Ser Asp Ile Ala Val
        275                 280                 285

Glu Trp Glu Ser Asn Gly Gln Pro Glu Asn Asn Tyr Lys Thr Thr Pro
    290                 295                 300

Pro Val Leu Asp Ser Asp Gly Ser Phe Phe Leu Tyr Ser Lys Leu Thr
305                 310                 315                 320

Val Asp Lys Ser Arg Trp Gln Gln Gly Asn Val Phe Ser Cys Ser Val
                325                 330                 335

Met His Glu Ala Leu His Asn His Tyr Thr Gln Lys Ser Leu Ser Leu
            340                 345                 350

Ser Pro Gly Lys
        355
```

<210> SEQ ID NO 323
<211> LENGTH: 356

```
<212> TYPE: PRT
<213> ORGANISM: Artificial Sequence
<220> FEATURE:
<223> OTHER INFORMATION: PR005585|Chain|HC

<400> SEQUENCE: 323

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Thr Val Ser Ser Phe
            20                  25                  30

Tyr Met Ser Trp Val Arg Gln Ala Pro Gly Lys Gly Arg Glu Trp Val
        35                  40                  45

Ser Ile Ile Asp Lys Ala Gly Ser Thr Tyr Tyr Ala Asp Ser Val Lys
    50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Glu Val Arg Glu Lys Gln Gly Tyr Asn Tyr Pro Phe Asn
            100                 105                 110

Tyr Trp Gly Gln Gly Thr Leu Val Thr Val Ser Ser Glu Pro Lys Ser
        115                 120                 125

Cys Asp Lys Thr His Thr Cys Pro Pro Cys Pro Ala Pro Glu Leu Leu
    130                 135                 140

Gly Gly Pro Ser Val Phe Leu Phe Pro Pro Lys Pro Lys Asp Thr Leu
145                 150                 155                 160

Met Ile Ser Arg Thr Pro Glu Val Thr Cys Val Val Val Asp Val Ser
                165                 170                 175

His Glu Asp Pro Glu Val Lys Phe Asn Trp Tyr Val Asp Gly Val Glu
            180                 185                 190

Val His Asn Ala Lys Thr Lys Pro Arg Glu Glu Gln Tyr Asn Ser Thr
        195                 200                 205

Tyr Arg Val Val Ser Val Leu Thr Val Leu His Gln Asp Trp Leu Asn
    210                 215                 220

Gly Lys Glu Tyr Lys Cys Lys Val Ser Asn Lys Ala Leu Pro Ala Pro
225                 230                 235                 240

Ile Glu Lys Thr Ile Ser Lys Ala Lys Gly Gln Pro Arg Glu Pro Gln
                245                 250                 255

Val Tyr Thr Leu Pro Pro Ser Arg Glu Glu Met Thr Lys Asn Gln Val
            260                 265                 270

Ser Leu Thr Cys Leu Val Lys Gly Phe Tyr Pro Ser Asp Ile Ala Val
        275                 280                 285

Glu Trp Glu Ser Asn Gly Gln Pro Glu Asn Asn Tyr Lys Thr Thr Pro
    290                 295                 300

Pro Val Leu Asp Ser Asp Gly Ser Phe Phe Leu Tyr Ser Lys Leu Thr
305                 310                 315                 320

Val Asp Lys Ser Arg Trp Gln Gln Gly Asn Val Phe Ser Cys Ser Val
                325                 330                 335

Met His Glu Ala Leu His Asn His Tyr Thr Gln Lys Ser Leu Ser Leu
            340                 345                 350

Ser Pro Gly Lys
        355

<210> SEQ ID NO 324
<211> LENGTH: 214
```

```
<212> TYPE: PRT
<213> ORGANISM: Artificial Sequence
<220> FEATURE:
<223> OTHER INFORMATION: PR000673|Chain|LC; PR000680|Chain|LC

<400> SEQUENCE: 324
```

| | | | | | | | | | | | | | | |
|---|---|---|---|---|---|---|---|---|---|---|---|---|---|---|
| Glu | Ile | Val | Leu | Thr | Gln | Ser | Pro | Ala | Thr | Leu | Ser | Phe | Ser | Pro | Gly |
| 1 | | | | 5 | | | | | 10 | | | | | 15 | |
| Glu | Arg | Ala | Thr | Leu | Ser | Cys | Arg | Ala | Ser | Gln | Ser | Val | Ser | Ser | Asp |
| | | | 20 | | | | | 25 | | | | | 30 | | |
| Leu | Ala | Trp | Tyr | Gln | Gln | Lys | Pro | Gly | Gln | Ala | Pro | Ser | Leu | Leu | Ile |
| | | | 35 | | | | | 40 | | | | | 45 | | |
| Tyr | Asp | Ala | Ser | Asn | Arg | Ala | Thr | Gly | Ile | Pro | Ala | Arg | Phe | Ser | Gly |
| | 50 | | | | | 55 | | | | | 60 | | | | |
| Ser | Gly | Ser | Gly | Thr | Asp | Phe | Thr | Leu | Thr | Ile | Ser | Ser | Leu | Glu | Pro |
| 65 | | | | | 70 | | | | | 75 | | | | | 80 |
| Glu | Asp | Phe | Ala | Val | Tyr | Tyr | Cys | His | Gln | Arg | Asn | Asn | Trp | Pro | Leu |
| | | | | 85 | | | | | 90 | | | | | 95 | |
| Thr | Phe | Gly | Gly | Gly | Thr | Lys | Val | Glu | Ile | Lys | Arg | Thr | Val | Ala | Ala |
| | | | | 100 | | | | | 105 | | | | | 110 | |
| Pro | Ser | Val | Phe | Ile | Phe | Pro | Pro | Ser | Asp | Glu | Gln | Leu | Lys | Ser | Gly |
| | | | 115 | | | | | 120 | | | | | 125 | | |
| Thr | Ala | Ser | Val | Val | Cys | Leu | Leu | Asn | Asn | Phe | Tyr | Pro | Arg | Glu | Ala |
| | | 130 | | | | | 135 | | | | | 140 | | | |
| Lys | Val | Gln | Trp | Lys | Val | Asp | Asn | Ala | Leu | Gln | Ser | Gly | Asn | Ser | Gln |
| 145 | | | | | 150 | | | | | 155 | | | | | 160 |
| Glu | Ser | Val | Thr | Glu | Gln | Asp | Ser | Lys | Asp | Ser | Thr | Tyr | Ser | Leu | Ser |
| | | | | 165 | | | | | 170 | | | | | 175 | |
| Ser | Thr | Leu | Thr | Leu | Ser | Lys | Ala | Asp | Tyr | Glu | Lys | His | Lys | Val | Tyr |
| | | | 180 | | | | | 185 | | | | | 190 | | |
| Ala | Cys | Glu | Val | Thr | His | Gln | Gly | Leu | Ser | Ser | Pro | Val | Thr | Lys | Ser |
| | | 195 | | | | | 200 | | | | | 205 | | | |
| Phe | Asn | Arg | Gly | Glu | Cys |
| 210 | | | | | |

```
<210> SEQ ID NO 325
<211> LENGTH: 214
<212> TYPE: PRT
<213> ORGANISM: Artificial Sequence
<220> FEATURE:
<223> OTHER INFORMATION: PR000674|Chain|LC; PR000678|Chain|LC

<400> SEQUENCE: 325
```

| | | | | | | | | | | | | | | | |
|---|---|---|---|---|---|---|---|---|---|---|---|---|---|---|---|
| Glu | Ile | Val | Leu | Thr | Gln | Ser | Pro | Ala | Thr | Leu | Ser | Leu | Ser | Pro | Gly |
| 1 | | | | 5 | | | | | 10 | | | | | 15 | |
| Glu | Arg | Ala | Thr | Leu | Ser | Cys | Arg | Ala | Ser | Gln | Ser | Val | Ser | Ser | Tyr |
| | | | 20 | | | | | 25 | | | | | 30 | | |
| Leu | Ala | Trp | Tyr | Gln | Gln | Lys | Pro | Gly | Gln | Ala | Pro | Arg | Leu | Leu | Ile |
| | | | 35 | | | | | 40 | | | | | 45 | | |
| Tyr | Asp | Thr | Ser | Lys | Arg | Ala | Thr | Gly | Ile | Pro | Ala | Arg | Phe | Ser | Gly |
| | 50 | | | | | 55 | | | | | 60 | | | | |
| Ser | Gly | Ser | Gly | Thr | Asp | Phe | Thr | Leu | Thr | Ile | Ser | Ser | Leu | Glu | Pro |
| 65 | | | | | 70 | | | | | 75 | | | | | 80 |
| Glu | Asp | Phe | Ala | Val | Tyr | Tyr | Cys | Gln | Gln | His | Asn | Asn | Trp | Ile | Phe |
| | | | | 85 | | | | | 90 | | | | | 95 | |
| Thr | Phe | Gly | Pro | Gly | Thr | Lys | Val | Asp | Ile | Lys | Arg | Thr | Val | Ala | Ala |
| | | | | 100 | | | | | 105 | | | | | 110 | |

```
Pro Ser Val Phe Ile Phe Pro Pro Ser Asp Glu Gln Leu Lys Ser Gly
        115                 120                 125

Thr Ala Ser Val Val Cys Leu Leu Asn Asn Phe Tyr Pro Arg Glu Ala
130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205

Phe Asn Arg Gly Glu Cys
    210

<210> SEQ ID NO 326
<211> LENGTH: 214
<212> TYPE: PRT
<213> ORGANISM: Artificial Sequence
<220> FEATURE:
<223> OTHER INFORMATION: PR000675|Chain|LC

<400> SEQUENCE: 326

Glu Ile Val Leu Thr Gln Ser Pro Ala Thr Leu Ser Leu Ser Pro Gly
1               5                   10                  15

Glu Arg Ala Thr Leu Ser Cys Arg Ala Ser Gln Ser Val Ser Arg Tyr
            20                  25                  30

Leu Ala Trp Tyr Gln Gln Lys Pro Gly Gln Ala Pro Arg Leu Leu Met
        35                  40                  45

His Asp Ala Ala Asn Arg Ala Thr Gly Leu Pro Ala Arg Phe Asn Gly
    50                  55                  60

Ser Gly Ser Gly Thr Asp Phe Thr Leu Thr Ile Ser Ser Leu Glu Pro
65                  70                  75                  80

Glu Asp Phe Ala Val Tyr Tyr Cys Gln Gln Arg Asn Asn Trp Pro Leu
                85                  90                  95

Thr Phe Gly Gly Gly Thr Lys Val Glu Ile Lys Arg Thr Val Ala Ala
            100                 105                 110

Pro Ser Val Phe Ile Phe Pro Pro Ser Asp Glu Gln Leu Lys Ser Gly
        115                 120                 125

Thr Ala Ser Val Val Cys Leu Leu Asn Asn Phe Tyr Pro Arg Glu Ala
130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205

Phe Asn Arg Gly Glu Cys
    210

<210> SEQ ID NO 327
<211> LENGTH: 214
<212> TYPE: PRT
<213> ORGANISM: Artificial Sequence
```

<220> FEATURE:
<223> OTHER INFORMATION: PR000676|Chain|LC

<400> SEQUENCE: 327

Glu Ile Val Leu Thr Gln Ser Pro Ala Thr Leu Ser Leu Ser Pro Gly
1               5                   10                  15

Glu Arg Ala Thr Leu Ser Cys Arg Ala Ser Gln Ser Val Ser Ser Tyr
            20                  25                  30

Leu Ala Trp Tyr Gln Gln Lys Pro Gly Gln Ala Pro Arg Leu Leu Ile
        35                  40                  45

Tyr Asp Ala Ser Thr Arg Ala Thr Gly Ile Pro Ala Arg Phe Ser Gly
    50                  55                  60

Ser Gly Ser Gly Thr Asp Phe Thr Leu Thr Ile Ser Ser Leu Glu Pro
65                  70                  75                  80

Glu Asp Phe Ala Val Tyr Tyr Cys Gln Gln Arg Ser Asn Trp Pro Leu
                85                  90                  95

Thr Phe Gly Gly Gly Thr Lys Val Glu Ile Lys Arg Thr Val Ala Ala
            100                 105                 110

Pro Ser Val Phe Ile Phe Pro Pro Ser Asp Glu Gln Leu Lys Ser Gly
        115                 120                 125

Thr Ala Ser Val Val Cys Leu Leu Asn Asn Phe Tyr Pro Arg Glu Ala
    130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205

Phe Asn Arg Gly Glu Cys
    210

<210> SEQ ID NO 328
<211> LENGTH: 214
<212> TYPE: PRT
<213> ORGANISM: Artificial Sequence
<220> FEATURE:
<223> OTHER INFORMATION: PR000677|Chain|LC

<400> SEQUENCE: 328

Glu Ile Val Met Thr Gln Ser Pro Ala Thr Leu Ser Val Ser Pro Gly
1               5                   10                  15

Glu Arg Ala Thr Leu Ser Cys Arg Ala Ser Gln Ser Val Ser Ser Ser
            20                  25                  30

Leu Ala Trp Tyr Gln Gln Lys Pro Gly Gln Ala Pro Arg Leu Leu Ile
        35                  40                  45

Tyr Gly Ala Ser Thr Arg Ala Thr Gly Ile Pro Ala Arg Phe Ser Gly
    50                  55                  60

Ser Gly Ser Gly Thr Glu Phe Thr Leu Thr Ile Ser Ser Leu Gln Ser
65                  70                  75                  80

Glu Asp Phe Ala Val Tyr Tyr Cys Gln Gln Tyr Asn Tyr Trp Pro Ile
                85                  90                  95

Thr Phe Gly Gln Gly Thr Arg Leu Glu Ile Lys Arg Thr Val Ala Ala
            100                 105                 110

Pro Ser Val Phe Ile Phe Pro Pro Ser Asp Glu Gln Leu Lys Ser Gly

```
                115                 120                 125
Thr Ala Ser Val Val Cys Leu Leu Asn Asn Phe Tyr Pro Arg Glu Ala
    130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205

Phe Asn Arg Gly Glu Cys
    210

<210> SEQ ID NO 329
<211> LENGTH: 213
<212> TYPE: PRT
<213> ORGANISM: Artificial Sequence
<220> FEATURE:
<223> OTHER INFORMATION: PR000679|Chain|LC

<400> SEQUENCE: 329

Asp Ile Gln Met Thr Gln Ser Pro Ser Thr Leu Ser Ala Ser Val Gly
1               5                   10                  15

Asp Arg Val Thr Ile Thr Cys Arg Ala Ser Gln Thr Ile Ser Ile Trp
            20                  25                  30

Leu Ala Trp Tyr Gln Gln Lys Pro Gly Lys Ala Pro Lys Leu Leu Ile
        35                  40                  45

Tyr Lys Ala Ser Ser Leu Glu Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Asp Asp Phe Ala Thr Tyr Tyr Cys Gln Gln Phe Asn Ser Tyr Trp Thr
                85                  90                  95

Phe Gly Gln Gly Thr Lys Val Glu Ile Lys Arg Thr Val Ala Ala Pro
            100                 105                 110

Ser Val Phe Ile Phe Pro Pro Ser Asp Glu Gln Leu Lys Ser Gly Thr
        115                 120                 125

Ala Ser Val Val Cys Leu Leu Asn Asn Phe Tyr Pro Arg Glu Ala Lys
    130                 135                 140

Val Gln Trp Lys Val Asp Asn Ala Leu Gln Ser Gly Asn Ser Gln Glu
145                 150                 155                 160

Ser Val Thr Glu Gln Asp Ser Lys Asp Ser Thr Tyr Ser Leu Ser Ser
                165                 170                 175

Thr Leu Thr Leu Ser Lys Ala Asp Tyr Glu Lys His Lys Val Tyr Ala
            180                 185                 190

Cys Glu Val Thr His Gln Gly Leu Ser Ser Pro Val Thr Lys Ser Phe
        195                 200                 205

Asn Arg Gly Glu Cys
    210

<210> SEQ ID NO 330
<211> LENGTH: 214
<212> TYPE: PRT
<213> ORGANISM: Artificial Sequence
<220> FEATURE:
<223> OTHER INFORMATION: PR000846|Chain|LC; PR003568|Chain
```

<400> SEQUENCE: 330

Lys Ile Val Met Thr Gln Ser Pro Ala Thr Leu Ser Leu Ser Pro Gly
1               5                   10                  15

Glu Arg Ala Thr Leu Ser Cys Arg Ala Ser Gln Ser Val Ser Arg Tyr
            20                  25                  30

Leu Ala Trp Tyr Gln Gln Lys Pro Gly Gln Ala Pro Arg Leu Leu Ile
        35                  40                  45

Tyr Asp Ala Ser Asn Arg Ala Thr Gly Ile Pro Ala Arg Phe Ser Gly
    50                  55                  60

Ser Gly Ser Gly Thr Asp Phe Thr Leu Thr Ile Ser Ser Leu Glu Pro
65                  70                  75                  80

Glu Asp Phe Ala Val Tyr Tyr Cys Gln Gln Arg Ser Asn Trp Ile Phe
                85                  90                  95

Thr Phe Gly Pro Gly Thr Lys Val Asp Ile Lys Arg Thr Val Ala Ala
            100                 105                 110

Pro Ser Val Phe Ile Phe Pro Pro Ser Asp Glu Gln Leu Lys Ser Gly
        115                 120                 125

Thr Ala Ser Val Val Cys Leu Leu Asn Asn Phe Tyr Pro Arg Glu Ala
130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205

Phe Asn Arg Gly Glu Cys
210

<210> SEQ ID NO 331
<211> LENGTH: 218
<212> TYPE: PRT
<213> ORGANISM: Artificial Sequence
<220> FEATURE:
<223> OTHER INFORMATION: PR000150 Chain 1

<400> SEQUENCE: 331

Glu Ile Val Leu Thr Gln Ser Pro Ala Thr Leu Ser Leu Ser Pro Gly
1               5                   10                  15

Glu Arg Ala Thr Leu Ser Cys Arg Ala Ser Lys Gly Val Ser Thr Ser
            20                  25                  30

Gly Tyr Ser Tyr Leu His Trp Tyr Gln Gln Lys Pro Gly Gln Ala Pro
        35                  40                  45

Arg Leu Leu Ile Tyr Leu Ala Ser Tyr Leu Glu Ser Gly Val Pro Ala
    50                  55                  60

Arg Phe Ser Gly Ser Gly Ser Gly Thr Asp Phe Thr Leu Thr Ile Ser
65                  70                  75                  80

Ser Leu Glu Pro Glu Asp Phe Ala Val Tyr Tyr Cys Gln His Ser Arg
                85                  90                  95

Asp Leu Pro Leu Thr Phe Gly Gly Gly Thr Lys Val Glu Ile Lys Arg
            100                 105                 110

Thr Val Ala Ala Pro Ser Val Phe Ile Phe Pro Pro Ser Asp Glu Gln
        115                 120                 125

```
Leu Lys Ser Gly Thr Ala Ser Val Val Cys Leu Leu Asn Asn Phe Tyr
    130                 135                 140

Pro Arg Glu Ala Lys Val Gln Trp Lys Val Asp Asn Ala Leu Gln Ser
145                 150                 155                 160

Gly Asn Ser Gln Glu Ser Val Thr Glu Gln Asp Ser Lys Asp Ser Thr
                165                 170                 175

Tyr Ser Leu Ser Ser Thr Leu Thr Leu Ser Lys Ala Asp Tyr Glu Lys
                180                 185                 190

His Lys Val Tyr Ala Cys Glu Val Thr His Gln Gly Leu Ser Ser Pro
                195                 200                 205

Val Thr Lys Ser Phe Asn Arg Gly Glu Cys
    210                 215
```

<210> SEQ ID NO 332
<211> LENGTH: 447
<212> TYPE: PRT
<213> ORGANISM: Artificial Sequence
<220> FEATURE:
<223> OTHER INFORMATION: PR000150 Chain 2

<400> SEQUENCE: 332

```
Gln Val Gln Leu Val Gln Ser Gly Val Glu Val Lys Lys Pro Gly Ala
1               5                   10                  15

Ser Val Lys Val Ser Cys Lys Ala Ser Gly Tyr Thr Phe Thr Asn Tyr
                20                  25                  30

Tyr Met Tyr Trp Val Arg Gln Ala Pro Gly Gln Gly Leu Glu Trp Met
            35                  40                  45

Gly Gly Ile Asn Pro Ser Gly Gly Thr Asn Phe Asn Glu Lys Phe
    50                  55                  60

Lys Asn Arg Val Thr Leu Thr Thr Asp Ser Ser Thr Thr Thr Ala Tyr
65                  70                  75                  80

Met Glu Leu Lys Ser Leu Gln Phe Asp Asp Thr Ala Val Tyr Tyr Cys
                85                  90                  95

Ala Arg Arg Asp Tyr Arg Phe Asp Met Gly Phe Asp Tyr Trp Gly Gln
                100                 105                 110

Gly Thr Thr Val Thr Val Ser Ser Ala Ser Thr Lys Gly Pro Ser Val
            115                 120                 125

Phe Pro Leu Ala Pro Cys Ser Arg Ser Thr Ser Glu Ser Thr Ala Ala
    130                 135                 140

Leu Gly Cys Leu Val Lys Asp Tyr Phe Pro Glu Pro Val Thr Val Ser
145                 150                 155                 160

Trp Asn Ser Gly Ala Leu Thr Ser Gly Val His Thr Phe Pro Ala Val
                165                 170                 175

Leu Gln Ser Ser Gly Leu Tyr Ser Leu Ser Ser Val Val Thr Val Pro
                180                 185                 190

Ser Ser Ser Leu Gly Thr Lys Thr Tyr Thr Cys Asn Val Asp His Lys
            195                 200                 205

Pro Ser Asn Thr Lys Val Asp Lys Arg Val Glu Ser Lys Tyr Gly Pro
    210                 215                 220

Pro Cys Pro Pro Cys Pro Ala Pro Glu Phe Leu Gly Gly Pro Ser Val
225                 230                 235                 240

Phe Leu Phe Pro Pro Lys Pro Lys Asp Thr Leu Met Ile Ser Arg Thr
                245                 250                 255

Pro Glu Val Thr Cys Val Val Val Asp Val Ser Gln Glu Asp Pro Glu
                260                 265                 270
```

```
Val Gln Phe Asn Trp Tyr Val Asp Gly Val Glu Val His Asn Ala Lys
            275                 280                 285

Thr Lys Pro Arg Glu Glu Gln Phe Asn Ser Thr Tyr Arg Val Val Ser
290                 295                 300

Val Leu Thr Val Leu His Gln Asp Trp Leu Asn Gly Lys Glu Tyr Lys
305                 310                 315                 320

Cys Lys Val Ser Asn Lys Gly Leu Pro Ser Ser Ile Glu Lys Thr Ile
                325                 330                 335

Ser Lys Ala Lys Gly Gln Pro Arg Glu Pro Gln Val Tyr Thr Leu Pro
                340                 345                 350

Pro Ser Gln Glu Glu Met Thr Lys Asn Gln Val Ser Leu Thr Cys Leu
            355                 360                 365

Val Lys Gly Phe Tyr Pro Ser Asp Ile Ala Val Glu Trp Glu Ser Asn
370                 375                 380

Gly Gln Pro Glu Asn Asn Tyr Lys Thr Thr Pro Pro Val Leu Asp Ser
385                 390                 395                 400

Asp Gly Ser Phe Phe Leu Tyr Ser Arg Leu Thr Val Asp Lys Ser Arg
                405                 410                 415

Trp Gln Glu Gly Asn Val Phe Ser Cys Ser Val Met His Glu Ala Leu
            420                 425                 430

His Asn His Tyr Thr Gln Lys Ser Leu Ser Leu Ser Leu Gly Lys
            435                 440                 445

<210> SEQ ID NO 333
<211> LENGTH: 588
<212> TYPE: PRT
<213> ORGANISM: Artificial Sequence
<220> FEATURE:
<223> OTHER INFORMATION: PR003568 Chain

<400> SEQUENCE: 333

Glu Val Gln Leu Val Glu Thr Gly Gly Gly Leu Ile Gln Pro Gly Gly
1               5                   10                  15

Ser Leu Arg Leu Ser Cys Ala Ala Ser Gly Phe Asn Val Ser Ser His
            20                  25                  30

Tyr Met Ser Trp Val Arg Gln Ala Pro Gly Lys Gly Arg Glu Trp Val
        35                  40                  45

Ser Ile Ile Asp Gly Gly Gly Ser Thr Tyr Tyr Ala Asp Ser Val Lys
50                  55                  60

Gly Arg Phe Thr Ile Ser Arg Asp Asn Ser Lys Asn Arg Leu Tyr Leu
65                  70                  75                  80

Gln Met Asn Ser Leu Arg Ala Glu Asp Thr Ala Met Tyr Tyr Cys Ala
                85                  90                  95

Arg Ala Thr Ala Val Ala Glu Lys Asn Gly Tyr Asn Tyr Pro Phe Asn
            100                 105                 110

Tyr Trp Gly Gln Gly Thr Leu Val Thr Val Ser Ser Gly Gly Gly Gly
        115                 120                 125

Ser Gly Gly Gly Gly Ser Gly Gly Gly Ser Gln Val Gln Leu Val
130                 135                 140

Glu Ser Gly Gly Gly Val Ala Gln Pro Gly Arg Ser Leu Ser Leu Ser
145                 150                 155                 160

Cys Ala Ala Ser Gly Phe Thr Phe Ser Asp Tyr Gly Met His Trp Val
                165                 170                 175

Arg Gln Ala Pro Gly Lys Gly Leu Glu Trp Val Ala Leu Ile Trp Tyr
            180                 185                 190
```

Asp Ala Ser Phe Glu Tyr Tyr Ala Asp Ser Val Lys Gly Arg Phe Ser
            195                 200                 205

Ile Ser Arg Asp Asn Ser Lys Asn Thr Leu Tyr Leu Gln Met Asn Ser
    210                 215                 220

Leu Arg Ala Glu Asp Thr Ala Val Tyr Tyr Cys Val Arg Asp Ala Gln
225                 230                 235                 240

Trp Gly Ser Arg Leu Asp Tyr Trp Gly Gln Gly Thr Leu Val Thr Val
                245                 250                 255

Ser Ser Ala Ser Thr Lys Gly Pro Ser Val Phe Pro Leu Ala Pro Ser
            260                 265                 270

Ser Lys Ser Thr Ser Gly Gly Thr Ala Ala Leu Gly Cys Leu Val Lys
    275                 280                 285

Asp Tyr Phe Pro Glu Pro Val Thr Val Ser Trp Asn Ser Gly Ala Leu
290                 295                 300

Thr Ser Gly Val His Thr Phe Pro Ala Val Leu Gln Ser Ser Gly Leu
305                 310                 315                 320

Tyr Ser Leu Ser Ser Val Val Thr Val Pro Ser Ser Ser Leu Gly Thr
                325                 330                 335

Gln Thr Tyr Ile Cys Asn Val Asn His Lys Pro Ser Asn Thr Lys Val
            340                 345                 350

Asp Lys Lys Val Glu Pro Lys Ser Cys Asp Lys Thr His Thr Cys Pro
    355                 360                 365

Pro Cys Pro Ala Pro Glu Ala Ala Gly Gly Pro Ser Val Phe Leu Phe
370                 375                 380

Pro Pro Lys Pro Lys Asp Thr Leu Met Ile Ser Arg Thr Pro Glu Val
385                 390                 395                 400

Thr Cys Val Val Val Asp Val Ser His Glu Asp Pro Glu Val Lys Phe
                405                 410                 415

Asn Trp Tyr Val Asp Gly Val Glu Val His Asn Ala Lys Thr Lys Pro
            420                 425                 430

Arg Glu Glu Gln Tyr Asn Ser Thr Tyr Arg Val Val Ser Val Leu Thr
    435                 440                 445

Val Leu His Gln Asp Trp Leu Asn Gly Lys Glu Tyr Lys Cys Lys Val
450                 455                 460

Ser Asn Lys Ala Leu Pro Ala Pro Ile Glu Lys Thr Ile Ser Lys Ala
465                 470                 475                 480

Lys Gly Gln Pro Arg Glu Pro Gln Val Tyr Thr Leu Pro Pro Ser Arg
                485                 490                 495

Glu Glu Met Thr Lys Asn Gln Val Ser Leu Thr Cys Leu Val Lys Gly
            500                 505                 510

Phe Tyr Pro Ser Asp Ile Ala Val Glu Trp Glu Ser Asn Gly Gln Pro
    515                 520                 525

Glu Asn Asn Tyr Lys Thr Thr Pro Pro Val Leu Asp Ser Asp Gly Ser
530                 535                 540

Phe Phe Leu Tyr Ser Lys Leu Thr Val Asp Lys Ser Arg Trp Gln Gln
545                 550                 555                 560

Gly Asn Val Phe Ser Cys Ser Val Met His Glu Ala Leu His Asn His
                565                 570                 575

Tyr Thr Gln Lys Ser Leu Ser Leu Ser Pro Gly Lys
            580                 585

<210> SEQ ID NO 334
<211> LENGTH: 2
<212> TYPE: PRT

```
<213> ORGANISM: Artificial Sequence
<220> FEATURE:
<223> OTHER INFORMATION: GS_2

<400> SEQUENCE: 334

Gly Ser
1

<210> SEQ ID NO 335
<211> LENGTH: 4
<212> TYPE: PRT
<213> ORGANISM: Artificial Sequence
<220> FEATURE:
<223> OTHER INFORMATION: GS_4

<400> SEQUENCE: 335

Gly Ser Gly Ser
1

<210> SEQ ID NO 336
<211> LENGTH: 5
<212> TYPE: PRT
<213> ORGANISM: Artificial Sequence
<220> FEATURE:
<223> OTHER INFORMATION: GS_5

<400> SEQUENCE: 336

Gly Gly Gly Gly Ser
1               5

<210> SEQ ID NO 337
<211> LENGTH: 7
<212> TYPE: PRT
<213> ORGANISM: Artificial Sequence
<220> FEATURE:
<223> OTHER INFORMATION: GS_7

<400> SEQUENCE: 337

Gly Gly Gly Gly Ser Gly Ser
1               5

<210> SEQ ID NO 338
<211> LENGTH: 15
<212> TYPE: PRT
<213> ORGANISM: Artificial Sequence
<220> FEATURE:
<223> OTHER INFORMATION: GS_15

<400> SEQUENCE: 338

Gly Gly Gly Gly Ser Gly Gly Gly Gly Ser Gly Gly Gly Gly Ser
1               5                   10                  15

<210> SEQ ID NO 339
<211> LENGTH: 20
<212> TYPE: PRT
<213> ORGANISM: Artificial Sequence
<220> FEATURE:
<223> OTHER INFORMATION: GS_20

<400> SEQUENCE: 339

Gly Gly Gly Gly Ser Gly Gly Gly Gly Ser Gly Gly Gly Gly Ser Gly
1               5                   10                  15

Gly Gly Gly Ser
            20

<210> SEQ ID NO 340
```

```
<211> LENGTH: 25
<212> TYPE: PRT
<213> ORGANISM: Artificial Sequence
<220> FEATURE:
<223> OTHER INFORMATION: GS_25

<400> SEQUENCE: 340

Gly Gly Gly Gly Ser Gly Gly Gly Gly Ser Gly Gly Gly Gly Ser Gly
1               5                   10                  15

Gly Gly Gly Ser Gly Gly Gly Gly Ser
            20                  25

<210> SEQ ID NO 341
<211> LENGTH: 15
<212> TYPE: PRT
<213> ORGANISM: Artificial Sequence
<220> FEATURE:
<223> OTHER INFORMATION: ?IgG1??

<400> SEQUENCE: 341

Glu Pro Lys Ser Cys Asp Lys Thr His Thr Cys Pro Pro Cys Pro
1               5                   10                  15

<210> SEQ ID NO 342
<211> LENGTH: 15
<212> TYPE: PRT
<213> ORGANISM: Artificial Sequence
<220> FEATURE:
<223> OTHER INFORMATION: ?IgG1?? (C220S)

<400> SEQUENCE: 342

Glu Pro Lys Ser Ser Asp Lys Thr His Thr Cys Pro Pro Cys Pro
1               5                   10                  15

<210> SEQ ID NO 343
<211> LENGTH: 15
<212> TYPE: PRT
<213> ORGANISM: Artificial Sequence
<220> FEATURE:
<223> OTHER INFORMATION: H1_15

<400> SEQUENCE: 343

Glu Pro Lys Ser Ser Asp Lys Thr His Thr Pro Pro Pro Pro Pro
1               5                   10                  15

<210> SEQ ID NO 344
<211> LENGTH: 15
<212> TYPE: PRT
<213> ORGANISM: Artificial Sequence
<220> FEATURE:
<223> OTHER INFORMATION: G5-LH

<400> SEQUENCE: 344

Gly Gly Gly Gly Gly Asp Lys Thr His Thr Cys Pro Pro Cys Pro
1               5                   10                  15

<210> SEQ ID NO 345
<211> LENGTH: 17
<212> TYPE: PRT
<213> ORGANISM: Artificial Sequence
<220> FEATURE:
<223> OTHER INFORMATION: H1_15-RT

<400> SEQUENCE: 345

Glu Pro Lys Ser Ser Asp Lys Thr His Thr Pro Pro Pro Pro Pro Arg
1               5                   10                  15
```

Thr

<210> SEQ ID NO 346
<211> LENGTH: 18
<212> TYPE: PRT
<213> ORGANISM: Artificial Sequence
<220> FEATURE:
<223> OTHER INFORMATION: L-GS_15-RT

<400> SEQUENCE: 346

Leu Gly Gly Gly Gly Ser Gly Gly Gly Gly Ser Gly Gly Gly Gly Ser
1               5                   10                  15

Arg Thr

<210> SEQ ID NO 347
<211> LENGTH: 18
<212> TYPE: PRT
<213> ORGANISM: Artificial Sequence
<220> FEATURE:
<223> OTHER INFORMATION: L-H1_15-RT

<400> SEQUENCE: 347

Leu Glu Pro Lys Ser Ser Asp Lys Thr His Thr Pro Pro Pro Pro
1               5                   10                  15

Arg Thr

<210> SEQ ID NO 348
<211> LENGTH: 19
<212> TYPE: PRT
<213> ORGANISM: Artificial Sequence
<220> FEATURE:
<223> OTHER INFORMATION: KL-H1_15-RT

<400> SEQUENCE: 348

Lys Leu Glu Pro Lys Ser Ser Asp Lys Thr His Thr Pro Pro Pro Pro
1               5                   10                  15

Pro Arg Thr

<210> SEQ ID NO 349
<211> LENGTH: 19
<212> TYPE: PRT
<213> ORGANISM: Artificial Sequence
<220> FEATURE:
<223> OTHER INFORMATION: KL-H1_15-AS

<400> SEQUENCE: 349

Lys Leu Glu Pro Lys Ser Ser Asp Lys Thr His Thr Pro Pro Pro Pro
1               5                   10                  15

Pro Ala Ser

<210> SEQ ID NO 350
<211> LENGTH: 9
<212> TYPE: PRT
<213> ORGANISM: Artificial Sequence
<220> FEATURE:
<223> OTHER INFORMATION: RT-GS_5-KL

<400> SEQUENCE: 350

Arg Thr Gly Gly Gly Gly Ser Lys Leu
1               5

<210> SEQ ID NO 351
<211> LENGTH: 19
<212> TYPE: PRT

```
<213> ORGANISM: Artificial Sequence
<220> FEATURE:
<223> OTHER INFORMATION: RT-GS_15-KL

<400> SEQUENCE: 351

Arg Thr Gly Gly Gly Gly Ser Gly Gly Gly Gly Ser Gly Gly Gly
1               5                   10                  15

Ser Lys Leu

<210> SEQ ID NO 352
<211> LENGTH: 29
<212> TYPE: PRT
<213> ORGANISM: Artificial Sequence
<220> FEATURE:
<223> OTHER INFORMATION: RT-GS_25-KL

<400> SEQUENCE: 352

Arg Thr Gly Gly Gly Gly Ser Gly Gly Gly Gly Ser Gly Gly Gly
1               5                   10                  15

Ser Gly Gly Gly Gly Ser Gly Gly Gly Ser Lys Leu
            20                  25

<210> SEQ ID NO 353
<211> LENGTH: 107
<212> TYPE: PRT
<213> ORGANISM: Artificial Sequence
<220> FEATURE:
<223> OTHER INFORMATION: Light Chain Constant Region

<400> SEQUENCE: 353

Arg Thr Val Ala Ala Pro Ser Val Phe Ile Phe Pro Pro Ser Asp Glu
1               5                   10                  15

Gln Leu Lys Ser Gly Thr Ala Ser Val Val Cys Leu Leu Asn Asn Phe
            20                  25                  30

Tyr Pro Arg Glu Ala Lys Val Gln Trp Lys Val Asp Asn Ala Leu Gln
        35                  40                  45

Ser Gly Asn Ser Gln Glu Ser Val Thr Glu Gln Asp Ser Lys Asp Ser
    50                  55                  60

Thr Tyr Ser Leu Ser Ser Thr Leu Thr Leu Ser Lys Ala Asp Tyr Glu
65                  70                  75                  80

Lys His Lys Val Tyr Ala Cys Glu Val Thr His Gln Gly Leu Ser Ser
                85                  90                  95

Pro Val Thr Lys Ser Phe Asn Arg Gly Glu Cys
            100                 105

<210> SEQ ID NO 354
<211> LENGTH: 327
<212> TYPE: PRT
<213> ORGANISM: Artificial Sequence
<220> FEATURE:
<223> OTHER INFORMATION: IgG4 Constant Region

<400> SEQUENCE: 354

Ala Ser Thr Lys Gly Pro Ser Val Phe Pro Leu Ala Pro Cys Ser Arg
1               5                   10                  15

Ser Thr Ser Glu Ser Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60
```

Leu Ser Ser Val Val Thr Val Pro Ser Ser Leu Gly Thr Lys Thr
65                  70                  75                  80

Tyr Thr Cys Asn Val Asp His Lys Pro Ser Asn Thr Lys Val Asp Lys
                85                  90                  95

Arg Val Glu Ser Lys Tyr Gly Pro Pro Cys Pro Pro Cys Pro Ala Pro
            100                 105                 110

Glu Phe Leu Gly Gly Pro Ser Val Phe Leu Phe Pro Pro Lys Pro Lys
        115                 120                 125

Asp Thr Leu Met Ile Ser Arg Thr Pro Glu Val Thr Cys Val Val Val
130                 135                 140

Asp Val Ser Gln Glu Asp Pro Glu Val Gln Phe Asn Trp Tyr Val Asp
145                 150                 155                 160

Gly Val Glu Val His Asn Ala Lys Thr Lys Pro Arg Glu Glu Gln Phe
                165                 170                 175

Asn Ser Thr Tyr Arg Val Val Ser Val Leu Thr Val Leu His Gln Asp
            180                 185                 190

Trp Leu Asn Gly Lys Glu Tyr Lys Cys Lys Val Ser Asn Lys Gly Leu
        195                 200                 205

Pro Ser Ser Ile Glu Lys Thr Ile Ser Lys Ala Lys Gly Gln Pro Arg
210                 215                 220

Glu Pro Gln Val Tyr Thr Leu Pro Pro Ser Gln Glu Glu Met Thr Lys
225                 230                 235                 240

Asn Gln Val Ser Leu Thr Cys Leu Val Lys Gly Phe Tyr Pro Ser Asp
                245                 250                 255

Ile Ala Val Glu Trp Glu Ser Asn Gly Gln Pro Glu Asn Asn Tyr Lys
            260                 265                 270

Thr Thr Pro Pro Val Leu Asp Ser Asp Gly Ser Phe Phe Leu Tyr Ser
        275                 280                 285

Arg Leu Thr Val Asp Lys Ser Arg Trp Gln Glu Gly Asn Val Phe Ser
290                 295                 300

Cys Ser Val Met His Glu Ala Leu His Asn His Tyr Thr Gln Lys Ser
305                 310                 315                 320

Leu Ser Leu Ser Leu Gly Lys
                325

<210> SEQ ID NO 355
<211> LENGTH: 232
<212> TYPE: PRT
<213> ORGANISM: Artificial Sequence
<220> FEATURE:
<223> OTHER INFORMATION: IgG1 Constant Region

<400> SEQUENCE: 355

Glu Pro Lys Ser Cys Asp Lys Thr His Thr Cys Pro Pro Cys Pro Ala
1               5                   10                  15

Pro Glu Leu Leu Gly Gly Pro Ser Val Phe Leu Phe Pro Pro Lys Pro
            20                  25                  30

Lys Asp Thr Leu Met Ile Ser Arg Thr Pro Glu Val Thr Cys Val Val
        35                  40                  45

Val Asp Val Ser His Glu Asp Pro Glu Val Lys Phe Asn Trp Tyr Val
    50                  55                  60

Asp Gly Val Glu Val His Asn Ala Lys Thr Lys Pro Arg Glu Glu Gln
65                  70                  75                  80

Tyr Asn Ser Thr Tyr Arg Val Val Ser Val Leu Thr Val Leu His Gln
                85                  90                  95

```
Asp Trp Leu Asn Gly Lys Glu Tyr Lys Cys Lys Val Ser Asn Lys Ala
            100                 105                 110

Leu Pro Ala Pro Ile Glu Lys Thr Ile Ser Lys Ala Lys Gly Gln Pro
        115                 120                 125

Arg Glu Pro Gln Val Tyr Thr Leu Pro Pro Ser Arg Glu Glu Met Thr
    130                 135                 140

Lys Asn Gln Val Ser Leu Thr Cys Leu Val Lys Gly Phe Tyr Pro Ser
145                 150                 155                 160

Asp Ile Ala Val Glu Trp Glu Ser Asn Gly Gln Pro Glu Asn Asn Tyr
                165                 170                 175

Lys Thr Thr Pro Pro Val Leu Asp Ser Asp Gly Ser Phe Phe Leu Tyr
            180                 185                 190

Ser Lys Leu Thr Val Asp Lys Ser Arg Trp Gln Gln Gly Asn Val Phe
        195                 200                 205

Ser Cys Ser Val Met His Glu Ala Leu His Asn His Tyr Thr Gln Lys
    210                 215                 220

Ser Leu Ser Leu Ser Pro Gly Lys
225                 230

<210> SEQ ID NO 356
<211> LENGTH: 25
<212> TYPE: PRT
<213> ORGANISM: Artificial Sequence
<220> FEATURE:
<223> OTHER INFORMATION: Flag-6His

<400> SEQUENCE: 356

Ser Gly His Arg Gly Gln Gly Gly Ser Asp Tyr Lys Asp Asp Asp Asp
1               5                   10                  15

Lys Ala Ser His His His His His
            20                  25

<210> SEQ ID NO 357
<211> LENGTH: 24
<212> TYPE: DNA
<213> ORGANISM: Artificial Sequence
<220> FEATURE:
<223> OTHER INFORMATION: Human VH Gene PCR Amplification Primer 1
<220> FEATURE:
<221> NAME/KEY: misc_feature
<222> LOCATION: (13)..(13)
<223> OTHER INFORMATION: n = g or c

<400> SEQUENCE: 357
ggtgtccagt gtnaggtgca gctg                                          24

<210> SEQ ID NO 358
<211> LENGTH: 29
<212> TYPE: DNA
<213> ORGANISM: Artificial Sequence
<220> FEATURE:
<223> OTHER INFORMATION: Human VH Gene PCR Amplification Primer 2

<400> SEQUENCE: 358
aatccctggg cactgaagag acggtgacc                                     29

<210> SEQ ID NO 359
<211> LENGTH: 9
<212> TYPE: PRT
<213> ORGANISM: Artificial Sequence
<220> FEATURE:
<223> OTHER INFORMATION: H2L2 HCDR1 General Formula
```

```
<220> FEATURE:
<221> NAME/KEY: misc_feature
<222> LOCATION: (2)..(2)
<223> OTHER INFORMATION: Xaa = Asp, Phe, Gly or Leu
<220> FEATURE:
<221> NAME/KEY: misc_feature
<222> LOCATION: (3)..(3)
<223> OTHER INFORMATION: Xaa = Ile, Ser or Thr
<220> FEATURE:
<221> NAME/KEY: misc_feature
<222> LOCATION: (4)..(4)
<223> OTHER INFORMATION: Xaa = Phe, Leu or Val
<220> FEATURE:
<221> NAME/KEY: misc_feature
<222> LOCATION: (6)..(6)
<223> OTHER INFORMATION: Xaa = Asp, Asn or Ser
<220> FEATURE:
<221> NAME/KEY: misc_feature
<222> LOCATION: (7)..(7)
<223> OTHER INFORMATION: Xaa = Asn or Tyr
<220> FEATURE:
<221> NAME/KEY: misc_feature
<222> LOCATION: (8)..(8)
<223> OTHER INFORMATION: Xaa = Ser or Absent
<220> FEATURE:
<221> NAME/KEY: misc_feature
<222> LOCATION: (9)..(9)
<223> OTHER INFORMATION: Xaa = Ala or Absent

<400> SEQUENCE: 359

Gly Xaa Xaa Xaa Ser Xaa Xaa Xaa Xaa
1               5

<210> SEQ ID NO 360
<211> LENGTH: 7
<212> TYPE: PRT
<213> ORGANISM: Artificial Sequence
<220> FEATURE:
<223> OTHER INFORMATION: H2L2 HCDR2 General Formula
<220> FEATURE:
<221> NAME/KEY: misc_feature
<222> LOCATION: (1)..(1)
<223> OTHER INFORMATION: Xaa = Ile, Leu, Ser, Trp or Tyr
<220> FEATURE:
<221> NAME/KEY: misc_feature
<222> LOCATION: (2)..(2)
<223> OTHER INFORMATION: Xaa = Gly, Pro, Ser or Tyr
<220> FEATURE:
<221> NAME/KEY: misc_feature
<222> LOCATION: (3)..(3)
<223> OTHER INFORMATION: Xaa = Asp, Ile, Arg or Ser
<220> FEATURE:
<221> NAME/KEY: misc_feature
<222> LOCATION: (4)..(4)
<223> OTHER INFORMATION: Xaa = Phe, Gly or Ser
<220> FEATURE:
<221> NAME/KEY: misc_feature
<222> LOCATION: (5)..(5)
<223> OTHER INFORMATION: Xaa = Asp, Lys, Ser or Tyr
<220> FEATURE:
<221> NAME/KEY: misc_feature
<222> LOCATION: (6)..(6)
<223> OTHER INFORMATION: Xaa = Lys, Asn, Ser, Thr or Trp
<220> FEATURE:
<221> NAME/KEY: misc_feature
<222> LOCATION: (7)..(7)
<223> OTHER INFORMATION: Xaa = Tyr or Absent

<400> SEQUENCE: 360

Xaa Xaa Xaa Xaa Xaa Xaa Xaa
1               5

<210> SEQ ID NO 361
<211> LENGTH: 14
<212> TYPE: PRT
```

```
<213> ORGANISM: Artificial Sequence
<220> FEATURE:
<223> OTHER INFORMATION: H2L2 HCDR3 General Formula
<220> FEATURE:
<221> NAME/KEY: misc_feature
<222> LOCATION: (1)..(1)
<223> OTHER INFORMATION: Xaa = Glu, Leu, Asn or Ser
<220> FEATURE:
<221> NAME/KEY: misc_feature
<222> LOCATION: (2)..(2)
<223> OTHER INFORMATION: Xaa = Asp, Gly, Pro, Ser or Thr
<220> FEATURE:
<221> NAME/KEY: misc_feature
<222> LOCATION: (3)..(3)
<223> OTHER INFORMATION: Xaa = Asp, Gly, His, Leu or Pro
<220> FEATURE:
<221> NAME/KEY: misc_feature
<222> LOCATION: (4)..(4)
<223> OTHER INFORMATION: Xaa = Asp or Tyr
<220> FEATURE:
<221> NAME/KEY: misc_feature
<222> LOCATION: (5)..(5)
<223> OTHER INFORMATION: Xaa = Ser, Val, Tyr or Absent
<220> FEATURE:
<221> NAME/KEY: misc_feature
<222> LOCATION: (6)..(6)
<223> OTHER INFORMATION: Xaa = Gly, Ser or Absent
<220> FEATURE:
<221> NAME/KEY: misc_feature
<222> LOCATION: (7)..(7)
<223> OTHER INFORMATION: Xaa = Asn, Ser or Absent
<220> FEATURE:
<221> NAME/KEY: misc_feature
<222> LOCATION: (8)..(8)
<223> OTHER INFORMATION: Xaa = Gly, Trp or Absent
<220> FEATURE:
<221> NAME/KEY: misc_feature
<222> LOCATION: (9)..(9)
<223> OTHER INFORMATION: Xaa = Ser, Tyr or Absent
<220> FEATURE:
<221> NAME/KEY: misc_feature
<222> LOCATION: (10)..(10)
<223> OTHER INFORMATION: Xaa = Gln, Tyr or Absent
<220> FEATURE:
<221> NAME/KEY: misc_feature
<222> LOCATION: (11)..(11)
<223> OTHER INFORMATION: Xaa = Leu, Tyr or Absent
<220> FEATURE:
<221> NAME/KEY: misc_feature
<222> LOCATION: (12)..(12)
<223> OTHER INFORMATION: Xaa = Asp, Phe or Absent
<220> FEATURE:
<221> NAME/KEY: misc_feature
<222> LOCATION: (13)..(13)
<223> OTHER INFORMATION: Xaa = Gln, Tyr or Absent
<220> FEATURE:
<221> NAME/KEY: misc_feature
<222> LOCATION: (14)..(14)
<223> OTHER INFORMATION: Xaa = His or Absent

<400> SEQUENCE: 361

Xaa Xaa Xaa Xaa Xaa Xaa Xaa Xaa Xaa Xaa Xaa Xaa Xaa Xaa
1               5                   10

<210> SEQ ID NO 362
<211> LENGTH: 7
<212> TYPE: PRT
<213> ORGANISM: Artificial Sequence
<220> FEATURE:
<223> OTHER INFORMATION: HCAb HCDR1 General Formula 1
<220> FEATURE:
<221> NAME/KEY: misc_feature
<222> LOCATION: (3)..(3)
<223> OTHER INFORMATION: Xaa = Ala, Phe, Asn or Ser
<220> FEATURE:
<221> NAME/KEY: misc_feature
<222> LOCATION: (5)..(5)
```

```
<223> OTHER INFORMATION: Xaa = Asp, Arg, Ser or Val
<220> FEATURE:
<221> NAME/KEY: misc_feature
<222> LOCATION: (6)..(6)
<223> OTHER INFORMATION: Xaa = Phe, Gly, Arg, Ser or Tyr
<220> FEATURE:
<221> NAME/KEY: misc_feature
<222> LOCATION: (7)..(7)
<223> OTHER INFORMATION: Xaa = Phe, His, Asn or Tyr

<400> SEQUENCE: 362

Gly Phe Xaa Val Xaa Xaa Xaa
1               5

<210> SEQ ID NO 363
<211> LENGTH: 5
<212> TYPE: PRT
<213> ORGANISM: Artificial Sequence
<220> FEATURE:
<223> OTHER INFORMATION: HCAb HCDR2 General Formula 1
<220> FEATURE:
<221> NAME/KEY: misc_feature
<222> LOCATION: (1)..(1)
<223> OTHER INFORMATION: Xaa = Asp or His
<220> FEATURE:
<221> NAME/KEY: misc_feature
<222> LOCATION: (2)..(2)
<223> OTHER INFORMATION: Xaa = Gly, Ile, Lys, Arg or Ser
<220> FEATURE:
<221> NAME/KEY: misc_feature
<222> LOCATION: (3)..(3)
<223> OTHER INFORMATION: Xaa = Ala, Gly or Ser
<220> FEATURE:
<221> NAME/KEY: misc_feature
<222> LOCATION: (5)..(5)
<223> OTHER INFORMATION: Xaa = Gly or Ser

<400> SEQUENCE: 363

Xaa Xaa Xaa Gly Xaa
1               5

<210> SEQ ID NO 364
<211> LENGTH: 16
<212> TYPE: PRT
<213> ORGANISM: Artificial Sequence
<220> FEATURE:
<223> OTHER INFORMATION: HCAb HCDR3 General Formula 1
<220> FEATURE:
<221> NAME/KEY: misc_feature
<222> LOCATION: (2)..(2)
<223> OTHER INFORMATION: Xaa = Ile or Thr
<220> FEATURE:
<221> NAME/KEY: misc_feature
<222> LOCATION: (3)..(3)
<223> OTHER INFORMATION: Xaa = Ala, Glu, Met, Gln or Arg
<220> FEATURE:
<221> NAME/KEY: misc_feature
<222> LOCATION: (5)..(5)
<223> OTHER INFORMATION: Xaa = Ala, Pro or Arg
<220> FEATURE:
<221> NAME/KEY: misc_feature
<222> LOCATION: (7)..(7)
<223> OTHER INFORMATION: Xaa = Ala, Glu or Lys
<220> FEATURE:
<221> NAME/KEY: misc_feature
<222> LOCATION: (8)..(8)
<223> OTHER INFORMATION: Xaa = Gly, Asn or Gln

<400> SEQUENCE: 364

Ala Xaa Xaa Val Xaa Glu Xaa Xaa Gly Tyr Asn Tyr Pro Phe Asn Tyr
1               5                   10                  15

<210> SEQ ID NO 365
```

```
<211> LENGTH: 11
<212> TYPE: PRT
<213> ORGANISM: Artificial Sequence
<220> FEATURE:
<223> OTHER INFORMATION: H2L2 LCDR1 General Formula
<220> FEATURE:
<221> NAME/KEY: misc_feature
<222> LOCATION: (5)..(5)
<223> OTHER INFORMATION: Xaa = Ser or Thr
<220> FEATURE:
<221> NAME/KEY: misc_feature
<222> LOCATION: (6)..(6)
<223> OTHER INFORMATION: Xaa = Ile or Val
<220> FEATURE:
<221> NAME/KEY: misc_feature
<222> LOCATION: (8)..(8)
<223> OTHER INFORMATION: Xaa = Ile, Arg or Ser
<220> FEATURE:
<221> NAME/KEY: misc_feature
<222> LOCATION: (9)..(9)
<223> OTHER INFORMATION: Xaa = Asp, Ser, Trp or Tyr

<400> SEQUENCE: 365

Arg Ala Ser Gln Xaa Xaa Ser Xaa Xaa Leu Ala
1               5                   10

<210> SEQ ID NO 366
<211> LENGTH: 7
<212> TYPE: PRT
<213> ORGANISM: Artificial Sequence
<220> FEATURE:
<223> OTHER INFORMATION: H2L2 LCDR2 General Formula
<220> FEATURE:
<221> NAME/KEY: misc_feature
<222> LOCATION: (1)..(1)
<223> OTHER INFORMATION: Xaa = Asp, Gly or Lys
<220> FEATURE:
<221> NAME/KEY: misc_feature
<222> LOCATION: (2)..(2)
<223> OTHER INFORMATION: Xaa = Ala or Thr
<220> FEATURE:
<221> NAME/KEY: misc_feature
<222> LOCATION: (3)..(3)
<223> OTHER INFORMATION: Xaa = Ala or Ser
<220> FEATURE:
<221> NAME/KEY: misc_feature
<222> LOCATION: (4)..(4)
<223> OTHER INFORMATION: Xaa = Lys, Asn, Ser or Thr
<220> FEATURE:
<221> NAME/KEY: misc_feature
<222> LOCATION: (5)..(5)
<223> OTHER INFORMATION: Xaa = Leu or Arg
<220> FEATURE:
<221> NAME/KEY: misc_feature
<222> LOCATION: (6)..(6)
<223> OTHER INFORMATION: Xaa = Ala or Glu
<220> FEATURE:
<221> NAME/KEY: misc_feature
<222> LOCATION: (7)..(7)
<223> OTHER INFORMATION: Xaa = Ser or Thr

<400> SEQUENCE: 366

Xaa Xaa Xaa Xaa Xaa Xaa Xaa
1               5

<210> SEQ ID NO 367
<211> LENGTH: 9
<212> TYPE: PRT
<213> ORGANISM: Artificial Sequence
<220> FEATURE:
<223> OTHER INFORMATION: H2L2 LCDR3 General Formula
<220> FEATURE:
<221> NAME/KEY: misc_feature
<222> LOCATION: (1)..(1)
<223> OTHER INFORMATION: Xaa = His or Gln
```

```
<220> FEATURE:
<221> NAME/KEY: misc_feature
<222> LOCATION: (3)..(3)
<223> OTHER INFORMATION: Xaa = Phe, His, Arg or Tyr
<220> FEATURE:
<221> NAME/KEY: misc_feature
<222> LOCATION: (4)..(4)
<223> OTHER INFORMATION: Xaa = Asn or Ser
<220> FEATURE:
<221> NAME/KEY: misc_feature
<222> LOCATION: (5)..(5)
<223> OTHER INFORMATION: Xaa = Asn, Ser or Tyr
<220> FEATURE:
<221> NAME/KEY: misc_feature
<222> LOCATION: (6)..(6)
<223> OTHER INFORMATION: Xaa = Trp or Tyr
<220> FEATURE:
<221> NAME/KEY: misc_feature
<222> LOCATION: (7)..(7)
<223> OTHER INFORMATION: Xaa = Ile, Pro or Trp
<220> FEATURE:
<221> NAME/KEY: misc_feature
<222> LOCATION: (8)..(8)
<223> OTHER INFORMATION: Xaa = Phe, Ile, Leu or Thr
<220> FEATURE:
<221> NAME/KEY: misc_feature
<222> LOCATION: (9)..(9)
<223> OTHER INFORMATION: Xaa = Thr or Absent

<400> SEQUENCE: 367

Xaa Gln Xaa Xaa Xaa Xaa Xaa Xaa Xaa
1               5

<210> SEQ ID NO 368
<211> LENGTH: 126
<212> TYPE: PRT
<213> ORGANISM: Artificial Sequence
<220> FEATURE:
<223> OTHER INFORMATION: H2L2 VH General Formula
<220> FEATURE:
<221> NAME/KEY: misc_feature
<222> LOCATION: (1)..(1)
<223> OTHER INFORMATION: Xaa = Glu or Gln
<220> FEATURE:
<221> NAME/KEY: misc_feature
<222> LOCATION: (2)..(2)
<223> OTHER INFORMATION: Xaa = Ile or Val
<220> FEATURE:
<221> NAME/KEY: misc_feature
<222> LOCATION: (5)..(5)
<223> OTHER INFORMATION: Xaa = Leu, Gln or Val
<220> FEATURE:
<221> NAME/KEY: misc_feature
<222> LOCATION: (6)..(6)
<223> OTHER INFORMATION: Xaa = Glu or Gln
<220> FEATURE:
<221> NAME/KEY: misc_feature
<222> LOCATION: (9)..(9)
<223> OTHER INFORMATION: Xaa = Gly, Pro or Thr
<220> FEATURE:
<221> NAME/KEY: misc_feature
<222> LOCATION: (10)..(10)
<223> OTHER INFORMATION: Xaa = Glu or Gly
<220> FEATURE:
<221> NAME/KEY: misc_feature
<222> LOCATION: (11)..(11)
<223> OTHER INFORMATION: Xaa = Leu or Val
<220> FEATURE:
<221> NAME/KEY: misc_feature
<222> LOCATION: (12)..(12)
<223> OTHER INFORMATION: Xaa = Lys or Val
<220> FEATURE:
<221> NAME/KEY: misc_feature
<222> LOCATION: (13)..(13)
<223> OTHER INFORMATION: Xaa = Lys or Gln
<220> FEATURE:
<221> NAME/KEY: misc_feature
```

```
<222> LOCATION: (15)..(15)
<223> OTHER INFORMATION: Xaa = Gly or Ser
<220> FEATURE:
<221> NAME/KEY: misc_feature
<222> LOCATION: (16)..(16)
<223> OTHER INFORMATION: Xaa = Gly, Lys, Gln, Arg or Ser
<220> FEATURE:
<221> NAME/KEY: misc_feature
<222> LOCATION: (17)..(17)
<223> OTHER INFORMATION: Xaa = Ser or Thr
<220> FEATURE:
<221> NAME/KEY: misc_feature
<222> LOCATION: (18)..(18)
<223> OTHER INFORMATION: Xaa = Leu or Val
<220> FEATURE:
<221> NAME/KEY: misc_feature
<222> LOCATION: (19)..(19)
<223> OTHER INFORMATION: Xaa = Lys, Arg or Ser
<220> FEATURE:
<221> NAME/KEY: misc_feature
<222> LOCATION: (20)..(20)
<223> OTHER INFORMATION: Xaa = Leu or Val
<220> FEATURE:
<221> NAME/KEY: misc_feature
<222> LOCATION: (21)..(21)
<223> OTHER INFORMATION: Xaa = Ser or Thr
<220> FEATURE:
<221> NAME/KEY: misc_feature
<222> LOCATION: (23)..(23)
<223> OTHER INFORMATION: Xaa = Ala, Lys, Thr or Val
<220> FEATURE:
<221> NAME/KEY: misc_feature
<222> LOCATION: (24)..(24)
<223> OTHER INFORMATION: Xaa = Ala, Asp, Ile or Val
<220> FEATURE:
<221> NAME/KEY: misc_feature
<222> LOCATION: (27)..(27)
<223> OTHER INFORMATION: Xaa = Asp, Phe, Gly or Leu
<220> FEATURE:
<221> NAME/KEY: misc_feature
<222> LOCATION: (28)..(28)
<223> OTHER INFORMATION: Xaa = Ile, Ser or Thr
<220> FEATURE:
<221> NAME/KEY: misc_feature
<222> LOCATION: (29)..(29)
<223> OTHER INFORMATION: Xaa = Phe, Leu or Val
<220> FEATURE:
<221> NAME/KEY: misc_feature
<222> LOCATION: (31)..(31)
<223> OTHER INFORMATION: Xaa = Asp, Asn or Ser
<220> FEATURE:
<221> NAME/KEY: misc_feature
<222> LOCATION: (32)..(32)
<223> OTHER INFORMATION: Xaa = Asn or Tyr
<220> FEATURE:
<221> NAME/KEY: misc_feature
<222> LOCATION: (33)..(33)
<223> OTHER INFORMATION: Xaa = Ser or Absent
<220> FEATURE:
<221> NAME/KEY: misc_feature
<222> LOCATION: (34)..(34)
<223> OTHER INFORMATION: Xaa = Ala or Absent
<220> FEATURE:
<221> NAME/KEY: misc_feature
<222> LOCATION: (35)..(35)
<223> OTHER INFORMATION: Xaa = Ala or Gly
<220> FEATURE:
<221> NAME/KEY: misc_feature
<222> LOCATION: (36)..(36)
<223> OTHER INFORMATION: Xaa = Ile, Met or Trp
<220> FEATURE:
<221> NAME/KEY: misc_feature
<222> LOCATION: (37)..(37)
<223> OTHER INFORMATION: Xaa = His, Asn, Ser or Thr
<220> FEATURE:
<221> NAME/KEY: misc_feature
<222> LOCATION: (39)..(39)
<223> OTHER INFORMATION: Xaa = Ile or Val
<220> FEATURE:
```

```
<221> NAME/KEY: misc_feature
<222> LOCATION: (42)..(42)
<223> OTHER INFORMATION: Xaa = Ala or Ser
<220> FEATURE:
<221> NAME/KEY: misc_feature
<222> LOCATION: (44)..(44)
<223> OTHER INFORMATION: Xaa = Gly or Ser
<220> FEATURE:
<221> NAME/KEY: misc_feature
<222> LOCATION: (45)..(45)
<223> OTHER INFORMATION: Xaa = Lys, Gln or Arg
<220> FEATURE:
<221> NAME/KEY: misc_feature
<222> LOCATION: (50)..(50)
<223> OTHER INFORMATION: Xaa = Leu, Met or Val
<220> FEATURE:
<221> NAME/KEY: misc_feature
<222> LOCATION: (51)..(51)
<223> OTHER INFORMATION: Xaa = Ala, Gly or Ser
<220> FEATURE:
<221> NAME/KEY: misc_feature
<222> LOCATION: (52)..(52)
<223> OTHER INFORMATION: Xaa = Gly, Arg or Val
<220> FEATURE:
<221> NAME/KEY: misc_feature
<222> LOCATION: (53)..(53)
<223> OTHER INFORMATION: Xaa = Ile or Thr
<220> FEATURE:
<221> NAME/KEY: misc_feature
<222> LOCATION: (54)..(54)
<223> OTHER INFORMATION: Xaa = Ile, Leu, Ser, Trp or Tyr
<220> FEATURE:
<221> NAME/KEY: misc_feature
<222> LOCATION: (55)..(55)
<223> OTHER INFORMATION: Xaa = Gly, Pro, Ser or Tyr
<220> FEATURE:
<221> NAME/KEY: misc_feature
<222> LOCATION: (56)..(56)
<223> OTHER INFORMATION: Xaa = Asp, Ile, Arg or Ser
<220> FEATURE:
<221> NAME/KEY: misc_feature
<222> LOCATION: (57)..(57)
<223> OTHER INFORMATION: Xaa = Phe, Gly or Ser
<220> FEATURE:
<221> NAME/KEY: misc_feature
<222> LOCATION: (58)..(58)
<223> OTHER INFORMATION: Xaa = Asp, Lys, Ser or Tyr
<220> FEATURE:
<221> NAME/KEY: misc_feature
<222> LOCATION: (59)..(59)
<223> OTHER INFORMATION: Xaa = Lys, Asn, Ser, Thr or Trp
<220> FEATURE:
<221> NAME/KEY: misc_feature
<222> LOCATION: (60)..(60)
<223> OTHER INFORMATION: Xaa = Tyr or Absent
<220> FEATURE:
<221> NAME/KEY: misc_feature
<222> LOCATION: (61)..(61)
<223> OTHER INFORMATION: Xaa = Lys, Ser, Thr or Val
<220> FEATURE:
<221> NAME/KEY: misc_feature
<222> LOCATION: (62)..(62)
<223> OTHER INFORMATION: Xaa = Asp, Ser or Tyr
<220> FEATURE:
<221> NAME/KEY: misc_feature
<222> LOCATION: (63)..(63)
<223> OTHER INFORMATION: Xaa = Ser or Tyr
<220> FEATURE:
<221> NAME/KEY: misc_feature
<222> LOCATION: (64)..(64)
<223> OTHER INFORMATION: Xaa = Ala or Gly
<220> FEATURE:
<221> NAME/KEY: misc_feature
<222> LOCATION: (65)..(65)
<223> OTHER INFORMATION: Xaa = Asp, Ile or Gln
<220> FEATURE:
<221> NAME/KEY: misc_feature
<222> LOCATION: (66)..(66)
<223> OTHER INFORMATION: Xaa = Lys or Ser
```

-continued

```
<220> FEATURE:
<221> NAME/KEY: misc_feature
<222> LOCATION: (67)..(67)
<223> OTHER INFORMATION: Xaa = Phe or Val
<220> FEATURE:
<221> NAME/KEY: misc_feature
<222> LOCATION: (68)..(68)
<223> OTHER INFORMATION: Xaa = Lys, Asn or Gln
<220> FEATURE:
<221> NAME/KEY: misc_feature
<222> LOCATION: (69)..(69)
<223> OTHER INFORMATION: Xaa = Gly or Ser
<220> FEATURE:
<221> NAME/KEY: misc_feature
<222> LOCATION: (71)..(71)
<223> OTHER INFORMATION: Xaa = Phe, Ile or Val
<220> FEATURE:
<221> NAME/KEY: misc_feature
<222> LOCATION: (73)..(73)
<223> OTHER INFORMATION: Xaa = Ile or Val
<220> FEATURE:
<221> NAME/KEY: misc_feature
<222> LOCATION: (74)..(74)
<223> OTHER INFORMATION: Xaa = Asn, Ser or Thr
<220> FEATURE:
<221> NAME/KEY: misc_feature
<222> LOCATION: (75)..(75)
<223> OTHER INFORMATION: Xaa = Ala, Pro or Arg
<220> FEATURE:
<221> NAME/KEY: misc_feature
<222> LOCATION: (77)..(77)
<223> OTHER INFORMATION: Xaa = Lys, Asn or Thr
<220> FEATURE:
<221> NAME/KEY: misc_feature
<222> LOCATION: (79)..(79)
<223> OTHER INFORMATION: Xaa = Lys or Thr
<220> FEATURE:
<221> NAME/KEY: misc_feature
<222> LOCATION: (80)..(80)
<223> OTHER INFORMATION: Xaa = Lys, Asn or Ser
<220> FEATURE:
<221> NAME/KEY: misc_feature
<222> LOCATION: (81)..(81)
<223> OTHER INFORMATION: Xaa = Leu or Thr
<220> FEATURE:
<221> NAME/KEY: misc_feature
<222> LOCATION: (82)..(82)
<223> OTHER INFORMATION: Xaa = Ala, Phe or Leu
<220> FEATURE:
<221> NAME/KEY: misc_feature
<222> LOCATION: (83)..(83)
<223> OTHER INFORMATION: Xaa = Ser or Tyr
<220> FEATURE:
<221> NAME/KEY: misc_feature
<222> LOCATION: (84)..(84)
<223> OTHER INFORMATION: Xaa = Leu or Met
<220> FEATURE:
<221> NAME/KEY: misc_feature
<222> LOCATION: (85)..(85)
<223> OTHER INFORMATION: Xaa = Glu or Gln
<220> FEATURE:
<221> NAME/KEY: misc_feature
<222> LOCATION: (86)..(86)
<223> OTHER INFORMATION: Xaa = Leu or Met
<220> FEATURE:
<221> NAME/KEY: misc_feature
<222> LOCATION: (87)..(87)
<223> OTHER INFORMATION: Xaa = Phe or Asn
<220> FEATURE:
<221> NAME/KEY: misc_feature
<222> LOCATION: (88)..(88)
<223> OTHER INFORMATION: Xaa = Asn, Pro or Ser
<220> FEATURE:
<221> NAME/KEY: misc_feature
<222> LOCATION: (89)..(89)
<223> OTHER INFORMATION: Xaa = Leu, Met or Val
<220> FEATURE:
<221> NAME/KEY: misc_feature
<222> LOCATION: (90)..(90)
```

```
<223> OTHER INFORMATION: Xaa = Arg or Thr
<220> FEATURE:
<221> NAME/KEY: misc_feature
<222> LOCATION: (91)..(91)
<223> OTHER INFORMATION: Xaa = Ala, Asp, Pro, Ser or Val
<220> FEATURE:
<221> NAME/KEY: misc_feature
<222> LOCATION: (98)..(98)
<223> OTHER INFORMATION: Xaa = Phe or Tyr
<220> FEATURE:
<221> NAME/KEY: misc_feature
<222> LOCATION: (100)..(100)
<223> OTHER INFORMATION: Xaa = Ala or Thr
<220> FEATURE:
<221> NAME/KEY: misc_feature
<222> LOCATION: (101)..(101)
<223> OTHER INFORMATION: Xaa = Asp, Glu, Arg or Thr
<220> FEATURE:
<221> NAME/KEY: misc_feature
<222> LOCATION: (102)..(102)
<223> OTHER INFORMATION: Xaa = Glu, Leu, Asn or Ser
<220> FEATURE:
<221> NAME/KEY: misc_feature
<222> LOCATION: (103)..(103)
<223> OTHER INFORMATION: Xaa = Asp, Gly, Pro, Ser or Thr
<220> FEATURE:
<221> NAME/KEY: misc_feature
<222> LOCATION: (104)..(104)
<223> OTHER INFORMATION: Xaa = Asp, Gly, His, Leu or Pro
<220> FEATURE:
<221> NAME/KEY: misc_feature
<222> LOCATION: (105)..(105)
<223> OTHER INFORMATION: Xaa = Asp or Tyr
<220> FEATURE:
<221> NAME/KEY: misc_feature
<222> LOCATION: (106)..(106)
<223> OTHER INFORMATION: Xaa = Ser, Val, Tyr or Absent
<220> FEATURE:
<221> NAME/KEY: misc_feature
<222> LOCATION: (107)..(107)
<223> OTHER INFORMATION: Xaa = Gly, Ser or Absent
<220> FEATURE:
<221> NAME/KEY: misc_feature
<222> LOCATION: (108)..(108)
<223> OTHER INFORMATION: Xaa = Asn, Ser or Absent
<220> FEATURE:
<221> NAME/KEY: misc_feature
<222> LOCATION: (109)..(109)
<223> OTHER INFORMATION: Xaa = Gly, Trp or Absent
<220> FEATURE:
<221> NAME/KEY: misc_feature
<222> LOCATION: (110)..(110)
<223> OTHER INFORMATION: Xaa = Ser, Tyr or Absent
<220> FEATURE:
<221> NAME/KEY: misc_feature
<222> LOCATION: (111)..(111)
<223> OTHER INFORMATION: Xaa = Gln, Tyr or Absent
<220> FEATURE:
<221> NAME/KEY: misc_feature
<222> LOCATION: (112)..(112)
<223> OTHER INFORMATION: Xaa = Leu, Tyr or Absent
<220> FEATURE:
<221> NAME/KEY: misc_feature
<222> LOCATION: (113)..(113)
<223> OTHER INFORMATION: Xaa = Asp, Phe or Absent
<220> FEATURE:
<221> NAME/KEY: misc_feature
<222> LOCATION: (114)..(114)
<223> OTHER INFORMATION: Xaa = Gln, Tyr or Absent
<220> FEATURE:
<221> NAME/KEY: misc_feature
<222> LOCATION: (115)..(115)
<223> OTHER INFORMATION: Xaa = His or Absent
<220> FEATURE:
<221> NAME/KEY: misc_feature
<222> LOCATION: (117)..(117)
<223> OTHER INFORMATION: Xaa = Gly or Ser
<220> FEATURE:
<221> NAME/KEY: misc_feature
```

-continued

```
<222> LOCATION: (121)..(121)
<223> OTHER INFORMATION: Xaa = Leu or Thr

<400> SEQUENCE: 368

Xaa Xaa Gln Leu Xaa Xaa Ser Gly Xaa Xaa Xaa Xaa Pro Xaa Xaa
1               5                   10                  15

Xaa Xaa Xaa Xaa Xaa Cys Xaa Xaa Ser Gly Xaa Xaa Xaa Ser Xaa Xaa
            20                  25                  30

Xaa Xaa Xaa Xaa Xaa Trp Xaa Arg Gln Xaa Pro Xaa Xaa Gly Leu Glu
        35                  40                  45

Trp Xaa Xaa Xaa Xaa Xaa Xaa Xaa Xaa Xaa Xaa Xaa Xaa Xaa
    50                  55                  60

Xaa Xaa Xaa Xaa Xaa Arg Xaa Thr Xaa Xaa Xaa Asp Xaa Ser Xaa Xaa
65                  70                  75                  80

Xaa Xaa Xaa Xaa Xaa Xaa Xaa Xaa Xaa Xaa Glu Asp Thr Ala Val
                85                  90                  95

Tyr Xaa Cys Xaa Xaa Xaa Xaa Xaa Xaa Xaa Xaa Xaa Xaa Xaa
            100                 105                 110

Xaa Xaa Xaa Trp Xaa Gln Gly Thr Xaa Val Thr Val Ser Ser
        115                 120                 125

<210> SEQ ID NO 369
<211> LENGTH: 107
<212> TYPE: PRT
<213> ORGANISM: Artificial Sequence
<220> FEATURE:
<223> OTHER INFORMATION: H2L2 VL General Formula
<220> FEATURE:
<221> NAME/KEY: misc_feature
<222> LOCATION: (1)..(1)
<223> OTHER INFORMATION: Xaa = Asp or Glu
<220> FEATURE:
<221> NAME/KEY: misc_feature
<222> LOCATION: (3)..(3)
<223> OTHER INFORMATION: Xaa = Gln or Val
<220> FEATURE:
<221> NAME/KEY: misc_feature
<222> LOCATION: (4)..(4)
<223> OTHER INFORMATION: Xaa = Leu or Met
<220> FEATURE:
<221> NAME/KEY: misc_feature
<222> LOCATION: (9)..(9)
<223> OTHER INFORMATION: Xaa = Ala or Ser
<220> FEATURE:
<221> NAME/KEY: misc_feature
<222> LOCATION: (13)..(13)
<223> OTHER INFORMATION: Xaa = Ala, Phe, Leu or Val
<220> FEATURE:
<221> NAME/KEY: misc_feature
<222> LOCATION: (15)..(15)
<223> OTHER INFORMATION: Xaa = Pro or Val
<220> FEATURE:
<221> NAME/KEY: misc_feature
<222> LOCATION: (17)..(17)
<223> OTHER INFORMATION: Xaa = Asp or Glu
<220> FEATURE:
<221> NAME/KEY: misc_feature
<222> LOCATION: (19)..(19)
<223> OTHER INFORMATION: Xaa = Ala or Val
<220> FEATURE:
<221> NAME/KEY: misc_feature
<222> LOCATION: (21)..(21)
<223> OTHER INFORMATION: Xaa = Ile or Leu
<220> FEATURE:
<221> NAME/KEY: misc_feature
<222> LOCATION: (22)..(22)
<223> OTHER INFORMATION: Xaa = Ser or Thr
<220> FEATURE:
<221> NAME/KEY: misc_feature
<222> LOCATION: (28)..(28)
```

```
<223> OTHER INFORMATION: Xaa = Ser or Thr
<220> FEATURE:
<221> NAME/KEY: misc_feature
<222> LOCATION: (29)..(29)
<223> OTHER INFORMATION: Xaa = Ile or Val
<220> FEATURE:
<221> NAME/KEY: misc_feature
<222> LOCATION: (31)..(31)
<223> OTHER INFORMATION: Xaa = Ile, Arg or Ser
<220> FEATURE:
<221> NAME/KEY: misc_feature
<222> LOCATION: (32)..(32)
<223> OTHER INFORMATION: Xaa = Asp, Ser, Trp or Tyr
<220> FEATURE:
<221> NAME/KEY: misc_feature
<222> LOCATION: (42)..(42)
<223> OTHER INFORMATION: Xaa = Lys or Gln
<220> FEATURE:
<221> NAME/KEY: misc_feature
<222> LOCATION: (45)..(45)
<223> OTHER INFORMATION: Xaa = Lys, Arg or Ser
<220> FEATURE:
<221> NAME/KEY: misc_feature
<222> LOCATION: (48)..(48)
<223> OTHER INFORMATION: Xaa = Ile or Met
<220> FEATURE:
<221> NAME/KEY: misc_feature
<222> LOCATION: (49)..(49)
<223> OTHER INFORMATION: Xaa = His or Tyr
<220> FEATURE:
<221> NAME/KEY: misc_feature
<222> LOCATION: (50)..(50)
<223> OTHER INFORMATION: Xaa = Asp, Gly or Lys
<220> FEATURE:
<221> NAME/KEY: misc_feature
<222> LOCATION: (51)..(51)
<223> OTHER INFORMATION: Xaa = Ala or Thr
<220> FEATURE:
<221> NAME/KEY: misc_feature
<222> LOCATION: (52)..(52)
<223> OTHER INFORMATION: Xaa = Ala or Ser
<220> FEATURE:
<221> NAME/KEY: misc_feature
<222> LOCATION: (53)..(53)
<223> OTHER INFORMATION: Xaa = Lys, Asn, Ser or Thr
<220> FEATURE:
<221> NAME/KEY: misc_feature
<222> LOCATION: (54)..(54)
<223> OTHER INFORMATION: Xaa = Leu or Arg
<220> FEATURE:
<221> NAME/KEY: misc_feature
<222> LOCATION: (55)..(55)
<223> OTHER INFORMATION: Xaa = Ala or Glu
<220> FEATURE:
<221> NAME/KEY: misc_feature
<222> LOCATION: (56)..(56)
<223> OTHER INFORMATION: Xaa = Ser or Thr
<220> FEATURE:
<221> NAME/KEY: misc_feature
<222> LOCATION: (58)..(58)
<223> OTHER INFORMATION: Xaa = Ile, Leu or Val
<220> FEATURE:
<221> NAME/KEY: misc_feature
<222> LOCATION: (60)..(60)
<223> OTHER INFORMATION: Xaa = Ala or Ser
<220> FEATURE:
<221> NAME/KEY: misc_feature
<222> LOCATION: (63)..(63)
<223> OTHER INFORMATION: Xaa = Asn or Ser
<220> FEATURE:
<221> NAME/KEY: misc_feature
<222> LOCATION: (70)..(70)
<223> OTHER INFORMATION: Xaa = Asp or Glu
<220> FEATURE:
<221> NAME/KEY: misc_feature
<222> LOCATION: (79)..(79)
<223> OTHER INFORMATION: Xaa = Glu or Gln
<220> FEATURE:
<221> NAME/KEY: misc_feature
```

```
<222> LOCATION: (80)..(80)
<223> OTHER INFORMATION: Xaa = Pro or Ser
<220> FEATURE:
<221> NAME/KEY: misc_feature
<222> LOCATION: (81)..(81)
<223> OTHER INFORMATION: Xaa = Asp or Glu
<220> FEATURE:
<221> NAME/KEY: misc_feature
<222> LOCATION: (85)..(85)
<223> OTHER INFORMATION: Xaa = Thr or Val
<220> FEATURE:
<221> NAME/KEY: misc_feature
<222> LOCATION: (89)..(89)
<223> OTHER INFORMATION: Xaa = His or Gln
<220> FEATURE:
<221> NAME/KEY: misc_feature
<222> LOCATION: (91)..(91)
<223> OTHER INFORMATION: Xaa = Phe, His, Arg or Tyr
<220> FEATURE:
<221> NAME/KEY: misc_feature
<222> LOCATION: (92)..(92)
<223> OTHER INFORMATION: Xaa = Asn or Ser
<220> FEATURE:
<221> NAME/KEY: misc_feature
<222> LOCATION: (93)..(93)
<223> OTHER INFORMATION: Xaa = Asn, Ser or Tyr
<220> FEATURE:
<221> NAME/KEY: misc_feature
<222> LOCATION: (94)..(94)
<223> OTHER INFORMATION: Xaa = Trp or Tyr
<220> FEATURE:
<221> NAME/KEY: misc_feature
<222> LOCATION: (95)..(95)
<223> OTHER INFORMATION: Xaa = Ile, Pro or Trp
<220> FEATURE:
<221> NAME/KEY: misc_feature
<222> LOCATION: (96)..(96)
<223> OTHER INFORMATION: Xaa = Phe, Ile, Leu or Absent
<220> FEATURE:
<221> NAME/KEY: misc_feature
<222> LOCATION: (100)..(100)
<223> OTHER INFORMATION: Xaa = Gly, Pro or Gln
<220> FEATURE:
<221> NAME/KEY: misc_feature
<222> LOCATION: (103)..(103)
<223> OTHER INFORMATION: Xaa = Lys or Arg
<220> FEATURE:
<221> NAME/KEY: misc_feature
<222> LOCATION: (104)..(104)
<223> OTHER INFORMATION: Xaa = Leu or Val
<220> FEATURE:
<221> NAME/KEY: misc_feature
<222> LOCATION: (105)..(105)
<223> OTHER INFORMATION: Xaa = Asp or Glu

<400> SEQUENCE: 369

Xaa Ile Xaa Xaa Thr Gln Ser Pro Xaa Thr Leu Ser Xaa Ser Xaa Gly
1               5                   10                  15

Xaa Arg Xaa Thr Xaa Xaa Cys Arg Ala Ser Gln Xaa Xaa Ser Xaa Xaa
            20                  25                  30

Leu Ala Trp Tyr Gln Gln Lys Pro Gly Xaa Ala Pro Xaa Leu Leu Xaa
            35                  40                  45

Xaa Xaa Xaa Xaa Xaa Xaa Xaa Gly Xaa Pro Xaa Arg Phe Xaa Gly
    50                  55                  60

Ser Gly Ser Gly Thr Xaa Phe Thr Leu Thr Ile Ser Ser Leu Xaa Xaa
65                  70                  75                  80

Xaa Asp Phe Ala Xaa Tyr Tyr Cys Xaa Gln Xaa Xaa Xaa Xaa Xaa Xaa
                85                  90                  95

Thr Phe Gly Xaa Gly Thr Xaa Xaa Xaa Ile Lys
                100                 105
```